(12) United States Patent
Kishigami et al.

(10) Patent No.: US 11,940,524 B2
(45) Date of Patent: Mar. 26, 2024

(54) RADAR APPARATUS AND RADAR METHOD

(71) Applicant: PANASONIC INTELLECTUAL PROPERTY MANAGEMENT CO., LTD., Osaka (JP)

(72) Inventors: Takaaki Kishigami, Tokyo (JP); Ryosuke Shiozaki, Tokyo (JP); Hidekuni Yomo, Kanagawa (JP); Kenta Iwasa, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/952,824

(22) Filed: Sep. 26, 2022

(65) Prior Publication Data

US 2023/0008565 A1     Jan. 12, 2023

Related U.S. Application Data

(63) Continuation of application No. 16/584,341, filed on Sep. 26, 2019, now Pat. No. 11,486,994.

(30) Foreign Application Priority Data

Sep. 28, 2018   (JP) ................................ 2018-185243
Sep. 28, 2018   (JP) ................................ 2018-185294
Mar. 27, 2019   (JP) ................................ 2019-061414

(51) Int. Cl.
  *G01S 13/34*    (2006.01)
  *G01S 7/40*     (2006.01)
  *G01S 13/02*    (2006.01)

(52) U.S. Cl.
  CPC .......... *G01S 13/343* (2013.01); *G01S 7/4026* (2013.01); *G01S 7/403* (2021.05); *G01S 7/4034* (2021.05); *G01S 2013/0245* (2013.01)

(58) Field of Classification Search
  CPC .... G01S 13/343; G01S 7/4026; G01S 7/4034; G01S 7/403; G01S 2013/0245; G01S 13/284; G01S 13/42
  See application file for complete search history.

(56) References Cited

U.S. PATENT DOCUMENTS 4,398,198 A  * 8/1983  Dano ........................ G01S 1/24
                                                                342/451
9,664,777 B2 * 5/2017  Kishigami .............. G01S 7/023
(Continued)

FOREIGN PATENT DOCUMENTS

CN        106019238        10/2016
CN        108232468         6/2018
(Continued)

OTHER PUBLICATIONS

Li et al., "MIMO Radar with Colocated Antennas", IEEE Signal Processing Magazine, vol. 24, Issue 5, pp. 106-114 (Sep. 2007).
(Continued)

*Primary Examiner* — Olumide Ajibade Akonai
*Assistant Examiner* — Yonghong Li
(74) *Attorney, Agent, or Firm* — Greenblum & Bernstein, P.L.C.

(57) ABSTRACT

A radar device includes radar transmission and receiving circuits. The radar transmission circuit transmits one or more transmission signals, each having a transmission period Tr. The radar receiving circuit receives one or more reflected signals in which the transmission signals are reflected by an object and estimates a direction of the object based on the reflected signals. The radar transmission circuit includes Nt transmission antennas. A control circuit sets a transmission gap period between a first and second periods, with the transmission gap period being a period during which the transmission signals are not transmitted. The first period is equal to an integral multiple of a period Np, the period Np (Continued)

is equal to or more than Nt times the transmission period Tr, and the second period is set after the first period and is equal to an integral multiple of the period Np.

6 Claims, 54 Drawing Sheets

(56) References Cited

U.S. PATENT DOCUMENTS

| 10,261,179 | B2* | 4/2019 | Davis | G01S 13/87 |
|---|---|---|---|---|
| 2008/0303711 | A1 | 12/2008 | Matsuoka | |
| 2011/0074621 | A1 | 3/2011 | Wintermantel | |
| 2015/0168540 | A1 | 6/2015 | Morita et al. | |
| 2016/0033632 | A1 | 2/2016 | Searcy | |
| 2017/0248692 | A1* | 8/2017 | Zivkovic | G01S 13/42 |
| 2017/0254879 | A1 | 9/2017 | Tokieda et al. | |
| 2017/0276769 | A1 | 9/2017 | Kishigami | |

FOREIGN PATENT DOCUMENTS

| JP | 2008-304417 | 12/2008 |
|---|---|---|
| JP | 2011-526371 | 10/2011 |
| JP | 2013-079890 | 5/2013 |
| JP | 2016-050778 | 4/2016 |
| JP | 2017-173227 | 9/2017 |

OTHER PUBLICATIONS

Kronauge et al., "Fast Two-Dimensional CFAR Procedure", IEEE Transactions on Aerospace and Electronic Systems, vol. 49, No. 3, pp. 1817-1823 (Jul. 2013).

Cadzow, "Direction-of-Arrival Estimation Using Signal Subspace Modeling", IEEE Transactions on Aerospace and Electronic Systems, vol. 28, No. 1, pp. 64-79 (Jan. 1992).

English language translation of Office Action from Japan Patent Office (JPO) in Japanese Patent Appl. No. 2018-185294, dated Feb. 1, 2022.

English language translation of Office Action from Japan Patent Office (JPO) in Japanese Patent Appl. No. 2018-185243, dated Mar. 8, 2022.

English language translation of Office Action from Japan Patent Office (JPO) in Japanese Patent Appl. No. 2019-061414, dated Jul. 5, 2022.

English language translation of Office Action from Japan Patent Office (JPO) in Japanese Patent Appl. No. 2018-185243, dated Aug. 23, 2022.

Wen-qin Wang, "Virtual Antenna Array Analysis for MIMO Synthetic Aperture Radars", International Journal of Antennas and Propagation, vol. 2012, Article ID 587276, 10 pages, doi: 10.1155/2012/587276. (Year: 2012).

I. Shapir, I. Bilik and G. Barkan, "Doppler ambiguity resolving in TDMA automotive MIMO radar via digital multiple PRF", 2018 IEEE Radar Conference (RadarConf18), 2018, pp. 0175-0180, doi: 10.1109/RADAR.2018.8378552. (Year: 2018).

English language translation of Office Action from Japan Patent Office (JPO) in Japanese Patent Appl. No. 2019-061414, dated Dec. 6, 2022.

English language translation of Office Action from Japan Patent Office (JPO) in Japanese Patent Appl. No. 2018-185243, dated Jan. 24, 2023.

English language translation of Office Action from Japan Patent Office (JPO) in Japanese Patent Appl. No. 2018-185243, dated Jun. 13, 2023.

* cited by examiner

RADAR APPARATUS AND RADAR METHOD

CROSS-REFERENCE TO RELATED APPLICATIONS

This is a continuation of U.S. patent application Ser. No. 16/584,341, filed Sep. 26, 2019, which claims priority to Jap. Pat. Appl. No. 2019-061414, filed Mar. 27, 2019, Jap. Pat. Appl. No. 2018-185294, filed Sep. 28, 2018, and Jap. Pat. Appl. No. 2018-185243, filed Sep. 28, 2018. The disclosure of each of the above-mentioned documents, including the specification, drawings, and claims, is incorporated herein by reference in its entirety.

TECHNICAL FIELD

The present disclosure relates to a radar apparatus and a radar method.

BACKGROUND ART

In recent years, a radar apparatus using a radar transmission signal of which a wavelength is short, including a radio wave such as a microwave or a millimeter wave enabling a high resolution to be obtained has been examined. In order to improve the safety outdoors, there is the need for development of a radar apparatus (wide-angle radar apparatus) that detects a small object such as a pedestrian or a falling object in a wide angle range other than a vehicle.

Regarding a configuration of a wide-angle radar apparatus, there is a configuration using a method (an arrival angle estimation method or direction of arrival (DOA) estimation) in which a reflected wave is received by a plurality of antennae (array antennae), and an arrival direction (arrival angle) of the reflected wave from a target is estimated on the basis of a reception phase difference for an antenna interval. For example, as the arrival angle estimation method, a fast Fourier transform (FFT) method is used. As the arrival angle estimation method, a method enabling a high resolution to be obtained may include a Capon method, multiple signal classification (MUSIC), and estimation of signal parameters via rotational invariance techniques (ESPRIT).

There has been proposed a configuration (MIMO radar) in which a plurality of transmission antennae (array antennae) are also provided on a transmission side in addition to a reception side, and beam scanning is performed through signal processes using the transmission and reception arrays (for example, refer to NPL 1).

CITATION LIST

Patent Literature

PTL 1
Japanese Patent Application Laid-Open No. 2008-304417
PTL 2
Japanese Translation of a PCT Application Laid-Open No. 2011-526371
PTL 3
Japanese Patent Application Laid-Open No. 2016-50778

Non Patent Literature

NPL 1
J. Li, P. Stoica, "MIMO Radar with Colocated Antennas," Signal Processing Magazine, IEEE Vol. 24, Issue: 5, pp. 106-114, 2007

NPL 2
M. Kronauge, H. Rohling,"Fast two-dimensional CFAR procedure", IEEE Trans. Aerosp. Electron. Syst., 2013, 49, (3), pp. 1817-1823
NPL 3
Direction-of-arrival estimation using signal subspace modeling Cadzow, J. A.; Aerospace and Electronic Systems, IEEE Transactions on Volume: 28, Issue: 1 Publication Year: 1992, Page(s): 64-79

SUMMARY

A radar apparatus according to one example of the present disclosure includes: a plurality of transmission antennae; and a transmission circuit that transmits transmission signals by using the plurality of transmission antennae, in which, in a virtual reception array including a plurality of virtual antennae formed based on a plurality of reception antennae and the plurality of transmission antennae, disposition positions of at least two of the plurality of virtual antennae are the same, and in which, transmission intervals of the transmission signals that are sequentially transmitted from the transmission antennae corresponding to the at least two virtual antennae among the plurality of transmission antennae are equal intervals.

These comprehensive or specific aspects may be realized by an apparatus, a method, an integrated circuit, a computer program, or a recording medium, and may be realized by any combination of a system, the apparatus, the method, the integrated circuit, the computer program, and the recording medium.

According to an aspect of the present disclosure, it is possible to reduce the ambiguity of a Doppler frequency.

DESCRIPTION OF EMBODIMENTS

Figure 1:
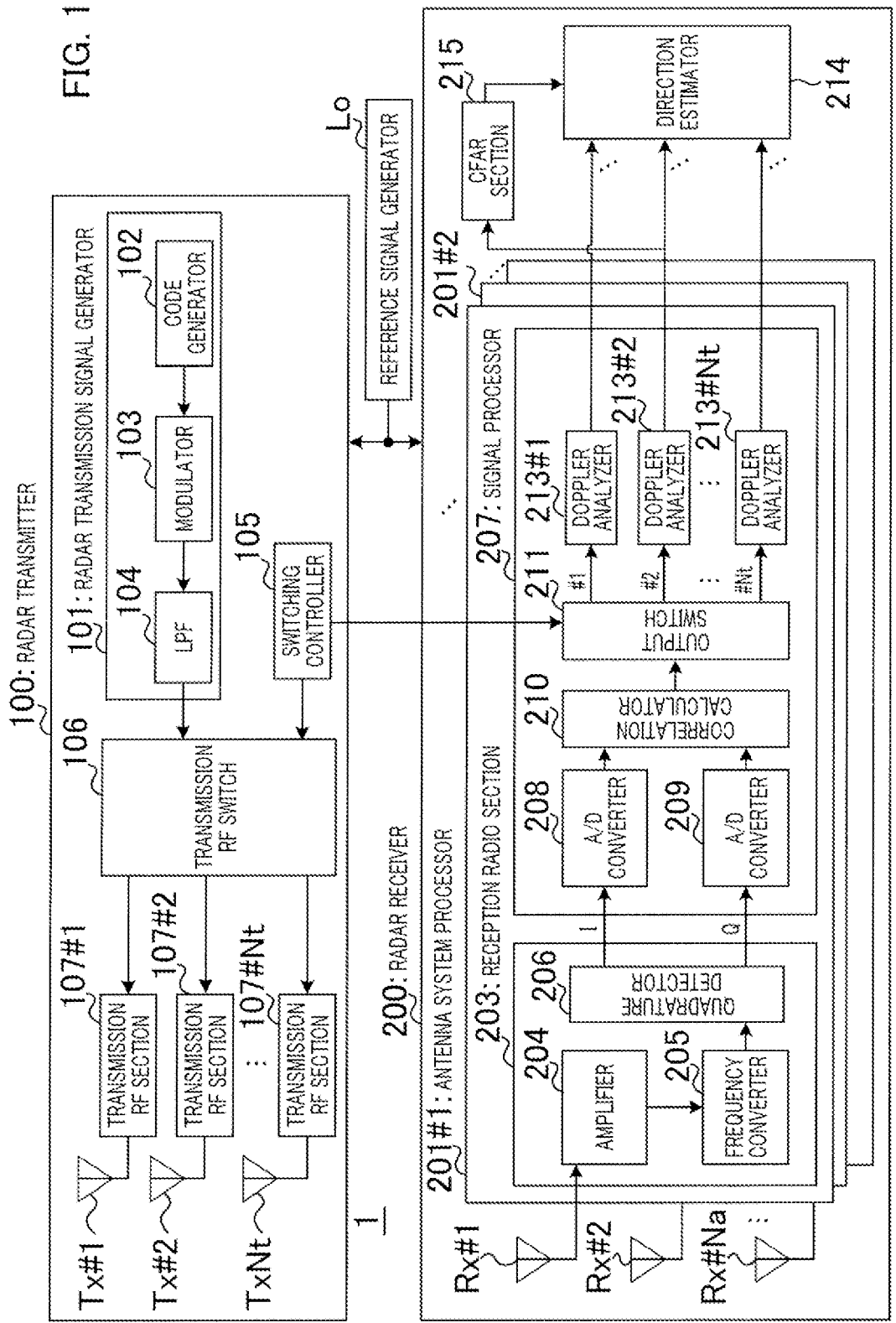
FIG. 1 is a diagram illustrating a configuration example of a radar apparatus according to Embodiment 1.

However, with reference to the drawings as appropriate, embodiments of one Example of the present disclosure will be described in detail. However, a detailed description more than necessary may be omitted. For example, a detailed description of a well-known content or a repeated description of a substantially identical content will be omitted. This is to avoid the following description from being unnecessarily redundant and thus to facilitate understanding by a person skilled in the art.

The accompanying drawings and the following description are provided for a person skilled in the art sufficiently understanding the present disclosure, and are not intended to limit the subject disclosed in the claims.

A MIMO radar transmits signals multiplexed by using, for example, time division, frequency division, or code division from a plurality of transmission antennae. The MIMO radar receives signals reflected at a peripheral object (target) by using a plurality of reception antennae, and demultiplexes the multiplexed transmission signals from the respective received signals. Consequently, the MIMO radar can extract a propagation path response represented by a product of the number of transmission antennae and the number of reception antennae. In the MIMO radar, an interval of transmission/reception antennae is appropriately disposed such that an antenna aperture can be virtually increased, and thus it is possible to improve an angle resolution.

For example, PTL 1 discloses a MIMO radar (hereinafter, referred to as a "time division multiplexing MIMO radar") using time division multiplexing in which a transmission time is shifted for each transmission antenna and a signal is transmitted, as a multiplexing transmission method for the MIMO radar. The time division multiplexing transmission may be realized with a simpler configuration than frequency multiplexing transmission or code multiplexing transmission. In the time division multiplexing transmission, an interval between transmission times is sufficiently increased, and thus the orthogonality between transmission signals can be maintained to be favorable. The time division multiplexing MIMO radar outputs a transmission pulse that is an example of a transmission signal while successively switching transmission antennae to each other in predetermined cycle $T_r$. The time division multiplexing MIMO radar receives signals of transmission pulses reflected by an object by using a plurality of reception antennae, performs a correlation process between the received signals and the transmission pulses, and then performs a spatial FFT process (reflected wave arrival direction estimation process).

As described above, the time division multiplexing MIMO radar successively performs switching among transmission antennae which will transmit transmission signals (for example, transmission pulses or radar transmission waves) in predetermined cycle $T_r$. Therefore, in the time division multiplexing transmission, the time required for completion of transmission of transmission signals from all transmission antennae may be longer than in frequency division transmission or code division transmission. Thus, for example, as in PTL 2, in a case where transmission signals are transmitted from respective transmission antennae, and a Doppler frequency (that is, a relative speed of a target) is detected on the basis of a reception phase change thereof, a time interval of observation of the reception phase change is increased when Fourier frequency analysis is performed to detect the Doppler frequency. Therefore, a Doppler frequency range (that is, a range of a detectable target relative speed) in which a Doppler frequency without aliasing can be detected is reduced.

In a case where a reflected signal from a target exceeding a Doppler frequency range in which a Doppler frequency without aliasing can be detected is supposed, whether or not there is an aliasing component cannot be specified, and thus the ambiguity (uncertainty) of a Doppler frequency (that is, a relative speed of a target) occurs. For example, in a case where transmission signals (transmission pulses) are sent while successively switching among $N_t$ transmission antennae in predetermined cycle $T_r$, a transmission time of $T_rN_t$ is necessary. In a case where such time division multiplexing transmission is repeatedly performed $N_c$ times, and Fourier frequency analysis is applied to detect a Doppler frequency, a Doppler frequency range in which a Doppler frequency without aliasing can be detected is $\pm 1/(2T_rN_t)$ according to the sampling theorem. Therefore, a Doppler frequency range in which a Doppler frequency without aliasing can be detected is reduced as the number $N_t$ of transmission antennae is increased, and thus the ambiguity of a Doppler frequency easily occurs.

An object of one Example of the present disclosure is to provide a radar apparatus capable of reducing the ambiguity of a Doppler frequency.

Embodiment 1

FIG. 1 illustrates a configuration example of a time division multiplexing MIMO radar apparatus (hereinafter, a simply referred to as a "radar apparatus") according to Embodiment 1. Radar apparatus 1 includes radar transmitter 100 and radar receiver 200. Radar transmitter 100 switches a plurality of transmission antennae Tx #1 to Tx #$N_t$ in a time division manner, and transmits transmission signals. Radar receiver 200 receives a reflected signal as a result of a transmission signal transmitted from radar transmitter 100 being reflected from a target (object), and estimates a direction of the target.

<Radar Transmitter 100>

Next, a description will be made of radar transmitter 100. Radar transmitter 100 includes a plurality of radar transmission signal generators 101, switching controller 105, transmission RF switch 106, $N_t$ transmission RF sections 107 #1 to 107 #$N_t$, and $N_t$ transmission antennae Tx #1 to Tx #$N_t$. Transmission antennae Tx #1 to Tx #$N_t$ may be referred to as transmission array antennae.

Radar transmission signal generator 101 includes code generator 102, modulator 103, and band limiting filter (low-pass filter (LPF)) 104.

Transmission RF switch 106 selects one among the plurality of transmission RF sections 107 on the basis of a switching control signal output from switching controller 105. Transmission RF switch 106 outputs a baseband transmission signal output from the radar transmission signal generator to selected transmission RF section 107.

Transmission RF section 107 selected by transmission RF switch 106 frequency-converts the baseband transmission signal output from transmission RF switch 106 to have a predetermined radio frequency band, and outputs the transmission signal to transmission antenna Tx connected to transmission RF section 107.

Transmission antennae Tx #1 to Tx #$N_t$ are respectively connected to transmission RF sections 107 #1 to #$N_t$. Transmission antenna Tx radiates a transmission signal output from transmission RF section 107 to the space.

Next, an operation of radar transmitter 100 will be described in detail.

Radar transmission signal generator 101 generates a timing clock obtained by multiplying a reference signal received from reference signal generator Lo by a predetermined number, and generates a transmission signal on the basis of the generated timing clock. Radar transmission signal generator 101 outputs the transmission signal in each predetermined transmission cycle $T_r$. The radar transmission signal is expressed by $y(k_t,M)=I(k_t,M)+jQ(k_t,M)$. Here, j indicates an imaginary number unit, $k_t$ indicates a discrete time, and M indicates an ordinal number of the transmission cycle. $I(k_t,M)$ and $Q(k_t,M)$ respectively indicate an in-phase component and a quadrature component of transmission signal $y(k_t,M)$ at discrete time $k_t$ in M-th transmission cycle $T_r$.

Code generator 102 generates codes $a_n(M)$ (where n=1, . . . , and L) of a code sequence with code length L in M-th transmission cycle $T_w$. As codes $a_n(M)$, pulse codes causing, for example, low range side lobe characteristics to be obtained are used. As the code sequence, for example, Barker codes, M-sequence codes, or Gold codes may be used.

Modulator 103 performs pulse modulation (amplitude modulation, amplitude shift keying (ASK), or pulse shift keying) or phase modulation (phase shift keying (PSK)) on codes $a_n(M)$) output from the code generator. The modulator outputs a signal (modulated signal) subjected to the pulse modulation to LPF 104.

LPF 104 extracts a signal component in a predetermined limited band or less from the modulated signal output from modulator 103, and outputs the extracted signal to transmission RF switch 106 as a baseband transmission signal.

Figure 2:
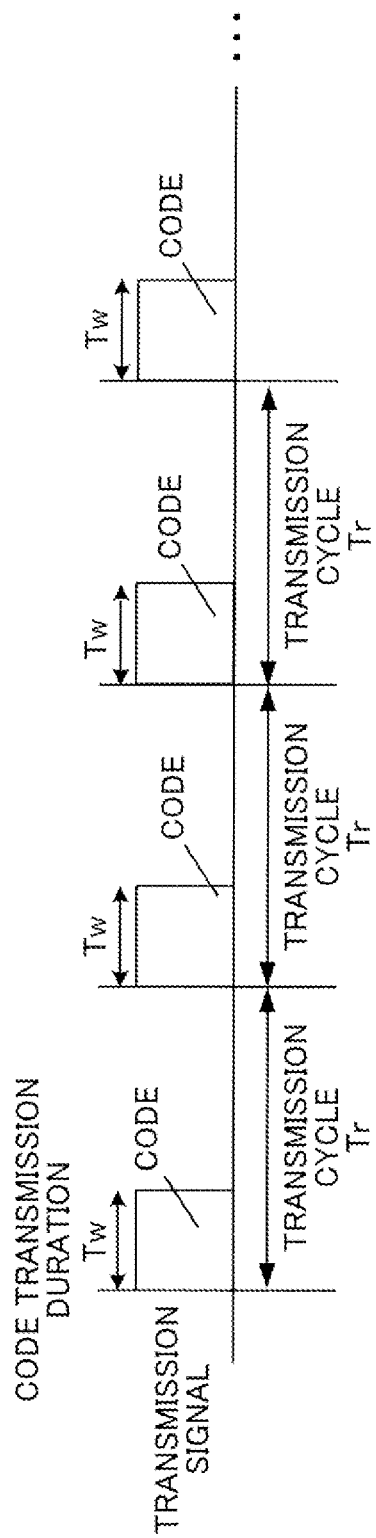
FIG. 2 is a diagram illustrating an example of a radar transmission signal generated by a radar transmission signal generator.

FIG. 2 illustrates a transmission signal generated by radar transmission signal generator 101.

In transmission cycle $T_r$, a signal is present in code transmission duration $T_w$, and a signal is not present in the remaining $(T_r\text{-}T_w)$ duration. In other words, $(T_r\text{-}T_w)$ duration is non-signal duration. A pulse code with pulse code length L is included in code transmission duration $T_w$. A single pulse code includes L sub-pulses, and pulse modulation using $N_o$ samples is performed on each sub-pulse. Therefore, $N_r$ ($=N_oL$) sample signals are included in each code transmission duration $T_w$. In other words, a sampling rate in the modulator is $(N_oL)/T_w$. $N_u$ samples are included in non-signal duration $(T_r\text{-}T_w)$.

Switching controller 105 outputs a switching control signal for giving an instruction for switching among output destinations to transmission RF switch 106 of radar transmitter 100 and output switch 211 of radar receiver 200. An instruction for switching among output destinations, given to output switch 211 will be described later (refer to a description of an operation of radar receiver 200). Hereinafter, a description will be made of an instruction for switching among output destinations, given to transmission RF switch 106.

Switching controller 105 selects one transmission RF section 107 to be used to transmit a transmission signal from among transmission RF sections 107 #1 to #$N_t$ in each transmission cycle $T_r$. Switching controller 105 outputs a switching control signal for an instruction for switching an output destination to selected transmission RF section 107, to transmission RF switch 106.

Transmission RF switch 106 switches an output destination to one of transmission RF sections 107 #1 to #$N_t$ on the basis of the switching control signal output from switching controller 105. Transmission RF switch 106 outputs a transmission signal output from radar transmission signal generator 101, to transmission RF section 107 that is a switched destination.

Here, switching controller 105 outputs a switching control signal in which a transmission interval between transmission signals of at least one transmission RF section 107 among $N_t$ transmission RF sections 107 is shorter than a transmission interval between transmission signals of each of the other transmission RF sections 107, to transmission RF switch 106. The transmission interval in the at least one transmission RF section 107 may be an equal interval. In other words, switching controller 105 selects the at least one transmission RF section 107 in a shorter cycle than each of the other transmission RF sections 107. Hereinafter, transmission RF section 107 selected in a shorter cycle may also be referred to as a "short-cycle transmission RF section". A transmission signal transmitted from the short-cycle transmission RF section may also be a "short-cycle transmission signal".

Hereinafter, specific examples will be described with reference to FIGS. 3, 4, and 5.

Figure 3:
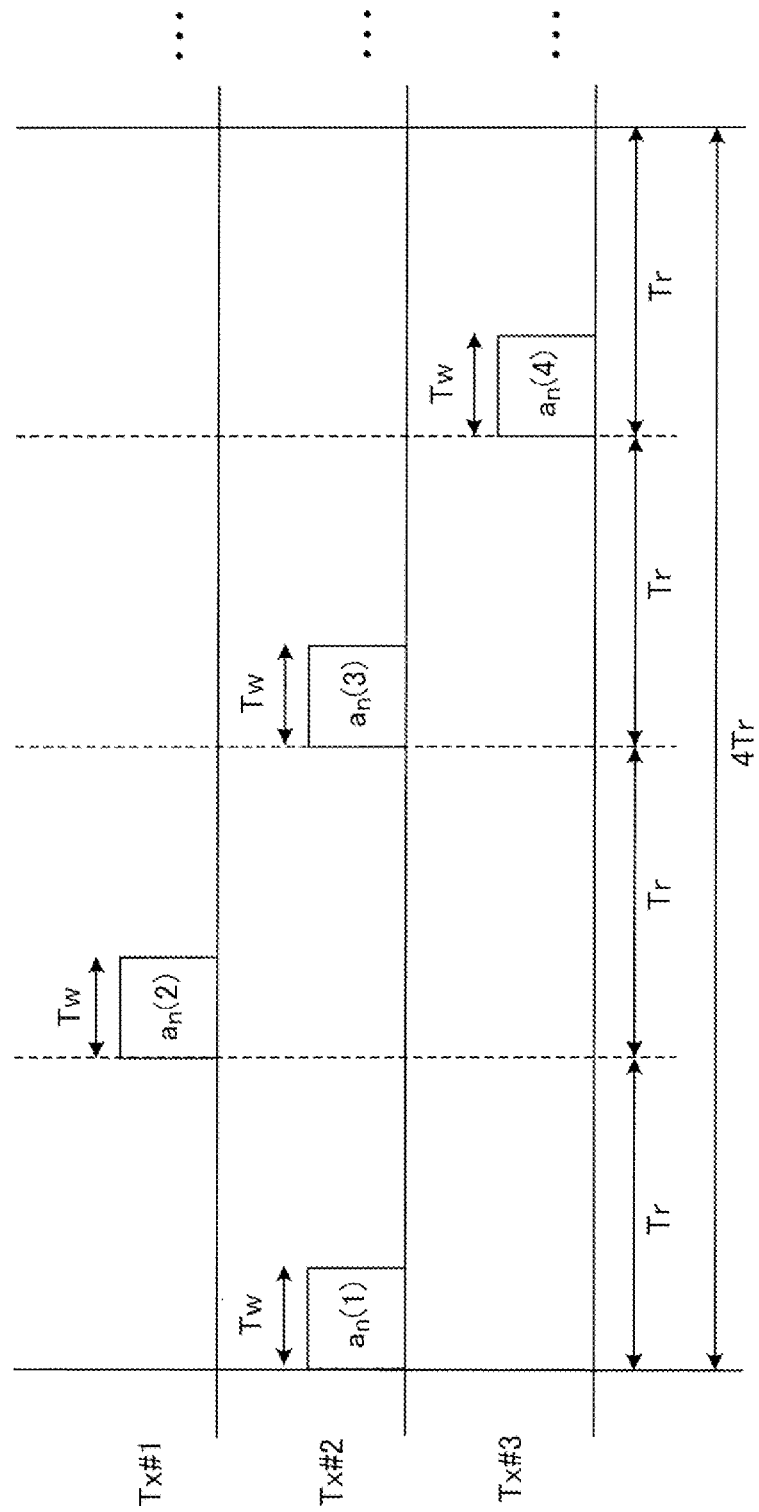
FIG. 3 is a diagram for describing timings at which transmission RF sections #1 to #3 according to Embodiment 1 transmit transmission signals in a case where the number $N_t$ of transmission antennae is three.

FIG. 3 is a diagram for describing timings at which transmission RF sections 107 #1 to 107 #3 transmit transmission signals in a case where the number $N_t$ of transmission antennae is three. FIG. 3 illustrates an example in which transmission RF section 107 #2 is a short-cycle transmission RF section.

In this case, transmission RF section 107 #2 outputs a transmission signal in each cycle of $2T_r$. Transmission RF sections 107 #1 and 107 #3 sequentially output transmission signals in respective $T_r$ periods in which transmission RF section 107 #2 does not output a transmission signal. In other words, transmission RF sections 107 #1 and 107 #3 respectively output transmission signal in each cycle of $N_p=4T_r=2(N_t-1)T_r$.

Figure 4:
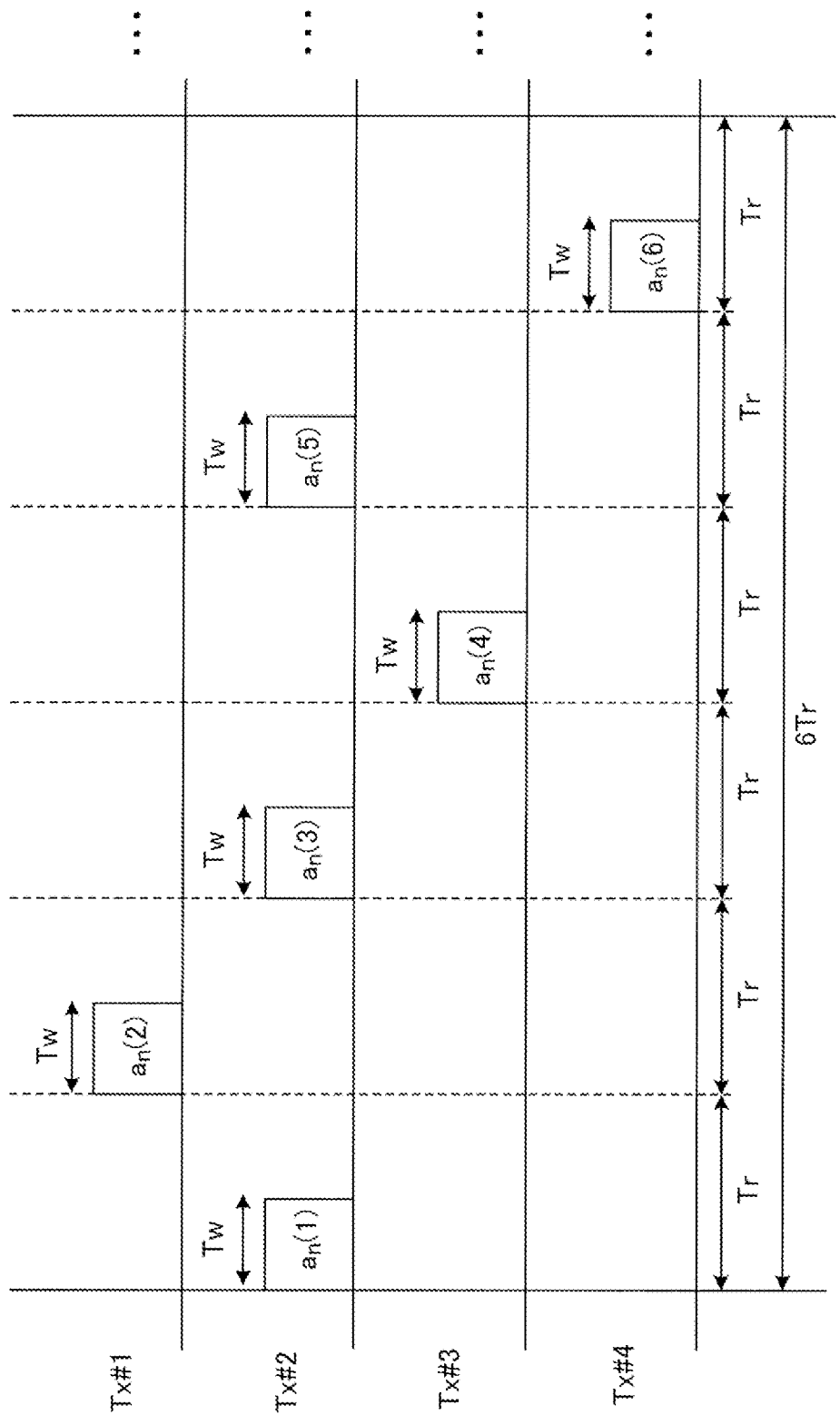
FIG. 4 is a diagram for describing timings at which transmission RF sections #1 to #4 according to Embodiment 1 output transmission signals in a case where the number $N_t$ of transmission antennae is four.

FIG. 4 is a diagram for describing timings at which transmission RF sections 107 #1 to 107 #4 transmit transmission signals in a case where the number $N_t$ of transmission antennae is four. FIG. 4 illustrates an example in which transmission RF section 107 #2 is a short-cycle transmission RF section.

In this case, transmission RF section 107 #2 outputs a transmission signal in each cycle of $2T_r$. Transmission RF sections 107 #1, 107 #3, and 107 #4 sequentially output transmission signals in respective $T_r$ periods in which transmission RF section 107 #2 does not output a transmission signal. In other words, transmission RF sections 107 #1, 107 #3, and 107 #4 respectively output transmission signal in each cycle of $N_p=6T_r=2(N_t-1)T_r$.

Figure 5:
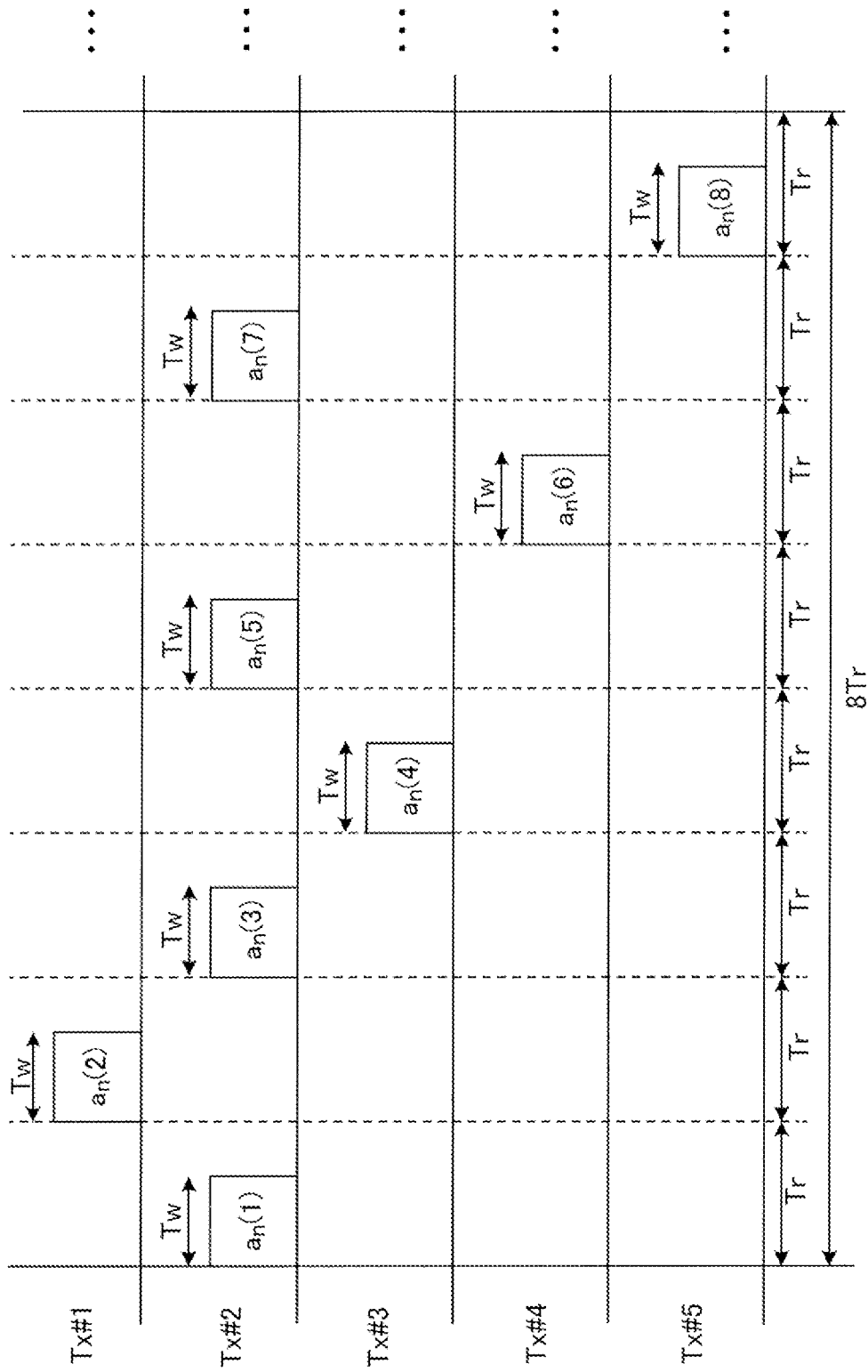
FIG. 5 is a diagram for describing timings at which transmission RF sections #1 to #5 according to Embodiment 1 output transmission signals in a case where the number $N_t$ of transmission antennae is five.

FIG. 5 is a diagram for describing timings at which transmission RF sections 107 #1 to 107 #5 transmit transmission signals in a case where the number $N_t$ of transmission antennae is five. FIG. 5 illustrates an example in which transmission RF section 107 #2 is a short-cycle transmission RF section.

In this case, transmission RF section 107 #2 outputs a transmission signal in each cycle of $2T_r$. Transmission RF sections 107 #1, 107 #3, 107 #4, and 107 #5 sequentially output transmission signals in respective $T_r$ periods in which transmission RF section 107 #2 does not output a transmission signal. In other words, transmission RF sections 107 #1, 107 #3, 107 #4, and 107 #5 respectively output transmission signal in each cycle of $N_p=8T_r=2(N_t-1)T_r$.

Switching controller 105 repeats the period of $N_p=2(N_t-1)T_r$ $N_c$ times with respect to the output destination switching process. In the period of $N_pN_c$, transmission RE section 107 #2 (short-cycle transmission RF section) outputs a transmission signal in each cycle of $2T_r$ and thus outputs transmission signals $(N_t-1)N_c$ times. Each of transmission RF sections 107 except transmission RF section 107 #2 outputs a transmission signal in each cycle of NP and thus outputs transmission signals $N_c$ times.

Transmission RF section 107 to which a transmission signal is output from transmission RF switch 106 outputs the transmission signal to transmission antenna Tx connected to transmission RF section 107. For example, transmission RF section 107 performs frequency conversion on a baseband transmission signal output from radar transmission signal generator 101, thus generates a transmission signal in a carrier frequency (radio frequency (RF)), amplifies the transmission signal to have predetermined transmission power P [dB] with a transmission amplifier, and outputs the transmission signal to transmission antenna Tx.

Transmission antenna Tx radiates a transmission signal output from transmission RF section 107 connected to transmission antenna Tx, to the space.

Figure 6:
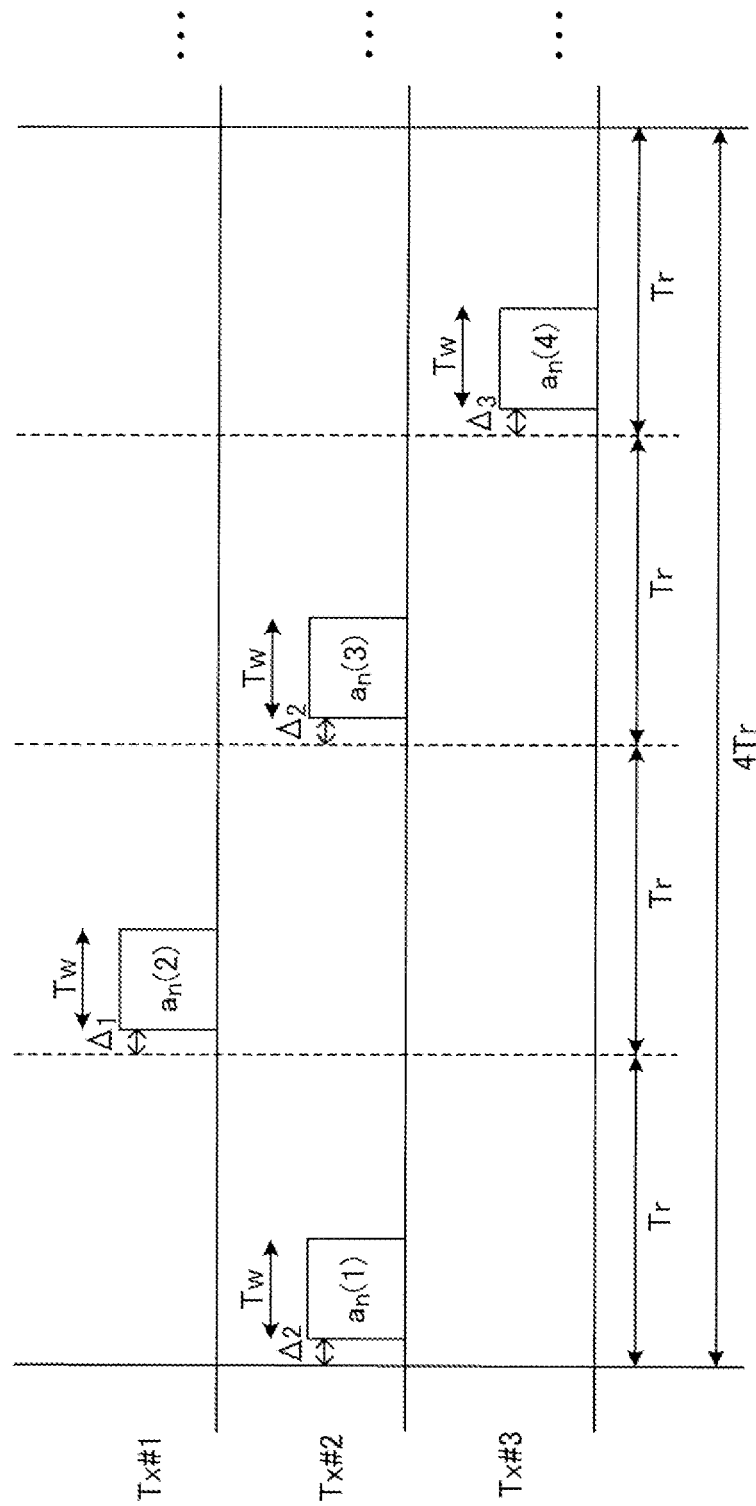
FIG. 6 is a diagram illustrating an example in which a transmission delay is provided for time points at which the transmission RF sections start to transmit transmission signals.

A transmission start time of a transmission signal in each transmission RF section 107 may not necessarily be synchronized with cycle $T_r$. For example, as illustrated in FIG. 6, transmission delays $\Delta_1, \Delta_2, \ldots,$ and $\Delta_{Nt}$ may be respectively provided for transmission start time points of respective transmission RF sections 107. In other words, in respective transmission RF sections 107, delays of transmission signal output timings may be different from each other. Next, further description will be made with reference to FIG. 6.

In FIG. 6, a transmission start time point for a transmission signal of transmission RF section 107 #1 is a time point after transmission delay $\Delta_1$ elapses from a start time point of the $T_r$ period. Similarly, a transmission start time point for a transmission signal of transmission RF section 107 #2 is a time point after transmission delay $\Delta_2$ elapses from a start time point of the $T_r$ period. A transmission start time point for a transmission signal of transmission RF section 107 #3 is a time point after transmission delay $\Delta_3$ elapses from a start time point of the $T_r$ period.

In a case where transmission delays $\Delta_1, \Delta_2, \ldots,$ and $\Delta_{Nt}$ are provided, as will be described later, correction coefficients in which transmission delays $\Delta_1, \Delta_2, \ldots,$ and $\Delta_{Nt}$ are taken into consideration may be introduced to transmission phase correction coefficients in a process performed by radar receiver 200. Consequently, it is possible to remove the influence that different Doppler frequencies cause different phase rotations (details thereof will be described later).

Transmission delays $\Delta_1, \Delta_2, \ldots,$ and $\Delta_{Nt}$ may be changed whenever a target is measured. Consequently, in a case where interference is received from other radar apparatuses, or interference is given to other radar apparatuses, it is possible to mutually randomize influences of interference with other radar apparatuses.

Next, with reference to FIG. 7, a description will be made of a modification example of radar transmission signal generator 101.

Figure 7:
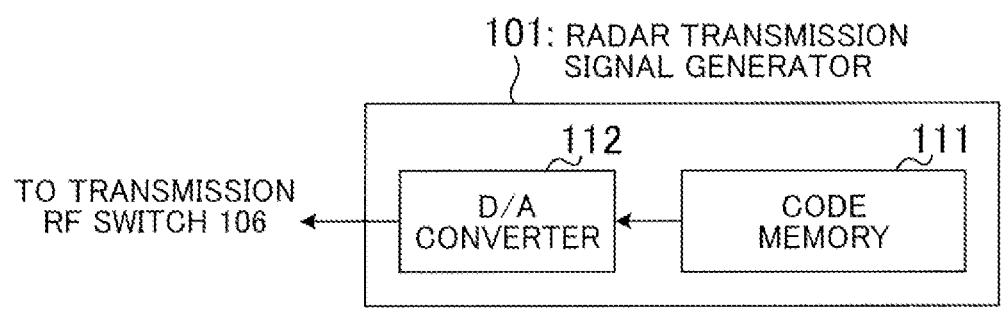
FIG. 7 is a diagram illustrating a modification example of the radar transmission signal generator.

As illustrated in FIG. 7, radar transmission signal generator 101 may be configured to include code memory 111 and D/A converter 112. Code memory 111 stores in advance a code sequence generated in code generator 102, and cyclically reads the code sequence. D/A converter 112 converts a digital signal into an analog signal. In other words, according to the configuration illustrated in FIG. 7, radar transmission signal generator 101 converts an output from code memory 111 into an analog baseband transmission signal that is then output to transmission RF section 107.

<Radar Receiver>

Next, radar receiver 200 will be described. Radar receiver 200 includes Na reception antennae Rx #1 to Rx #$N_a$, $N_a$ antenna system processors 201 #1 to 201 #Na, CFAR section 215, and direction estimator 214. Reception antennae Rx #1 to Rx #Na may also be referred to as reception array antennae. Single reception antenna Rx is correlated with single antenna system processor 201. In other words, antenna system processor 201 #z is correlated with reception antenna Rx #z (where z=1, ..., and $N_a$). Each antenna system processor 201 includes reception radio section 203 and signal processor 207.

Each reception antenna Rx receives a reflected signal as a result of a transmission signal transmitted from radar transmitter 100 being reflected from a target. Reception antenna Rx outputs the received signal that has been received to reception radio section 203 of antenna system processor 201 correlated with reception antenna Rx. Reception radio section 203 outputs the received signal to signal processor 207 included in identical antenna system processor 201.

Reception radio section 203 includes amplifier 204, frequency converter 205, and quadrature detector 206. Reception radio section 203 performs signal amplification on the received signal output from reception antenna Rx by using amplifier 204. Reception radio section 203 converts the received signal into a baseband received signal including an I signal component (in-phase signal component) and a baseband received signal including a Q signal component (quadrature signal component) by using frequency converter 205 and quadrature detector 206.

Signal processor 207 includes A/D converter 208, A/D converter 209, correlation calculator 210, output switch 211, and $N_t$ Doppler analyzers 213 #1 to 213 #$N_t$. Next, each functional block will be described.

A/D converter 208 performs sampling at a discrete time on a baseband received signal including an I signal component, output from reception radio section 203, and thus converts the baseband received signal into digital data. A/D converter 209 performs sampling at a discrete time on a baseband received signal including a Q signal component, and thus converts the baseband received signal into digital data. Here, in sampling performed by A/D converters 208 and 209, Ns discrete samples are generated per sub-pulse time $T_p$ (=$T_w$/L) of a single in a transmission signal. In other words, the number of oversamples per sub-pulse is Ns.

In the following description, baseband received signals $Q_z(k,M)$ including an I signal component and baseband received signals including a Q signal component, received by reception antenna Rx #z at discrete time k in M-th transmission cycle $T_r$ are represented by $x_z(k,M)=I_z(k,M)+jQ_z(k,M)$ by using complex numbers. Here, j is an imaginary number unit.

Hereinafter, discrete time k uses a timing at which transmission cycle $T_r$ starts as a reference (k=1). The signal processor periodically operates up to $k=(N_r+N_u)N_s/N_o$ that is a sample point before radar transmission cycle $T_r$ ends. In other words, k is 1, ..., and $(N_r+N_u)N_s/N_o$.

A reference clock signal in reception radio section 203 and signal processor 207 may be a signal obtained by multiplying a reference signal from reference signal generator Lo by a predetermined number in the same manner as in radar transmission signal generator 101. Consequently, operations of radar transmission signal generator 101, and reception radio section 203 and signal processor 207 of radar receiver 200 are synchronized with each other.

Correlation calculator 210 of antenna system processor 201 #z performs correlation calculation between discrete sample value $x_z(k,M)$ output from A/D converters 208 and 209 and pulse codes $a_n(M)$ with code length L transmitted from radar transmitter 100 in each transmission cycle $T_r$. Here, z is 1, ..., and Na, and n is 1, ..., and L. For example, correlation calculator 210 performs sliding correlation calculation between discrete sample value $x_z(k,M)$ and pulse codes $a_n(M)$ on the basis of the following expression (1) in M-th transmission cycle $T_r$. In expression (1), $AC_z(k,M)$ indicates a correlation calculation value at discrete time k. The asterisk (*) indicates a complex conjugate operator. Here, $AC_z(k,M)$ is calculated over periods of k=1, ..., and $$(N_r + N_u)N_s/N_o. \quad AC_z(k,M) = \sum_{n=1}^{L} x_z(k+N_s(n-1),M)a_n(M)^* \quad \text{(Expression 1)}$$

Figure 11B:
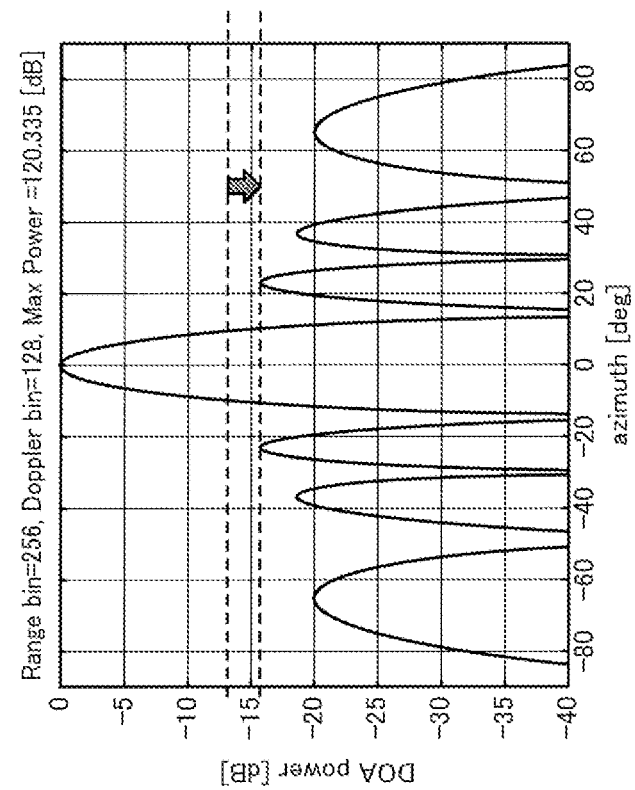
FIGS. 11A and 11B are diagrams illustrating examples of space profile results in a case where a beam former method is used by a direction estimator.
Figure 11A:
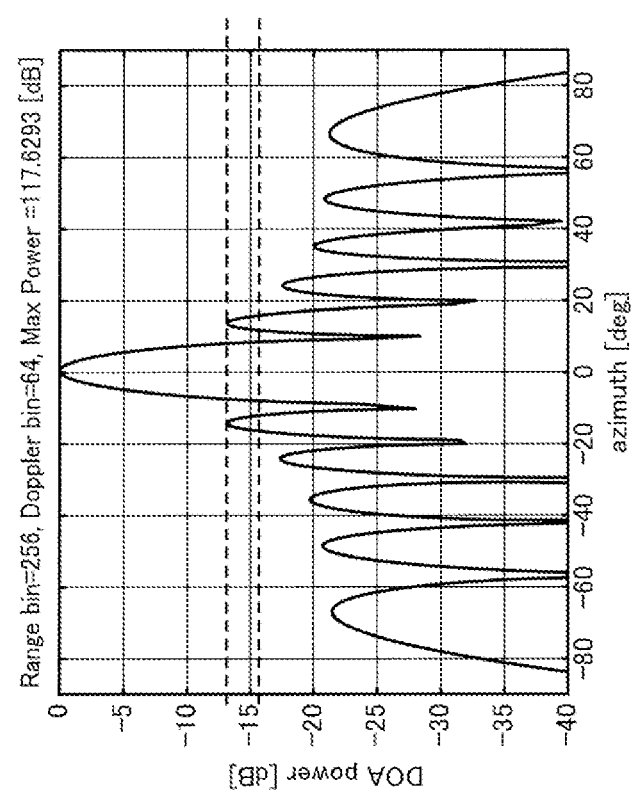

Correlation calculator 210 is not limited to performing correlation calculation at k=1, . . . , and $(N_r+N_u)N_s/N_o$, and may restrict a measurement range (that is, a range of k) according to a range in which a target is present. Consequently, a calculation process amount of correlation calculator 210 can be reduced. For example, correlation calculator 210 may restrict a measurement range to k=NS(L+1), . . . , and $(N_r+N_u)N_s/N_o-N_sL$. In this case, as illustrated in FIGS. 11A and 11B, radar apparatus 1 does not perform measurement in duration corresponding to code transmission duration $T_w$.

Figure 8:
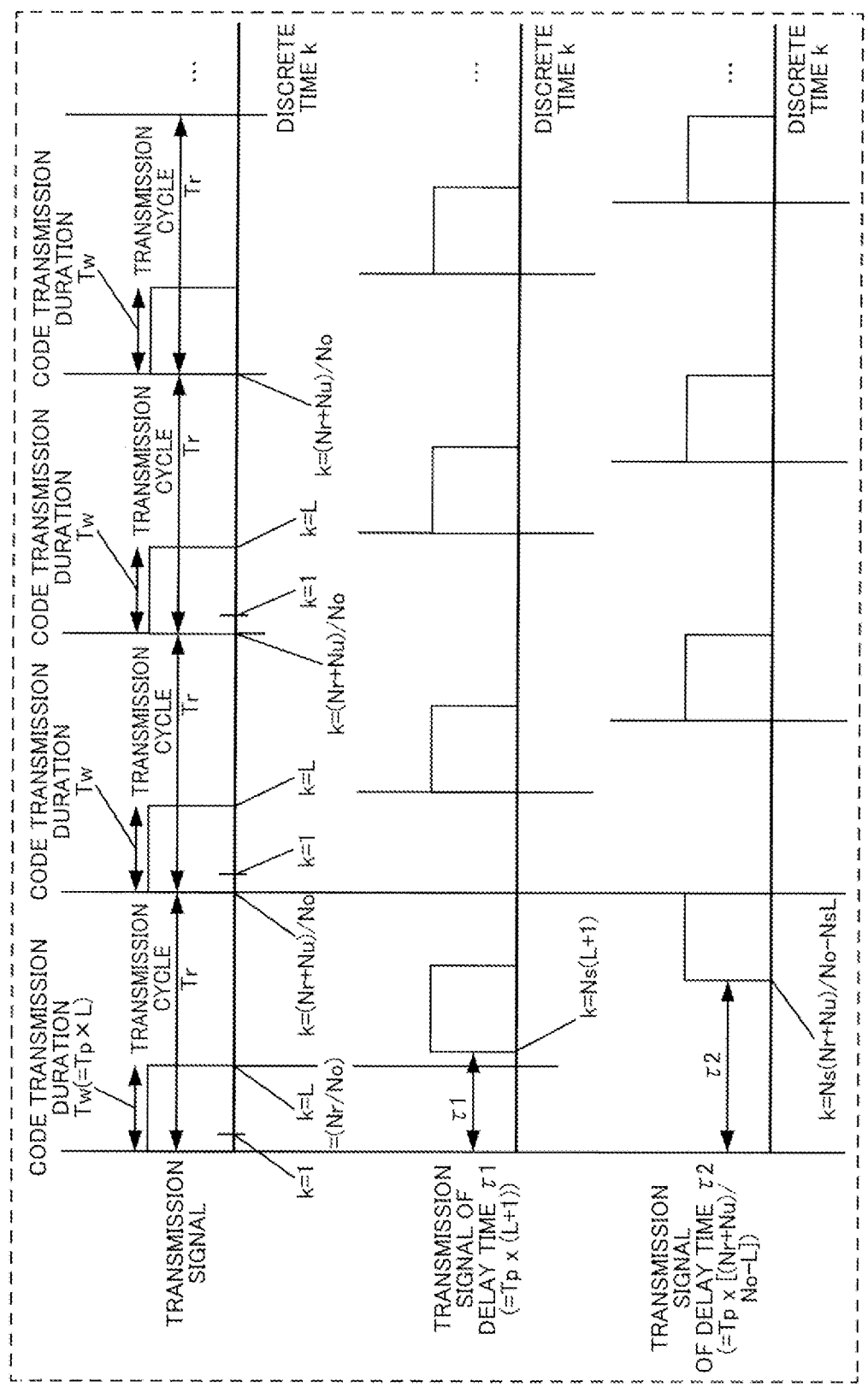
FIG. 8 is a diagram for describing a timing of a transmission signal and a measurement range of a discrete time.

Consequently, even in a case where a radar transmission signal directly sneaks to radar receiver 200, the correlation calculator does not perform a process in a period (at least a period less than at least τ1 in FIG. 8) in which the transmission signal is sneaking, and thus radar apparatus 1 can perform measurement excluding the influence of sneaking. In a case where a measurement range (a range of k) is restricted, a process in which the measurement range (the range of k) is restricted may also be applied to processes in Doppler analyzer 213 and direction estimator 214 described below. Consequently, a process amount in each block can be reduced, and thus it is possible to reduce power consumption in radar receiver 200.

Output switch 211 selects one from among $N_t$ Doppler analyzers 213 on the basis of a switching control signal output from switching controller 105 in each transmission cycle $T_r$. Output switch 211 outputs a correlation calculation result output from correlation calculator 210 in each transmission cycle $T_r$, to selected Doppler analyzer 213.

A switching control signal in M-th radar transmission cycle $T_r$ may be formed of $N_t$ bits [$bit_1(M)$, $bit_2(M)$, . . . , and $bitN_t(M)$]. In this case, in a switching control signal in M-th transmission cycle $T_r$, output switch 211 selects ND-th Doppler analyzer 213 as an output destination in a case where the ND-th bit is 1, and does not select (non-selects) ND-th Doppler analyzer 213 as an output destination in a case where the ND-th bit is 0. Here, ND is 1, . . . , and $N_t$.

In a case where the number $N_t$ of transmission antennae is three, switching controller 105 outputs, to output switch 211, a 3-bit switching control signal indicated in, for example, the following (A1) in correspondence with the output pattern of a transmission signal illustrated in FIG. 3.

[$bit_1(1),bit_2(1),bit_3(1)$]=[0,1,0]

[$bit_1(2),bit_2(2),bit_3(2)$]=[1,0,0]

[$bit_1(3),bit_2(3),bit_3(3)$]=[0,1,0]

[$bit_1(4),bit_2(4),bit_3(4)$]=[0,0,1]  (A1)

In other words, switching controller 105 outputs a switching control signal in which $bit_2(M)$ becomes 1 (ON) in each cycle of $2T_r$, and $bit_1(M)$ and $bit_3(M)$ except $bit_2(M)$ sequentially become 1 in each cycle of $N_p=4T_r=2(N_t-1)T_r$. Switching controller 105 repeats one set indicated in (A1) $N_c$ times.

In a case where the number $N_t$ of transmission antennae is four, switching controller 105 outputs, to output switch 211, a 4-bit switching control signal indicated in, for example, the following (A2) in correspondence with the output pattern of a transmission signal illustrated in FIG. 4.

[$bit_1(1), bit_2(1), bit_3(1), bit_4(1)$]=[0,1,0, 0]

[$bit_1(2), bit_2(2), bit_3(2), bit_4(2)$]=[1,0,0,0]

[$bit_1(3),bit_2(3),bit_3(3),bit_4(3)$]=[0,1,0,0]

[$bit_1(4),bit_2(4),bit_3(4),bit_4(4)$]=[0,0,1,0]

[$bit_1(5),bit_2(5),bit_3(5),bit_4(5)$]=[0,1,0,0]

[$bit_1(6),bit_2(6),bit_3(6),bit_4(6)$]=[0,0,0,1]  (A2)

In other words, switching controller 105 outputs a switching control signal in which $bit_2(M)$ becomes 1 in each cycle of $2T_r$, and $bit_1(M)$, $bit_3(M)$, and $bit_4(M)$ except $bit_2(M)$ sequentially become 1 in each cycle of $N_p=6T_r=2(N_t-1)T_r$. Switching controller 105 repeats one set indicated in (A2) $N_c$ times.

In a case where the number $N_t$ of transmission antennae is five, switching controller 105 outputs, to output switch 211, a 5-bit switching control signal indicated in, for example, the following (A3) in correspondence with the output pattern of a transmission signal illustrated in FIG. 5.

[$bit_1(1),bit_2(1),bit_3(1),bit_4(1),bit_5(1)$]=[0,1,0,0,0]

[$bit_1(2),bit_2(2),bit_3(2),bit_4(2),bit_5(2)$]=[1,0,0,0,0]

[$bit_1(3),bit_2(3),bit_3(3),bit_4(3),bit_5(3)$]=[0,1,0,0,0]

[$bit_1(4),bit_2(4),bit_3(4),bit_4(4),bit_5(4)$]=[0,0,1,0,0]

[$bit_1(5),bit_2(5),bit_3(5),bit_4(5),bit_5(5)$]=[0,1,0,0,0]

[$bit_1(6),bit_2(6),bit_3(6),bit_4(6),bit_5(6)$]=[0,0,0,1,0]

[$bit_1(7),bit_2(7),bit_3(7),bit_4(7),bits(7)$]=[0,1,0,0,0]

[$bit_1(8),bit_2(8),bit_3(8),bit_4(8),bit_5(8)$]=[0,0,0,0,1]  (A3)

In other words, switching controller 105 outputs a switching control signal in which $bit_2(M)$ becomes 1 in each cycle of $2T_r$, and $bit_1(M)$, $bit_3(M)$, $bit_4(M)$, and $bit_5(M)$ except $bit_2(M)$ sequentially become 1 in each cycle of $N_p=8T_r=2(N_t-1)T_r$. Switching controller 105 repeats one set indicated in (A3) $N_c$ times.

Signal processor 207 of antenna system processor 201 #z includes Doppler analyzer 213 #1 to 213 #$N_t$. Doppler analyzer 213 performs Doppler analysis on a correlation calculation result output from output switch 211 at each discrete time k. In other words, Doppler analyzer 213 analyzes a Doppler frequency component of each received signal corresponding to a certain transmission signal. For example, in a case where $N_c$ is a power of 2, an FFT process as represented by expressions (2) and (3) may be applied.

Here, $FT\_CI_z^{ND}(k,f_s,w)$ is a w-th output from Doppler analyzer 213 #ND of signal processor 207 of antenna system processor 201 #z (that is, corresponding to reception antenna Rx #z), and indicates a Doppler frequency response of Doppler frequency index $f_s$ at discrete time k. ND is 1 to $N_t$, k is 1, . . . , and $(N_r+N_u)N_s/N_c$, and z is 1, . . . , and $N_a$. In addition, w is a natural number.

During the FFT process, a window function coefficient such as a Hann window or a Hamming window may be multiplied. A window function is used, and thus it is possible to suppress side lobes generated around a beat frequency peak.

In a case where ND is 2 (short-cycle received signal), an FFT size in Doppler analysis is $(N_t-1)N_c$, and the maximum Doppler frequency not causing aliasing, derived from the sampling theorem, is $±1/(4T_r)$. A Doppler frequency interval of Doppler frequency index $f_s$ is $1/\{2(N_t-1)N_cT_r\}$, and a range of Doppler frequency index $f_s$ is $f_s=-(N_t-1)N_c/2+1, . . . , 0, . . . ,$ and $(N_t-1)N_c/2$.

In a case where ND is not 2 (not short-cycle received signal), an FFT size in Doppler analysis is $N_c$, and the maximum Doppler frequency not causing aliasing, derived from the sampling theorem, is $\pm 1/(4(N_t-1)T_r)$. A Doppler frequency interval of Doppler frequency index $f_u$ is $1/\{2(N_t-1)N_cT_r\}$, and a range of Doppler frequency index $f_u$ is $f_u=-N_c/2+1, \ldots, 0, \ldots,$ and $N_c/2$.

When outputs from Doppler analyzer 213 in cases where ND is 2 and ND is not 2 are compared with each other, Doppler frequency intervals of both thereof are the same as each other. However, the maximum Doppler frequency at which aliasing is not generated in a case where ND is 2 is $\pm(N_t-1)$ times the maximum Doppler frequency in a case where ND is not 2, and thus a Doppler frequency range is increased by $(N_t-1)$ times.

Therefore, the maximum Doppler frequency at which aliasing is not generated at ND=2 is increased by $N_t/2$ times in a case where the number $N_t$ of transmission antennae is three or more, according to the configuration of setting short-cycle transmission antenna Tx #2 as described above, compared with a case where a transmission antenna outputting a transmission signal is sequentially switched to Tx #1, Tx #2, . . . , and Tx #$N_t$. In other words, a Doppler frequency range in which aliasing is not generated is increased in proportion to the number $N_t$ of transmission antennae.

In case of ND=2 (short-cycle received signal):

$$\text{FT\_CI}_z^{ND}(k, f_s, w) = \sum_{q=0}^{2(N_t-1)N_c-1} \text{bit}_{ND}(q+1) \quad \text{(Expression 2)}$$

$$AC_z(k, 2(N_t-1)N_c(w-1)+q+1)\exp\left[-j\frac{2\pi\left\lfloor\frac{q}{2}\right\rfloor f_s}{(N_t-1)N_c}\right]$$

In case of ND #2 (not short-cycle received signal):

$$\text{FT\_CI}_z^{ND}(k, f_u, w) = \sum_{q=0}^{2(N_t-1)N_c-1} \text{bit}_{ND}(q+1) \quad \text{(Expression 3)}$$

$$AC_z(k, 2(N_t-1)N_c(w-1)+q+1)\exp\left[-j\frac{2\pi\left\lfloor\frac{q}{2(N_t-1)}\right\rfloor f_u}{N_c}\right]$$

In a case where ND is not 2, when there is no output from output switch 211, an FFT size in Doppler analysis may be set to $(N_t-1)N_c$, and sampling may be performed by virtually setting an output as zero according to expression (4). Expression (4) is the same as expression (2). Consequently, an FFT size is increased, and thus a processing amount is increased, but a Doppler frequency index is the same as that in a case where ND is 2. Therefore, a conversion process of a Doppler frequency index which will be described later is not necessary.

$$\text{FT\_CI}_z^{ND}(k, f_u, w) = \sum_{q=0}^{2(N_t-1)N_c-1} \text{bit}_{ND}(q+1) \quad \text{(Expression 4)}$$

$$AC_z(k, 2(N_t-1)N_c(w-1)+q+1)\exp\left[-j\frac{2\pi\left\lfloor\frac{q}{2}\right\rfloor f_u}{(N_t-1)N_c}\right]$$

CFAR section 215 adaptively sets (adjusts) a threshold value, and performs a peak signal detection process, by using a short-cycle received signal. In other words, CFAR section 215 detects a peak signal through a constant false alarm rate (CFAR) process. Consequently, CFAR section 215 detects discrete time index $k_{\_cfar}$ and Doppler frequency index $f_{s\_far}$ causing a peak signal. In the present embodiment, an example in which transmission RF section 107 #2 outputs a short-cycle transmission signal in each cycle of $2T_r$. Thus, CFAR section 215 performs a CFAR process by using $\text{FT\_CI}_1^{(2)}(k,f_s,w), \ldots,$ and $\text{FT\_CIN}_a^{(2)}(k,f_s,w)$ that are w-th outputs from Doppler analyzers 213 #2 of respective antenna system processors 201 #1 to 201 #$N_a$.

As represented in expression (5), CFAR section 215 adds power levels of $\text{FT\_CI}_1^{(2)}(k,f_s,w), \ldots,$ and $\text{FT\_CIN}_a^{(2)}(k,f_s,w)$ that are w-th outputs from Doppler analyzers 213 #2 of respective antenna system processors 201 #1 to 201 #$N_a$. Here, in expression (5), ND is assumed to be 2. CFAR section 215 performs, for example, a CFAR process in which one-dimensional CFAR processes are combined with each other, or two-dimensional CFAR process on a power addition result. The process disclosed in NPL 2 may be applied to the CFAR process. Here, an axis of discrete time (corresponding to a distance to a target) and an axis of a Doppler frequency (corresponding to a relative speed of the target) may be used in the two-dimensional CFAR process.

$$PowerFT^{ND}(k, f_s, w) = \sum_{z=1}^{N_a}|\text{FT\_CI}_z^{ND}(k, f_s, w)|^2 \quad \text{(Expression 5)}$$

Alternatively, as represented in expression (6), CFAR section 215 multiplies received signals from reception antennae Rx #1 to Rx #$N_a$ having common discrete time k and Doppler frequency index $f_s$ by directivity weight $W(\theta)=[w_1(\theta), w_2(\theta), \ldots, wN_a(\theta)]$ in main beam direction $\theta$. Here, in expression (6), ND is assumed to be 2. CFAR section 215 performs, for example, a CFAR process in which one-dimensional CFAR processes are combined with each other or two-dimensional CFAR process in each of a plurality of directional beam directions. Here, an axis of discrete time k and an axis of a Doppler frequency may be used in the two-dimensional CFAR process.

$$PowerFT_\theta^{ND}(k, f_s, w) = \sum_{z=1}^{N_a}|w_z(\theta)\text{FT\_CI}_z^{ND}(k, f_s, w)|^2 \quad \text{(Expression 6)}$$

CFAR section 215 adaptively sets a threshold value, and outputs discrete time index $k_{\_cfar}$ and Doppler frequency index $f_{s\_cfar}$ at ND=2 causing reception power more than the threshold value, to direction estimator 214. CFAR section 215 performs index conversion in order to make Doppler frequency index $f_{s\_cfar}$ at ND=2 having a wide Doppler frequency range correspond to Doppler frequency indexes $f_u$ of $\text{FT\_CI}_1^{(ND\neq2)}(k,f_u,w), \ldots,$ and $\text{FT\_CIN}_a^{(ND\neq2)}(k,f_u,w)$ that are w-th outputs from respective Doppler analyzers 213 #1, 213 #3, . . . , and 213 #$N_t$ except Doppler analyzers 213 #2. The index conversion may be performed according to expressions (7) and (8). CFAR section 215 outputs Doppler frequency index $f_{u\_cfar}$ subjected to the index conversion to direction estimator 214. In other words, CFAR section 215 detects a peak Doppler frequency component that is a frequency component of which reception power is more than a threshold value, from a Doppler frequency component of a received signal.

Here, $f_{s\_cfar} = -(N_r-1)N_c/2+1, \ldots, 0, \ldots,$ and $(N_r-1)N_c/2$, and $f_{u\_cfar} = -N_c/2+1, \ldots, 0, \ldots,$ and $N_c/2$.

In case of $f_{s\_cfar} \geq 0$:

$$f_{u\_cfar} = f_{s\_cfar} - \left\lfloor \frac{f_{s\_cfar} + N_c/2 - 1}{N_c} \right\rfloor \times N_c \quad \text{(Expression 7)}$$

In case of $f_{s\_cfar} < 0$:

$$f_{u\_cfar} = f_{s\_cfar} + \left\lfloor \frac{-f_{s\_cfar} + N_c/2}{N_c} \right\rfloor \times N_c \quad \text{(Expression 8)}$$

Hereinafter, in the present embodiment, Doppler frequency index $f_{s\_cfar}$ having a wide Doppler frequency range at ND=2 will be referred to as wide-range Doppler frequency index $f_{s\_cfar}$. In the present embodiment, Doppler frequency index $f_u$ having a narrow Doppler frequency range at ND #2 will be referred to as narrow-range Doppler frequency index $f_u$. When wide-range Doppler frequency index $f_{s\_cfar}$ is made to correspond to narrow-range Doppler frequency index $f_u$, overlapping may occur.

For example, in a case where Doppler frequency index α in the range of $0 \leq \alpha \leq N_c/2$ is included in wide-range Doppler frequency index $f_{s\_cfar}$, conversion into a occurs through index conversion for correspondence to narrow-range Doppler frequency index $f_u$. Here, in a case where $\beta=\alpha-N_c$ is also included in wide-range Doppler frequency index $f_{s\_cfar}$, β is included in the range of $-N_c \leq \beta \leq -N_c/2$, and thus conversion into $\beta+N_c=\alpha$ occurs through index conversion for correspondence to narrow-range Doppler frequency index $f_u$. Therefore, in index conversion for making wide-range Doppler frequency index $f_{s\_cfar}$ correspond to narrow-range Doppler frequency index $f_u$, overlapping occurs.

Similarly, in a case where $\beta=\alpha+N_c$ is also included in wide-range Doppler frequency index $f_{s\_cfar}$, β is included in the range of $N_c \leq \beta \leq 3N_c/2$, and thus conversion into $\beta+N_c=\alpha$ occurs through index conversion for correspondence to narrow-range Doppler frequency index $f_u$. Therefore, in index conversion for making wide-range Doppler frequency index $f_{s\_cfar}$ correspond to narrow-range Doppler frequency index $f_u$, overlapping occurs.

As mentioned above, α and β having a relationship of $|\alpha-\beta|$ being an integer multiple of $N_c$ are included in wide-range Doppler frequency index $f_{s\_far}$, overlapping occurs when being made to correspond to narrow-range Doppler frequency index $f_u$.

In a case where overlapping occurs in narrow-range Doppler frequency index $f_u$, a signal component of narrow-range Doppler frequency index $f_u$ is in a state of being mixed with signals with other Doppler frequency components. As power levels of the mixed signals become closer to each other, an amplitude phase component varies, and thus angle measurement accuracy in direction estimator 214 in the subsequent stage may deteriorate. Therefore, in the present embodiment, overlapping determination process is introduced. Consequently, the influence to cause deterioration in angle measurement accuracy in direction estimator 214 is suppressed. Next, the overlapping determination process will be described.

<Overlapping Determination Process>

Among wide-range Doppler frequency indexes $f_{s\_cfar}$ extracted through the CFAR process, Doppler frequency index α and Doppler frequency index β are subjected to index conversion for correspondence to Doppler frequency indexes $f_u$ of w-th outputs $FT\_CI_1^{(ND=2)}(k, f_u, w), \ldots,$ and $FT\_CIN_a^{(ND=2)}(k, f_u, w)$ from respective Doppler analyzers 213 except Doppler analyzers 213 #2. In a case where overlapping occurs in converted Doppler frequency index $f_{u\_cfar}$, processes in the following (B1) to (B3) are performed.

(B1) CFAR section 215 compares a power sum of $FT\_CI_1^{(ND=2)}(k, \alpha, w), \ldots,$ and $FT\_CIN_a^{(ND=2)}(k, \alpha, w)$ with a power sum of $FT\_CI_1^{(ND=2)}(k, \beta, w), \ldots,$ and $jFT\_CIN_a^{(ND=2)}(k, \beta, w)$, which are the w-th outputs from Doppler analyzers 213 #2.

(B2) In a case where there is a power difference of a predetermined value (for example, about 6 dB to 10 dB) or greater as a result of the power sum comparison in (B1), CFAR section 215 makes a Doppler frequency index with higher power of Doppler frequency indexes α and β valid, and excludes a Doppler frequency index with lower power from an output target to direction estimator 214.

(B3) In a case where there is no power difference of the predetermined value or greater as a result of the power sum comparison in (B1), CFAR section 215 excludes both of Doppler frequency indexes α and β from an output target to direction estimator 214.

Direction estimator 214 performs a target direction estimation process by using an output from each Doppler analyzer 213 on the basis of discrete time index $k_{\_cfar}$, Doppler frequency index $f_{s\_cfar}$, and Doppler frequency index $f_{u\_cfar}$ output from CFAR section 215. Specifically, direction estimator 214 generates virtual reception array correlation vector $h(k_{\_cfar}, f_{s\_cfar}, w)$ as represented in expression (9), and performs a direction estimation process.

Hereinafter, a sum of the w-th outputs from Doppler analyzers 213 #1 to 213 #$N_t$ obtained through identical processes in respective signal processors 207 of antenna system processors 201 #1 to 201 #$N_a$ is represented by virtual reception array correlation vector $h(k_{\_cfar}, f_{s\_cfar}, w)$ including $N_tN_a$ elements corresponding to a product of the number $N_t$ of transmission antennae and the number $N_a$ of reception antennae, as represented in expression (9). Virtual reception array correlation vector $h(k_{\_cfar}, f_{s\_cfar}, w)$ is used for a process of performing direction estimation based on a phase difference between respective reception antennae Rx on reflected signals from a target. Here, z is $1, \ldots,$ and $N_a$, and ND is $1, \ldots,$ and $N_t$.

$$h(k_{\_cfar}, f_{s\_cfar}, w) = \quad \text{(Expression 9)}$$

$$\begin{bmatrix} h_{cal[1]} FT\_CI_1^{(1)}(k_{\_cfar}, f_{u\_cfar}, w) TxCAL^{(1)}(f_{u\_cfar}) \\ h_{cal[2]} FT\_CI_2^{(1)}(k_{\_cfar}, f_{u\_cfar}, w) TxCAL^{(1)}(f_{u\_cfar}) \\ \vdots \\ h_{cal[Na]} FT\_CI_{Na}^{(1)}(k_{\_cfar}, f_{u\_cfar}, w) TxCAL^{(1)}(f_{u\_cfar}) \\ h_{cal[Na+1]} FT\_CI_1^{(2)}(k_{\_cfar}, f_{s\_cfar}, w) TxCAL^{(2)}(f_{s\_cfar}) \\ h_{cal[Na+2]} FT\_CI_2^{(2)}(k_{\_cfar}, f_{s\_cfar}, w) TxCAL^{(2)}(f_{s\_cfar}) \\ \vdots \\ h_{cal[2Na]} FT\_CI_{Na}^{(2)}(k_{\_cfar}, f_{s\_cfar}, w) TxCAL^{(2)}(f_{s\_cfar}) \\ \vdots \\ h_{cal[Na(Nt-1)+1]} FT\_CI_1^{(Nt)}(k_{\_cfar}, f_{u\_cfar}, w) TxCAL^{(Nt)}(f_{u\_cfar}) \\ h_{cal[Na(Nt-1)+2]} FT\_CI_2^{(Nt)}(k_{\_cfar}, f_{u\_cfar}, w) TxCAL^{(Nt)}(f_{u\_cfar}) \\ \vdots \\ h_{cal[NaNt]} FT\_CI_{Na}^{(Nt)}(k_{\_cfar}, f_{u\_cfar}, w) TxCAL^{(Nt)}(f_{u\_cfar}) \end{bmatrix}$$

Here, $h_{cal[b]}$ is an array correction value for correcting a phase deviation and an amplitude deviation between the transmission antennae and between the reception antennae. In addition, b is 1, . . . , and $N_tN_a$.

Switching among transmission antennae Tx is performed in a time division manner, and thus different phase rotations occur at different Doppler frequencies f. $TxCAL^{(1)}(f), \ldots,$ and $TxCAL^{(N_t)}(f)$ are transmission phase correction coefficients for correcting the phase rotations to match a phase of a reference transmission antenna. For example, in a case where the number $N_t$ of transmission antennae is three as illustrated in FIG. 3, and transmission antenna Tx #2 is used as a reference transmission antenna, the transmission phase correction coefficients are represented by expression (10).

$$TxCAL^{(1)}(f) = \exp\left(-j\frac{2\pi f}{Nc}\frac{1}{4}\right),$$
$$TxCAL^{(2)}(f) = 1, \ldots ,$$
$$TxCAL^{(Nt)}(f) = \exp\left(-j\frac{2\pi f}{Nc}\frac{3}{4}\right)$$

(Expression 10)

In a case where the number $N_t$ of transmission antennae is four as illustrated in FIG. 4 or in a case where the number $N_t$ of transmission antennae is five as illustrated in FIG. 5, and transmission antenna Tx #2 is used as a reference transmission antenna, the transmission phase correction coefficients are represented by expression (11).

$$TxCAL^{(1)}(f) = \exp\left(-j\frac{2\pi f}{Nc}\frac{1}{2(Nt-1)}\right),$$
$$TxCAL^{(2)}(f) = 1,$$
$$TxCAL^{(3)}(f) = \exp\left(-j\frac{2\pi f}{Nc}\frac{3}{2(Nt-1)}\right), \ldots ,$$
$$TxCAL^{(Nt)}(f) = \exp\left(-j\frac{2\pi f}{Nc}\frac{2Nt-1}{2(Nt-1)}\right)$$

(Expression 11)

In a case where different transmission delays $\Delta_1, \Delta_2, \ldots,$ and $\Delta_{Nt}$ are respectively provided for transmission start time points for transmission signals of respective transmission RF sections 107, a result of multiplying transmission phase correction coefficient $TxCAL^{(ND)}(f)$ by correction coefficient $\Delta T_{xCAL}^{(ND)}(f)$ represented in expression (12) may be used as new transmission phase correction coefficient $TxCAL^{(ND)}(f)$. Consequently, it is possible to eliminate the influence of different phase rotations due to Doppler frequencies. Here, $\Delta_{ref}$ indicates a transmission delay of a reference transmission antenna number used as a phase reference, and, in a case of the present embodiment, a reference transmission antenna is Tx #2, and thus $\Delta_{ref}$ is $\Delta_2$.

$$\Delta_{TxCAL}^{(ND)}(f) = \exp\left(-j\frac{2\pi f}{Nc}\frac{\Delta_{ND}-\Delta_{ref}}{N_p}\right)$$

(12)

Virtual reception array correlation vector $h(k_{\_cfar}, f_{s\_cfar}, w)$ is a column formed of $N_aN_t$ elements.

In arrival direction estimation, a space profile is calculated by making azimuthal direction θ in direction estimation evaluation function value $P_H(\theta, k_{\_cfar}, f_{s\_cfar}, w)$ variable within a predetermined angle range. In the arrival direction estimation, a predetermined number of maximum peaks of the calculated space profile is extracted in a descending order, and elevation angle directions of the maximum peaks are output as arrival direction estimation values.

Direction estimation evaluation function value $P_H(\theta, k_{\_cfar}, f_{s\_cfar}, w)$ may be calculated according to an arrival direction estimation algorithm. The arrival direction estimation algorithm includes various methods such as a beam former method, Capon, or MUSIC. For example, the estimation method using array antennae disclosed in NPL 3 may be used.

Figure 9:
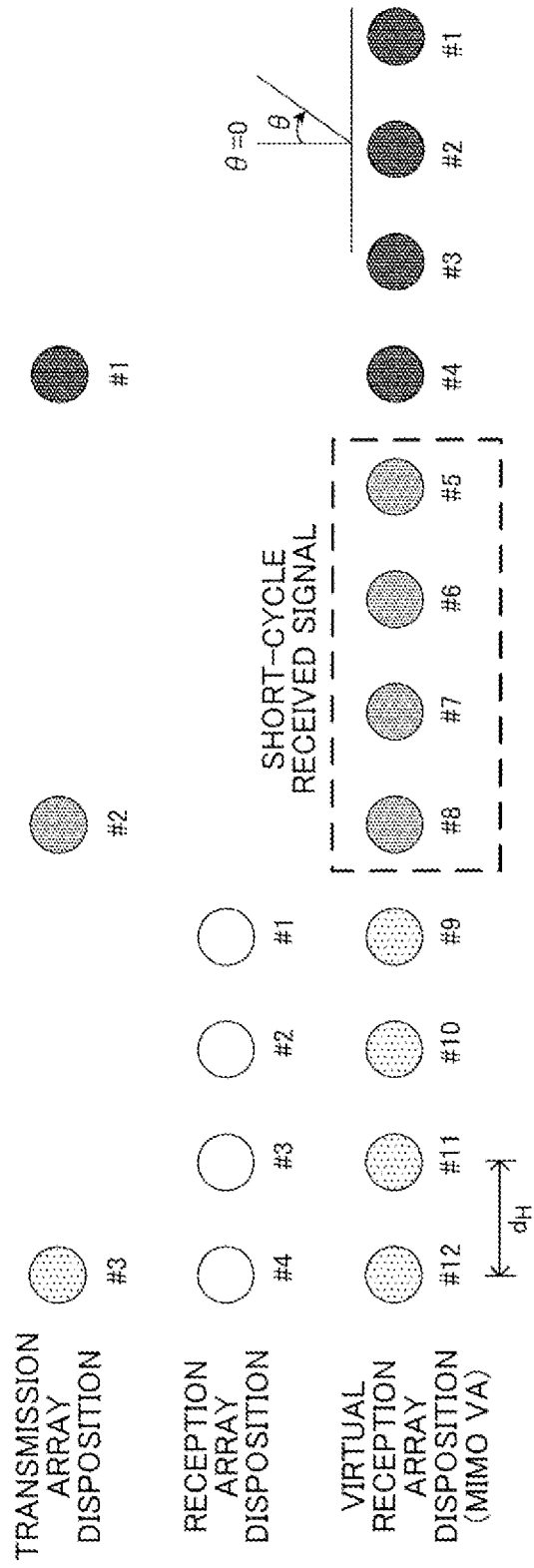
FIG. 9 is a diagram for describing a relationship among a transmission antenna, a reception antenna, and a virtual reception antenna.

As exemplified in FIG. 9, For example, in a case where $N_tN_a$ virtual reception arrays are linearly disposed at equal interval $d_H$ ($N_t$=3, and $N_a$=4), a beam former method may be represented by expressions (13) and (14). Here, the superscript H is an Hermitian transpose operator. In addition, $a(\theta_u)$ indicates a direction vector of a virtual reception array for an arrival wave in azimuthal direction θ. $\theta_u$ is a vector obtained by changing an azimuth range subjected to arrival direction estimation at predetermined azimuth interval β1. For example, $\theta_u$ is set as follows.

$\theta_u = \theta_{\min} + u\beta_1$.

Here, u=0, . . . , and NU, and NU=floor$[(\theta_{max}-\theta_{min})/\beta_1]+1$ Here, floor(x) is a function that returns the maximum integer value not exceeding real number x.

$$P_H(\theta_u, k_{\_cfar}, f_{s\_cfar}, s, w) = |a^H(\theta_u)h(k_{\_cfar}, f_{s\_cfar}, w)|^2$$

(Expression 14)

$$a(\theta_u) = \begin{bmatrix} 1 \\ \exp\{-j2\pi d_H \sin\theta_u/\lambda\} \\ \vdots \\ \exp\{-j2\pi(N_tN_a-1)d_H\sin\theta_u/\lambda\} \end{bmatrix}$$

(Expression 14)

Time information (discrete time) $k_{\_cfar}$ may be converted into distance information that is then output. Time information $k_{\_cfar}$ is converted into distance information $R(k_{\_cfar})$ by using, for example, expression (15). Here, $T_w$ indicates code transmission duration, L indicates a pulse code length, and $C_0$ indicates a light speed.

$$R(k_{\_cfar}) = k_{\_cfar}\frac{T_wC_0}{2L}$$

(Expression 15)

The Doppler frequency information may be converted into a relative speed component that is then output. Doppler frequency index $f_{s\_cfar}$ may be converted into relative speed component $v_d$ according to expression (16). Here, $d_f$ is a Doppler frequency interval in an FFT process performed by Doppler analyzer 213, and is $d_f=1/\{2(N_t-1)N_cT_r\}$ in a case of the present embodiment. Here, X is a wavelength of a carrier frequency of an RF signal output from transmission RF section 107.

$$v_d(k_{s\_cfar}) = \frac{\lambda}{2}f_s d_f$$

(Expression 16)

As mentioned above, in radar apparatus 1 according to Embodiment 1, a transmission cycle of a short-cycle transmission antenna (transmission antenna Tx #2 in the present embodiment) is set to $2T_r$, and a transmission cycle of each transmission antenna except the short-cycle transmission antenna is set to $2(N_t-1)T_r$. Consequently, compared with a case of sequential switching among $N_t$ transmission antennae, in the short-cycle received signal, the maximum Doppler frequency (relative speed) at which aliasing is not generated is increased by $N_t/2$ times and thus a Doppler frequency range in which aliasing is not generated is increased by $N_t/2$ times.

In the present embodiment, in radar receiver 200, Doppler frequency index $f_{s\_cfar}$ extracted through a CFAR process on a short-cycle received signal is converted to be applied reference signals except the short-cycle received signal. A direction estimation process is performed by using Doppler frequency index $f_{s\_cfar}$ for the short-cycle received signal and by using Doppler frequency index $f_{u\_cfar}$ obtained through conversion thereof for received signals except the short-cycle received signal. Consequently, it is possible to perform a direction estimation process using all virtual reception arrays.

In the present embodiment, in a CFAR process, a short-cycle received signal is used instead of all received signals, but an FFT size in Doppler analyzer 213 becomes $(N_t-1)$ times, and thus a coherent addition gain of $(N_t-1)$ times can be obtained. Therefore, it is possible to supplement an SNR proportional to a reduced number of reception antennae used for the CFAR process. Specifically, a reception SNR during a CFAR process in the present embodiment becomes about $0.5(N_t)^{1/2}$ times compared with a case where a CFAR process is performed by combining power levels of outputs from Doppler analyzers 213 for all virtual reception antennae while sequentially switching among transmission antennae Tx #1 to Tx #$N_t$ in a method of the related art (where $N_t \geq 3$). In other words, a reception SNR during a CFAR process becomes 0.9 times at $N_t=3$, and becomes 0.9 times or more at $N_t=4$ or greater. Therefore, in the present embodiment, particular deterioration does not occur compared with the method of the related art.

Figure 10:
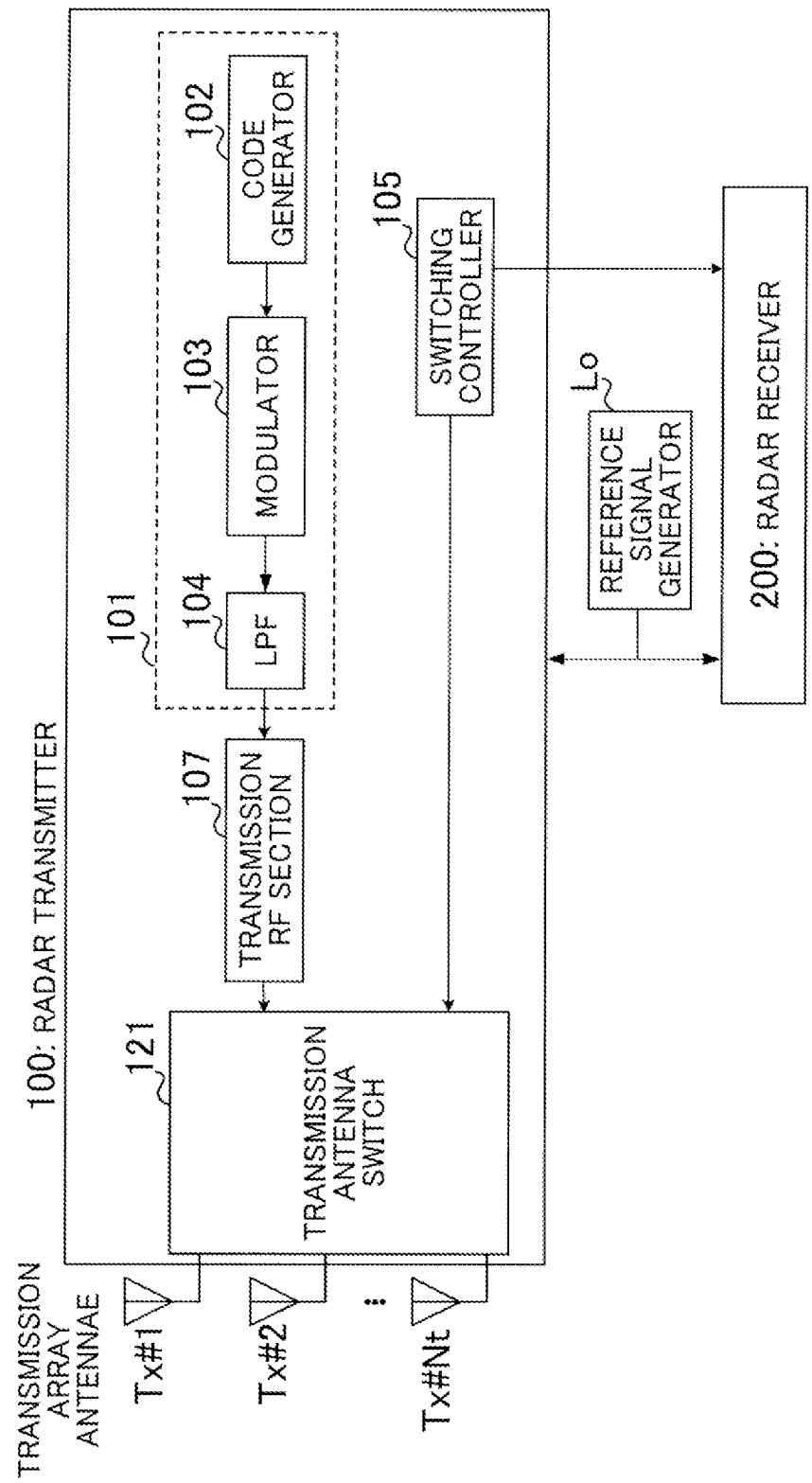
FIG. 10 is a diagram illustrating a modification example of a radar transmitter.

In the present embodiment, as illustrated in FIG. 10, in radar transmitter 100, an output from transmission RF section 107 may be selectively switched to one of a plurality of transmission antennae Tx by transmission antenna switch 121. In this case, the same effect as the above-described effect can also be achieved.

As illustrated in FIG. 9, a transmission antenna forming a virtual reception antenna (for example, inside a dotted line in FIG. 9) located around the center in the virtual arrangement of a plurality of virtual reception antennae may be selected as short-cycle transmission antenna Tx. Consequently, it is possible to achieve an effect of reducing side lobes on an angle profile in a direction estimation process. Next, a specific example will be described.

FIG. 9 illustrates an example of antenna disposition of a MIMO radar in a case where the number $N_t$ of transmission antennae is three, and the number $N_a$ of reception antennae is four. FIGS. 11A and 11B are diagrams illustrating examples of space profile results (a direction of the truth value 0 degrees as a target direction) in a case where a beam former method is used by direction estimator 214.

FIG. 11A illustrates a space profile result in a case where switching among transmission antennae Tx #1, Tx #2, and Tx #3 is sequentially performed according to a method of the related art. FIG. 11B illustrates a space profile result in a case where transmission antenna Tx #2 is used as a short-cycle transmission antenna as in the present embodiment. As illustrated in FIGS. 11A and 11B, a target in a front direction is accurately estimated in both of the methods.

When FIGS. 11A and 11B are compared with each other, in FIG. 11B corresponding to the present embodiment, it can be checked that the effect (about 3 dB) of reducing side lobes in the beam former method is achieved. This is because of the following reasons. In other words, in the virtual reception antennae (disposition of MIMOVAs #1 to #12 in FIG. 9), MIMOVAs #5 to #8 disposed around the center receive a short-cycle transmission signal from Tx #2. Therefore, received signal levels of MIMOVAs #5 to #8 are higher than received signal levels of the other MIMOVAs #1 to #4 and #9 to #12, and thus it is possible to achieve an effect of reducing side lobes on a space profile.

Embodiment 2

In Embodiment 1, a description has been made of a case where radar transmitter 100 uses a pulse compression radar that performs phase modulation or amplitude modulation on a pulse train and then transmits the pulse train. In Embodiment 2, a description will be made of a radar method using a pulse compression wave such as a chirp pulse subjected to frequency modulation (fast chirp modulation). In Embodiment 2, the same content as in Embodiment 1 will not be repeated.

Figure 12:
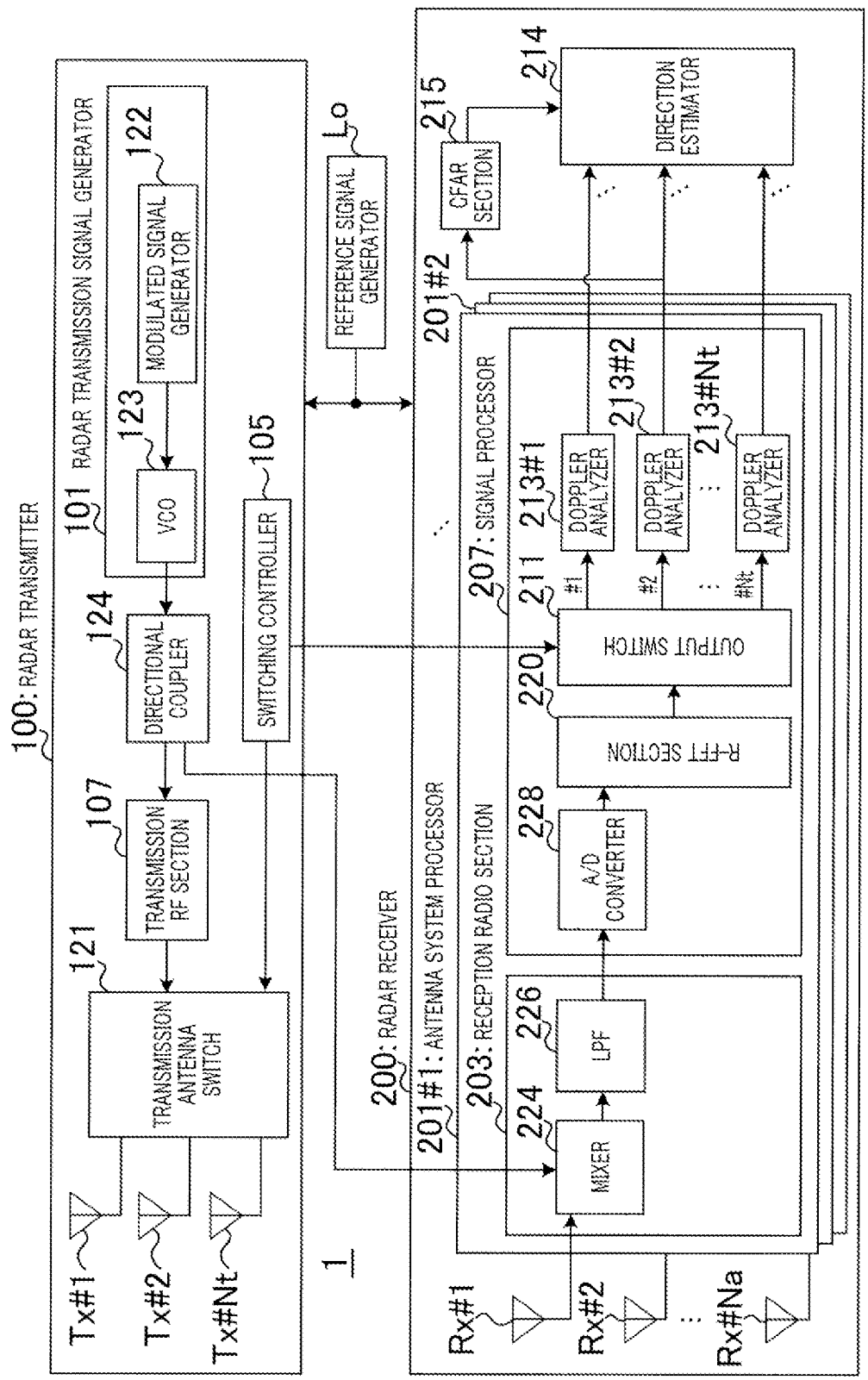
FIG. 12 is a diagram illustrating a configuration example of a radar apparatus according to Embodiment 2.

FIG. 12 illustrates a configuration example of radar apparatus 1 using a chirp pulse in radar transmission.

Radar transmitter 100 includes radar transmission signal generator 101, directional coupler 124, transmission RF section 107, transmission antenna switch 121, a plurality of transmission antennae Tx #1 to Tx #$N_t$, and switching controller 105. Radar transmission signal generator 101 includes modulated signal generator 122 and voltage controlled oscillator (VCO) 123.

Figure 13A:
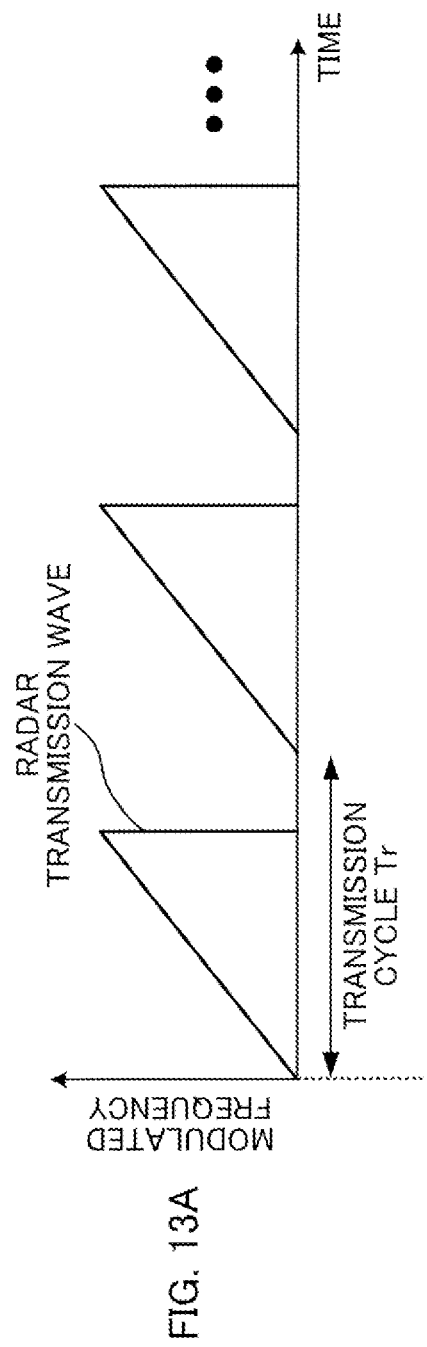
FIGS. 13A and 13B are diagrams respectively illustrating a transmission chirp signal and a reflected wave signal according to Embodiment 2.

Modulated signal generator 122 periodically generates, for example, a modulated signal having a saw tooth shape as illustrated in FIG. 13A. Here, a transmission cycle is indicated by $T_r$.

VCO 123 performs frequency modulation on a transmission signal on the basis of an output from modulated signal generator 122, and thus generates a frequency modulated signal (frequency chirp signal). VCO 123 outputs the frequency modulated signal to directional coupler 124.

Directional coupler 124 outputs frequency modulated signals output from VCO 123 to transmission RF section 107, and also extracts some of the frequency modulated signals and outputs the extracted frequency modulated signal to respective mixers 224 of radar receiver 200.

Transmission RF section 107 amplifies the frequency modulated signal output from directional coupler 124, and outputs the amplified frequency modulated signal to transmission antenna switch 121.

Transmission antenna switch 121 outputs the frequency modulated signal output from transmission RF section 107 to transmission antenna Tx selected through switching by switching controller 105. Transmission antenna Tx radiates a transmission signal output from transmission antenna switch 121 to the space.

Radar receiver 200 includes a plurality of reception antennae Rx #1 to Rx #$N_a$, antenna system processors 201 #1 to 201 #$N_a$ respectively corresponding to reception antennae Rx #1 to Rx #$N_a$, CFAR section 215, and direction estimator 214. Each antenna system processor 201 includes reception radio section 203 and signal processor 207. Reception radio section 203 includes mixer 224 and LPF 226. Signal processor 207 includes A/D converter 228, R-FFT section 220, output switch 211, and Doppler analyzer 213.

Figure 13B:
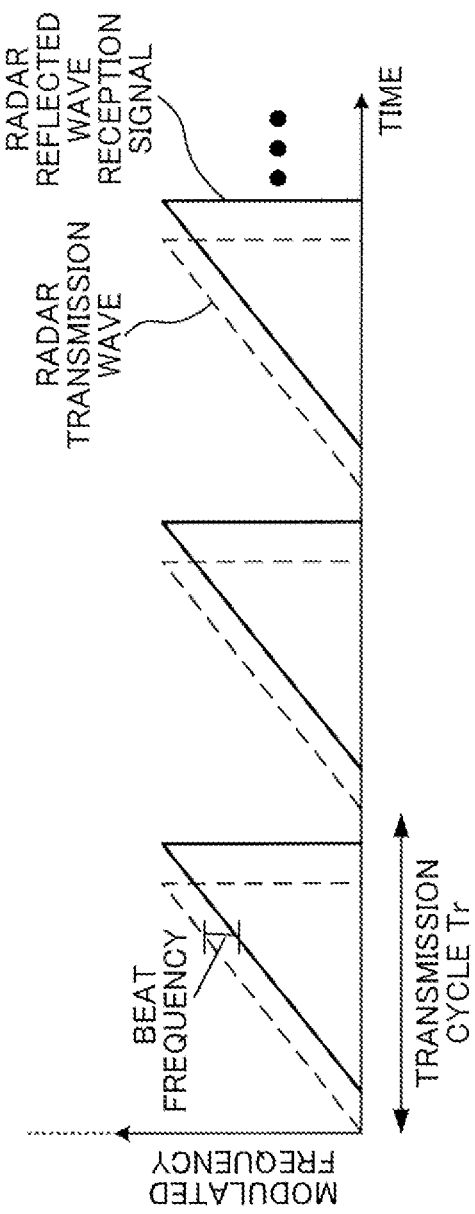

Radar receiver 200 mixes a received signal as a result of a reflected signal being received by reception antenna Rx with a frequency modulated signal that is a transmission signal in mixer 224, causes a resultant to pass through LPF 226, and thus extracts a bit signal having a frequency corresponding to a delay time between the transmission signal and the received signal. For example, as illustrated in FIG. 13B, a difference frequency between a frequency of a transmission frequency modulation wave (radar transmission wave) and a frequency of a reception frequency modulation wave (radar reflected wave reception signal) is extracted as a beat frequency.

A/D converter 228 of signal processor 207 converts the bit signal output from reception radio section 203 into discrete sampling data.

R-FFT section 220 performs an FFT process on $N_{data}$ pieces of discrete sampling data obtained in a predetermined time range (range gate) in each cycle of $T_r$. Consequently, a frequency spectrum in which a peak appears in a beat frequency corresponding to a delay time of a received signal is output. During the FFT process, a window function coefficient such as a Hann window or a Hamming window may be multiplied. A window function is used, and thus it is possible to suppress side lobes generated around a beat frequency peak.

Here, a beat frequency spectrum response output from R-FFT section 220 of signal processor 207 of antenna system processor 201 #z, obtained due to M-th chirp pulse transmission, is indicated by $AC\_RFT_z(f_b,M)$. Here, $f_b$ is an index number of FFT, and is $f_b=0, \ldots,$ and $N_{data}/2$. Frequency index $f_b$ indicates a beat frequency at which a delay time of a received signal (reflected signal) becomes shorter (that is, a distance from a target becomes shorter) as the index number becomes smaller.

Output switch 211 performs the same operation as the operation of output switch 211 of Embodiment 1. In other words, output switch 211 selects (performs switching to) one Doppler analyzer 212 from among $N_t$ Doppler analyzers 213 #1 to 213 #$N_t$ on the basis of a switching control signal from switching controller 105. Output switch 211 outputs a frequency spectrum output from R-FFT section 220 to selected Doppler analyzer 213 in each cycle of $T_r$.

A switching control signal in M-th radar transmission cycle $T_r$ may be formed of $N_t$ bits [$bit_1(M)$, $bit_2(M)$, ..., and $bitN_t(M)$]. In this case, in a switching control signal in M-th transmission cycle $T_r$, output switch 211 selects Doppler analyzer 213 #ND as an output destination in a case where the ND-th bit is 1, and does not select (non-selects) ND-th Doppler analyzer 213 #ND as an output destination in a case where the ND-th bit is 0. Here, ND is 1, ..., and $N_t$.

Switching controller 105 performs the same operation as the operation of switching controller 105 of Embodiment 1. For example, in a case where transmission antenna Tx #2 is a short-cycle transmission antenna, transmission antenna Tx #2 is selected in each cycle of $2T_r$, and each of transmission antennae Tx #1, Tx #3, ..., and Tx #$N_t$ except transmission antenna Tx #2 is selected in each cycle of $N_p=2(N_t-1)T_r$.

As described in Embodiment 1, a time point at which each transmission antenna Tx starts to transmit a transmission signal may not necessarily be synchronized with cycle $T_r$. For example, as illustrated in FIG. 6, transmission delays $\Delta_1$, $\Delta_2$, ..., and $\Delta_{Nt}$ may be respectively provided for transmission start time points in the respective transmission antennae.

Switching controller 105 repeats one set in the period of $N_p=2(N_t-1)T_r$ $N_c$ times. Consequently, in the period of $N_pN_c$, a transmission signal is transmitted $(N_t-1)N_c$ times from transmission antenna Tx #2 that is a short-cycle transmission antenna, and a transmission signal is transmitted $N_c$ times from each of transmission antennae Tx #1, Tx #3, ..., and Tx #$N_t$ except the short-cycle transmission antenna.

In radar receiver 200, signal processor 207 of antenna system processor 201 #z includes Doppler analyzer 213 #1 to 213 #$N_t$. Doppler analyzer 213 performs a Doppler analysis on a received signal output from output switch 211 for each beat frequency index $f_b$. For example, in a case where $N_c$ is a power of 2, an FFT process as represented by expressions (17) and (18) may be applied.

Here, $FT\_CI_z^{ND}(f_b,f_s,w)$ is a w-th output from Doppler analyzer 213 #ND of signal processor 207 of antenna system processor 201 #z and indicates a Doppler frequency response of Doppler frequency index $f_s$ at beat frequency index $f_b$. ND is 1 to $N_t$, k is 1, ..., and $(N_t+N_u)NS/N_c$, and z is 1, ..., and $N_a$. In addition, w is a natural number.

In a case where ND is 2 (short-cycle received signal), an FFT size in Doppler analysis is $(N_t-1)N_c$, and the maximum Doppler frequency not causing aliasing, derived from the sampling theorem, is $\pm 1/(2T_r)$. A Doppler frequency interval of Doppler frequency index $f_s$ is $2/\{2(N_t-1)N_cT_r\}$, and a range of Doppler frequency index $f_s$ is $f_s=-(N_t-1)N_c/2+1, \ldots, 0, \ldots,$ and $(N_t-1)N_c/2$.

In a case where ND is not 2 (not short-cycle received signal), an FFT size in Doppler analysis is $N_c$, and the maximum Doppler frequency not causing aliasing, derived from the sampling theorem, is $\pm 1/(2(N_t-1)T_r)$. A Doppler frequency interval of Doppler frequency index $f_u$ is $2/\{2(N_t-1)N_cT_r\}$, and a range of Doppler frequency index $f_u$ is $f_u=-N_c/2+1, \ldots, 0, \ldots,$ and $N_c/2$.

When outputs from Doppler analyzer 213 in cases where ND is 2 and ND is not 2 are compared with each other, Doppler frequency intervals of both thereof are the same as each other. However, the maximum Doppler frequency at which aliasing is not generated in a case where ND is 2 is $\pm(N_t-1)$ times the maximum Doppler frequency in a case where ND is not 2, and thus a Doppler frequency range is increased by $(N_t-1)$ times.

Therefore, the maximum Doppler frequency at which aliasing is not generated at ND=2 is increased by $N_t/2$ times in a case where the number $N_t$ of transmission antennae is three according to the configuration of the present embodiment, compared with a case where a transmission antenna outputting a transmission signal is sequentially switched to Tx #1, Tx #2, ..., and Tx #$N_t$. In other words, a Doppler frequency range in which aliasing is not generated is increased in proportion to the number $N_t$ of transmission antennae.

In case of ND=2 (short-cycle received signal):

$$FT\_CI_z^{ND}(f_b, f_s, w) = \sum_{q=0}^{2(N_t-1)N_c-1} bit_{N_D}(q+1) AC\_RFT_z \quad \text{(Expression 17)}$$

$$(f_b, 2(N_t-1)N_c(w-1)+q+1)\exp\left[-j\frac{2\pi\left\lfloor\frac{q}{2}\right\rfloor f_s}{(N_t-1)N_c}\right]$$

In case of ND #2 (not short-cycle received signal):

$$FT\_CI_z^{ND}(f_b, f_s, w) = \sum_{q=0}^{2(N_t-1)N_c-1} bit_{N_D}(q+1) \quad \text{(Expression 18)}$$

$$AC\_RFT_z(f_b, 2(N_t-1)N_c(w-1)+q+1)\exp\left[-j\frac{2\pi\left\lfloor\frac{q}{2(N_t-1)}\right\rfloor f_u}{N_c}\right]$$

In a case where ND is not 2, when there is no output from output switch 211, an FFT size in Doppler analysis may be set to $(N_t-1)N_c$, and sampling may be performed by virtually setting an output as zero according to expression (19).

Expression (19) is the same as expression (17). Consequently, an FFT size is increased, and thus a processing amount is increased, but a Doppler frequency index is the same as that in a case where ND is 2. Therefore, a conversion process of a Doppler frequency index which will be described later is not necessary.

$$\text{FT\_CI}_z^{N_D}(f_b, f_u, w) = \sum_{q=0}^{2(N_c-1)N_c-1} \text{bit}_{N_D}(q+1)\text{AC\_RFT}_z \quad \text{(Expression 19)}$$

$$(f_b, 2(N_c-1)N_c(w-1)+q+1)\exp\left[-j\frac{2\pi\left\lfloor\frac{q}{2}\right\rfloor f_u}{(N_t-1)N_c}\right]$$

The subsequent processes in CFAR section 215 and direction estimator 214 are the same as processes in which discrete time k used in Embodiment 1 is replaced with beat frequency index $f_b$, and thus description thereof will be omitted here. According to the configuration and the processes, Embodiment 2 can achieve the same effect as in Embodiment 1.

In the following embodiments, a frequency chirp signal may also be applied as a transmission signal, and thus the same effect as in a case of using a coded pulse signal can be achieved.

Beat frequency index $f_b$ may be converted into distance information $R(f_b)$ by using expression (20). Here, $B_w$ indicates a frequency modulation bandwidth in a frequency chirp signal generated through frequency modulation, and $C_0$ indicates a light speed.

$$R(f_b) = \frac{C_0}{2B_w} f_b \quad \text{(Expression 20)}$$

Embodiment 3

Figure 14:
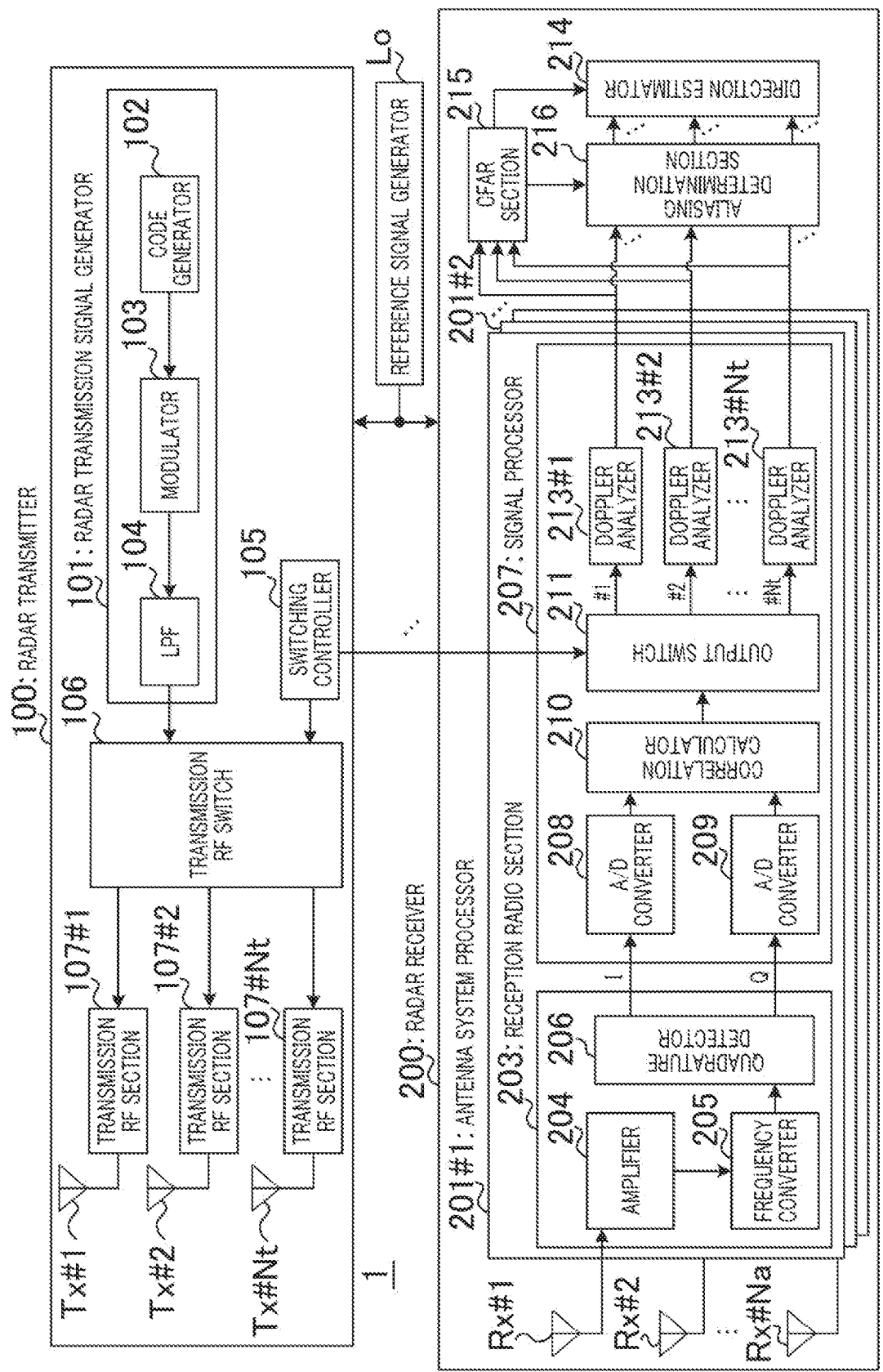
FIG. 14 is a diagram illustrating a configuration example of a radar apparatus according to Embodiment 3.

FIG. 14 illustrates a configuration example of radar apparatus 1 according to Embodiment 3. Radar apparatus 1 according to Embodiment 3 further includes aliasing determiner 216 compared with radar apparatus 1 according to Embodiment 1. Embodiment 3 is different from Embodiment 1 in terms of operations of switching controller 105, Doppler analyzer 213, CFAR section 215, and direction estimator 214. Hereinafter, in embodiment 3, contents that are different from those of Embodiment 1 will be focused, and the same contents as those of Embodiment 1 will not be repeated.

Switching controller 105 outputs a switching control signal for an instruction for switching among output destinations to transmission RF switch 106 of radar transmitter 100 and output switch 211 of radar receiver 200. An instruction for switching among output destinations, given to output switch 211 will be described later. Hereinafter, a description will be made of an instruction for switching among output destinations, given to transmission RF switch 106.

Switching controller 105 sequentially selects one from among transmission RF sections 107 #1 to #$N_t$ in each transmission cycle $T_r$. Switching controller 105 outputs a switching control signal for an instruction for switching an output destination to selected transmission RF section 107, to transmission RF switch 106.

Transmission RF switch 106 switches an output destination to one of transmission RF sections 107 #1 to #$N_t$ on the basis of the switching control signal output from switching controller 105. Transmission RF switch 106 outputs a transmission signal output from radar transmission signal generator 101, to transmission RF section 107 that is a switched destination.

Figure 15:
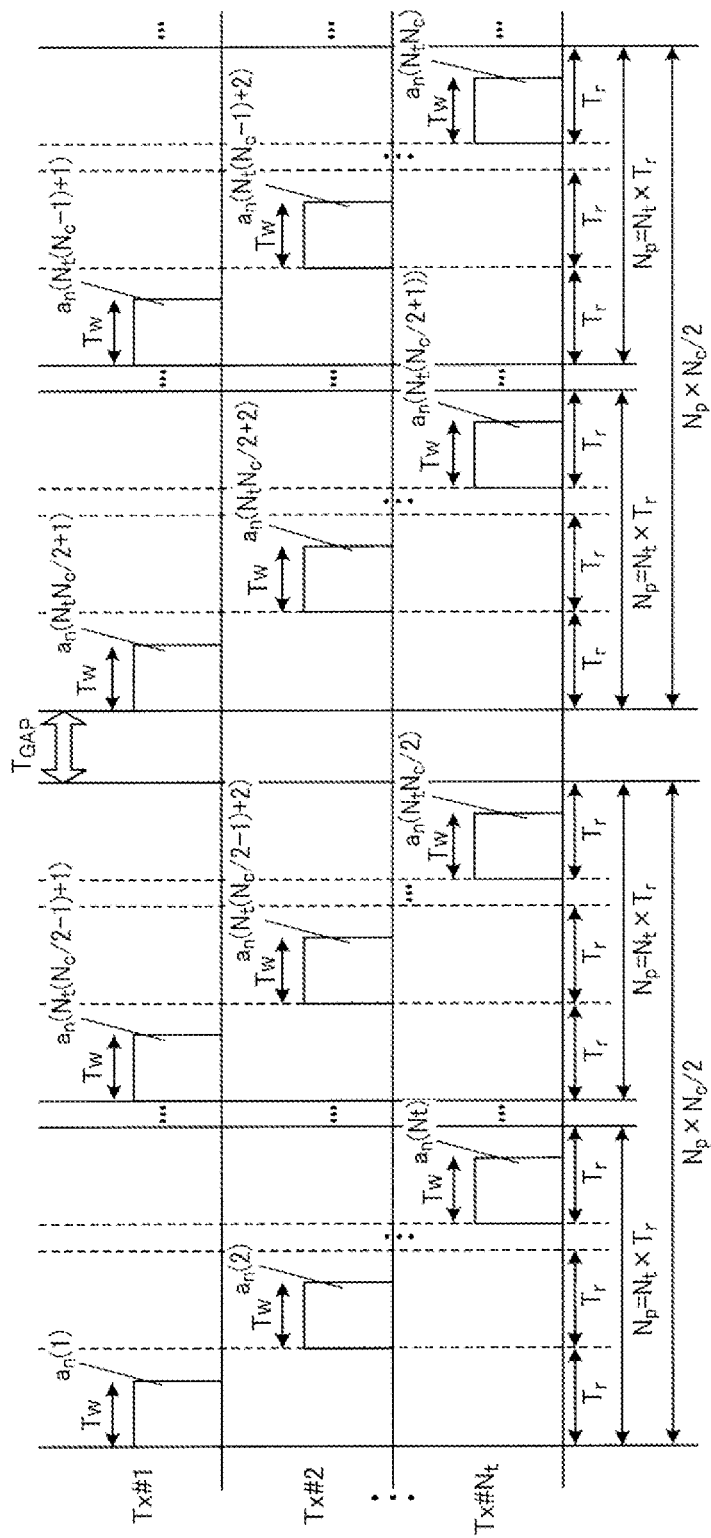
FIG. 15 is a diagram for describing timings at which transmission RF sections #1 to #$N_t$ according to Embodiment 3 transmit transmission signals.

FIG. 15 is a diagram for describing timings at which transmission RF sections 107 #1 to #$N_t$ transmit transmission signals.

As illustrated in FIG. 15, switching controller 105 sequentially selects transmission RF sections 107 #1 to #$N_t$ as output destinations in each transmission cycle $T_r$. Switching controller 105 outputs a switching control signal for an instruction for switching an output destination to selected transmission RF section 107 to transmission RF switch 106 in each transmission cycle $T_r$. Consequently, transmission RF switch 106 selects each of transmission RF sections 107 #1 to #$N_t$ in each cycle of $N_p=N_tT_r$. In other words, each of transmission RF sections 107 #1 to #$N_t$ transmits a transmission signal in each cycle of $N_p=N_tT_r$.

As illustrated in FIG. 15, switching controller 105 repeats the processes for one set in the period of $N_p=N_tT_r$ $N_c/2$ times, and provides transmission gap period $T_{GAP}$ in which a transmission signal is not output. After transmission gap period $T_{GAP}$ elapses, switching controller 105 repeats again the processes for one set in the period of $N_p=N_tT_r$ $N_c/2$ times. Through the processes, each transmission RF section 107 transmits a transmission signal $N_c$ times. Transmission gap period $T_{GAP}$ may be set to ½ of the sampling cycle $(N_p=N_tT_r)$ in Doppler analyzer 213. In other words, transmission gap period $T_{GAP}$ may be $N_p/2=N_tT_r/2$.

In radar receiver 200, output switch 211 of signal processor 207 of antenna system processor 201 #z selects one from among Doppler analyzers 213 #1 to 213 #$N_t$ in each cycle of $T_r$ on the basis of a switching control signal output from switching controller 105. Output switch 211 outputs a correlation calculation result output from correlation calculator 210 in each cycle of $T_r$, to selected Doppler analyzer 213.

A switching control signal in M-th radar transmission cycle $T_r$ may be formed of $N_t$ bits [bit$_1$(M), bit$_2$(M), . . . , and bitN$_t$(M)]. In this case, in M-th transmission cycle $T_r$, output switch 211 selects Doppler analyzer 213 #ND as an output destination in a case where the ND-th bit of the switching control signal is 1, and does not select (non-selects) Doppler analyzer 213 #ND as an output destination in a case where the ND-th bit of the switching control signal is 0. Here, ND is 1, . . . , and $N_t$.

Switching controller 105 sequentially switches each bit to 1 and outputs a switching control signal in each cycle of $N_p=N_tT_r$ before transmission gap period $T_{GAP}$ starts. Next, a specific example thereof will be described.

First, switching controller 105 outputs one set (corresponding to period $N_p$) of switching control signals indicated in the following (C1) $N_c/2$ times.

[bit$_1$(1),bit$_2$(1), . . . ,bitN$_t$(1)]=[1,0, . . . ,0]

[bit$_1$(2),bit$_2$(2), . . . ,bitN$_t$(2)]=[0,1, . . . ,0]

[bit$_1$($N_t$),bit$_2$($N_t$), . . . ,bitN$_t$($N_t$)]=[0,0, . . . ,1]  (C1)

Switching controller 105 outputs one set (corresponding to period $N_p$) of the switching control signals indicated in (C1) $N_c/2$ times, and then outputs a switching control signal of which all bits are zeros indicated the following (C2) in transmission gap period $T_{GAP}$.

[bit$_1$,bit$_2$, . . . ,bitN$_t$]=[0,0, . . . ,0]  (C2)

After transmission gap period $T_{GAP}$ ends, switching controller 105 outputs one set (corresponding to period $N_p$) of switching control signals indicated in the following (C3) $N_c/2$ times.

[bit$_1$($N_tN_c/2+1$),bit$_2$($N_tN_c/2+1$), . . . ,bitN$_t$($N_tN_c/2+1$)]=[1,0, . . . ,0]

[bit$_1$($N_tN_c/2+2$),bit$_2$($N_tN_c/2+2$), . . . ,bitN$_t$($N_tN_c/2+2$)]=[0,1, . . . ,0]

[bit$_1$($N_tN_c$),bit$_2$($N_tN_c$), . . . ,bitN$_t$($N_tN_c$)]=[0,0, . . . ,1]   (C3)

Signal processor 207 of antenna system processor 201 #z includes Doppler analyzers 213 #1 to 213 #$N_t$. Each of Doppler analyzers 213 #1 to 213 #$N_t$ separately performs Doppler analysis on correlation calculation results corresponding to $N_c/2$ times (first half period) before transmission gap period $T_{GAP}$ starts and correlation calculation results corresponding to N/2 times (second half period) after transmission gap period $T_{GAP}$ ends at each discrete time k. In a case where $N_c$ is a power of 2, an FFT process as represented in expressions (21) and (22) may be applied.

FT_FH_CI$_z^{ND}$(k,f$_s$,w) in expression (21) is a w-th output from Doppler analyzer 213 #ND of signal processor 207 of antenna system processor 201 #z, and indicates a Doppler frequency response corresponding to $N_c/2$ times in the first half period of Doppler frequency index f$_s$ at discrete time k.

FT_SII_CI$_z^{ND}$(k,f$_s$,w) in expression (22) is a w-th output from Doppler analyzer 213 #ND of signal processor 207 of antenna system processor 201 #z, and indicates a Doppler frequency response corresponding to $N_c/2$ times in the second half period of Doppler frequency index f$_s$ at discrete time k. Here, ND is 1 to $N_t$, k is 1, . . . , and ($N_r+N_u$)$N_s/N_c$, and z is 1, . . . , and $N_a$. In addition, w is a natural number.

In FT_FH_CI$_z^{ND}$(k,f$_s$,w), an FFT size is $N_c$, and $N_c/2$ pieces of data of the second half portion are set to zero. In FT_SH_CI$_z^{ND}$(k,f$_s$,w), an FFT size is $N_c$, and $N_c/2$ pieces of data of the first half portion are set to zero.

Therefore, the maximum Doppler frequency not causing aliasing, derived from the sampling theorem, is $\pm 1/(2N_tT_r)$. A Doppler frequency interval of Doppler frequency index f$_s$ is $1/\{N_tN_cT_r\}$, and a range of Doppler frequency index f$_s$ is f$_s$=$-N_c/2+1$, . . . , 0, . . . , and $N_c/2$.

Doppler frequency response corresponding to $N_c/2$ times (first half portion) before transmission gap period $T_{GAP}$ starts:

$$\text{FT\_FH\_CI}_z^{ND}(k, f_s, w) = \sum_{q=0}^{N_tN_c/2-1} \text{bit}_{N_D}(q+1) \quad \text{(Expression 21)}$$

$$AC_z(k, N_pN_c(w-1)+q+1)\exp\left[-j\frac{2\pi\left\lfloor\frac{q}{N}\right\rfloor-f_s}{N_c}\right]$$

Doppler frequency response corresponding to NJ/2 times (second half portion) before transmission gap period $T_{GAP}$ ends:

$$\text{FT\_SH\_CI}_z^{ND}(k, f_s, w) = \sum_{q=N_tN_c/2}^{N_tN_c-1} \text{bit}_{N_D}(q+1) \quad \text{(Expression 22)}$$

$$AC_z(k, N_tN_c(w-1)+q+1)\exp\left[-j\frac{2\pi\left\lfloor\frac{q}{N}\right\rfloor-f_s}{N_c}\right]$$

During the FFT process, a window function coefficient such as a Hann window or a Hamming window may be multiplied. A window function is used, and thus it is possible to suppress side lobes generated around a beat frequency peak. Regarding the window function coefficient, a window function coefficient having $N_c$ as an FFT size is used, $N_c/2$ window function coefficients of the first half portion are used to calculate FT_FH_CI$_z^{ND}$(k,f$_s$,w), and $N_c/2$ window function coefficients of the second half portion are used to calculate FT_SH_CI$_z^{ND}$ (k,f$_s$,w).

CFAR section 215 performs a CFAR process by using w-th outputs FT_FH_CI$_z^{ND}$(k,f$_s$,w) and FT_SH_CI$_z^{ND}$(k,f$_s$,w) from Doppler analyzers 213 #1 to 213 #$N_t$ of antenna system processors 201 #1 to 201 #$N_a$. The CFAR process is performed on a two-dimensional input signal having discrete time k (corresponding to a distance to a target) and Doppler frequency index f$_s$ (corresponding to a relative speed of the target).

In the CFAR process, for example, as represented in expression (22a), power levels of w-th outputs FT_FH_CI$_z^{ND}$(k,f$_s$,w) and FT_SH_CI$_z^{ND}$(k,f$_s$,w) from respective Doppler analyzers 213 #2 of antenna system processors 201 #1 to 201 #$N_a$ are added together. CFAR section 215 performs, for example, a CFAR process in which one-dimensional CFAR processes are combined with each other, or two-dimensional CFAR process on a power addition result. The process disclosed in NPL 2 may be applied to the CFAR process. Here, an axis of discrete time (corresponding to a distance to a target) and an axis of a Doppler frequency (corresponding to a relative speed of the target) may be used in the two-dimensional CFAR process. CFAR section 215 outputs discrete time index k$_{\_cfar}$ and Doppler frequency index f$_{s\_cfar}$ at which the power addition result is more than a threshold value, to direction estimator 214 and aliasing determiner 216.

$$PowerFT^{ND}(k, f_s, w) = \sum_{z=1}^{N_a}\left\{|\text{FT\_FH\_CI}_z^{ND}(k, f_s, w)|^2 + |\text{FT\_SH\_CI}_z^{ND}(k, f_s, w)|^2\right\} \quad \text{(Expression 22a)}$$

Aliasing determiner 216 determines whether or not an output from Doppler analyzer 213 includes an aliasing signal on the basis of discrete time index k$_{\_cfar}$ and Doppler frequency index f$_{s\_cfar}$ output from CFAR section 215. For example, aliasing determiner 216 performs the determination according to expressions (23) and (24).

In a case where the following expression is not established, it is determined that an aliasing signal is not included.

$$\sum_{ND=1}^{Nt}\sum_{z=1}^{Na}|\text{FT\_CAL}_z^{ND}(k_{\_cfar}, f_{s\_char}, w)|^2 > \quad \text{(Expression 23a)}$$

$$\sum_{ND=1}^{Nt}\sum_{z=1}^{Na}|\text{FT\_ALIAS}_z^{ND}(k_{\_cfar}, f_{s\_char}, w)|^2$$

In a case where the following expression is established, it is determined that an aliasing signal is included.

$$\sum_{ND=1}^{Nt}\sum_{z=1}^{Na}|\text{FT\_CAL}_z^{ND}(k_{\_cfar}, f_{s\_char}, w)|^2 < \quad \text{(Expression 24)}$$

$$\sum_{ND=1}^{Nt} \sum_{z=1}^{Na} |FT\_ALIAS_z^{ND}(k_{\_cfar}, f_{s\_char}, w)|^2$$

In expressions (23) and (24), the following expressions are given.

$$FT\_CAL_z^{ND}(k_{\_cfar}, f_{s\_char}, w) = \qquad \text{(Expression 25)}$$

$$FT\_FH\_CI_z^{ND}(k_{\_cfar}, f_{s\_char}, w) +$$

$$\exp\left(-j\frac{2\pi f_{s\_cfar}}{Nc}\frac{1}{2}\right)FT\_SH\_CI_z^{ND}(k_{\_cfar}, f_{s\_char}, w)$$

$$FT\_ALIAS_z^{ND}(k_{\_cfar}, f_{s\_char}, w) = \qquad \text{(Expression 26)}$$

$$FT\_FH\_CI_z^{ND}(k_{\_cfar}, f_{s\_char}, w) -$$

$$\exp\left(-j\frac{2\pi f_{s\_cfar}}{Nc}\frac{1}{2}\right)FT\_SH\_CI_z^{ND}(k_{\_cfar}, f_{s\_char}, w)$$

Here, $FT\_CAL_z^{ND}(k,f_s,w)$ in expression (25) is an expression used for in-phase addition of $FT\_FH\_CI_z^{ND}(k,f_s,w)$ and $FT\_SH\_CI_z^{ND}(k,f_s,w)$ assuming that Doppler frequency index $f_{s\_cfar}$ does not include an aliasing signal. In expression (25), a signal of Doppler frequency index $f_{s\_cfar}$ causes a phase change (phase rotation) during transmission gap period $T_{GAP}$, and thus the term of expression (25a) is introduced to correct the phase rotation. Here, transmission gap period $T_{GAP}$ is set to ½ of the sampling cycle $(N_p=N_tT_r)$ in Doppler analyzer 213, and thus a phase rotation corresponding to a half (½) of a phase change (phase rotation) in a sampling cycle period of the Doppler frequency index $(f_{s\_cfar})$ is corrected.

$$\exp\left(-j\frac{2\pi f_{s\_cfar}}{Nc}\frac{1}{2}\right) \qquad \text{(Expression 25a)}$$

On the other hand, $FT\_ALIAS_z^{ND}(k,f_s,W)$ in expression (26) is an expression used for in-phase addition of $FT\_FH\_CI\_ND(k,f_s,w)$ and $FT\_SH\_CI_z^{ND}(k,f_s,w)$ assuming that a signal of Doppler frequency index $f_{s\_cfar}$ includes an aliasing signal. In a case where a signal of Doppler frequency index $f_{s\_cfar}$ includes a (primary) aliasing signal, a phase change (phase rotation) corresponding to a Doppler frequency index of $(f_{s\_cfar}-N_c)$ occurs during transmission gap period $T_{GAP}$ at Doppler frequency index $f_{s\_cfar} \geq 0$. A phase change (phase rotation) corresponding to a Doppler frequency index of $(f_{s\_cfar}+N_c)$ occurs during transmission gap period $T_{GAP}$ at Doppler frequency index $f_{s\_car} \leq 0$. Therefore, in expression (26), the term of expression (26a) is introduced to correct the phase rotation occurring during transmission gap period $T_{GAP}$. Expression (26a) is obtained by assigning $(f_{s\_cfar}+N_c)$ to $f_{s\_cfar}$ in expression (25a), and is thus obtained by inverting the phase in expression (25a). Therefore, one of $FT\_CAL_z^{ND}(k,f_s,w)$ and $FT\_ALIAS_z^{ND}(k,f_s,w)$ is subjected to in-phase addition, and the other thereof is subjected to anti-phase addition. Therefore, a signal level difference is clarified, and thus it is possible to determine the presence or absence of an aliasing signal even in a case where an SNR of a received signal is low.

$$-\exp\left(-j\frac{2\pi f_{s\_cfar}}{Nc}\frac{1}{2}\right) \qquad \text{(Expression 26a)}$$

In other words, from the above description, in a case where a signal of Doppler frequency index $f_{s\_cfar}$ includes an aliasing signal, $FT\_CAL_z^{ND}(k,f_s,w)$ has power lower than power of $FT\_ALIAS_z^{ND}(k,f_s,w)$. On the other hand, in a case where a signal of Doppler frequency index $f_{s\_cfar}$ does not include an aliasing signal, $FT\_ALIAS_z^{ND}(k,f_s,w)$ has power lower than power of $FT\_CAL_z^{ND}(k,f_s,w)$. For the reason, a determination method using Expressions (23) and (24) can be used.

Aliasing determiner 216 outputs a Doppler frequency index after conversion as follows with respect to a signal of Doppler frequency index $f_{s\_cfar}$ determined as including a (primary) aliasing signal. In a case of Doppler frequency index $f_{s\_cfar} \geq 0$, conversion into $DopConv(f_{s\_cfar})=f_{s\_cfar}-N_c$ is performed, and the resultant is output. In a case of Doppler frequency index $f_{s\_cfar}<0$, conversion into $DopConv(f_{s\_cfar})=f_{s\_cfar}+N_c$ is performed, and the resultant is output. Here, $DopConv(f)$ indicates a conversion result of a Doppler frequency index for Doppler frequency index f based on determination of an aliasing signal.

Aliasing determiner 216 outputs a Doppler frequency index without conversion as follows with respect to a signal of Doppler frequency index $f_{s\_cfar}$ determined as not including an aliasing signal. $DopConv(f_{s\_cfar})=f_{s\_cfar}$ Direction estimator 214 generates virtual reception array correlation vector $h(k,f_s,w)$ represented in expression (27) on the basis of an output from the aliasing determiner, and performs a direction estimation process.

Hereinafter, a sum of the w-th outputs from Doppler analyzers 213 #1 to 213 #$N_t$ obtained through identical processes in respective signal processors 207 of antenna system processors 201 #1 to 201 #$N_a$ is represented by virtual reception array correlation vector $h(k_{\_cfar},f_{s\_cfar},w)$ including $N_tN_a$ elements corresponding to a product of the number $N_t$ of transmission antennae and the number $N_a$ of reception antennae, as represented in expression (27). Virtual reception array correlation vector $h(k_{\_cfar},f_{s\_cfar},w)$ is used for a process of performing direction estimation based on a phase difference between respective reception antennae Rx on received waves from a target. Here, z is 1, . . . , and $N_a$, and ND is 1, . . . , and $N_t$.

(Expression 27)

$$h(k_{\_cfar}, f_{s\_cfar}, w) =$$

$$\begin{bmatrix} h_{cal[1]}FT\_CI_1^{(1)}(k_{\_cfar}, f_{s\_cfar}, w)TxCAL^{(1)}(DopConv(f_{s\_cfar})) \\ h_{cal[2]}FT\_CI_2^{(1)}(k_{\_cfar}, f_{s\_cfar}, w)TxCAL^{(1)}(DopConv(f_{s\_cfar})) \\ \vdots \\ h_{cal[Na]}FT\_CI_{Na}^{(1)}(k_{\_cfar}, f_{s\_cfar}, w)TxCAL^{(1)}(DopConv(f_{s\_cfar})) \\ h_{cal[Na+1]}FT\_CI_1^{(2)}(k_{\_cfar}, f_{s\_cfar}, w)TxCAL^{(2)}(DopConv(f_{s\_cfar})) \\ h_{cal[Na+2]}FT\_CI_2^{(2)}(k_{\_cfar}, f_{s\_cfar}, w)TxCAL^{(2)}(DopConv(f_{s\_cfar})) \\ \vdots \\ h_{cal[2Na]}FT\_CI_{Na}^{(2)}(k_{\_cfar}, f_{s\_cfar}, w)TxCAL^{(2)}(DopConv(f_{s\_cfar})) \\ \vdots \\ h_{cal[Na(Nt-1)+1]}FT\_CI_1^{(Nt)}(k_{\_cfar}, f_{s\_cfar}, w)TxCAL^{(Nt)}(DopConv(f_{s\_cfar})) \\ h_{cal[Na(Nt-1)+2]}FT\_CI_2^{(Nt)}(k_{\_cfar}, f_{s\_cfar}, w)TxCAL^{(Nt)}(DopConv(f_{s\_cfar})) \\ \vdots \\ h_{cal[NaNt]}FT\_CI_{Na}^{(Nt)}(k_{\_cfar}, f_{s\_cfar}, w)TxCAL^{(Nt)}(DopConv(f_{s\_cfar})) \end{bmatrix}$$

$$\begin{aligned}\text{FT\_CI}_z^{ND}&(k_{\_cfar}, f_{s\_char}, w) = \\ &\text{FT\_FH\_CI}_z^{ND}(k_{\_cfar}, f_{s\_char}, w) + \\ &\exp\left(-j\frac{2\pi DopConv(f_{s\_cfar})}{Nc}\frac{1}{2}\right) \\ &\text{FT\_SH\_CI}_z^{ND}(k_{\_cfar}, f_{s\_char}, w)\end{aligned}$$

(Expression 28)

Here, $h_{cal[b]}$ is an array correction value for correcting a phase deviation and an amplitude deviation between the transmission antennae and between the reception antennae. In addition, b is 1, . . . , and $N_tN_a$.

Since switching among transmission antennae Tx is performed in a time division manner, different phase rotations occur at different Doppler frequencies f. $TxCAL^{(1)}(f)$, . . . , and $TxCAL^{(N_t)}(f)$ are transmission phase correction coefficients for correcting the phase rotations and thus matching phases of the transmission antennae with a phase of a reference transmission antenna. For example, in a case where Tx #1 is used as a reference transmission antenna, the transmission phase correction coefficients are as in expression (29).

$$\begin{aligned}TxCAL^{(1)}(f) &= 1, \\ TxCAL^{(2)}(f) &= \exp\left(-j\frac{2\pi f}{N_c}\frac{2}{N_t}\right), \\ &\cdots \\ TxCAL^{(N_t)}(f) &= \exp\left(-j\frac{2\pi f}{N_c}\frac{N_t-1}{N_t}\right)\end{aligned}$$

(Expression 29)

In this case, virtual reception array correlation vector $h(k_{\_cfar}, f_{s\_cfar}, w)$ in expression (27) is a column formed of $N_aN_t$ elements.

In arrival direction estimation, a space profile is calculated by making azimuthal direction θ in direction estimation evaluation function value $P_H(\theta, k_{\_cfar}, f_{s\_cfar}, w)$ variable within a predetermined angle range. In the arrival direction estimation, a predetermined number of maximum peaks of the calculated space profile is extracted in a descending order, and elevation angle directions of the maximum peaks are output as arrival direction estimation values.

Radar apparatus 1 according to Embodiment 3 performs switching among a plurality of transmission antennae Tx in a time division manner, and transmits a transmission signal from each transmission antenna Tx $N_c$ times. In this case, radar apparatus 1 transmits a transmission signal from each transmission antenna Tx $N_c/2$ times, and then provides transmission gap period $T_{GAP}$. In radar apparatus 1, aliasing determiner 216 determines whether or not an output signal from Doppler analyzer 213 includes an aliasing signal on the basis of a phase change occurring during transmission gap period $T_{GAP}$. Consequently, a Doppler frequency range in which there is no ambiguity can be increased by twice compared with a case where transmission gap period $T_{GAP}$ is not provided.

In a case where transmission gap period $T_{GAP}$ is set to $N_tT_r/2$, determination performance (accuracy) of whether or not an aliasing signal is included is highest. However, transmission gap period TOM is not limited thereto, and may be set to about $N_tT_r/2$ or a period before or after $N_tT_r/2$.

In a case where transmission signal is transmitted $N_c$ times from each transmission antenna Tx, a transmission signal is transmitted $N_c/2$ times from each transmission antenna Tx, and then transmission gap period TOM is provided. Therefore, determination performance (accuracy) of whether or not an aliasing signal is included is highest. However, a timing at which transmission gap period $T_{GAP}$ is provided is not limited thereto, and may be provided after a transmission signal is transmitted about $N_c/2$ times, or may be provided after a transmission signal is transmitted below or over $N_c/2$ times.

Embodiment 4

In Embodiment 1, a description has been made of a configuration in which at least one of a plurality of transmission antennae Tx is used as a short-cycle transmission antenna. In Embodiment 3, a description has been made of a configuration in which transmission gap period $T_{GAP}$ is provided. In Embodiment 4, a description will be made of a combination example of Embodiment 1 and Embodiment 3. Consequently, it is possible to increase a Doppler frequency detection range more than in Embodiment 1. Hereinafter, in embodiment 4, contents that are different from those of Embodiments 1 and 3 will be focused, and the same contents as those of Embodiments 1 and 3 will not be repeated.

Figure 16:
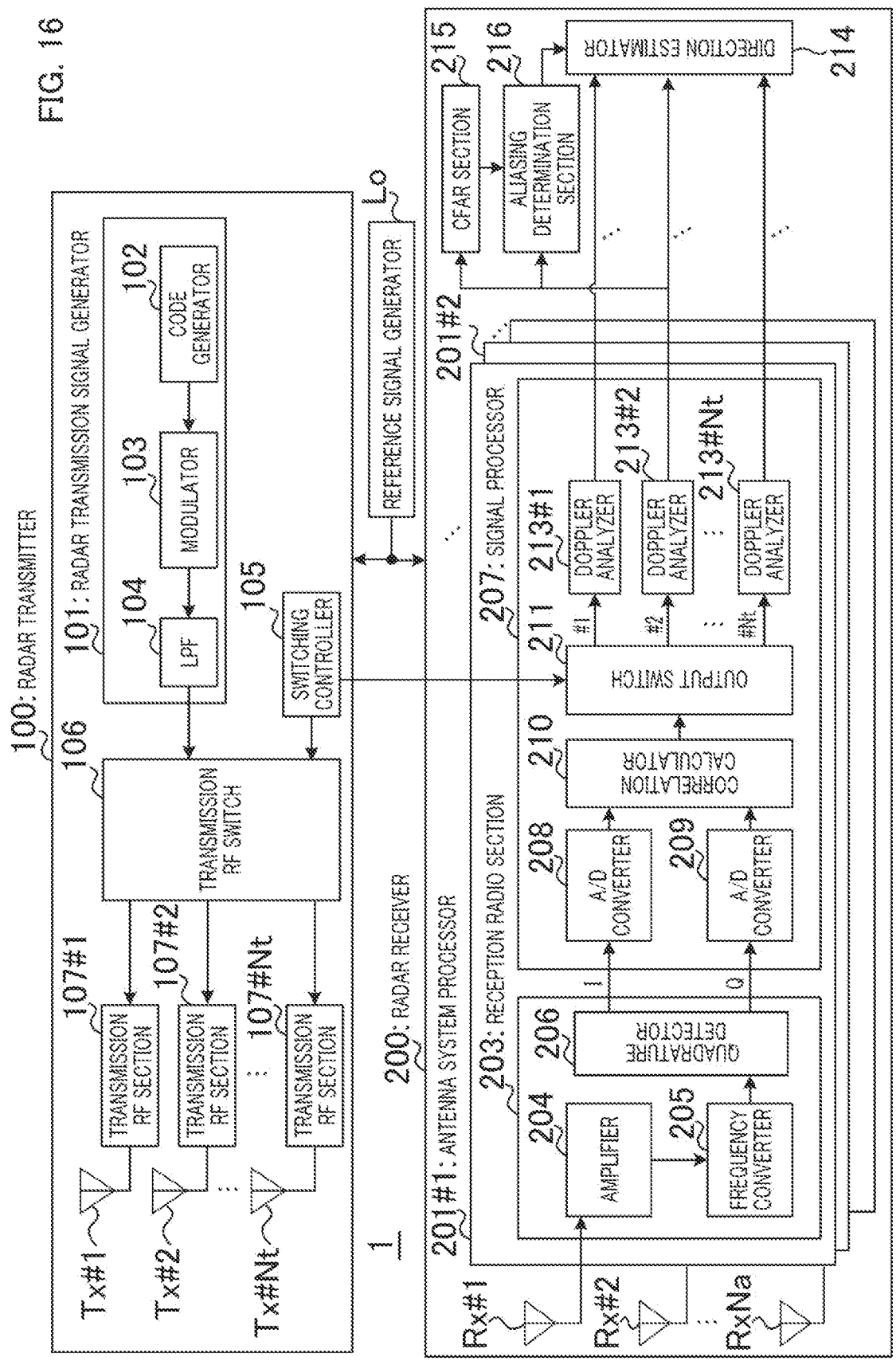
FIG. 16 is a diagram illustrating a configuration example of a radar apparatus according to Embodiment 4.

FIG. 16 illustrates a configuration example of radar apparatus 1 according to Embodiment 4.

Switching controller 105 outputs a switching control signal for an instruction for switching among output destinations to transmission RF switch 106 of radar transmitter 100 and output switch 211 of radar receiver 200. An instruction for switching among output destinations, given to output switch 211 will be described later. Hereinafter, a description will be made of an instruction for switching among output destinations, given to transmission RF switch 106.

Switching controller 105 selects one transmission RF section 107 to be used to transmit a transmission signal from among transmission RF sections 107 #1 to #$N_t$ in each transmission cycle $T_r$. Switching controller 105 outputs a switching control signal for an instruction for switching an output destination to selected transmission RF section 107, to transmission RF switch 106.

Transmission RF switch 106 switches an output destination to one of transmission RF sections 107 #1 to #$N_t$ on the basis of the switching control signal output from switching controller 105. Transmission RF switch 106 outputs a transmission signal output from radar transmission signal generator 101, to transmission RF section 107 that is a switched destination.

Figure 17:
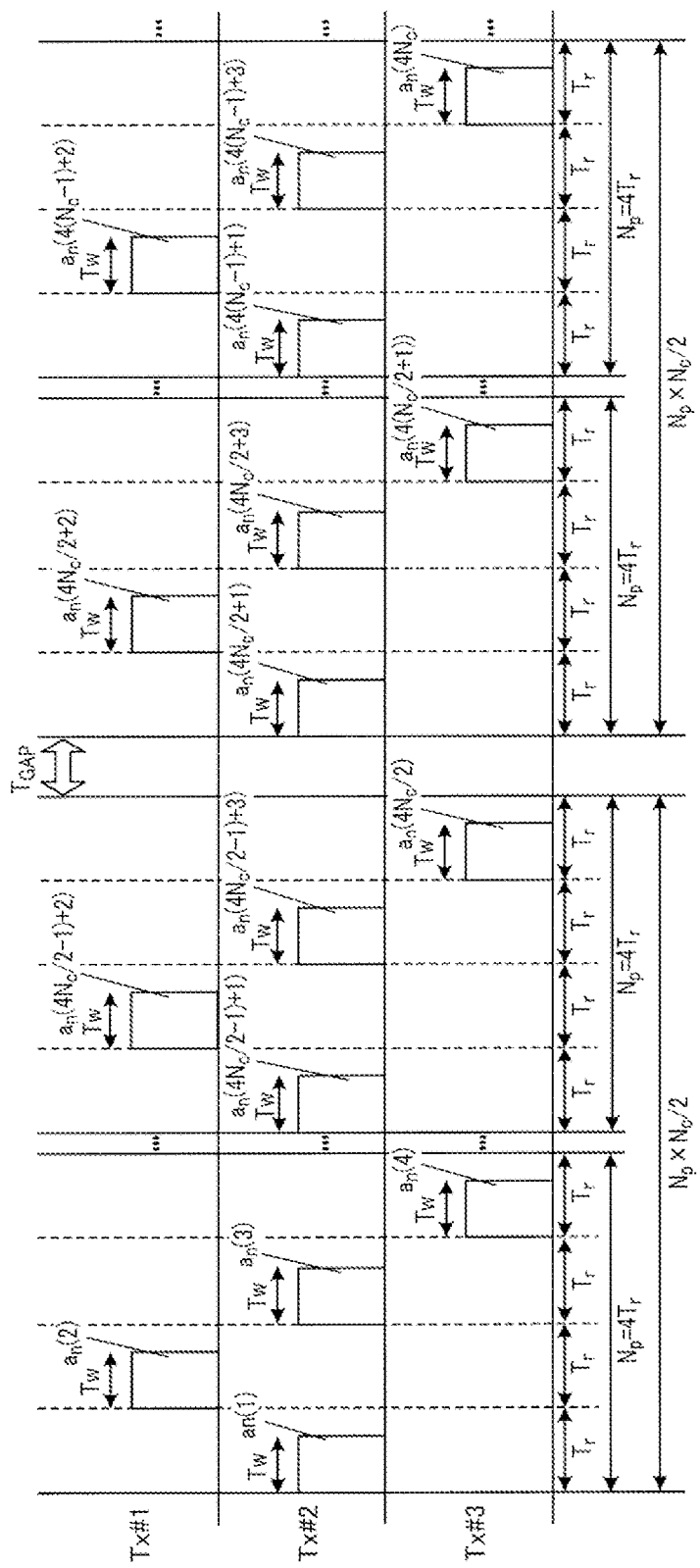
FIG. 17 is a diagram for describing timings at which transmission RF sections #1 to #3 according to Embodiment 5 output transmission signals in a case where the number $N_t$ of transmission antennae is three.

FIG. 17 is a diagram for describing timings at which transmission RF sections 107 #1 to 107 #3 transmit transmission signals in a case where the number $N_t$ of transmission antennae is three. FIG. 17 illustrates an example in which transmission RF section 107 #2 is a short-cycle transmission RF section.

In this case, switching controller 105 selects transmission RF section 107 #2 as an output destination of a transmission signal in each cycle of $2T_r$. In the period of $T_r$ in which transmission RF section 107 #2 does not output a transmission signal, switching controller 105 sequentially selects transmission RF sections 107 #1 and 107 #3 as output destinations of a transmission signal. In other words, switching controller 105 selects transmission RF sections 107 #1 and 107 #3 as output destinations of a transmission signal in each cycle of $N_p=4T_r=2(N_t-1)T_r$.

Here, as illustrated in FIG. 17, switching controller 105 repeats the processes for one set in the period of $N_p=4T_r=2(N_t-1)T_r$ $N_c/2$ times, and provides transmission gap period $T_{GAP}$ in which a transmission signal is not output. After transmission gap period $T_{GAP}$ elapses, switching controller 105 repeats again the processes for one set in the period of $N_P=4T_r=2(N_t-1)T_r$. $N_c/2$ times. Through the processes, transmission RF section 107 #2 that is a short-cycle transmission RF section transmits a transmission signal $(N_t-1)N_c$ times. Each of transmission RF sections 107 #1 and 107 #3 except transmission RF section 107 #2 transmits a transmission signal $N_c$ times.

Transmission gap period $T_{GAP}$ may be set to ½ of transmission cycle $2T_r$ in transmission RF section 107 #2 (short-cycle transmission RF section). In other words, transmission gap period $T_{GAP}$ may be $T_r$.

A time point at which each transmission RF section 107 starts to transmit a transmission signal may not necessarily be synchronized with cycle $T_r$. For example, as illustrated in FIG. 6, transmission delays $\Delta_1, \Delta_2, \ldots,$ and $\Delta_{Nt}$ may be respectively provided for transmission start time points of respective transmission RF sections 107 #1 to 107 #$N_t$.

In radar receiver 200, output switch 211 of signal processor 207 of antenna system processor 201 #z selects (performs switching to) one Doppler analyzer 213 from among $N_t$ Doppler analyzers 213 #1 to 213 #$N_t$ on the basis of a switching control signal from switching controller 105 in each cycle of $T_r$. Output switch 211 outputs a correlation calculation result output from correlation calculator 210 in each cycle of $T_r$, to selected Doppler analyzer 213.

A switching control signal in M-th radar transmission cycle $T_r$ may be formed of $N_t$ bits $[bit_1(M), bit_2(M), \ldots,$ and $bitN_t(M)]$. In this case, in a switching control signal in M-th transmission cycle $T_r$, output switch 211 selects Doppler analyzer 213 #ND as an output destination in a case where the ND-th bit is 1, and does not select ND-th Doppler analyzer 213 #ND as an output destination in a case where the ND-th bit is 0. Here, ND is $1, \ldots,$ and $N_t$.

Regarding a switching control signal, in a case where the number $N_t$ of transmission antennae is three, a 3-bit switching control signal corresponding to the output pattern of a transmission signal illustrated in FIG. 17 is output to output switch 211. Next, a specific example thereof will be described.

First, switching controller 105 repeatedly outputs respective switching control signals indicated in the following (D1) in each cycle of $T_r$ in the period (first half period) of $N_pN_c/2$. Here, $N_p$ is $4T_r=2(N_t-1)T_r$.

$[bit_1(1),bit_2(1),bit_3(1)]=[0,1,0]$ $[bit_1(2),bit_2(2),bit_3(2)]=[1,0,0]$ $[bit_1(3),bit_2(3),bit_3(3)]=[0,1,0]$ $[bit_1(4),bit_2(4),bit_3(4)]=[0,0,1]$ (D1)

Switching controller 105 outputs a switching control signal of which all bits are zeros indicated the following (D2) in transmission gap period $T_{GAP}$ after the first half period.

$[bit_1,bit_2,bit_3]=[0,0,0]$ (D2)

Switching controller 105 repeatedly outputs respective switching control signals indicated in the following (D3) in each cycle of $T_r$ in the period (second half period) of $N_pN_c/2$ after transmission gap period $T_{GAP}$ ends.

$[bit_1(2(N_t-1)N_c/2+1),bit_2(2(N_t-1)N_c/2+1),bit_3(2(N_t-1)N_c/2+1)]=[0,1,0]$ $[bit_1(2(N_t-1)N_c/2+2),bit_2(2(N_t-1)N_c/2+2),bit_3(2(N_t-1)N_c/2+2)]=[1,0,0]$ $[bit_1(2(N_t-1)N_c/2+3),bit_2(2(N_t-1)N_c/2+3),bit_3(2(N_t-1)N_c/2+3)]=[0,1,0]$ $[bit_1(2(N_t-1)(N_c/2+1)),bit_2(2(N_t-1)(N_c/2+1)),bit_3(2(N_t-1)(N_c/2+1))]=[0,0,1]$ $[bit_1(2(N_t-1)(N_c-1)+1),bit_2(2(N_t-1)(N_c-1)+1),bit_3(2(N_t-1)(N_c-1)+1)]=[0,1,0]$ $[bit_1(2(N_t-1)(N_c-1)+2),bit_2(2(N_t-1)(N_c-1)+2),bit_3(2(N_t-1)(N_c-1)+2)]=[1,0,0]$ $[bit_1(2(N_t-1)(N_c-1)+3),bit_2(2(N_t-1)(N_c-1)+3),bit_3(2(N_t-1)(N_c-1)+3)]=[0,1,0]$ $[bit_1(2(N_t-1)N_c),bit_2(2(N_t-1)N_c),bit_3(2(N_t-1)N_c)]=[0,0,1]$ (D3)

Signal processor 207 of antenna system processor 201 #z includes Doppler analyzers 213 #1 to 213 #$N_t$. With respect to correlation calculation results output from output switch 211, doppler analyzer 213 separately performs Doppler analysis on correlation calculation results corresponding to $N_c/2$ times (first half period) before transmission gap period $T_{GAP}$ starts and correlation calculation results corresponding to $N_c/2$ times (second half period) after transmission gap period $T_{GAP}$ ends at each discrete time k. In a case where $N_c$ is a power of 2, an FFT process as represented in, for example, expressions (30) to (34) may be applied.

$FT\_FH\_CI_z^{ND}(k,f_s,w)$ in expressions (30) and (31) is a w-th output from Doppler analyzer 213 #ND of signal processor 207 of antenna system processor 201 #z, and indicates a Doppler frequency response corresponding to $N_c/2$ times (first half period) of Doppler frequency index $f_s$ at discrete time k.

$FT\_SH\_CI_z^{ND}(k,f_s,w)$ in expressions (32) and (33) is a w-th output from Doppler analyzer 213 #ND of signal processor 207 of antenna system processor 201 #z, and indicates a Doppler frequency response corresponding to $N_c/2$ times (second half period) of Doppler frequency index $f_s$ at discrete time k. ND is 1 to $N_t$, k is $1, \ldots,$ and $(N_r+N_u)N_s/N_c$, and z is $1, \ldots,$ and $N_a$. In addition, w is a natural number.

Hereinafter, a specific example will be described by using second transmission RF section 107 #2 as short-cycle transmission RF section 107 with each cycle of $2T_r$.

In a case where ND is 2 (short-cycle received signal), in $FT\_FH\_CI_z^{ND}(c,f_s,w)$, an FFT size is $(N_t-1)N_c$, and $(N_t-1)N_c/2$ pieces of data of the second half portion are set to zero. In a case where ND is 2, in $FT\_SH\_CI_z^{ND}(k,f_s,w)$, an FFT size is $(N_t-1)N_c$, and $(N_t-1)N_c/2$ pieces of data of the first half portion are set to zero. The maximum Doppler frequency not causing aliasing, derived from the sampling theorem, is $\pm 1/(4T_r)$ in both of the cases. In both of the cases, Doppler frequency interval of Doppler frequency index $f_s$ is $1/\{2(N_t-1)N_cT_r\}$, and a range of Doppler frequency index $f_s$ is $f_s=-(N_t-1)N_c/2+1, \ldots, 0, \ldots,$ and $(N_t-1)N_c/2$.

In a case where ND is not 2 (not short-cycle received signal), in $FT\_FH\_CI_z^{ND}(k,f_s,w)$, an FFT size is $N_c$, and $N_c/2$ pieces of data of the second half portion are set to zero. In a case where ND is not 2, in $FT\_SH\_CI_z^{ND}(k,f_s,w)$, an FFT size is $N_c/2$, and $(N_t-1)N_c/2$ pieces of data of the first half portion are set to zero. The maximum Doppler frequency not causing aliasing, derived from the sampling theorem, is $\pm 1/(4(N_t-1)T_r)$ in both of the cases. In both of the cases, Doppler frequency interval of Doppler frequency index $f_s$ is $1/\{2(N_t-1)N_cT_r\}$, and a range of Doppler frequency index $f_u$ is $f_u=-N_c/2+1, \ldots, 0, \ldots,$ and $N_c/2$.

When outputs from Doppler analyzer 213 in cases where ND is 2 and ND is not 2 are compared with each other, Doppler frequency intervals of both thereof are the same as each other. The maximum Doppler frequency at which aliasing is not generated in a case where ND is 2 is $\pm(N_t-1)$ times the maximum Doppler frequency in a case where ND is not 2, and thus a Doppler frequency range is increased by $(N_t-1)$ times and is output.

Therefore, the maximum Doppler frequency at which aliasing is not generated at ND=2 is increased by $N_t/2$ times in a case where the number $N_t$ of transmission antennae is three or more, according to the configuration of the present embodiment, compared with a case where a transmission antenna is sequentially switched to Tx #1, Tx #2, . . . , and Tx #$N_t$. In other words, a Doppler frequency range in which aliasing is not generated is increased in proportion to the number $N_t$ of transmission antennae.

Expressions (30) and (31) are applied to a Doppler frequency response corresponding to $N_c/2$ times before transmission gap period $T_{GAP}$ starts (first half period).

In case of ND=2 (short-cycle received signal):

(Expression 30)

$$FT\_FH\_CI_z^{ND}(k, f_s, w) = \sum_{q=0}^{2(N_t-1)N_c/2-1} bit_{N_D}(q+1)$$

$$AC_z(k, 2(N_t-1)N_c(w-1)+q+1)\exp\left[-j\frac{2\pi\left\lfloor\frac{q}{2}\right\rfloor f_s}{(N_t-1)N_c}\right]$$

In case of ND≈2 (not short-cycle received signal):

(Expression 31)

$$FT\_FH\_CI_z^{ND}(k, f_s, w) = \sum_{q=0}^{2(N_t-1)N_c/2-1} bit_{N_D}(q+1)$$

$$AC_z(k, 2(N_t-1)N_c(w-1)+q+1)\exp\left[-j\frac{2\pi\left\lfloor\frac{q}{2(N_t-1)}\right\rfloor f_u}{N_c}\right]$$

Expressions (32) and (33) are applied to a Doppler frequency response corresponding to $N_c/2$ times after transmission gap period $T_{GAP}$ ends (second half period).

In case of ND=2 (short-cycle received signal):

(Expression 32)

$$FT\_SH\_CI_z^{ND}(k, f_s, w) = \sum_{q=2(N_t-1)N_c/2}^{2(N_t-1)N_c-1} bit_{ND}(q+1)$$

$$AC_z(k, 2(N_t-1)N_c(w-1)+q+1)\exp\left[-j\frac{2\pi\left\lfloor\frac{q}{2}\right\rfloor f_s}{(N_t-1)N_c}\right]$$

In case of ND≈2 (not short-cycle received signal):

(Expression 33)

$$FT\_SH\_CI_z^{ND}(k, f_u, w) = \sum_{q=2(N_t-1)N_c/2}^{2(N_t-1)N_c-1} bit_{ND}(q+1)$$

$$AC_z(k, 2(N_t-1)N_c(w-1)+q+1)\exp\left[-j\frac{2\pi\left\lfloor\frac{q}{2(N_t-1)}\right\rfloor f_u}{N_c}\right]$$

In a case where ND is not 2, when there is no output from output switch 211, an FFT size may be set to $(N_t-1)N_c$, and sampling may be performed by virtually setting an output as zero according to expressions (34) and (35). Expression (34) is the same as expression (30), and expression (35) is the same as expression (32). Consequently, an FFT size is increased, and thus a processing amount is increased, but a Doppler frequency index is the same as that in a case where ND is 2. Therefore, a conversion process of a Doppler frequency index which will be described later is not necessary.

(Expression 34)

$$FT\_FH\_CI_z^{ND}(k, f_s, w) = \sum_{q=0}^{2(N_t-1)N_c/2-1} bit_{N_D}(q+1)$$

$$AC_z(k, 2(N_t-1)N_c(w-1)+q+1)\exp\left[-j\frac{2\pi\left\lfloor\frac{q}{2}\right\rfloor f_s}{(N_t-1)N_c}\right]$$

(Expression 35)

$$FT\_SH\_CI_z^{ND}(k, f_s, w) = \sum_{q=2(N_t-1)N_c/2}^{2(N_t-1)N_c-1} bit_{ND}(q+1)$$

$$AC_z(k, 2(N_t-1)N_c(w-1)+q+1)\exp\left[-j\frac{2\pi\left\lfloor\frac{q}{2}\right\rfloor f_s}{(N_t-1)N_c}\right]$$

During the FFT process, a window function coefficient such as a Hann window or a Hamming window may be multiplied. A window function is used, and thus it is possible to suppress side lobes generated around a beat frequency peak. In a case where ND is 2, a window function coefficient having $(N_t-1)N_c$ as an FFT size is used, among $(N_t-1)N_c$ window function coefficients, $(N_t-1)N_c/2$ window function coefficients in the first half period are used to calculate $FT\_FH\_CI_z^{ND}(k,f_s,w)$, and $(N_t-1)N_c/2$ window function coefficients in the second half period are used to calculate $FT\_SH\_CI_z^{ND}(k,f_s,w)$.

In a case where ND is not 2, a window function coefficient having $N_c$ as an FFT size is used, among $N_c$ window function coefficients, $N_c/2$ window function coefficients in the first half period are used to calculate $FT\_FH\_CI_z^{ND}(k, f_s,w)$, and $N_c/2$ window function coefficients in the second half period are used to calculate $FT\_SH\_CI_z^{ND}(k,f_s,w)$.

CFAR section 215 adaptively sets (adjusts) a threshold value, and performs a peak signal detection process (CFAR process), by using a short-cycle received signal. In the present embodiment, transmission RF section 107 #2 transmits a transmission signal in each cycle of $2T_r$. Therefore, CFAR section 215 performs a CFAR process by using $FT\_FH\_CI_1^{(2)}(k,f_s,w)$, . . . , and $FT\_FH\_CIN_a^{(2)}(k,f_s,w)$, and $FT\_SH\_CI_1^{(2)}(k,f_s,w)$, . . . , and $FT\_SH\_CIN_a^{(2)}(k,f_s,w)$ that are w-th outputs from Doppler analyzers 213 #2.

CFAR section 215 sets an adaptive threshold value through the CFAR process, and outputs discrete time index $k_{\_cfar}$ and Doppler frequency index $f_{s\_cfar}$ at ND=2 causing reception power more than the threshold value, to aliasing determiner 216.

Aliasing determiner 216 determines whether or not the outputs from Doppler analyzers 213 #2 include an aliasing signal on the basis of discrete time index $k_{\_cfar}$ and Doppler frequency index $f_{s\_cfar}$ output from CFAR section 215. In a case of the present embodiment, aliasing determiner 216 applies expressions (36) and (37) to the outputs from Doppler analyzers 213 #2, and thus determines whether or not an aliasing signal is included therein. ND is a number of short-cycle transmission antenna Tx, and ND is 2 in the present embodiment.

In a case where the following expression is established, it is determined that an aliasing signal is not included.

$$\sum_{z=1}^{Na} \left| FT\_CAL_z^{ND}(k_{\_cfar}, f_{s\_char}, w) \right|^2 > \sum_{z=1}^{Na} \left| FT\_ALIAS_z^{ND}(k_{\_cfar}, f_{s\_char}, w) \right|^2 \quad \text{(Expression 36)}$$

In a case where the following expression is established, it is determined that an aliasing signal is included.

$$\sum_{z=1}^{Na} \left| FT\_CAL_z^{ND}(k_{\_cfar}, f_{s\_char}, w) \right| < \sum_{z=1}^{Na} \left| FT\_ALIAS_z^{ND}(k_{\_cfar}, f_{s\_char}, w) \right|^2 \quad \text{(Expression 37)}$$

In expressions (36) and (37), the following expressions are given.

$$FT\_CAL_z^{ND}(k_{\_cfar}, f_{s\_char}, w) = \quad \text{(Expression 38)}$$
$$FT\_FH\_CI_z^{ND}(k_{\_cfar}, f_{s\_char}, w) +$$
$$\exp\left(-j\frac{2\pi f_{s\_cfar}}{(Nt-1)Nc}\frac{1}{2}\right)FT\_SH\_CI_z^{ND}(k_{\_cfar}, f_{s\_char}, w)$$

$$FT\_ALIAS_z^{ND}(k_{\_cfar}, f_{s\_char}, w) = \quad \text{(Expression 39)}$$
$$FT\_FH\_CI_z^{ND}(k_{\_cfar}, f_{s\_char}, w) -$$
$$\exp\left(-j\frac{2\pi f_{s\_cfar}}{(Nt-1)Nc}\frac{1}{2}\right)FT\_SH\_CI_z^{ND}(k_{\_cfar}, f_{s\_char}, w)$$

Here, $FT\_CAL_z^{ND}(k, f_s, w)$ in expression (38) is an expression used for in-phase addition of $FT\_FH\_CI_z^{ND}(k, f_s, w)$ and $FT\_SH\_CI_z^{ND}(k, f_s, w)$ assuming that Doppler frequency index $f_{s\_cfar}$ does not include an aliasing signal. In expression (38), a signal of Doppler frequency index $f_{s\_cfar}$ causes a phase change (phase rotation) during transmission gap period $T_{GAP}$, and thus the term of expression (38a) is introduced to correct the phase rotation. Here, transmission gap period $T_{GAP}$ is set to ½ of the transmission cycle $2T_r$ in transmission RF section 107 #2 (short-cycle transmission RF section), that is, transmission gap period $T_{GAP}$ is set to $T_r$, and thus a phase rotation corresponding to a half (½) of a phase change (phase rotation) in a sampling cycle period of the Doppler frequency index ($f_{s\_cfar}$) is corrected.

$$\exp\left(-j\frac{2\pi f_{s\_cfar}}{(Nt-1)Nc}\frac{1}{2}\right) \quad \text{(Expression 38a)}$$

On the other hand, $FT\_ALIAS_z^{ND}(k, f_s, w)$ in expression (39) is an expression used for in-phase addition of $FT\_FH\_CI_z^{ND}(k, f_s, w)$ and $FT\_SH\_CI_z^{ND}(k, f_s, w)$ assuming that a signal of Doppler frequency index $f_{s\_cfar}$ includes a (primary) aliasing signal. In a case where a signal of Doppler frequency index $f_{s\_cfar}$ includes a (primary) aliasing signal, a phase change (phase rotation) corresponding to a Doppler frequency index of $(f_{s\_cfar}(N_r-1)N_c)$ occurs during transmission gap period $T_{GAP}$ at Doppler frequency index $f_{s\_cfar} \geq 0$. A phase change (phase rotation) corresponding to a Doppler frequency index of $(f_{s\_cfar}+(N_r-1)N_c)$ occurs during transmission gap period $T_{GAP}$ at Doppler frequency index $f_{s\_cfar} < 0$. Therefore, in expression (39), the following expression (39a) obtained by inverting the phase in expression (38a) is introduced to correct the phase rotation. Expression (39a) is obtained by assigning $(f_{s\_cfar}+(N_r-1)N_c)$ to $f_{s\_cfar}$ in expression (38a), and is thus obtained by inverting the phase in expression (38a). Therefore, one of $FT\_CAL_z^{ND}(k, f_s, w)$ and $FT\_ALIAS_z^{ND}(k, f_s, w)$ is subjected to in-phase addition, and the other thereof is subjected to anti-phase addition. Therefore, a signal level difference is clarified, and thus it is possible to determine the presence or absence of an aliasing signal even in a case where an SNR of a received signal is low.

$$-\exp\left(-j\frac{2\pi f_{s\_cfar}}{(Nt-1)Nc}\frac{1}{2}\right) \quad \text{(Expression 39a)}$$

In other words, from the above description, in a case where a signal of Doppler frequency index $f_{s\_cfar}$ includes an aliasing signal, $FT\_CAL_z^{ND}(k, f_s, w)$ has power lower than power of $FT\_ALIAS_z^{ND}(k, f_s, w)$. On the other hand, in a case where a signal of Doppler frequency index $f_{s\_cfar}$ does not include an aliasing signal, $FT\_ALIAS_z^{ND}(k, f_s, w)$ has power lower than power of $FT\_CAL_z^{ND}(k, f_s, w)$. For the reason, a determination method using Expressions (36) and (37) can be used.

Aliasing determiner 216 outputs, to direction estimator 214 along with discrete time index $k_{\_cfar}$, a Doppler frequency index after conversion as follows with respect to a signal of Doppler frequency index $f_s\_car$ determined as including a (primary) aliasing signal.

In a case of Doppler frequency index $f_{s\_cfar} \geq 0$, conversion into $DopConv(f_{s\_cfar})=f_{s\_cfar}-(N_r-1)N_c$ is performed, and the resultant is output.

In a case of Doppler frequency index $f_{s\_cfar} \leq 0$, conversion into $DopConv(f_{s\_cfar})=f_{s\_cfar}+(N_r-1)N_c$ is performed, and the resultant is output.

Aliasing determiner 216 outputs, to direction estimator 214 along with discrete time index $k_{\_cfar}$, a Doppler frequency index without conversion as follows with respect to a signal of Doppler frequency index $f_{s\_cfar}$ determined as not including an aliasing signal.

$$DopConv(f_{s\_cfar})=f_{s\_cfar}$$

Aliasing determiner 216 performs index conversion by using the following expressions (40) and (41), in order to make $DopConv(f_{s\_cfar})$ that is a conversion result of wide-range Doppler frequency index $f_{s\_cfar}$ at ND=2 correspond to narrow-range Doppler frequency index $f_u$ of w-th outputs from respective Doppler analyzers 213 #1, 213 #3, ..., and 213 #$N_t$ except Doppler analyzers 213 #2. Aliasing determiner 216 outputs narrow-range Doppler frequency index $f_{u\_cfar}$ subjected to the index conversion to direction estimator 214.

In case of $f_{s\_cfar} \geq 0$:

$$f_{u\_cfar} = DopConv(f_{s\_cfar}) + \left\lfloor \frac{-DopConv(f_{s\_cfar}) - N_c/2 + 1}{N_c} \right\rfloor \times N_c \quad \text{(Expression 40)}$$

In case of $f_{s\_cfar} < 0$:

$$f_{u\_cfar} = DopConv(f_{s\_cfar}) + \left\lfloor \frac{DopConv(f_{s\_cfar}) - N_c/2 + 1}{N_c} \right\rfloor \times N_c \quad \text{(Expression 41)}$$

Direction estimator 214 generates virtual reception array correlation vector $h(k, f_s, w)$ represented in expression (42) by using outputs from Doppler analyzers 213 on the basis of discrete time index $k_{\_cfar}$, Doppler frequency index $f_{s\_cfar}$, Doppler frequency index $DopConv(f_{s\_cfar})$, and Doppler frequency index $f_{u\_cfar}$ output from aliasing determiner 216, and performs a direction estimation process.

Hereinafter, a sum of the w-th outputs from Doppler analyzers 213 #1 to 213 #$N_t$ obtained through identical processes in respective signal processors 207 of antenna system processors 201 #1 to 201 #$N_a$ is represented by virtual reception array correlation vector $h(k_{\_cfar}, f_{s\_cfar}, w)$ including $N_t N_a$ elements corresponding to a product of the number $N_t$ of transmission antennae and the number $N_a$ of reception antennae, as represented in expression (42). Virtual reception array correlation vector $h(k_{\_cfar}, f_{s\_cfar}, w)$ is used for a process of performing direction estimation based on a phase difference between respective reception antennae Rx on received signals from a target. Here, z is 1, . . . , and $N_a$, and ND is 1, . . . , and $N_t$.

$$FT\_CI_z^{ND}(k_{\_cfar}, f_{s\_char}, w) = FT\_FH\_CI_z^{ND}(k_{\_cfar}, f_{s\_char}, w) + \exp\left(-j\frac{2\pi DopConv(f_{s\_cfar})}{N_c}\frac{1}{2}\right) \quad \text{(Expression 43)}$$

$$FT\_SH\_CI_z^{ND}(k_{\_cfar}, f_{s\_cfar}, w)$$

Here, $h_{cal[b]}$ is an array correction value for correcting a phase deviation and an amplitude deviation between the transmission antennae and between the reception antennae. In addition, b is 1, . . . , and $N_t N_a$.

Switching among transmission antennae Tx is performed in a time division manner, and thus different phase rotations occur at different Doppler frequencies f. $TxCAL^{(1)}(f)$, . . . , and $TxCAL^{(N_t)}(f)$ are transmission phase correction coefficients for correcting the phase rotations to match a phase of a reference transmission antenna. For example, in a case where transmission antenna Tx #2 is used as a reference transmission antenna, the transmission phase correction coefficients are represented by expression (44).

$$TxCAL^{(1)}(f) = \exp\left(-j\frac{2\pi f}{Nc}\frac{1}{2(Nt-1)}\right), \quad \text{(Expression 44)}$$

$$TxCAL^{(2)}(f) = 1,$$

$$TxCAL^{(3)}(f) = \exp\left(-j\frac{2\pi f}{Nc}\frac{3}{2(Nt-1)}\right),$$

$$TxCAL^{(Nt)}(f) = \exp\left(-j\frac{2\pi f}{Nc}\frac{2Nt-1}{2(Nt-1)}\right).$$

In this case, virtual reception array correlation vector $h(k_{\_cfar}, f_{s\_cfar}, w)$ in expression (42) is a column formed of $N_a N_t$ elements.

In radar apparatus 1 according to Embodiment 4, among transmission antennae Tx #1 to Tx #$N_t$, a transmission cycle of a transmission signal from transmission antenna (short-cycle transmission antenna) Tx #2 is $2T_r$, and a transmission cycle of a transmission signal from each of transmission antennae Tx #1, Tx #3, . . . , and Tx #$N_t$ except transmission antenna Tx #2 is $2(N_t-1)T_r$. Consequently, compared with a case where transmission signals are transmitted through $$h(k_{\_cfar}, f_{s\_cfar}, w) = \begin{bmatrix} h_{cal[1]}FT\_CI_1^{(1)}(k_{\_cfar}, f_{u\_cfar}, w)TxCAL^{(1)}(DopConv(f_{s\_cfar})) \\ h_{cal[2]}FT\_CI_2^{(1)}(k_{\_cfar}, f_{u\_cfar}, w)TxCAL^{(1)}(DopConv(f_{s\_cfar})) \\ \vdots \\ h_{cal[Na]}FT\_CI_{Na}^{(1)}(k_{\_cfar}, f_{u\_cfar}, w)TxCAL^{(1)}(DopConv(f_{s\_cfar})) \\ h_{cal[Na+1]}FT\_CI_1^{(2)}(k_{\_cfar}, f_{s\_cfar}, w)TxCAL^{(2)}(DopConv(f_{s\_cfar})) \\ h_{cal[Na+2]}FT\_CI_2^{(2)}(k_{\_cfar}, f_{s\_cfar}, w)TxCAL^{(2)}(DopConv(f_{s\_cfar})) \\ \vdots \\ h_{cal[2Na]}FT\_CI_{Na}^{(2)}(k_{\_cfar}, f_{s\_cfar}, w)TxCAL^{(2)}(DopConv(f_{s\_cfar})) \\ \vdots \\ h_{cal[Na(Nt-1)+1]}FT\_CI_1^{(Nt)}(k_{\_cfar}, f_{u\_cfar}, w)TxCAL^{(Nt)}(DopConv(f_{s\_cfar})) \\ h_{cal[Na(Nt-1)+2]}FT\_CI_2^{(Nt)}(k_{\_cfar}, f_{u\_cfar}, w)TxCAL^{(Nt)}(DopConv(f_{s\_cfar})) \\ \vdots \\ h_{cal[NaNt]}FT\_CI_{Na}^{(Nt)}(k_{\_cfar}, f_{u\_cfar}, w)TxCAL^{(Nt)}(DopConv(f_{s\_cfar})) \end{bmatrix} \quad \text{(Expression 42)}$$

sequential switching among transmission antennae Tx #1 to Tx #$N_t$, in a short-cycle received signal corresponding to a short-cycle transmission signal, the maximum Doppler frequency (relative speed) at which aliasing is not generated is increased by $N_t/2$ times and thus a Doppler frequency range in which aliasing is not generated is increased by $N_t/2$ times (effect E1).

Radar apparatus 1 according to Embodiment 4, a transmission signal is transmitted $N_c$ times from each of transmission antennae Tx #1, Tx #3, . . . , and Tx #$N_t$. In this case, radar apparatus 1 transmits a transmission signal from each of transmission antennae Tx #1, Tx #3, . . . , and Tx #$N_t$ $N_c/2$ times, and then provides transmission gap period $T_{GAP}$. In radar apparatus 1, aliasing determiner 216 determines whether or not a Doppler analysis result from Doppler analyzer 213 #2 includes an aliasing signal on the basis of a phase rotation occurring during transmission gap period $T_{GAP}$. Consequently, a Doppler frequency range in which there is no ambiguity can be increased by twice compared with a case where transmission gap period $T_{GAP}$ is not provided (effect E2).

Therefore, radar apparatus 1 according to Embodiment 4 can increase a Doppler frequency range by $N_t$ times (=$N_t/2 \times 2$) due to two effects E1 and E2 compared with a case of sequential switching among transmission antennae Tx #1 to Tx #$N_t$.

In a case where transmission gap period $T_{GAP}$ is set to $T_r$, determination performance (accuracy) of whether or not an aliasing signal is included is highest. However, transmission gap period $T_{GAP}$ is not limited thereto, and may be set to about $T_r$ or a period before or after $T_r$.

In a case where a transmission signal is transmitted $N_c$ times from each of transmission antennae Tx #1, Tx #3, . . . , and Tx #$N_t$, a transmission signal is transmitted $N_c/2$ times from each of transmission antennae Tx #1, Tx #3, . . . , and Tx #$N_t$, and then transmission gap period $T_{GAP}$ is provided. Therefore, determination performance (accuracy) of whether or not an aliasing signal is included is highest. However, a timing at which transmission gap period $T_{GAP}$ is provided is not limited thereto, and may be provided after a transmission signal is transmitted about $N_c/2$ times, or may be provided after a transmission signal is transmitted below or over $N_c/2$ times.

Embodiment 5

In Embodiment 3, a description has been made of an example in which single transmission gap period $T_{GAP}$ is provided. In Embodiment 5, a description will be made of an example in which $N_{GAP}$ transmission gap periods $T_{GAP}$ are provided. A configuration of radar apparatus 1 is the same as the configuration illustrated in FIG. 14 in Embodiment 3. Some operations are different, and, hereinafter, different operations will be focused.

Transmission RF switch 106 outputs an output from radar transmission signal generator 101 to transmission RF section 107 that is a switched destination for which an instruction is given, on the basis of a switching control signal output from switching controller 105.

Switching controller 105 sequentially selects one from among transmission RF sections 107 #1 to #$N_t$ in each transmission cycle $T_r$. Switching controller 105 outputs a switching control signal for an instruction for switching an output destination to selected transmission RF section 107, to transmission RF switch 106. Consequently, transmission RF switch 106 sequentially selects each of transmission RF sections 107 #1 to #$N_t$ as an output destination in cycle $N_t T_r$. In other words, each transmission RF section 107 transmits a transmission signal in cycle $N_t T_r$.

Switching controller 105 repeats a process in the period of $N_p = N_t T_r N_c/(N_{GAP}+1)$ times. Thereafter, switching controller 105 provides first transmission gap period $T_{GAP}$#1.

After transmission gap period $T_{GAP}$#1 elapses, switching controller 105 repeats a process in the period of $N_p = N_t T_r$ $N_c/(N_{GAP}+1)$ times again. Thereafter, switching controller 105 provides second transmission gap period $T_{GAP}$ #2.

After transmission gap period $T_{GAP}$#2 elapses, switching controller 105 repeats a process in the period of $N_p = N_t T_r$ $N_c/(N_{GAP}+1)$ times again.

According to the process, $N_{GAP}$ transmission gap periods $T_{GAP}$ are provided, and each of transmission RF sections 107 #1 to #$N_t$ transmits a transmission signal $N_c$ times.

In a case where $N_c/(N_{GAP}+1)$ is not an integer, a $N_c/(N_{GAP}+1)$ may become integer by rounding down or up value after the decimal point.

Transmission gap period $T_{GAP}$ may be 1/($N_{GAP}$+1) times as long as sampling cycle (a cycle of selecting transmission RF sections 107 #1 to #$N_t$ by one round) $N_p = N_t T_r$. In other words, transmission gap period $T_{GAP}$ may be $N_p/(N_{GAP}+1)$ =$N_t T_r/(N_{GAP}+1)$.

Output switch 211 sequentially selects Doppler analyzers 213 #1 to 213 #$N_t$ in each transmission cycle $T_r$, on the basis of a switching control signal output from switching controller 105. Output switch 211 outputs a correlation calculation result output from correlation calculator 210 to selected Doppler analyzer 213 in each transmission cycle $T_r$.

A switching control signal in M-th radar transmission cycle $T_r$ may be formed of $N_t$ bits [$bit_1(M), bit_2(M), \ldots,$ and $bitN_t(M)$]. In this case, in M-th transmission cycle $T_r$, output switch 211 selects Doppler analyzer 213 #ND as an output destination in a case where the ND-th bit of the switching control signal is 1, and does not select (non-selects) Doppler analyzer 213 #ND as an output destination in a case where the ND-th bit of the switching control signal is 0. Here, ND is 1, . . . , and $N_t$.

Switching controller 105 outputs one set (corresponding to the period of $N_p = N_t T_r$) of switching control signals indicated in the following (F1) $N_c/(N_{GAP}+1)$ times before transmission gap period $T_{GAP}$ #1 starts.

[$bit_1(1),bit_2(1), \ldots ,bitN_t(1)$]=[1,0, . . . ,0]

[$bit_1(2),bit_2(2), \ldots ,bitN_t(2)$]=[0,1, . . . ,0]

[$bit_1(N_t),bit_2(N_t), \ldots ,bitN_t(N_t)$]=[0,0, . . . ,1]   (F1)

Switching controller 105 outputs one set of the switching control signals indicated in (F1) $N_c/(N_{GAP}+1)$ times, and then outputs a switching control signal of which all bits are zeros indicated the following (F2) in transmission gap period $T_{GAP}$ #1.

[$bit_1, bit_2, \ldots , bitN_t$]=[0,0, . . . ,0]   (F2)

After transmission gap period $T_{GAP}$ #1 ends and before transmission gap period $T_{GAP}$#2 starts, switching controller 105 outputs one set (corresponding to the period of $N_p = N_t T_r$) of switching control signals indicated in the following (F3) $N_c/(N_{GAP}+1)$ times.

[$bit_1(N_t N_c/(N_{GAP}+1)+1),bit_2(N_t N_c/(N_{GAP}+1)+ 1), \ldots ,bitN_t(N_t N_c/(N_{GAP}+)+1)$]=[1,0, . . . ,0]

[$bit_1(N_t N_c/(N_{GAP}+1)+2),bit_2(N_t N_c/(N_{GAP}+1)+ 2)], \ldots ,bitN_t(N_t N_c/(N_{GAP}+1)+2)$[0,1, . . . 0]

[$bit_1(2N_t N_c/(N_{GAP}+1)),bit_2(2N_t N_c/(N_{GAP}+ 1)), \ldots ,bitN_t(2N_t N_c/(N_{GAP}+))$]=[0,0, . . . ,1]   (F3)

Switching controller 105 outputs one set of the switching control signals indicated in (F3) $N_c/(N_{GAP}+1)$ times, and then outputs a switching control signal of which all bits are zeros indicated the following (F4) in transmission gap period $T_{GAP}$ #2.

[$bit_1,bit_2, \ldots ,bitN_t$]=[0,0, . . . ,0]   (F4)

Switching controller 105 subsequently performs the same processes, and outputs one set (corresponding to the period of $N_p=N_tT_r$) of switching control signals indicated in the following (F5) $N_c/(N_{GAP}+1)$ times after transmission gap period $T_{GAP}$ #$N_{GAP}$ ends.

$$[bit_1(N_{GAP}N_tN_c/(N_{GAP}+1)+1), bit_2(N_{GAP}N_tN_c/(N_{GAP}+1)+1), \ldots, bitN_t(N_{GAP}N_tN_c/(N_{GAP}+1)+1)] = [1,0,\ldots,0]$$

$$[bit_1(N_{GAP}N_tN_c/(N_{GAP}+1)+2), bit_2(N_{GAP}N_tN_c/(N_{GAP}+1)+2), \ldots, bitN_t(N_{GAP}N_tN_c/(N_{GAP}+1)+2)] = [0,1,\ldots,0]$$

$$[bit_1(N_tN_c), bit_2(N_tN_c), \ldots, bitN_t(N_tN_c)] = [0,0,\ldots,1] \quad \text{(F5)}$$

Signal processor 207 of antenna system processor 201 #z includes Doppler analyzers 213 #1 to 213 #$N_t$. Each of Doppler analyzers 213 #1 to 213 #$N_t$ separately (that is, in ($N_{GAP}+1$) times) performs Doppler analysis on correlation calculation results corresponding to $N_c/(N_{GAP}+1)$ times before transmission gap period $T_{GAP}$ starts at each discrete time k. In a case where $N_c$ is a power of 2, an FFT process as represented in expression (45) may be applied.

FT_GAP_CI$_z^{ND}$(ng,k,$f_s$,w) in expression (45) is a w-th output from Doppler analyzer 213 #ND of signal processor 207 of antenna system processor 201 #z, and indicates Doppler frequency responses for correlation calculation results corresponding to $N_c/(N_{GAP}+1)$ times partitioned by transmission gap periods, of Doppler frequency index $f_s$ at discrete time k. Here, $n_g$ is 0, ..., and $N_{GAP}$, and, in a case of ng=0, FT_GAP_CI$_z^{ND}$(ng,k,$f_s$,w) indicates Doppler frequency responses for correlation calculation results corresponding to initial $N_c/(N_{GAP}+1)$ times. In a case of 0<ng<$N_{GAP}$, FT_GAP_CI$_z^{ND}$(ng,k,$f_s$,w) indicates Doppler frequency responses for correlation calculation results corresponding to initial $N_c/(N_{GAP}+1)$ times between ending of transmission gap period $T_{GAP}$ #ng and starting of transmission gap period $T_{GAP}$ #(ng+1). In a case of ng=$N_{GAP}$, FT_GAP_CI$_z^{ND}$(ng,k,$f_s$,w) indicates Doppler frequency responses for correlation calculation results corresponding to last $N_c/(N_{GAP}+1)$ times. ND is 1 to $N_t$, k is 1, ..., and ($N_t+N_u$)$N_s/N_c$, and z is 1, ..., and $N_a$. In addition, w is a natural number.

In FT_GAP_CI$_z^{ND}$(ng,k,$f_s$,w), an FFT size is $N_c$, and data other than correlation calculation outputs corresponding to $N_c/(N_{GAP}+1)$ is set to zero.

Therefore, the maximum Doppler frequency not causing aliasing, derived from the sampling theorem, is ±1/(2$N_tT_r$). A Doppler frequency interval of Doppler frequency index $f_s$ is 1/{$N_tN_cT_r$}, and a range of Doppler frequency index $f_s$ is $f_s=-N_c/2+1, \ldots, 0, \ldots,$ and $N_c/2$.

(Expression 45)

$$\text{FT\_GAP\_CI}_z^{ND}(n_g, k, f_s, w) = \sum_{q=n_g N_t N_c/(N_{GAP}+1)}^{(n_g+1)N_t N_c/(N_{GAP}+1)-1} bit_{ND}(q+1)$$

$$AC_z(k, N_pN_c(w-1)+q+1)\exp\left[-j\frac{2\pi\left\lfloor\frac{q}{N_t}\right\rfloor f_s}{N_c}\right]$$

During the FFT process, a window function coefficient such as a Hann window or a Hamming window may be multiplied. A window function is used, and thus it is possible to suppress side lobes generated around a beat frequency peak. For example, as represented in expression (46), a window function coefficient having $N_c$ as an FFT size is used. Here, winf(x) indicates a window function coefficient, and x indicates an index of a window function (where x=1, ..., and $N_c$).

(Expression 46)

$$\text{FT\_GAP\_CI}_z^{ND}(n_g, k, f_s, w) = \sum_{q=n_g N_t N_c/(N_{GAP}+1)}^{(n_g+1)N_t N_c/(N_{GAP}+1)-1} bit_{ND}(q+1)\text{winf}\left(\left\lfloor\frac{q}{N_t}\right\rfloor\right)$$

$$AC_z(k, N_pN_c(w-1)+q+1)\exp\left[-j\frac{2\pi\left\lfloor\frac{q}{N_t}\right\rfloor f_s}{N_c}\right]$$

CFAR section 215 performs a CFAR process on w-th outputs from Doppler analyzers 213 #1 to 213 #$N_t$ of antenna system processors 201 #1 to 201 #$N_a$ by using FT_GAP_CI$_z^{ND}$($n_g$,k,$f_s$,w). The CFAR process is performed on a two-dimensional input signal having discrete time k (corresponding to a distance to a target) and Doppler frequency index $f_s$ (corresponding to a relative speed of the target).

In the CFAR process, for example, as represented in expression (46a), power levels of w-th outputs FT_GAP_CI$_z^{ND}$(0,k,$f_s$,w), FT_GAP_CI$_z^{ND}$(1,k,$f_s$,w), ..., and FT_GAP_CI$_z^{ND}$($N_{GAP}$,k,$f_s$,w) from respective Doppler analyzers 213 #2 of antenna system processors 201 #1 to 201 #$N_a$ are added together. CFAR section 215 performs, for example, a CFAR process in which one-dimensional CFAR processes are combined with each other, or two-dimensional CFAR process on a power addition result. The process disclosed in NPL 2 may be applied to the CFAR process. Here, an axis of discrete time (corresponding to a distance to a target) and an axis of a Doppler frequency (corresponding to a relative speed of the target) may be used in the two-dimensional CFAR process.

(Expression 46a)

$$POWERFT^{ND}(k, f_s, w) = \sum_{z=1}^{N_a} \sum_{n_g=0}^{N_{GAP}} |\text{FT\_GAP\_CI}_z^{ND}(n_g, k, f_s, w)|^2$$

For example, CFAR section 215 may set an adaptive threshold value as disclosed in NPL 2. CFAR section 215 outputs discrete time index $k\_{cfar}$ and Doppler frequency index $f_{s\_cfar}$ at which the power addition result is more than a threshold value, to direction estimator 214 and aliasing determiner 216.

Aliasing determiner 216 determines whether or not an output from Doppler analyzer 213 includes an aliasing signal on the basis of discrete time index $k\_{cfar}$ and Doppler frequency index $f_{s\_cfar}$ output from CFAR section 215. For example, aliasing determiner 216 performs the determination according to expressions (47) and (48).

In a case where the following expression is not established, it is determined that a (primary) aliasing signal is not included.

$$\sum_{ND=1}^{Nt} \sum_{z=1}^{Na} |FT\_CAL_z^{ND}(k_{\_cfar}, f_{s\_char}, w)|^2 > \quad \text{(Expression 47)}$$

$$\sum_{ND=1}^{Nt} \sum_{z=1}^{Na} |FT\_ALIAS_z^{ND}(k_{\_cfar}, f_{s\_char}, w)|^2$$

In a case where the following expression is established, it is determined that a (primary) aliasing signal is included.

$$\sum_{ND=1}^{Nt} \sum_{z=1}^{Na} |FT\_CAL_z^{ND}(k_{\_cfar}, f_{s\_char}, w)|^2 < \quad \text{(Expression 48)}$$

$$\sum_{ND=1}^{Nt} \sum_{z=1}^{Na} |FT\_ALIAS_z^{ND}(k_{\_cfar}, f_{s\_char}, w)|^2$$

In expressions (47) and (48), the following expressions are given.

$$FT\_CAL_z^{ND}(k_{\_cfar}, f_{s\_char}, w) = \quad \text{(Expression 49)}$$

$$\sum_{n_g=0}^{N_{GAP}} \exp\left(-j\frac{2\pi f_{s\_cfar}}{Nc} \frac{n_g}{N_{GAP}+1}\right) FT\_GAP\_CI_z^{ND}(n_g, k_{\_cfar}, f_{s\_char}, w)$$

$$FT\_ALIAS_z^{ND}(k_{\_cfar}, f_{s\_char}, w) = \quad \text{(Expression 50)}$$

$$\sum_{n_g=0}^{N_{GAP}} \exp\left(-j\frac{2\pi f_{s\_cfar}}{Nc} \frac{n_g}{N_{GAP}+1}\right)$$

$$\exp\left(j2\pi \text{sign}(f_{s\_cfar}) \frac{n_g}{N_{GAP}+1}\right) FT\_GAP\_CI_z^{ND}(n_g, k_{\_cfar}, f_{s\_char}, w)$$

Here, sign(x) is a function that returns 1 in a case where x is positive, and returns −1 in a case where x is negative.

Here, $FT\_CAL_z^{ND}(k,f_s,w)$ in expression (49) is an expression used for in-phase addition of $FT\_GAP\_CI_z^{ND}(0,k,f_s,w)$, $FT\_GAP\_CI_z^{ND}(1,k,f_s,W)$, ..., and $FT\_GAP\_CI_z^{ND}(N_{GAP},k,f_s,W)$ assuming that Doppler frequency index $f_{s\_cfar}$ does not include an aliasing signal. In expression (49), a signal of Doppler frequency index $f_{s\_cfar}$ causes a phase change (phase rotation) during transmission gap period $T_{GAP}$, and thus the term of expression (49a) is introduced to correct the phase rotation. Here, transmission gap period $T_{GAP}$ is set to $T_{GAP}=N_p/(N_{GAP}+1)=N_rT_r/(N_{GAP}+1)$, and thus a phase rotation corresponding to $n_g/(N_{GAP}+1)$ of a phase change (phase rotation) in a sampling cycle period of the Doppler frequency index ($f_{s\_cfar}$) is corrected with respect to $FT\_GAP\_CI_z^{ND}(1,k,f_s,w)$.

$$\exp\left(-j\frac{2\pi f_{s\_cfar}}{Nc} \frac{n_g}{N_{GAP}+1}\right) \quad \text{(Expression 49a)}$$

On the other hand, $FT\_ALIAS_z^{ND}(k,f_s,w)$ in expression (50) is an expression used for in-phase addition of $FT\_GAP\_CI_z^{ND}(0,k,f_s,w)$, $FT\_GAP\_CI_z^{ND}(1,k,f_s,w)$, ..., and $FT\_GAP\_CI_z^{ND}(N_{GAP},k,f_s,w)$ assuming that a signal of Doppler frequency index $f_{s\_cfar}$ includes a (primary) aliasing signal. In a case where a signal of Doppler frequency index $f_{s\_cfar}$ includes a (primary) aliasing signal, a phase change (phase rotation) corresponding to a Doppler frequency index of $(f_{s\_cfar}-N_c)$ occurs during transmission gap period $T_{GAP}$ at Doppler frequency index $f_{s\_cfar}\geq 0$. A phase change (phase rotation) corresponding to a Doppler frequency index of $(f_{s\_cfar}+N_c)$ occurs during transmission gap period $T_{GAP}$ at Doppler frequency index $f_{s\_cfar}<0$. Therefore, in expression (50), the term of expression (50a) is introduced to correct the phase rotation. Expression (50a) is obtained by assigning $(f_{s\_cfar}-\text{sign}(f_{s\_cfar})N_c)$ to $f_{s\_cfar}$ in expression (49a), and is thus obtained by applying phase rotations $2\pi \times n_g/(N_{GAP}+1)$ to expression (49a). Here, phase rotations $2\pi \times n_g/(N_{GAP}+1)$ are $\{0, 2\pi/3, 4\pi/3\}$ at $N_{GAP}=2$. Phase rotations $2\pi \times n_g/(N_{GAP}+1)$ are $\{0, 2\pi/4, 4\pi/4, 6\pi/4\}$ at $N_{GAP}=3$. As mentioned above, in a case where phase rotations $2\pi \times n_g/(N_{GAP}+1)$ are added together at $n_g=0, \ldots,$ and $N_{GAP}$, phase rotations $2\pi \times n_g/(N_{GAP}+1)$ apply phase rotations that cancel out each other and thus become zero. Therefore, in a case where one of $FT\_CAL_z^{ND}(k,f_s,w)$ and $FT\_ALIAS_z^{ND}(k,f_s,w)$ is subjected to in-phase addition, and the other thereof is subjected to addition of $FT\_GAP\_CI_z^{ND}(n_g,k,f_s,w)$ of which respective terms are mutually canceled out. Therefore, a signal level difference is clarified, and thus it is possible to determine the presence or absence of an aliasing signal even in a case where an SNR of a received signal is low.

$$\exp\left(-j\frac{2\pi f_{s\_cfar}}{Nc} \frac{n_g}{N_{GAP}+1}\right) \exp\left(j2\pi \text{sign}(f_{s\_cfar}) \frac{n_g}{N_{GAP}+1}\right) \quad \text{(Expression 50a)}$$

Therefore, in a case where a signal of Doppler frequency index $f_{s\_cfar}$ includes a (primary) aliasing signal, $FT\_CAL_z^{ND}(k,f_s,w)$ has power lower than power of $FT\_ALIAS_z^{ND}(k,f_s,w)$. On the other hand, in a case where a signal of Doppler frequency index $f_{s\_cfar}$ does not include an aliasing signal, $FT\_ALIAS_z^{ND}(k,f_s,w)$ has power lower than power of $FT\_CAL_z^{ND}(k,f_s,w)$. For the reason, a determination method using Expressions (49) and (50) can be used.

In a case where $N_{GAP}$ is plural, it is possible to further achieve an effect that determination is possible even in a case where a higher-order aliasing signal is included. For example, in a case where a secondary aliasing signal is included, aliasing determiner 216 performs the determination object expressions (50b), (50c), and (50d). In a case where the following expression is not established, it is determined that a (primary) aliasing signal is not included.

$$\sum_{ND=1}^{Nt} \sum_{z=1}^{Na} |FT\_CAL_z^{ND}(k_{\_cfar}, f_{s\_char}, w)|^2 > \quad \text{(Expression 50b)}$$

$$\sum_{ND=1}^{Nt} \sum_{z=1}^{Na} |FT\_ALIAS_z^{ND}(k_{\_cfar}, f_{s\_char}, w)|^2$$

$$\sum_{ND=1}^{Nt} \sum_{z=1}^{Na} |FT\_CAL_z^{ND}(k_{\_cfar}, f_{s\_char}, w)|^2 >$$

$$\sum_{ND=1}^{Nt} \sum_{z=1}^{Na} |FT\_2ndALIAS_z^{ND}(k_{\_cfar}, f_{s\_char}, w)|^2$$

In a case where the following expression is established, it is determined that a (primary) aliasing signal is included.

$$\sum_{ND=1}^{Nt} \sum_{z=1}^{Na} |FT\_ALIAS_z^{ND}(k_{\_cfar}, f_{s\_char}, w)|^2 > \quad \text{(Expression 50c)}$$

-continued $$\sum_{ND=1}^{Nt} \sum_{z=1}^{Na} |FT\_CAL_z^{ND}(k_{cfar}, f_{s\_char}, w)|^2$$

$$\sum_{ND=1}^{Nt} \sum_{z=1}^{Na} |FT\_ALIAS_z^{ND}(k_{cfar}, f_{s\_char}, w)|^2 >$$

$$\sum_{ND=1}^{Nt} \sum_{z=1}^{Na} |FT\_2ndALIAS_z^{ND}(k_{cfar}, f_{s\_char}, w)|^2$$

In a case where the following expression is established, it is determined that a (secondary) aliasing signal is included.

$$\sum_{ND=1}^{Nt} \sum_{z=1}^{Na} |FT\_2ndALIAS_z^{ND}(k_{cfar}, f_{s\_char}, w)|^2 > \quad \text{(Expression 50d)}$$

$$\sum_{ND=1}^{Nt} \sum_{z=1}^{Na} |FT\_CAL_z^{ND}(k_{cfar}, f_{s\_char}, w)|^2$$

$$\sum_{ND=1}^{Nt} \sum_{z=1}^{Na} |FT\_2ndALIAS_z^{ND}(k_{cfar}, f_{s\_char}, w)|^2 >$$

$$\sum_{ND=1}^{Nt} \sum_{z=1}^{Na} |FT\_ALIAS_z^{ND}(k_{cfar}, f_{s\_char}, w)|^2$$

In expressions (50b), (50c), and (50d), the following expressions are given.

$$FT\_2ndALIAS_z^{ND}(k_{cfar}, f_{s\_char}, w) = \quad \text{(Expression 50e)}$$

$$\sum_{n_g=0}^{N_{GAP}} \exp\left(-j\frac{2\pi f_{s\_cfar}}{Nc} \frac{n_g}{N_{GAP}+1}\right)$$

$$\exp\left(-j4\pi \text{sign}(f_{s\_cfar}) \frac{n_g}{N_{GAP}+1}\right) FT\_GAP\_CI_z^{ND}(n_g, k_{cfar}, f_{s\_char}, w)$$

$$\exp\left(-j\frac{2\pi f_{s\_cfar}}{Nc} \frac{n_g}{N_{GAP}+1}\right) \exp\left(-j4\pi \text{sign}(f_{s\_cfar}) \frac{n_g}{N_{GAP}+1}\right) \quad \text{(Expression 50f)}$$

Here, $FT\_2ndALIAS_z^{ND}(k, f_s, w)$ in expression (50e) is an expression used for in-phase addition of $FT\_GAP\_CI_z^{ND}(0, k, f_s, w)$, $FT\_GAP\_CI_z^{ND}(1, k, f_s, w)$, ..., and $FT\_GAP\_CI_z^{ND}(N_{GAP}, k, f_s, w)$ assuming that a signal of Doppler frequency index $f_{s\_cfar}$ includes a (secondary) aliasing signal. In a case where a signal of Doppler frequency index $f_{s\_cfar}$ includes an aliasing signal, a phase change (phase rotation) corresponding to a Doppler frequency index of $(f_{s\_cfar}-2N_c)$ occurs during transmission gap period $T_{GAP}$ at Doppler frequency index $f_{s\_cfar} \geq 0$. A phase change (phase rotation) corresponding to a Doppler frequency index of $(f_{s\_car}+2N_c)$ occurs during transmission gap period $T_{GAP}$ at Doppler frequency index $f_{s\_cfar} < 0$. Therefore, in expression (50e), the term of expression (50f) is introduced to correct the phase rotation. Expression (50f) is obtained by assigning $(f_{s\_cfar}+\text{sign}(f_{s\_cfar}) \times 2N_c)$ to $f_{s\_cfar}$ in expression (49a), and is thus obtained by applying phase rotations $4\pi \times n_g/(N_{GAP}+1)$ to expression (49a). For example, phase rotations $4\pi \times n_g/(N_{GAP}+1)$ are $\{0, 4\pi/3, 8/3\}$ at $N_{GAP}=2$. Phase rotations $4\pi \times n_g/(N_{GAP}+1)$ are $\{0, 4\pi/4, 8\pi/4, 12\pi/4\}$ at $N_{GAP}=3$. As mentioned above, in a case where phase rotations $4\pi \times n_g/(N_{GAP}+1)$ are applied and added together at $ng=0, \ldots$, and $N_{GAP}$, phase rotations $4\pi \times n_g/(N_{GAP}+1)$ has the property of canceling out each other and thus becoming zero. Therefore, in a case where one of $FT\_CAL_z^{ND}(k,f_s,w)$, $FT\_ALIAS_z^{ND}(k,f_s,w)$, and $FT\_2ndALIAS_z^{ND}(k,f_s,w)$ is subjected to in-phase addition, and the other two thereof are subjected to addition of $FT\_GAP\_CI_z^{ND}(n_g,k,f_s,w)$ of which respective terms are mutually canceled out. Therefore, a signal level difference is clarified, and thus it is possible to determine the presence or absence of an aliasing signal even in a case where an SNR of a received signal is low and also to determine whether a (primary) aliasing signal or a (secondary) aliasing signal is included.

Aliasing determiner 216 outputs, to direction estimator 214 along with discrete time index $k_{\_cfar}$, a Doppler frequency index after conversion as follows with respect to a signal of Doppler frequency index $f_{s\_cfar}$ determined as being a (primary) aliasing signal. In a case of Doppler frequency index $f_{s\_cfar} \geq 0$, conversion into $\text{DopConv}(f_{s\_cfar})=f_{s\_cfar}-N_c$ is performed, and the resultant is output. In a case of Doppler frequency index $f_{s\_cfar} < 0$, conversion into $\text{DopConv}(f_{s\_cfar})=f_{s\_cfar}+N_c$ is performed, and the resultant is output.

Aliasing determiner 216 outputs, to direction estimator 214 along with discrete time index $k_{\_cfar}$, a Doppler frequency index after conversion as follows with respect to a signal of Doppler frequency index $f_{s\_cfar}$ determined as being a (secondary) aliasing signal. In a case of Doppler frequency index $f_{s\_cfar} \geq 0$, conversion into $\text{DopConv}(f_{s\_cfar})=f_{s\_cfar}+2N_c$ is performed, and the resultant is output. In a case of Doppler frequency index $f_{s\_cfar} < 0$, conversion into $\text{DopConv}(f_{s\_cfar})=f_{s\_cfar}-2N_c$ is performed, and the resultant is output.

Aliasing determiner 216 outputs, to direction estimator 214 along with discrete time index $k_{\_cfar}$, a Doppler frequency index without conversion as follows with respect to a signal of Doppler frequency index $f_{s\_cfar}$ determined as not being an aliasing signal. $\text{DopConv}(f_{s\_cfar})=f_{s\_cfar}$ Direction estimator 214 generates virtual reception array correlation vector $h(k,f_s,w)$ represented in expression (51) by using outputs from Doppler analyzers 213 on the basis of outputs from aliasing determiner 216, and performs a direction estimation process.

Hereinafter, a sum of the w-th outputs from Doppler analyzers 213 #1 to 213 #$N_t$ obtained through identical processes in respective signal processors 207 of antenna system processors 201 #1 to 201 #$N_a$ is represented by virtual reception array correlation vector $h(k_{\_cfar}, f_{s\_cfar}, w)$ including $N_tN_a$ elements corresponding to a product of the number $N_t$ of transmission antennae and the number $N_a$ of reception antennae, as represented in expression (51). Virtual reception array correlation vector $h(k_{\_cfar}, f_{s\_cfar}, w)$ is used for a process of performing direction estimation based on a phase difference between respective reception antennae $Rx$ on received signals from a target. Here, $z$ is $1, \ldots$, and $N_a$, and $ND$ is $1, \ldots$, and $N_t$.

$$h(k\_cfar, f_{s\_cfar}, w) = \quad \text{(Expression 51)}$$

$$\begin{bmatrix} h_{cal[1]}\text{FT\_CI}_1^{(1)}(k\_cfar, f_{s\_cfar}, w)TxCAL^{(1)}(DopConv(f_{s\_cfar})) \\ h_{cal[2]}\text{FT\_CI}_2^{(1)}(k\_cfar, f_{s\_cfar}, w)TxCAL^{(1)}(DopConv(f_{s\_cfar})) \\ \vdots \\ h_{cal[Na]}\text{FT\_CI}_{Na}^{(1)}(k\_cfar, f_{s\_cfar}, w)TxCAL^{(1)}(DopConv(f_{s\_cfar})) \\ h_{cal[Na+1]}\text{FT\_CI}_1^{(2)}(k\_cfar, f_{s\_cfar}, w)TxCAL^{(2)}(DopConv(f_{s\_cfar})) \\ h_{cal[Na+2]}\text{FT\_CI}_2^{(2)}(k\_cfar, f_{s\_cfar}, w)TxCAL^{(2)}(DopConv(f_{s\_cfar})) \\ \vdots \\ h_{cal[2Na]}\text{FT\_CI}_{Na}^{(2)}(k\_cfar, f_{s\_cfar}, w)TxCAL^{(2)}(DopConv(f_{s\_cfar})) \\ \vdots \\ h_{cal[Na(Nt-1)+1]}\text{FT\_CI}_1^{(Nt)}(k\_cfar, f_{s\_cfar}, w)TxCAL^{(Nt)}(DopConv(f_{s\_cfar})) \\ h_{cal[Na(Nt-1)+2]}\text{FT\_CI}_2^{(Nt)}(k\_cfar, f_{s\_cfar}, w)TxCAL^{(Nt)}(DopConv(f_{s\_cfar})) \\ \vdots \\ h_{cal[NaNt]}\text{FT\_CI}_{Na}^{(Nt)}(k\_cfar, f_{s\_cfar}, w)TxCAL^{(Nt)}(DopConv(f_{s\_cfar})) \end{bmatrix}$$

$$\text{FT\_CI}_z^{ND}(k\_cfar, f_{s\_char}, w) = \quad \text{(Expression 52)}$$

$$\sum_{n_g=0}^{N_{GAP}} \exp\left(-j\frac{2\pi DopConv(f_{s\_cfar})}{Nc} \frac{n_g}{N_{GAP}+1}\right)$$

$$\text{FT\_GAP\_CI}_z^{ND}(n_g, k\_cfar, f_{s\_char}, w)$$

Here, $h_{cal[b]}$ is an array correction value for correcting a phase deviation and an amplitude deviation between the transmission antennae and between the reception antennae. In addition, b is 1, ..., and $N_t N_a$.

Switching among transmission antennae Tx is performed in a time division manner, and thus different phase rotations occur at different Doppler frequencies f. $TxCAL^{(1)}(f), \ldots,$ and $TxCAL^{(Nt)}(f)$ are transmission phase correction coefficients for correcting the phase rotations to match a phase of a reference transmission antenna. For example, in a case where transmission antenna Tx #1 is used as a reference transmission antenna, the transmission phase correction coefficients are represented by expression (53).

$$TxCAL^{(1)}(f) = 1, \quad \text{(Expression 53)}$$

$$TxCAL^{(2)}(f) = \exp\left(-j\frac{2\pi f}{N_c}\frac{2}{N_t}\right),$$

$$TxCAL^{(Nt)}(f) = \exp\left(-j\frac{2\pi f}{N_c}\frac{N_t-1}{N_t}\right)$$

In this case, virtual reception array correlation vector $h(k\_cfar, f_{s\_cfar}, w)$ in expression (53) is a column formed of $N_a N_t$ elements.

In arrival direction estimation, a space profile is calculated by making azimuthal direction θ in direction estimation evaluation function value $P_H(\theta, k\_cfar, f_{s\_cfar}, W)$ variable within a predetermined angle range. In the arrival direction estimation, a predetermined number of maximum peaks of the calculated space profile is extracted in a descending order, and elevation angle directions of the maximum peaks are output as arrival direction estimation values.

Radar apparatus 1 according to Embodiment 5 performs switching among a plurality of transmission antennae Tx in a time division manner, and transmits a transmission signal from each transmission antenna Tx $N_c$ times. In this case, radar apparatus 1 provides transmission gap period $T_{GAP}$ whenever a transmission signal is transmitted $N_c/(N_{GAP}+1)$ times from each transmission antenna Tx. In other words, $N_{GAP}$ transmission gap periods $T_{GAP}$ are provided. Radar apparatus 1 includes aliasing determiner 216. In radar apparatus 1, aliasing determiner 216 determines whether or not an output signal from Doppler analyzer 213 includes an aliasing signal on the basis of a phase change occurring during transmission gap period $T_{GAP}$. Consequently, a Doppler frequency range in which there is no ambiguity can be increased by twice or more compared with a case where transmission gap period $T_{GAP}$ is not provided.

In a case where transmission gap period $T_{GAP}$ is set to $N_t T_r/(N_{GAP}+1)$, determination performance (accuracy) of whether or not an aliasing signal is included is highest. However, transmission gap period $T_{GAP}$ is not limited thereto, and may be set to about $N_t T_r/(N_{GAP}+1)$ or a period before or after $N_t T_r/(N_{GAP}+1)$.

In a case where a transmission signal is transmitted $N_c$ times from each transmission antenna Tx, a transmission signal is transmitted $N_c/(N_{GAP}+1)$ times from each transmission antenna Tx, and then transmission gap period $T_{GAP}$ is provided. Therefore, determination performance (accuracy) of whether or not an aliasing signal is included is highest. However, a timing at which transmission gap period $T_{GAP}$ is provided is not limited thereto, and may be provided after a transmission signal is transmitted about $N_c/(N_{GAP})$ times, or may be provided after a transmission signal is transmitted below or over $N_c/(N_{GAP}+1)$ times.

Embodiment 6

The above-described transmission gap period is not limited to the time division multiplexing MIMO radar apparatus, and may be applied to, for example, a MIMO radar apparatus (hereinafter, also referred to as a "code multiplexing MIMO radar apparatus") that simultaneously transmits signals by using code multiplexing from a plurality of transmission antennae Tx.

A MIMO radar apparatus using code multiplexing transmission is disclosed in, for example, PTL 3 (for example, refer to FIG. 1). In PTL 3, phase modulation (00 or 180°) based on different code strings is applied to respective transmission antennae whenever a transmission signal (chirp signal) is repeatedly transmitted, and code multiplexing transmission is performed from the plurality of transmission antennae.

A detection process is performed on signals received by a plurality of reception antennae, and thus distance information of code-multiplexed received signals is extracted. The distance information object whenever a transmission signal is repeatedly transmitted is multiplied by an inverse code string for each transmission antenna, and thus the code-multiplexed received signals are demultiplexed, and thus speed (Doppler) information is extracted through a speed-direction Fourier transform process. An azimuthal-direction Fourier transform process is performed by using speed (Doppler) information of $(N_a \times N_r)$ systems obtained by multiplying the number $N_a$ of reception antennae by multiplex number $N_r$.

In this configuration, since transmission signals are simultaneously transmitted from a plurality of transmission antennae every repeated transmission of transmission signals, received signals can be sampled every repeated transmission of the transmission signals. Thus, it is possible to increase a Doppler speed range satisfying the sampling theorem (that is, aliasing of a frequency does not occur and ambiguity does not occur) compared with a time division multiplexing method.

However, since an inverse code string for each transmission antenna is multiplied before a speed-direction Fourier transform process, and thus code-multiplexed signals are demultiplexed, when a Doppler variation due to movement of a target or a radar apparatus is included in a received signal, the orthogonality between codes is reduced, and thus interference between the codes occurs.

Since code sequences are superimposed on each other every repeated transmission of a transmission signal, when interference between codes occurs, a peak side lobe ratio in a speed direction obtained through speed-direction Fourier transform is lower than an ideal peak side lobe ratio defined by cross-correlation characteristics between code sequences used for code multiplexing transmission.

Thus, in a case where there are a plurality of targets at an identical distance, and a reception power level difference between reflected waves from the plurality of targets is more than a peak side lobe ratio in a speed direction, a reflected wave from a target providing a low reception power level is equal to or less than a side lobe level in the speed direction, and thus there is a high probability that the target may not be detected.

As a Doppler variation due to movement of a target or a radar apparatus increases, interference between codes increases, a peak side lobe ratio decreases, and thus a probability that a target may not be detected further increases in a case where there are a plurality of targets at an identical distance.

In Embodiment 6, in a code multiplexing MIMO radar apparatus, transmission in which transmission gap period $T_{GAP}$ described in Embodiment 3 is provided is performed. Consequently, in the same manner as in Embodiment 3, it is possible to increase a detection range of a Doppler frequency (relative speed) at which ambiguity does not occur. Even in a case where a Doppler variation due to movement of a target or radar apparatus 1 is included in a received signal, it is possible to suppress the occurrence of interference between codes.

Figure 18:
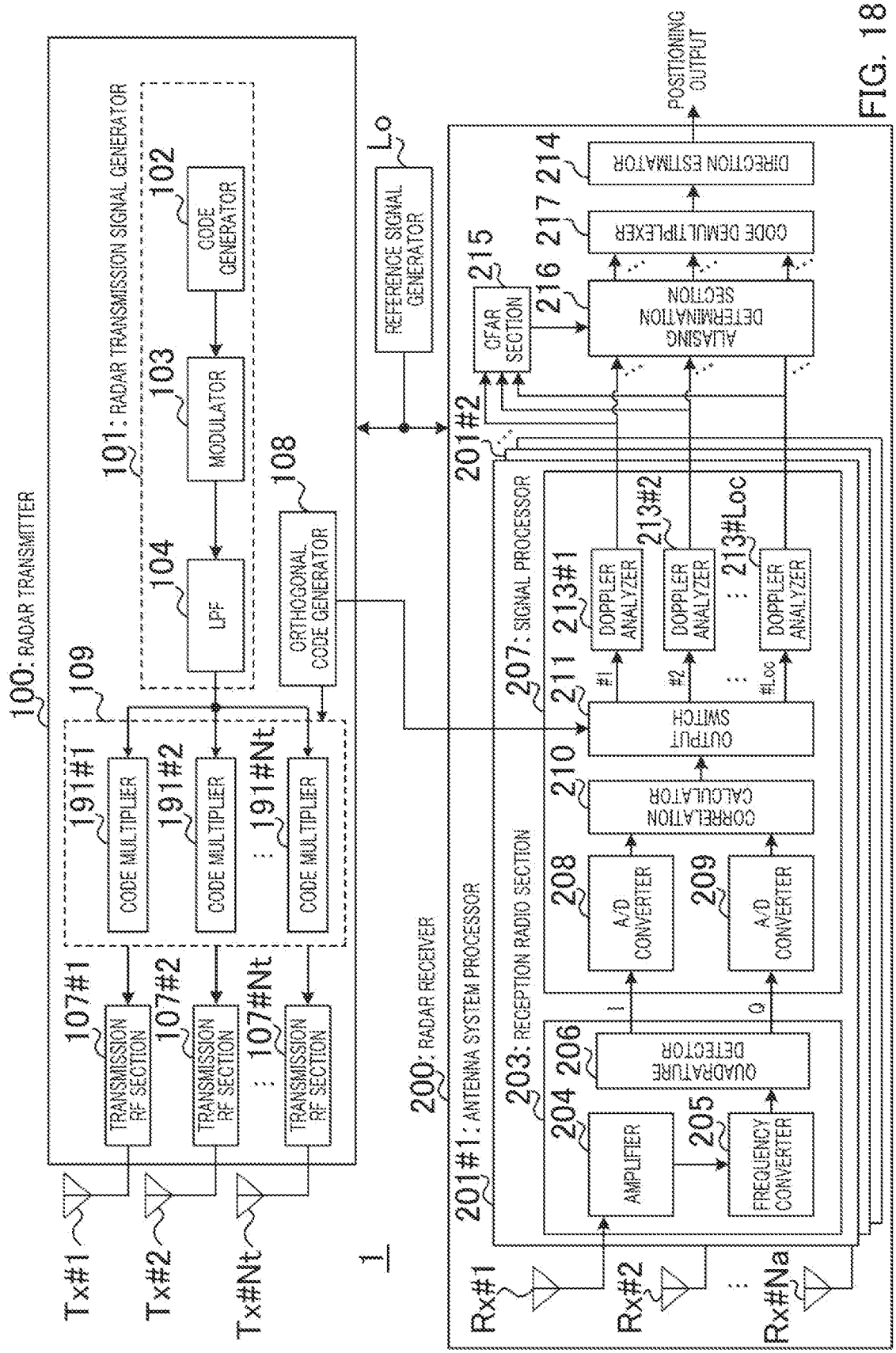
FIG. 18 is a diagram illustrating a configuration example of a radar apparatus according to Embodiment 6.

FIG. 18 is a diagram illustrating a configuration example of radar apparatus 1 according to Embodiment 6. The configuration exemplified in FIG. 18 corresponds to a configuration of performing transmission in which transmission gap period $T_{GAP}$ described in Embodiment 3 (FIGS. 14 and 15) is provided in the code multiplexing MIMO radar apparatus.

For example, a configuration of code multiplexing MIMO radar apparatus 1 illustrated in FIG. 18 is different from the configuration exemplified in FIG. 14 in that orthogonal code generator 108, and code multiplexer 109 including first code multiplier 191 #1 to $N_t$-th code multiplier 191 #$N_t$ are provided instead of switching controller 105 and transmission RF switch 106 in radar transmitter 100.

A configuration of radar receiver 200 illustrated in FIG. 18 is different from the configuration exemplified in FIG. 14 in that code demultiplexer 217 is provided between aliasing determiner 216 and direction estimator 214, and an output from orthogonal code generator 108 is input to output switch 211. Code demultiplexer 217 demultiplexes code-multiplexed received signals on the basis of a determination (or detection) result of the presence or absence of aliasing of a Doppler frequency in aliasing determiner 216.

By using the configuration exemplified in FIG. 18, even in a case where a Doppler variation due to movement of a target or radar apparatus 1 is included in a received signal, code demultiplexing becomes possible after a phase change caused by the Doppler variation is corrected.

Hereinafter, an operation of code multiplexing MIMO radar apparatus 1 according to Embodiment 6 will be described focusing on differences from Embodiment 3.

Radar transmitter 100 performs MIMO radar transmission using code multiplexing. For example, orthogonal code generator 108 generates $N_t$ orthogonal code sequences $OCS_{ND} = \{OC_{ND}(1), OC_{ND}(2), \ldots, OC_{ND}(L_{OC})\}$ with orthogonal code length $L_{OC}$. Here, ND is $1, \ldots,$ and $N_t$.

For example, orthogonal code generator 108 cyclically makes orthogonal code element index OC_INDEX indicating elements of orthogonal code sequences $OCS_1$ to $OCS_{Nt}$ variable in each radar transmission cycle $(T_r)$, and thus outputs elements $OC_1(OC\_INDEX)$ to $OC_{Nt}(OC\_INDEX)$ of orthogonal code sequences $OCS_1$ to $OCS_{Nt}$ to first code multiplier 191 #1 to $N_t$-th code multiplier 191 #$N_t$. Orthogonal code generator 108 outputs element index OC_INDEX to output switch 211 of radar receiver 200 in each radar transmission cycle $(T_r)$.

Here, OC_INDEX is $1, 2, \ldots,$ and $L_{OC}$, and OC_INDEX=MOD$(M-1, L_{OC})+1$ in a$_n$ M-th transmission cycle. MOD(x,y) is a modulo operator, and is a function that outputs a remainder obtained by dividing x by y.

For example, codes uncorrelated with each other are used in an orthogonal code sequence generated by orthogonal code generator 108. For example, orthogonal code generator 108 uses Walsh-Hadamard-codes in an orthogonal code sequence.

In a case of $N_t=2$, orthogonal code length $L_{OC}$ of Walsh-Hadamard-codes is 2, and thus orthogonal code generator 108 generates orthogonal code sequences including $OCS_1=\{1,1\}$ and $OCS_2=\{1,-1\}$.

In a case of $N_t=4$, orthogonal code length $L_{OC}$ is 4, and thus orthogonal code generator 108 generates orthogonal code sequences including $OCS_1=\{1,1,1,1\}$, $OCS_2=\{1,-1,1,-1\}$, $OCS_3=\{1,1,-1,-1\}$, and $OCS_4=\{1,-1,-1,1\}$.

Elements forming an orthogonal code sequence are not limited to real numbers, and may include complex numbers. For example, orthogonal codes using phase rotation represented in the following expression (6-1) may be used.

$$OCS_{ND} = \left\{ 1, \exp\left[j\frac{2\pi}{Nt}(ND-1)\right], \ldots, \exp\left[j\frac{2\pi}{Nt}L_{OC}(ND-1)\right] \right\} \quad \text{(Expression 6-1)}$$

In a case of $N_t=3$, orthogonal code length $L_{OC}$ is $N_t$, and thus orthogonal code generator 108 generates orthogonal code sequences including $OCS_1=\{1,1,1\}$, $OCS_2=\{1,\exp(j2\pi/3),\exp(j4\pi/3)\}$, and $OCS_3=\{1,\exp(-j2\pi/3),\exp(-j4\pi/3)\}$.

In a case of $N_t=4$, orthogonal code length $L_{OC}$ is $N_t$, and thus orthogonal code generator 108 generates orthogonal code sequences including $OCS_1=\{1,1,1,1\}$, $OCS_2=\{1,j,-1,-j\}$, $OCS_3=\{1,-1,1,-1\}$, and $OCS_4=\{1,-j,-1,j\}$.

Figure 19A:
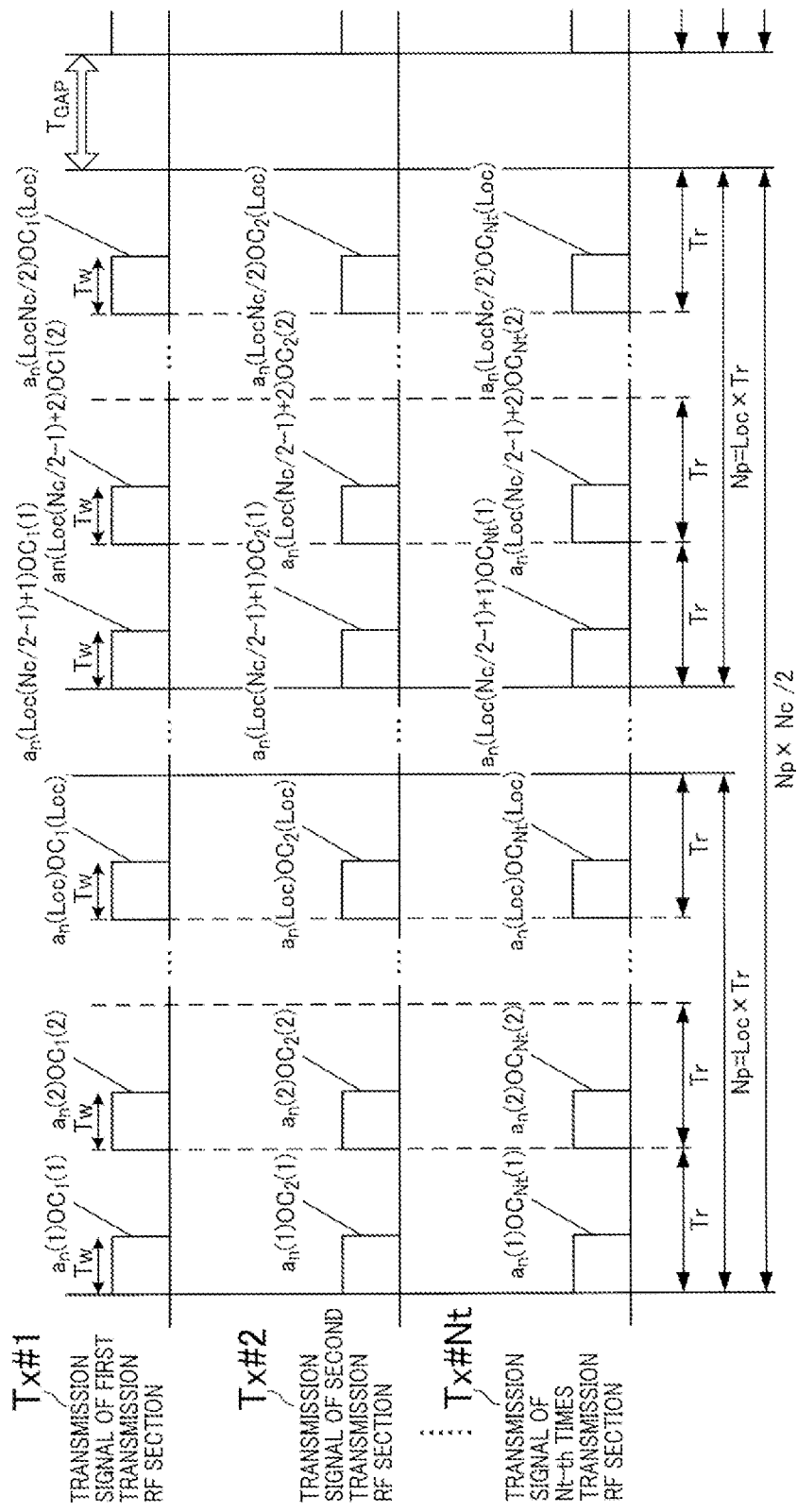
FIG. 19A is a diagram for describing examples of transmission timings in the radar apparatus according to Embodiment 6.
Figure 19B:
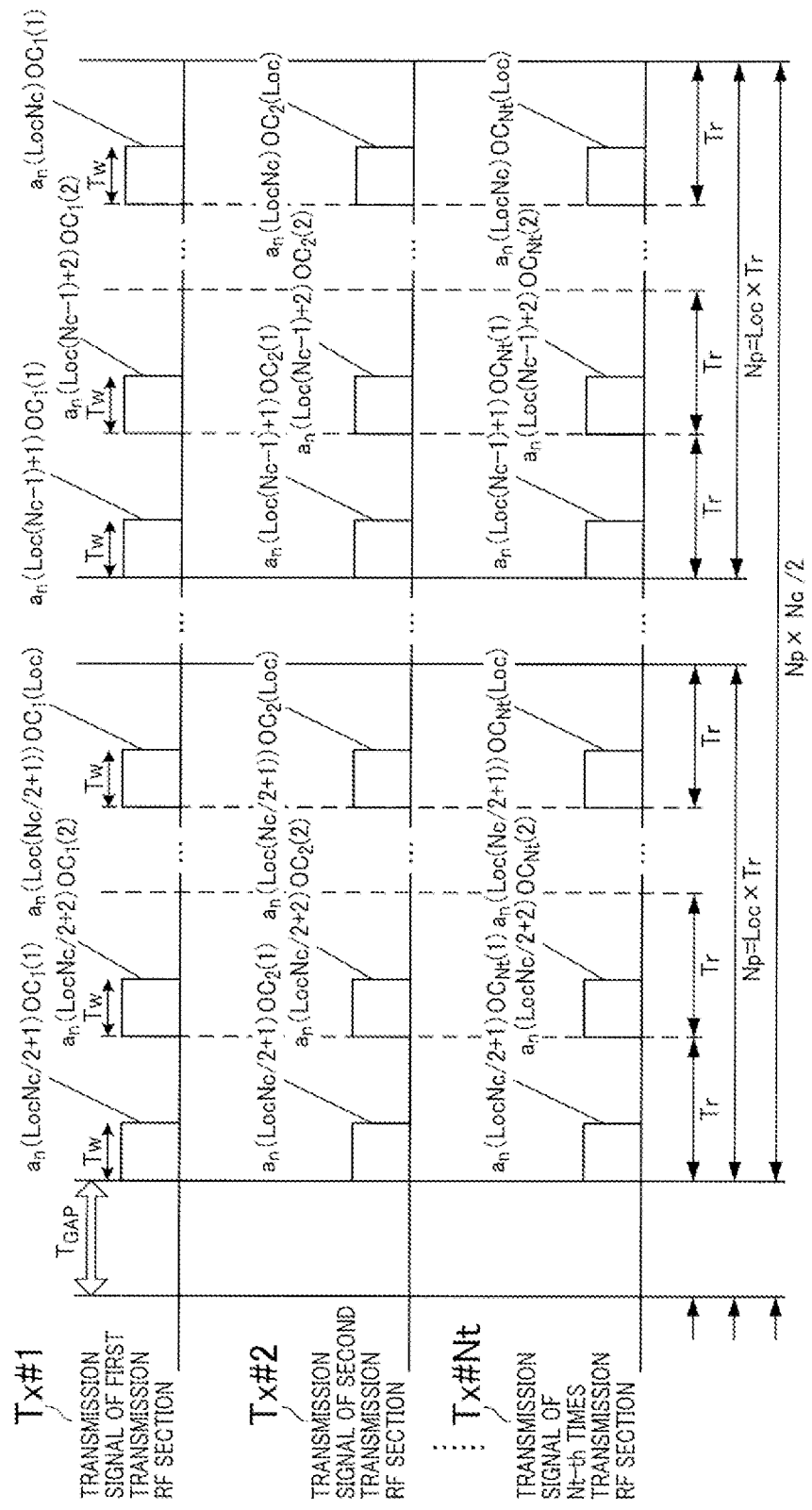
FIG. 19B is a diagram for describing examples of transmission timings in the radar apparatus according to Embodiment 6.

First code multiplier 191 #1 to $N_t$-th code multiplier 191 #$N_t$ respectively multiply elements $OC_1(OC\_INDEX)$ to $OC_{Nt}(OC\_INDEX)$ of orthogonal code sequences $OCS_1$ to $OCS_{Nt}$ generated by orthogonal code generator 108 by baseband radar transmission signals as exemplified in FIGS. 19A and 19B in each radar transmission cycle $(T_r)$, and output resultants to $N_t$ transmission RF sections 107 #1 to #107$N_t$.

As exemplified in FIG. 19A, each of transmission RF sections 107 #1 to 107 #$N_t$ repeats an operation of transmitting a transmission signal $L_{OC}$ times in the period of $N_p = L_{OC} \times T_r$, $N_c/2$ times, and then does not transmit a transmission signal in transmission gap period $T_{GAP}$.

In other words, each of transmission RF sections 107 #1 to 107 #$N_t$ transmits each transmission signal subjected to code multiplexing in each transmission cycle $T_r$ of the transmission signal in a first period (period of $N_p = L_{OC} \times T_r$) in which orthogonal codes cyclically generated are transmitted by at least one round, and then does not transmit a code-multiplexed transmission signal in predetermined transmission gap period $T_{GAP}$.

After transmission gap period $T_{GAP}$ elapses, as exemplified in FIG. 19B, each of transmission RF sections 107 #1 to 107 #$N_t$ repeats an operation of transmitting a transmission signal $L_{OC}$ times in the period of $N_p = L_{OC} \times T_r$, $N_c/2$ times again.

Through the transmission operations of transmission RF sections 107 #1 to 107 #$N_t$ as exemplified in FIGS. 19A and 19B, transmission signals from first transmission RF section 107 #1 to $N_t$-th transmission RF section 107 #$N_t$ are transmitted $L_{OC} \times N_c$ times.

In other words, each of transmission RF sections 107 #1 to 107 #$N_t$ transmits each transmission signal subjected to code multiplexing in each transmission cycle $T_r$ of the transmission signal in a second period (period of $N_p = L_{OC} \times T_r$) in which orthogonal codes cyclically generated are transmitted by at least one round after transmission gap period $T_{GAP}$.

Here, transmission gap period $T_{GAP}$ is set to $N_p/2$ corresponding to ½ of the period of $N_p = L_{OC} \times T_r$ that is a transmission cycle of orthogonal codes corresponding to a sampling cycle in Doppler analyzer 213. In other words, transmission gap period $T_{GAP}$ is $L_{OC} \times T_r/2$.

Next, a description will be made of an operation of radar receiver 200 exemplified in FIG. 18. Output switch 211 of z-th signal processor 207 selectively switches and outputs an output from correlation calculator 210 in each transmission cycle to OC_INDEX-th Doppler analyzer 213 among $L_{OC}$ Doppler analyzers 213 on the basis of orthogonal code element index OC_INDEX from orthogonal code generator 108.

In other words, output switch 211 selects (OC_INDEX=MOD(M−1,$L_{OC}$)+1)-th Doppler analyzer 213 in M-th transmission cycle $T_r$. Output switch 211 non-selects all Doppler analyzers 213 in transmission gap period $T_{GAP}$.

In z-th signal processor 207, a plurality of ($L_{OC}$) Doppler analyzers 213 separately perform Doppler analysis, in twice, on outputs corresponding to $N_c/2$ times of a first half portion before transmission gap period $T_{GAP}$ starts and outputs corresponding to $N_c/2$ times of a second half portion after transmission gap period $T_{GAP}$ ends. In a case where $N_c$ is a power of 2, a fast Fourier transform (FFT) process as represented in expressions (6-2) and (6-3) may be applied.

For example, an FFT process on the outputs corresponding to $N_c/2$ times of the first half portion before transmission gap period $T_{GAP}$ starts is represented in expression (6-2).

(Expression 6-2)
$$FT\_FH\_CI_z^{OC\_INDEX}(k, f_s, w) =$$
$$\sum_{q=0}^{N_c/2-1} AC_z(k, N_pN_c(w-1) + L_{oc} \times q + OC\_INDEX)$$
$$\exp\left[-j\frac{2\pi q f_s}{N_c}\right]$$

An FFT process on the outputs corresponding to $N_c/2$ times of the second half portion after transmission gap period $T_{GAP}$ ends is represented in expression (6-3).

(Expression 6-3)
$$FT\_SH\_CI_z^{OC\_INDEX}(k, f_s, w) =$$
$$\sum_{q=N_c/2}^{N_c-1} AC_z(k, N_tN_c(w-1) + L_{oc} \times q + OC\_INDEX)$$
$$\exp\left[-j\frac{2\pi q f_s}{N_c}\right]$$

Here, $FT\_FH\_CI_z^{(OC\_INDEX)}(k,f_s,w)$ is a w-th output from OC_INDEX-th Doppler analyzer 213 of z-th signal processor 207, and indicates a Doppler frequency response for outputs corresponding to $N_c/2$ times in the first half portion of Doppler frequency index $f_s$ at discrete time k before transmission gap period $T_{GAP}$ starts.

Here, $FT\_SH\_CI_z^{(OC\_INDEX)}(k,f_s,w)$ is a w-th output from OC_INDEX-th Doppler analyzer 213 of z-th signal processor 207, and indicates a Doppler frequency response for outputs corresponding to $N_c/2$ times in the second half portion of Doppler frequency index $f_s$ at discrete time k after transmission gap period $T_{GAP}$ ends.

Here, OC_INDEX is 1 to $L_{OC}$, k is 1, ..., and $(N_r + N_u)N_s/N_c$, and w is an integer of 1 or greater. Here, j is an imaginary number unit. In addition, z is 1, ..., and $N_a$.

In $FT\_FH\_CI_z^{(OC\_INDEX)}(k,f_s,w)$, an FFT size is $N_c$, and $N_c/2$ pieces of data of the second half portion are set to zero (or zero padding). In $FT\_SH\_CI_z^{(OC\_INDEX)}(k,f_s,w)$, an FFT size is $N_c$, and $N_c/2$ pieces of data of the first half portion are set to zero.

Therefore, the maximum Doppler frequency not causing aliasing, derived from the sampling theorem, is $\pm 1/(2L_{OC} \times T_r)$. A Doppler frequency interval of Doppler frequency index $f_s$ is $1/\{L_{OC} \times N_c \times T_r\}$, and a range of Doppler frequency index $f_s$ is $f_s = -N_c/2+1, \ldots, 0, \ldots,$ and $N_c/2$.

During the FFT process, a window function coefficient such as a Hann window or a Hamming window may be multiplied. A window function is used, and thus it is possible to suppress side lobes generated around a beat frequency peak. As the window function coefficient, a window function coefficient having $N_c$ as an FFT size may be used. For example, $N_c/2$ window function coefficients of the first half portion are used to calculate $FT\_FH\_CI_z^{(OC\_INDEX)}(k,f_s,w)$, and $N_c/2$ window function coefficients of the second half portion are used to calculate $FT\_SH\_CI_z^{(OC\_INDEX)}(k,f_s,w)$.

CFAR section 215 performs a CFAR process on w-th outputs from LoC Doppler analyzers 213 by using $FT\_FH\_CI_z^{(OC\_INDEX)}(k, f_s,w)$ and $FT\_SH\_CI_z^{(OC\_INDEX)}(k,f_s,w)$.

For example, CFAR section 215 calculates a power addition value represented in expression (6-4), and performs a two-dimensional CFAR process using a discrete time axis (corresponding to a distance axis) and a Doppler frequency axis (corresponding to a relative speed axis), or a CFAR process in which one-dimensional CFAR processes are combined with each other thereon. The two-dimensional CFAR process or the CFAR process in which one-dimensional CFAR processes are combined with each other may employ the process disclosed in, for example, NPL 2.

$$PowerFT^{ND}(k, f_s, w) = \quad \text{(Expression 6-4)}$$

$$\sum_{OC\_INDEX=1}^{Loc} \{|FT\_FH\_CI_z^{OC\_INDEX}(k, f_s, w)|^2 + |FT\_SH\_CI_z^{OC\_INDEX}(k, f_s, w)|^2\}$$

CFAR section 215 sets an adaptive threshold value by using the CFAR process, and gives an instruction for discrete time index $k_{\_cfar}$ and Doppler frequency index $f_{s\_cfar}$ at which the power addition result is more than a threshold value, to direction estimator 214 and aliasing determiner 216.

Aliasing determiner 216 extracts an output from Doppler analyzer 213 on the basis of discrete time index $k_{\_cfar}$ and Doppler frequency index $f_{s\_cfar}$ for which the instruction is given from CFAR section 215, and performs a process of determines whether or not an aliasing signal is included according to a determination method using the following expressions (6-5) and (6-6). For example, aliasing determiner 216 determines that an aliasing is included in a case where expression (6-5) is established, and determines that an aliasing signal is not included in a case where expression (6-6) is established.

$$\sum_{OC\_INDEX=1}^{Loc} \sum_{z=1}^{Na} |FT\_CAL_z^{OC\_INDEX}(k_{\_cfar}, f_{s\_char}, w)|^2 > \quad \text{(Expression 6-5)}$$

$$\sum_{OC\_INDEX=1}^{Loc} \sum_{z=1}^{Na} |FT\_ALIAS_z^{OC\_INDEX}(k_{\_cfar}, f_{s\_char}, w)|^2$$

$$\sum_{OC\_INDEX=1}^{Loc} \sum_{z=1}^{Na} |FT\_CAL_z^{OC\_INDEX}(k_{\_cfar}, f_{s\_char}, w)|^2 < \quad \text{(Expression 6-6)}$$

$$\sum_{OC\_INDEX=1}^{Loc} \sum_{z=1}^{Na} |FT\_ALIAS_z^{OC\_INDEX}(k_{\_cfar}, f_{s\_char}, w)|^2$$

In expressions (6-5) and (6-6), the following expressions are given.

$$FT\_CAL_z^{OC\_INDEX}(k_{\_cfar}, f_{s\_char}, w) = \quad \text{(Expression 6-7)}$$

$$FT\_FH\_CI_z^{OC\_INDEX}(k_{\_cfar}, f_{s\_char}, w) +$$

$$\exp\left(-j\frac{2\pi f_{s\_cfar}}{Nc}\frac{1}{2}\right) FT\_SH\_CI_z^{OC\_INDEX}(k_{\_cfar}, f_{s\_cfar}, w)$$

$$FT\_ALIAS_z^{OC\_INDEX}(k_{\_cfar}, f_{s\_char}, w) = \quad \text{(Expression 6-8)}$$

$$FT\_FH\_CI_z^{OC\_INDEX}(k_{\_cfar}, f_{s\_char}, w) -$$

$$\exp\left(-j\frac{2\pi f_{s\_cfar}}{Nc}\frac{1}{2}\right) FT\_SH\_CI_z^{OC\_INDEX}(k_{\_cfar}, f_{s\_char}, w)$$

Here, the following term is introduced to correct phase rotation during the transmission gap period for a signal of Doppler frequency index $f_{s\_cfar}$.

$$\exp\left(-j\frac{2\pi f_{s\_cfar}}{Nc}\frac{1}{2}\right)$$

In a case where a signal of Doppler frequency index $f_{s\_cfar}$ includes an aliasing signal, a phase change corresponding to a Doppler frequency index of $(f_{s\_cfar}-N_c)$ occurs during transmission gap period at Doppler frequency index $f_{s\_cfar} \geq 0$, and, a phase change corresponding to a Doppler frequency index of $(f_{s\_cfar}+N_c)$ occurs during transmission gap period at Doppler frequency index $f_{s\_cfar} < 0$. Therefore, the following term is subjected to phase inversion.

$$\exp\left(-j\frac{2\pi f_{s\_cfar}}{Nc}\frac{1}{2}\right)$$

As a result, the following term is obtained.

$$\exp\left(-j\frac{2\pi(f_{s\_cfar} \pm Nc)}{Nc}\frac{1}{2}\right) =$$

$$\exp\left(-j\frac{2\pi f_{s\_cfar}}{Nc}\frac{1}{2}\right)\exp(\pm j\pi) = -\exp\left(-j\frac{2\pi f_{s\_cfar}}{Nc}\frac{1}{2}\right)$$

Therefore, in a case where a signal of Doppler frequency index $f_{s\_cfar}$ includes an aliasing signal, $FT\_CAL_z^{OC\_INDEX}(k_{\_cfar}, f_{s\_cfar}, w)$ has power lower than power of $FT\_ALIAS_z^{OC\_INDEX}(k_{\_cfar}, f_{s\_cfar}, w)$.

On the other hand, in a case where a signal of Doppler frequency index $f_{s\_cfar}$ does not include an aliasing signal, $FT\_ALIAS_z^{OC\_INDEX}(k_{\_cfar}, f_{s\_cfar}, w)$ has power lower than power of $FT\_CAL_z^{OC\_INDEX}(k_{\_cfar}, f_{s\_cfar}, w)$.

For the reason, the aliasing determination method may be applied. As a result of the determination, in a case where a signal of Doppler frequency index $f_{s\_cfar}$ includes an aliasing signal, aliasing determiner 216 outputs a conversion result of the Doppler frequency index as exemplified in the following (1) and (2).

(1) In a case of Doppler frequency index $f_{s\_cfar} \geq 0$, DopConv$(f_{s\_cfar})=f_{s\_cfar}-N_c$ is given.

(2) In a case of Doppler frequency index $f_{s\_cfar} < 0$, DopConv$(f_{s\_cfar})=f_{s\_cfar}+N_c$ is given.

DopConv(f) indicates a conversion result of a Doppler frequency index for Doppler frequency index f based on determination of an aliasing signal.

On the other hand, as a result of the determination, in a case where a signal of Doppler frequency index $f_{s\_cfar}$ does not include an aliasing signal, aliasing determiner 216 outputs a conversion result of the Doppler frequency index as follows.

$$\text{DopConv}(f_{s\_cfar}) = f_{s\_cfar}$$

Code demultiplexer 217 demultiplexes signals that are multiplexed by using orthogonal codes and are transmitted, on the basis of an output from aliasing determiner 216. For example, a code-multiplexed signal transmitted from ND-th transmission antenna Tx #ND is demultiplexed by multiplying complex conjugates (*) of orthogonal code elements used during transmission by Doppler analysis results for respective code element indexes and summing resultants, as represented in expressions (6-9) and (6-10). Here, ND is 1, . . . , and $N_t$. The term of exp in expression (6-9) is provided to correct a phase change occurring due to a transmission time delay of an orthogonal code.

$$DeMUL_z^{ND}(k_{\_cfar}, f_{s\_char}, w) = \qquad \text{(Expression 6-9)}$$

$$\sum_{OC\_INDEX=1}^{Loc} OC_{ND}^*(OC\_INDEX)FT\_CI_z^{OC\_INDEX}(k_{\_cfar},$$

$$f_{s\_char}, w)\exp\left(-j\frac{2\pi DopConv(f_{s\_cfar})}{Nc}\frac{OC\_INDEX-1}{Loc}\right)$$

$$FT\_CI_z^{OC\_INDEX}(k_{\_cfar}, f_{s\_char}, w) = \qquad \text{(Expression 6-10)}$$

$$FT\_FH\_CI_z^{OC\_INDEX}(k_{\_cfar}, f_{s\_char}, w) +$$

$$\exp\left(-j\frac{2\pi DopConv(f_{s\_cfar})}{Nc}\frac{1}{2}\right)$$

$$FT\_SH\_CI_z^{OC\_INDEX}(k_{\_cfar}, f_{s\_cfar}, w)$$

Direction estimator 214 generates virtual reception array correlation vector h(k,f$_s$,w) on the basis of the output from code demultiplexer 217, and performs a direction estimation process on the basis of the vector. For example, direction estimation based on a phase difference between reception antennae Rx is performed on a reflected wave from a target by using virtual reception array correlation vector h(k$_{\_cfar}$, f$_{s\_cfar}$,w) including N$_t$×N$_a$ elements corresponding to a product of the number N$_t$ of transmission antennae and the number N$_a$ of reception antennae, as represented in expression (6-11).

Here, virtual reception array correlation vector h(k$_{\_cfar}$, f$_{s\_cfar}$,w) corresponds to a vector obtained by summing w-th outputs from Doppler analyzers 213, obtained in first signal processor 207 to N$_a$-th signal processor 207. Here, z is 1, . . . , and N$_a$, and ND is 1, . . . , and N$_t$.

$$h(k_{\_cfar}, f_{s\_cfar}, w) = \begin{bmatrix} h_{cal[1]}DeMUL_1^{(1)}(k_{\_cfar}, f_{s\_char}, w) \\ h_{cal[2]}DeMUL_2^{(1)}(k_{\_cfar}, f_{s\_char}, w) \\ \vdots \\ h_{cal[Na]}DeMUL_{Na}^{(1)}(k_{\_cfar}, f_{s\_char}, w) \\ h_{cal[Na+1]}DeMUL_1^{(2)}(k_{\_cfar}, f_{s\_char}, w) \\ h_{cal[Na+2]}DeMUL_2^{(2)}(k_{\_cfar}, f_{s\_char}, w) \\ \vdots \\ h_{cal[2Na]}DeMUL_{Na}^{(2)}(k_{\_cfar}, f_{s\_char}, w) \\ \vdots \\ h_{cal[Na(Nt-1)+1]}DeMUL_1^{(Nt)}(k_{\_cfar}, f_{s\_char}, w) \\ h_{cal[Na(Nt-1)+2]}DeMUL_2^{(Nt)}(k_{\_cfar}, f_{s\_char}, w) \\ \vdots \\ h_{cal[NaNt]}DeMUL_{Na}^{(Nt)}(k_{\_cfar}, f_{s\_char}, w) \end{bmatrix}$$

(Expression 6-11)

Here, heal[b] is an array correction value for correcting a phase deviation and an amplitude deviation between the transmission antennae and between the reception antennae. In addition, b is 1, . . . , and N$_t$×N$_a$. Virtual reception array correlation vector h(k$_{\_cfar}$,f$_{s\_cfar}$,w) is a column formed of N$_t$×N$_a$ elements.

Direction estimator 214 calculates a space profile by making azimuthal direction θ in direction estimation evaluation function value P$_H$(θ,k$_{\_cfar}$,f$_{s\_cfar}$,w) variable within a predetermined angle range, extracts maximum peak directions in a descending order, and outputs azimuthal directions of the maximum peaks as arrival direction estimation values. Information regarding the maximum peak level may be output along with the azimuthal direction as a positioning result of a radar reflected wave. As the positioning result of a radar reflected wave, DopConv(f$_{s\_cfar}$) after aliasing determination is output as arrival time information (distance information) and Doppler frequency information (relative speed information) on the basis of k$_{\_cfar}$.

As mentioned above, in code multiplexing MIMO radar apparatus 1 according to Embodiment 6, in radar transmitter 100, when radar transmission is performed a plurality of (L$_{OC}$×N$_c$) times from each transmission RF section 107 by using a plurality of transmission RF sections 107 and code multiplexing, a transmission signal is transmitted L$_{OC}$×N$_c$/2 times from each transmission RF section 107, and then transmission gap period T$_{GAP}$ is provided.

In radar receiver 200, aliasing determiner 216 determines whether or not an aliasing signal is included in an output from Doppler analyzer 213, and thus it is possible to increase a Doppler frequency range in which the ambiguity of a Doppler frequency does not occur. For example, it is possible to increase a Doppler frequency range by twice the Doppler frequency range in a case where a sampling cycle is L$_{OC}$.

Since the Doppler frequency range in which the ambiguity of a Doppler frequency does not occur is increased, when results of performing Doppler analysis on respective orthogonal code elements are added together through multiplication of complex conjugates of the orthogonal code elements, code demultiplexer 217 can perform an orthogonal code demultiplexing process by using a determination result of whether or not an aliasing signal is included.

Consequently, a code-multiplexed signal can be demultiplexed while suppressing interference between orthogonal codes. Therefore, it is possible to reduce side lobes in a time direction or a frequency deterioration. In principle, in a case where a noise component is not present or negligible, a side lobe can be made substantially zero.

L$_{OC}$×Tr/2 is used in transmission gap period T$_{GAP}$, and thus aliasing determination performance can be maximized, but this is only an example. For example, about L$_{OC}$×Tr/2 or a period before or after L$_{OC}$×Tr/2 may be set.

When radar transmission is performed a plurality of (L$_{OC}$×N$_c$) times from each transmission RE section 107, transmission gap period T$_{GAP}$ is provided after a transmission signal is transmitted L$_{OC}$×N$_c$/2 times from each transmission RF section 107, and thus aliasing determination performance can be maximized, but this is only an example.

Transmission gap period T$_{GAP}$ may be provided after a transmission signal is transmitted about L$_{OC}$×N$_c$/2 times from each transmission antenna 107, or may be provided after a transmission signal is transmitted below or over $L_{OC} \times N_c/2$ times. For example, the transmission gap period may be set at an inequal interval in a range in which deviation in a signal-to-noise ratio (SNR) does not occur.

In Embodiment 6, a description has been made of an example in which single transmission gap period $T_{GAP}$ is provided, but, as described in Embodiment 5, a plurality of ($N_{GAP}$) transmission gap periods $T_{GAP}$ may be provided. In a case where a plurality of transmission gap periods $T_{CAP}$ are provided, it is possible to determine whether or not a higher-order aliasing signal is included, and thus to achieve an effect of further increasing a Doppler frequency range in which the ambiguity of a Doppler frequency does not occur.

Embodiment 7

In Embodiment 6, a description has been made of code multiplexing MIMO radar apparatus 1 in which radar transmitter 100 performs phase modulation or amplitude modulation on a pulse train, and transmits the pulse train. In Embodiment 7, a description will be made of code multiplexing MIMO radar apparatus 1 using a pulse compression wave such as a chirp pulse subjected to frequency modulation in radar transmitter 100.

Figure 20:
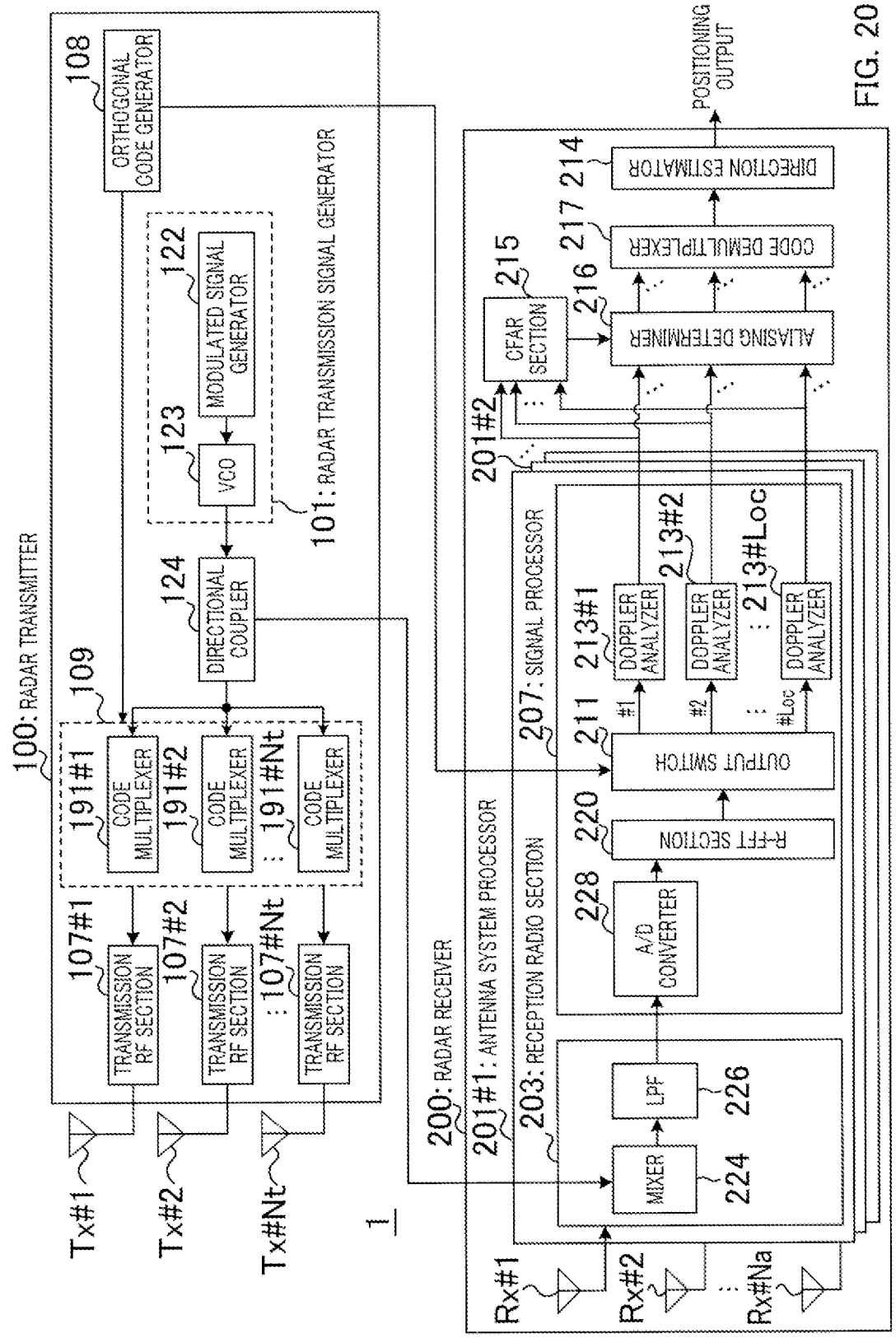
FIG. 20 is a diagram illustrating a configuration example of a radar apparatus according to Embodiment 7.

FIG. 20 is a diagram illustrating a configuration example of code multiplexing MIMO radar apparatus 1 in which a chirp pulse subjected to frequency modulation is used for a radar transmission signal. A configuration of code multiplexing MIMO radar apparatus 1 exemplified in FIG. 20 is different from the configuration exemplified in Embodiment 2 (FIG. 12) in that orthogonal code generator 108, first transmission RF section 107 #1 to $N_t$-th transmission RF section 107 #$N_t$, and code multiplexer 109 including first code multiplier 191 #1 to $N_t$-th code multiplier 191 #$N_t$ are provided instead of switching controller 105, transmission RF section 107, and transmission antenna switch 121 in radar transmitter 100.

A configuration of radar receiver 200 illustrated in FIG. 20 is different from the configuration exemplified in FIG. 12 in that aliasing determiner 216 and code demultiplexer 217 are provided between signal processor 207 and direction estimator 214, and an output from orthogonal code generator 108 is input to output switch 211. Code demultiplexer 217 demultiplexes code-multiplexed received signals on the basis of a determination (or detection) result of the presence or absence of aliasing of a Doppler frequency in aliasing determiner 216.

Hereinafter, an operation of code multiplexing MIMO radar apparatus 1 according to Embodiment 7 will be described focusing on differences from Embodiment 2.

In radar transmitter 100, radar transmission signal generator 101 generates a frequency modulated signal (frequency chirp signal) by using modulated signal generator 122 and VCO 123 as described in Embodiment 2. The generated frequency chirp signal is input to code multiplexer 109 and mixer 224 of reception radio section 203 via directional coupler 124.

In the same manner as in Embodiment 6, orthogonal code generator 108 generates $N_t$ orthogonal code sequences $OCS_{ND} = \{OC_{ND}(1), OC_{ND}(2), \ldots, OC_{ND}(L_{OC})\}$ with orthogonal code length $L_{OC}$. Here, ND is 1, ..., and $N_t$.

For example, orthogonal code generator 108 cyclically makes orthogonal code element index OC_INDEX indicating elements of orthogonal code sequences $OCS_1$ to $OCS_{Nt}$ variable in each radar transmission cycle ($T_r$), and thus outputs elements $OC_1$(OC_INDEX) to $OC_{Nt}$(OC_INDEX) of orthogonal code sequences $OCS_1$ to $OCS_{Nt}$ to first code multiplier 191 #1 to $N_t$-th code multiplier 191 #$N_t$. Orthogonal code generator 108 outputs element index OC_INDEX to output switch 211 of signal processor 207 of radar receiver 200 in each radar transmission cycle ($T_r$).

Here, OC_INDEX is 1, 2, ..., and $L_{OC}$, and OC_INDEX=MOD(M–1,$L_{OC}$)+1 in a$_n$ M-th transmission cycle. MOD(x,y) is a modulo operator, and is a function that outputs a remainder obtained by dividing x by y.

In the same manner as in Embodiment 6, first to $N_t$-th code multipliers 191 respectively multiply elements $OC_1$(OC_INDEX) to $OC_{Nt}$(OC_INDEX) of orthogonal code sequences $OCS_1$ to $OCS_{Nt}$ generated by orthogonal code generator 108 by baseband radar transmission signals (here, frequency chirp signals) in each radar transmission cycle ($T_r$), and output resultants to $N_t$ transmission RF sections 107 #1 to 107 #$N_t$.

In the same manner as in Embodiment 6, each of transmission RF sections 107 #1 to 107 #$N_t$ repeats an operation of transmitting a transmission signal $L_{OC}$ times in the period of $N_p = L_{OC} \times T_r$, $N_c/2$ times, and then does not transmit a transmission signal in transmission gap period $T_{GAP}$.

After transmission gap period $T_{GAP}$ elapses, each of transmission RF sections 107 #1 to 107 #$N_t$ repeats an operation of transmitting a transmission signal $L_{OC}$ times in the period of $N_p = L_{OC} \times T_r$, $N_c/2$ times again.

Through the transmission operations of transmission RF sections 107 #1 to 107 #$N_t$, transmission signals from first transmission RF section 107 #1 to $N_t$-th transmission RF section 107 #$N_t$ are transmitted $L_{OC} \times N_c$ times.

Here, transmission gap period $T_{GAP}$ is set to $N_p/2$ corresponding to ½ of the period of $N_p = L_{OC} \times T_r$ that is a transmission cycle of orthogonal codes corresponding to a sampling cycle in Doppler analyzer 213. In other words, transmission gap period $T_{GAP}$ is $L_{OC} \times T_r/2$.

Outputs from first to $N_t$-th code multipliers 191 are amplified to have predetermined transmission power levels by transmission RF sections 107, and are radiated to the space from respective transmission antennae Tx #1 to Tx #$N_t$ forming transmission array antennae.

Next, a description will be made of an operation of radar receiver 200 exemplified in FIG. 20. In radar receiver 200, an operation or a process from signal reception in each of reception antennae Rx #1 to Rx #$N_a$ forming reception array antennae to signal output in R-FFT section 220 is the same as the operation or the process described in Embodiment 2.

Here, a beat frequency spectrum response output from z-th R-FFT section 220 of z-th signal processor 207, obtained due to M-th chirp pulse transmission, is indicated by AC_RFT$_z$($f_b$,M). Here, fb is an index number of a beat frequency output from R-FFT section 220, and is $f_b = 0, \ldots$, and $N_{data}/2$. Smaller frequency index $f_b$ indicates a beat frequency at which a delay time of a reflected wave becomes shorter (that is, a distance from a target becomes shorter).

Output switch 211 of z-th signal processor 207 selectively switches and outputs an output from R-FFT section 220 in each transmission cycle to OC_INDEX-th Doppler analyzer 213 among $L_{OC}$ Doppler analyzers 213 on the basis of orthogonal code element index OC_INDEX from orthogonal code generator 108.

For example, output switch 211 selects (OC_INDEX=MOD(M–1,$L_{OC}$)+1)-th Doppler analyzer 213 in M-th transmission cycle $T_r$. Output switch 211 non-selects all Doppler analyzers 213 in transmission gap period $T_{GAP}$.

In z-th signal processor 207, a plurality of ($L_{OC}$) Doppler analyzers 213 separately perform Doppler analysis, in twice, on outputs corresponding to $N_c/2$ times of a first half portion before transmission gap period $T_{GAP}$ starts and outputs corresponding to $N_c/2$ times of a second half portion after transmission gap period $T_{GAP}$ ends. In a case where $N_c$ is a power of 2, a FFT process as represented in expressions (6-12) and (6-13) may be applied.

For example, an FFT process on the outputs corresponding to $N_c/2$ times of the first half portion before transmission gap period $T_{GAP}$ starts is represented in expression (6-12).

$$\text{FT\_FH\_CI}_z^{OC\_INDEX}(f_b, f_s, w) = \sum_{q=0}^{N_c/2-1} \text{AC\_RFT}_z \quad \text{(Expression 6-12)}$$

$$(f_b, N_p N_c(w-1) + L_{oc} \times q + \text{OC\_INDEX}) \exp\left[-j\frac{2\pi q f_s}{N_c}\right]$$

An FFT process on the outputs corresponding to $N_c/2$ times of the second half portion after transmission gap period $T_{GAP}$ ends is represented in expression (6-13).

$$\text{FT\_SH\_CI}_z^{OC\_INDEX}(f_b, f_s, w) = \sum_{q=N_c/2}^{N_c-1} \text{AC\_RFT}_z \quad \text{(Expression 6-13)}$$

$$(f_b, N, N_c(w-1) + L_{oc} \times q + \text{OC\_INDEX}) \exp\left[-j\frac{2\pi q f_s}{N_c}\right]$$

Here, $\text{FT\_FH\_CI}_z^{(OC\_INDEX)}(f_b,f_s,w)$ is a w-th output from OC_INDEX-th Doppler analyzer 213 of z-th signal processor 207, and indicates a Doppler frequency response for outputs corresponding to $N_c/2$ times in the first half portion of Doppler frequency index $f_s$ at frequency index $f_b$ before transmission gap period $T_{GAP}$ starts.

Here, $\text{FT\_SH\_CI}_z^{(OC\_INDEX)}(f_b,f_s,w)$ is a w-th output from OC_INDEX-th Doppler analyzer 213 of z-th signal processor 207, and indicates a Doppler frequency response for outputs corresponding to $N_c/2$ times in the second half portion of Doppler frequency index $f_s$ at frequency index $f_b$ after transmission gap period $T_{GAP}$ ends. Here, OC_INDEX is 1 to $L_{OC}$, $f_b$ is 0, . . . , and $N_{data}/2$, and w is an integer of 1 or greater. Here, j is an imaginary number unit. In addition, z is 1, . . . , and $N_a$.

In $\text{FT\_FH\_CI}_z^{(OC\_INDEX)}(f_b,f_s,w)$, an FFT size is No, and $N_c/2$ pieces of data of the second half portion are set to zero (or zero padding). In $\text{FT\_SH\_CI}_z^{(OC\_INDEX)}(f_b,f_s,w)$, an FFT size is No, and $N_c/2$ pieces of data of the first half portion are set to zero.

Therefore, the maximum Doppler frequency not causing aliasing, derived from the sampling theorem, is $\pm 1/(2L_{OC} \times Tr)$. A Doppler frequency interval of Doppler frequency index $f_s$ is $1/\{L_{OC} \times N_c \times T_r\}$, and a range of Doppler frequency index $f_s$ is $f_s = -N_c/2+1, \ldots, 0, \ldots,$ and $N_c/2$.

During the FFT process, a window function coefficient such as a Hann window or a Hamming window may be multiplied, and a window function is used, and thus it is possible to suppress side lobes generated around a beat frequency peak. As the window function coefficient, a window function coefficient having $N_c$ as an FFT size is used, $N_c/2$ window function coefficients of the first half portion are used to calculate $\text{FT\_FH\_CI}_z^{(OC\_INDEX)}(f_b,f_s,w)$, and $N_c/2$ window function coefficients of the second half portion are used to calculate $\text{FT\_SH\_CI}_z^{(OC\_INDEX)}(f_b,f_s,w)$.

Subsequent processes in CFAR section 215, aliasing determiner 216, code demultiplexer 217, and direction estimator 214 correspond to processes in which discrete time k used in Embodiment 6 is replaced with frequency index $f_b$ of a beat frequency.

Through the configuration and the operation, the same effect or advantage as in Embodiment 6 can be achieved in addition to the effect or the advantage described in Embodiment 2.

Embodiment 8

A MIMO radar transmits signals (radar transmission waves) multiplexed by using, for example, time division, frequency division, or code division from a plurality of transmission antennae (also referred to as transmission array antennae), and receives signals (radar reflected waves) reflected at a peripheral object (target) by using a plurality of reception antennae (also referred to as reception array antennae), and demultiplexes the multiplexed transmission signals from the respective received signals. Through the process, the MIMO radar can extract a complex propagation path response represented by a product of the number of transmission antennae and the number of reception antennae, and performs an array signal process on the received signals as a virtual received array.

In the MIMO radar, an element interval in transmission/reception array antennae is appropriately disposed such that an antenna aperture can be virtually increased, and thus it is possible to improve an angle resolution.

For example, PTL 1 discloses a MIMO radar (hereinafter, referred to as a "time division multiplexing MIMO radar") using time division multiplexing in which a transmission time is shifted for each transmission antenna and a signal is transmitted, as a multiplexing transmission method for the MIMO radar. The time division multiplexing transmission may be realized with a simpler configuration than frequency multiplexing transmission or code multiplexing transmission. In the time division multiplexing transmission, an interval between transmission times is sufficiently increased, and thus the orthogonality between transmission signals can be maintained to be favorable. The time division multiplexing MIMO radar outputs a transmission pulse that is an example of a transmission signal while successively switching transmission antennae to each other in a predetermined cycle. The time division multiplexing MIMO radar receives signals of transmission pulses reflected by an object by using a plurality of reception antennae, performs a correlation process between the received signals and the transmission pulses, and then performs, for example, a spatial FFT process (reflected wave arrival direction estimation process).

The time division multiplexing MIMO radar successively performs switching among transmission antennae which will transmit transmission signals (for example, transmission pulses or radar transmission waves) in a predetermined cycle. Therefore, in the time division multiplexing transmission, the time required for completion of transmission of transmission signals from all transmission antennae may be longer than in frequency division transmission or code division transmission. Thus, for example, as in PTL 2, in a case where transmission signals are transmitted from respective transmission antennae, and a Doppler frequency (that is, a relative speed of a target) is detected on the basis of a reception phase change thereof, a time interval (for example, a sampling interval) of observation of the reception phase change is increased when Fourier frequency analysis is performed to detect the Doppler frequency. Therefore, a Doppler frequency range (that is, a range of a detectable target relative speed) in which a Doppler frequency without aliasing can be detected is reduced.

In a case where a received signal from a target exceeding a Doppler frequency range (that is, a relative speed range) in which a Doppler frequency without aliasing can be detected is supposed, a radar apparatus cannot specify whether or not a reflected wave signal includes an aliasing component, and thus the ambiguity (uncertainty) of a Doppler frequency (a relative speed of a target) occurs.

For example, in a case where transmission signals (transmission pulses) are sent while successively switching among Nt transmission antennae in predetermined cycle Tr, a transmission time of Tr×Nt is required to complete transmission of transmission signals from all of the transmission antennae. In a case where such time division multiplexing transmission is repeatedly performed Nc times, and Fourier frequency analysis is applied to detect a Doppler frequency, a Doppler frequency range in which a Doppler frequency without aliasing can be detected is $\pm 1/(2Tr \times Nt)$ according to the sampling theorem. Therefore, a Doppler frequency range in which a Doppler frequency without aliasing can be detected is reduced as the number Nt of transmission antennae is increased, and thus the ambiguity of a Doppler frequency easily occurs.

As one of methods of increasing a Doppler frequency range (that is, a relative speed range or the maximum value of a relative speed), there is a method of not forming a virtual reception array by using a single (one branch) transmission antenna. In this method, a transmission time (transmission cycle) of Tr×Nt can be reduced by the single transmission antenna (Nt=1), and thus it is possible to increase a Doppler frequency range (or the maximum value of a relative speed). However, in this method, an antenna aperture area is reduced, and thus the accuracy of separation and estimation of a distance or an azimuth deteriorates.

As another method of increasing a Doppler frequency range (or the maximum value of a relative speed), there is a method of increasing an element interval of reception antennae by using a single (one branch) transmission antenna. In this method, a transmission time (transmission cycle) of Tr×Nt can be reduced by the single transmission antenna (Nt=1), and thus it is possible to increase a Doppler frequency range (or the maximum value of a relative speed). The element interval of the reception antennae is increased, and thus an antenna aperture area can be increased. However, in this method, a grating lobe increases due to the element interval of the reception antennae, and thus wrong detection (for example, the occurrence of ghost) increases.

Therefore, in an aspect of the present disclosure, a description will be made of a method of increasing a Doppler frequency range (or the maximum value of a relative speed) in which aliasing does not occur (in other words, ambiguity does not occur) while reducing an antenna aperture area or suppressing an increase in a grating lobe. Consequently, in the aspect of the present disclosure, radar apparatus 110 can detect a target with high accuracy in a wider Doppler frequency range.

Hereinafter, an embodiment according to the aspect of the present disclosure will be described in detail with reference to the drawings. In the embodiment, an identical constituent element will be given an identical reference numeral, and a repeated description will be omitted.

Hereinafter, a description will be made of a configuration (in other words, a MIMO radar configuration) in which, in a radar apparatus, different transmission signals that are time-division multiplexed are transmitted from a plurality of transmission antennae in a transmission branch, and each transmission signal is demultiplexed to be subjected to a reception process in a reception branch.

[Configuration of Radar Apparatus]

Figure 21:
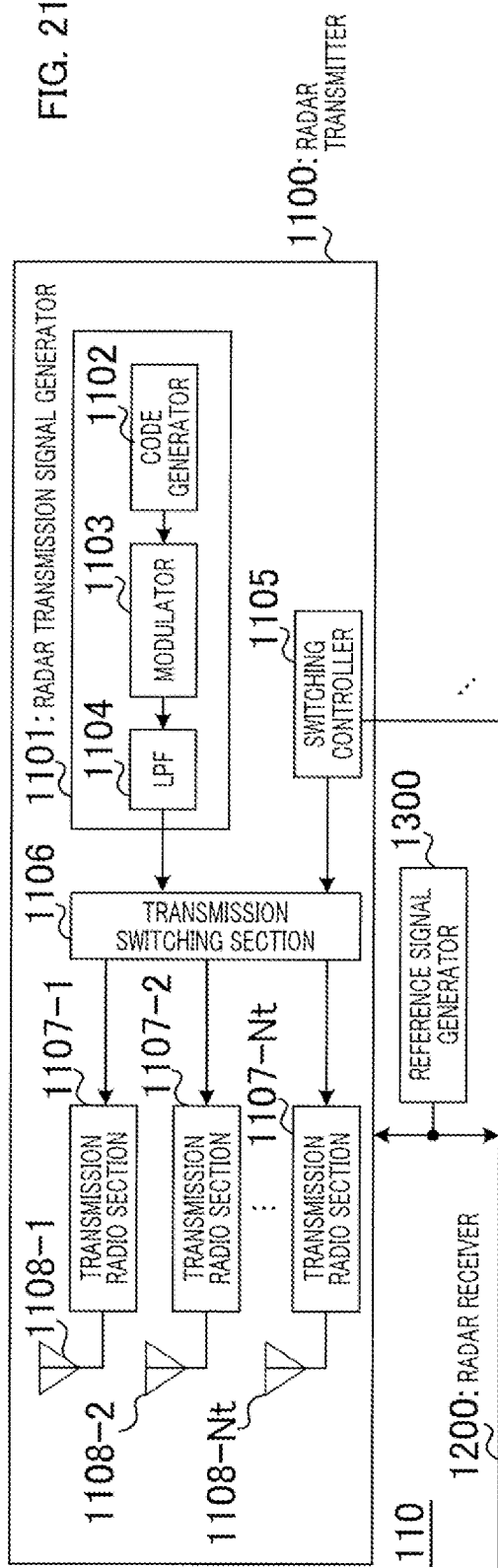
FIG. 21 is a diagram illustrating a configuration example of a radar apparatus according to Embodiment 8.
Figure 21:
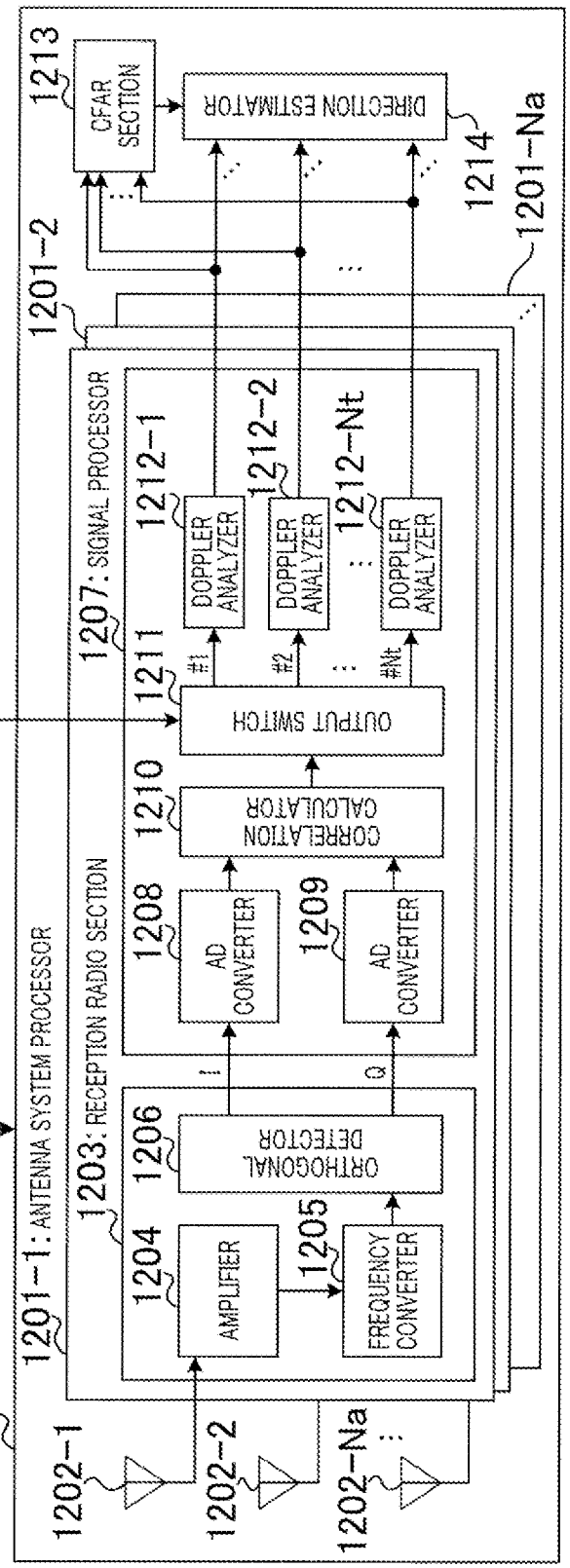

FIG. 21 is a block diagram illustrating a configuration of radar apparatus 110 according to the present embodiment.

Radar apparatus 110 includes radar transmitter (transmission branch) 1100, radar receiver (reception branch) 1200, and reference signal generator 1300.

Radar transmitter 1100 generates a radio frequency radar signal (radar transmission signal) on the basis of a reference signal received from the reference signal generator 1300. Radar transmitter 1100 transmits the radar transmission signal in a predetermined transmission cycle by using transmission array antennae including a plurality of transmission antennae 1108-1 to 1108-Nt.

Radar receiver 1200 receives a reflected wave signal that is the radar transmission signal reflected by a target (not illustrated) by using a plurality of reception antennae 1202-1 to 1202-$N_a$. Radar receiver 1200 performs the following processing operation by using a reference signal received from reference signal generator 1300, and thus performs a process synchronized with radar transmitter 1100. Radar receiver 1200 performs signal processes on a reflected wave signal received by each reception antenna 1202, and thus, for example, detects the presence or absence of a target or estimates an arrival direction of the reflected wave signal.

A target is an object to be detected by radar apparatus 110, and includes, for example, a vehicle (including four-wheeled vehicle and a two-wheeled vehicle), a person, a block, or a curbstone.

Reference signal generator 1300 is connected to radar transmitter 1100 and radar receiver 1200. Reference signal generator 1300 supplies a reference signal to radar transmitter 1100 and radar receiver 1200, and thus synchronizes processes in radar transmitter 1100 and radar receiver 1200 with each other.

[Configuration of Radar Transmitter 1100]

Radar transmitter 1100 includes radar transmission signal generator 1101, switching controller 1105, transmission switch 1106, transmission radio sections 1107-1 to 1107-Nt, and transmission antennae 1108-1 to 1108-Nt. In other words, radar transmitter 1100 has Nt transmission antennae 1108, and transmission antennae 1108 are respectively connected to transmission radio sections 1107.

Radar transmission signal generator 1101 generates a timing clock by multiplying a reference signal received from reference signal generator 1300 by a predetermined number, and generates a radar transmission signal on the basis of the generated timing clock. Radar transmission signal generator 1101 repeatedly outputs a radar transmission signal in a predetermined radar transmission cycle (Tr). The radar transmission signal is expressed by y(k,M)=I(k,M)+jQ(k,M). Here, j indicates an imaginary number unit, k indicates a discrete time, and M indicates an ordinal number of the radar transmission cycle. I(k,M) and Q(k,M) respectively indicate an in-phase component and a quadrature component of radar transmission signal (k,M) at discrete time k in the M-th radar transmission cycle.

Radar transmission signal generator 1101 includes code generator 1102, modulator 1103, and low-pass filter (LPF) 1104. Hereinafter, each constituent element of radar transmission signal generator 1101 will be described.

Specifically, code generator 1102 generates codes $a_n(M)$ (where n=1, . . . , and L) (pulse codes) of a code sequence with code length L in each radar transmission cycle Tr. As codes $a_n(M)$ generated in code generator 1102, codes causing, for example, low range side lobe characteristics to be obtained are used. As the code sequence, for example, Barker codes, M-sequence codes, or Gold codes may be used.

Modulator 1103 performs pulse modulation (amplitude modulation, amplitude shift keying (ASK), or pulse shift keying) or phase modulation (phase shift keying) on a pulse code sequence (for example, codes $a_n(M)$) received from code generator 1102, and outputs a modulated signal to LPF 1104.

LPF 1104 outputs a signal component in a predetermined limited band or less in the modulated signal received from modulator 1103, to transmission switch 1106 as a baseband radar transmission signal.

Figure 22:
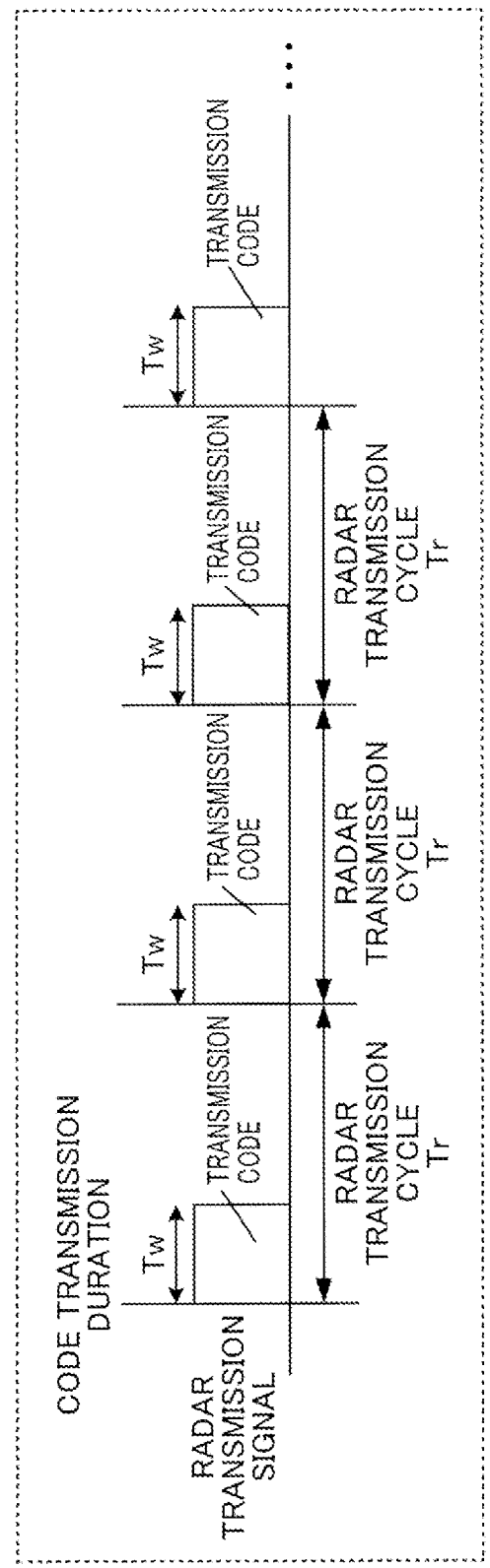
FIG. 22 is a diagram illustrating an example of a radar transmission signal according to Embodiment 8.

FIG. 22 illustrates an example of a radar transmission signal generated by radar transmission signal generator 1101. As illustrated in FIG. 22, a pulse code sequence with code length L is included in code transmission duration Tw of radar transmission cycle Tr. The pulse code sequence is transmitted in code transmission duration $T_w$ of each radar transmission cycle Tr, and remaining duration (Tr-Tw) is non-signal duration. A single code includes L sub-pulses. Pulse modulation using No samples is performed on each sub-pulse, and thus Nr (=No×L) sample signals are included in each code transmission duration Tw. Nu samples are included in non-signal duration (Tr-Tw) of radar transmission cycle Tr.

Switching controller 1105 controls transmission switch 1106 of radar transmitter 1100 and output switch 1211 of radar receiver 1200. A control operation for output switch 1211 of radar receiver 1200 in switching controller 1105 will be described later in a description of an operation of radar receiver 1200. Hereinafter, a description will be made of a control operation for transmission switch 1106 of radar transmitter 1100 in switching controller 1105.

Switching controller 1105 outputs, to transmission witching section 1106, a control signal (hereinafter, referred to as a "switching control signal") for switching among transmission antennae 1108 (in other words, transmission radio sections 1107) in each radar transmission cycle Tr.

Transmission switch 1106 performs a switching operation of outputting a radar transmission signal that is input from radar transmission signal generator 1101 to transmission radio section 1107 indicated by a switching control signal that is input from switching controller 1105. For example, transmission switch 1106 selects one from among the plurality of transmission radio sections 1107-1 to 1107-Nt and performs switching to the selected transmission radio section on the basis of the switching control signal, and outputs a radar transmission signal to the selected transmission radio section 1107.

z-th (where z=1, . . . , and Nt) transmission radio section 1107 performs frequency conversion on the baseband radar transmission signal output from transmission switch 1106, thus generates a radar transmission signal in a carrier frequency (radio frequency (RF)), amplifies the radar transmission signal to have predetermined transmission power P [dB] with a transmission amplifier, and outputs the radar transmission signal to z-th transmission antenna 1108.

z-th (where z=1, . . . , and $N_t$) transmission antenna 1108 radiates the radar transmission signal output from z-th transmission radio section 1107 to the space.

Figure 23:
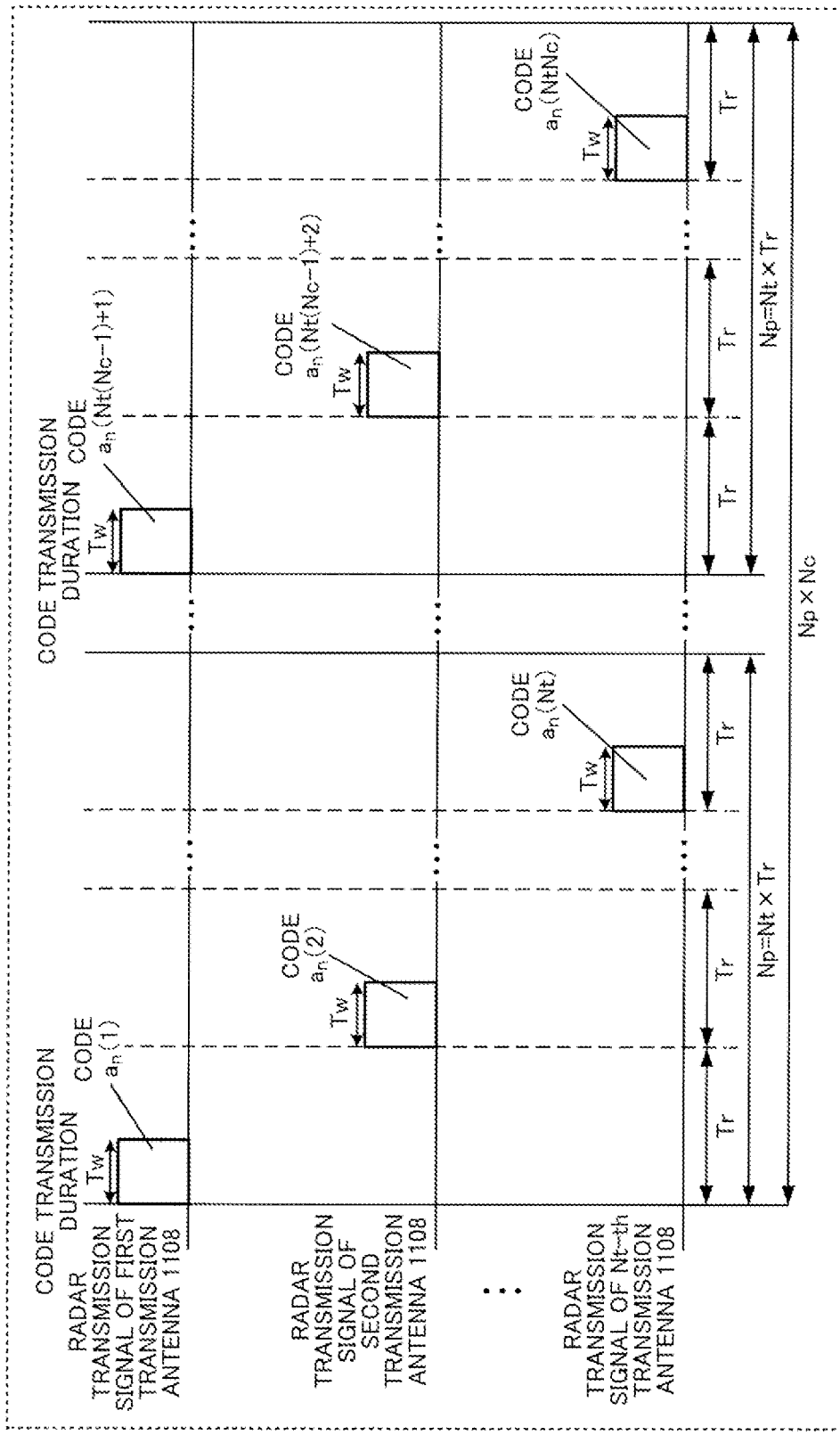
FIG. 23 is a diagram illustrating an example of a transmission switching operation according to Embodiment 8.

FIG. 23 illustrates an example of a switching operation of transmission antenna 1108 according to the present embodiment. A switching operation of transmission antenna 1108 according to the present embodiment is not limited to the example illustrated in FIG. 23.

In FIG. 23, switching controller 1105 outputs a switching control signal indicating an instruction for sequentially switching from first transmission antenna 1108 (or transmission radio section 1107-1) to Nt-th transmission antenna 1108 (or transmission radio section 1107-Nt) to transmission switch 1106 in each radar transmission cycle Tr. Therefore, radar transmission signals are respectively transmitted from transmission antennae including first transmission antenna 1108 to Nt-th transmission antenna 1108 at a transmission interval of the cycle of Np (=Nt×Tr).

Switching controller 1105 performs control of repeating a switching operation of transmission radio section 1107 Nc times in antenna switching cycle Np.

A transmission start time for a transmission signal of each transmission radio section 1107 may not be synchronized with cycle Tr. For example, different transmission delays $\Delta_1$, $\Delta_2$, . . . , and $\Delta_{Nt}$ may be respectively provided for transmission start time points of respective transmission radio sections 1107, and radar transmission signals may be transmitted. In a case where transmission delays $\Delta_1, \Delta_2, \ldots$, and $\Delta_{Nt}$ are provided, in a process performed by radar receiver 1200 which will be described later, correction coefficients in which transmission delays $\Delta_1, \Delta_2, \ldots$, and $\Delta_{Nt}$ are taken into consideration may be introduced to transmission phase correction coefficients, and thus it is possible to remove the influence that different Doppler frequencies cause different phase rotations. Transmission delays $\Delta_1, \Delta_2, \ldots$, and $\Delta_{Nt}$ may be changed whenever a target is measured. Consequently, in a case where interference is received from other radar apparatuses (not illustrated), or interference is given to other radar apparatuses, it is possible to mutually randomize influences of interference with other radar apparatuses.

Figure 24:
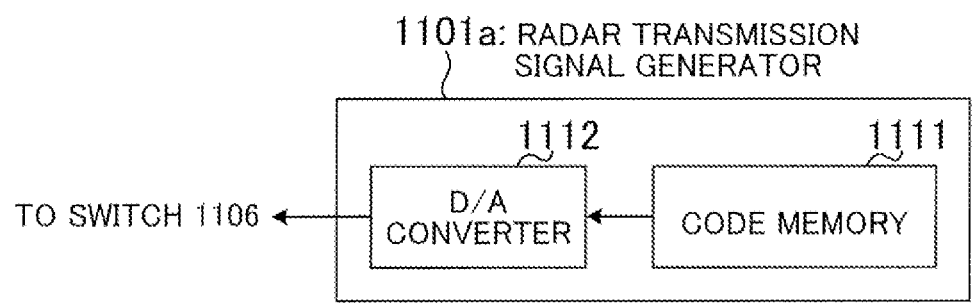
FIG. 24 is a block diagram illustrating another configuration example of a radar transmission signal generator according to Embodiment 8.

Radar transmitter 1100 may include radio signal generator 1101a illustrated in FIG. 24 instead of radar transmission signal generator 1101. Radio signal generator 1101a includes code memory 1111 and D/A converter 1112 instead of code generator 1102, modulator 1103, and LPF 1104 illustrated in FIG. 21. Code memory 1111 stores in advance a code sequence generated in code generator 1102 (FIG. 21), and cyclically and sequentially reads the stored code sequence. D/A converter 1112 converts the code sequence (digital signal) output from code memory 1111 into an analog signal (baseband signal).

[Configuration of Radar Receiver 1200]

In FIG. 21, radar receiver 1200 includes Na reception antenna 1202 to configure array antennae. Radar receiver 1200 includes $N_a$ antenna system processors 1201-1 to 1201-Na, CFAR section 1213, and direction estimator 1214.

Each of reception antenna 1202 receives a reflected wave signal that is a radar transmission signal reflected at a target, and outputs the received reflected wave signal to corresponding antenna system processor 1201 as a received signal.

Each of antenna system processors 1201 includes reception radio section 1203 and signal processor 1207.

Reception radio section 1203 includes amplifier 1204, frequency converter 1205, and quadrature detector 1206. Reception radio section 1203 generates a timing clock obtained by multiplying a reference signal received from reference signal generator 1300 by a predetermined number, and operates on the basis of the generated timing clock. Specifically, amplifier 1204 amplifies a received signal that is received from reception antenna 1202 to have a predetermined level, frequency converter 1205 frequency-converts a received signal in a radio frequency band into a received signal in a baseband band, and quadrature detector 1206 converts the received signal in the baseband band into baseband received signals including an I signal and a Q signal.

Signal processor 1207 of each of antenna system processors 1201-z (where z is any one of 1 to $N_a$) includes A/D converters 1208 and 1209, correlation calculator 1210, output switch 1211, and Doppler analyzers 1212-1 to 1212-Nt.

An I signal is input to A/D converter 1208 from quadrature detector 1206, and a Q signal is input to A/D converter 1209 from quadrature detector 1206. A/D converter 1208 performs sampling at a discrete time on a baseband signal including the I signal, and thus converts the I signal into digital data. A/D converter 1209 performs sampling at a discrete time on a baseband signal including the Q signal, and thus converts the Q signal into digital data.

Here, in sampling performed by A/D converters 1208 and 1209, Ns discrete samples are generated per time Tp (=Tw/L) of a single sub-pulse in a radar transmission signal. In other words, the number of oversamples per sub-pulse is Ns.

In the following description, baseband received signals at discrete time k in M-th radar transmission cycle Tr[M] as outputs from A/D converters 1208 and 1209 are represented by complex number signal $x_z(k,M)=I_z(k,M)+jQ_z(k,M)$ by using I signal $I_z(k,M)$ and Q signal $Q_z(k,M)$ (where z is any one of 1 to $N_a$). Hereinafter, discrete time k uses a timing at which radar transmission cycle $T_r$ starts as a reference (k=1), and signal processor 1207 periodically operates up to k=(Nr+Nu)Ns/No that is a sample point before radar transmission cycle Tr ends. In other words, k is 1, . . . , and (Nr+Nu)Ns/No. Here, j is an imaginary number unit.

Correlation calculator 1210 of z-th (where z=1, . . . , and Na) signal processor 1207 performs correlation calculation between discrete sample value $x_z(k,M)$ including discrete sample values $I_z(k,M)$ and $Q_z(k,M)$ received from A/D converters 1208 and 1209 and pulse codes $a_n(M)$ (where z=1, . . . , and $N_a$, and n=1, . . . , and L) with code length L transmitted from radar transmitter 1100 in each radar transmission cycle $T_r$. For example, correlation calculator 1210 performs sliding correlation calculation between discrete sample value $x_z(k,M)$ and pulse codes $a_n(M)$. For example, correlation calculation value ACz(k,M) obtained through the sliding correlation calculation at discrete time k in M-th radar transmission cycle Tr[M] is calculated on the basis of the following expression.

$$AC_z(k, M) = \sum_{n=1}^{L} x_z(k + N_s(n - 1), M)a_n(M)^* \quad \text{(Expression 54)}$$

In the expression, the asterisk (*) indicates a complex conjugate operator.

Correlation calculator 1210 performs correlation calculation over periods of k=1, . . . , and (Nr+Nu)Ns/No according to expression (54).

Figure 25:
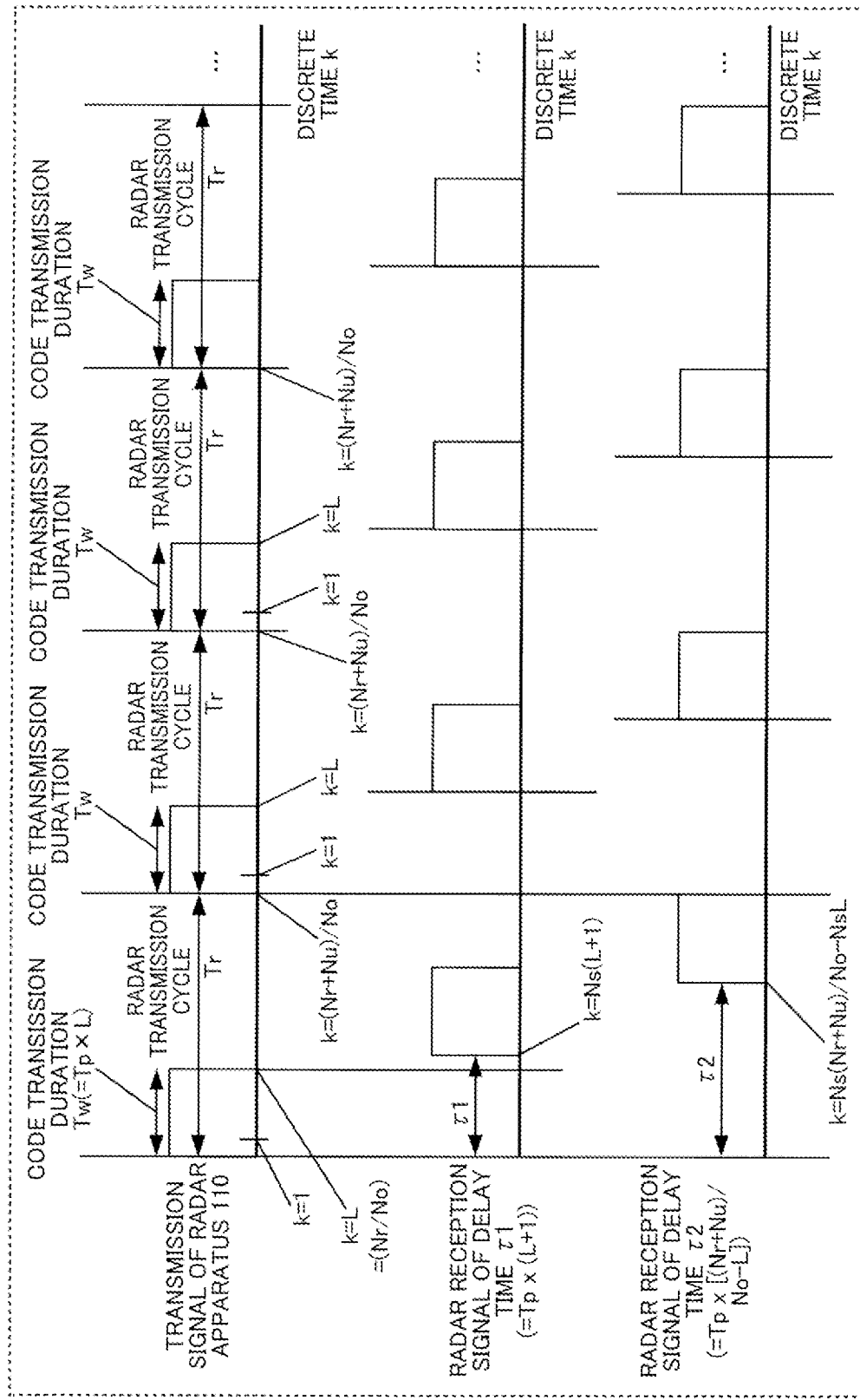
FIG. 25 is a diagram illustrating examples of a transmission timing of a radar transmission signal and a measurement range according to Embodiment 8.

Correlation calculator 1210 is not limited to performing correlation calculation at k=1, . . . , and (Nr+Nu)Ns/No, and may restrict a measurement range (that is, a range of k) according to a range in which a target to be measured by radar apparatus 110 is present. Consequently, in radar apparatus 110, a calculation process amount of correlation calculator 1210 can be reduced. For example, correlation calculator 1210 may restrict a measurement range to k=Ns(L+1), . . . , and (Nr+Nu)Ns/No−NsL. In this case, as illustrated in FIG. 25, radar apparatus 110 does not perform measurement in duration corresponding to code transmission duration Tw.

Consequently, even in a case where a radar transmission signal directly sneaks to radar receiver 1200, correlation calculator 1210 does not perform a process in a period (at least a period less than at least τ1) in which the radar transmission signal is sneaking, and thus radar apparatus 110 can perform measurement excluding the influence of sneaking. In a case where a measurement range (a range of k) is restricted, a process in which the measurement range (the range of k) is restricted may also be applied to processes in output switch 1211, Doppler analyzer 1212, CFAR section 1213, and direction estimator 1214 described below. Consequently, a process amount in each constituent element can be reduced, and thus it is possible to reduce power consumption in radar receiver 1200.

Output switch 1211 selectively switches and outputs an output from correlation calculator 1210 in each radar transmission cycle Tr to one of Nt Doppler analyzers 1212 on the basis of a switching control signal that is input from switching controller 1105. Hereinafter, as an example, a switching control signal in M-th radar transmission cycle Tr[M] is represented by Nt-bit information [$bit_1(M), bit_2(M), \ldots,$ and $bit_{Nt}(M)$]. For example, in a case where, in the switching control signal in M-th radar transmission cycle Tr[M], an ND-th bit (where ND is any one of 1 to $N_t$) is "1", output switch 1211 selects ND-th Doppler analyzer 1212 (that is, turns on Doppler analyzer 1212). On the other hand, in a case where, in the switching control signal in M-th radar transmission cycle Tr[M], the ND-th bit is "0", output switch 1211 non-selects ND-th Doppler analyzer 1212 (that is, turns off Doppler analyzer 1212). Output switch 1211 outputs correlation calculation value $AC_z(k,M)$ that is input from correlation calculator 1210, to selected Doppler analyzer 1212.

For example, an $N_t$-bit switching control signal corresponding to a switching operation for transmission radio sections 1107 (or transmission antennae 1108) illustrated in FIG. 23 is as follows.

[$bit_1(1), bit_2(1), \ldots, bit_{Nt}(1)$]=[1,0, . . . ,0]

[$bit_1(2), bit_2(2), \ldots, bit_{Nt}(2)$]=[0,1, . . . ,0]

[$bit_1(Nt), bit_2(Nt), \ldots, bit_{Nt}(Nt)$]=[0,0, . . . ,1]

As described above, respective Doppler analyzers 1212 are sequentially selected (that is, turned on) in the cycle of $N_p$ (=Nt×Tr). The switching control signal repeats the content Nc times.

z-th (where z=1, . . . , and Na) signal processor 1207 includes Nt Doppler analyzers 1212.

Doppler analyzer 1212 performs Doppler analysis on an output (for example, correlation calculation value $AC_z(k, M)$) from output switch 1211 at each discrete time k. For example, in a case where $N_c$ is a power of 2, a fast Fourier transform (FFT) process may be applied in the Doppler analysis.

For example, among w-th outputs from ND-th Doppler analyzers 1212 of z-th signal processor 1207, an output in overlapping virtual reception arrays which will be described later indicates Doppler frequency response $FT\_CI_z^{(ND)}(k,f_s,w)$ of Doppler frequency index $f_s$ at discrete time k as indicated by the following expression. ND is 1 to Nt, k is 1, . . . , and (Nr+Nu)Ns/No, and w is an integer of 1 or greater. $N_{pa}$ indicates the number of antennae corresponding to overlapping virtual reception arrays, and N indicates the number of times of transmission within one cycle. In addition, j is an imaginary number unit, and z is 1 to Na.

$$\text{FT\_CI}_z^{(ND)}(k, f_s, w) = \sum_{q=0}^{N_{va}N_c-1} \text{bit}_{N_D}(q+1)$$

$$AC_z(k, NN_c(w-1) + q + 1)\exp\left[-j\frac{2\pi\left\lfloor\frac{N_{va}q}{N}\right\rfloor f_s}{N_{va}N_c}\right]$$

(Expression 55)

Figure 27:
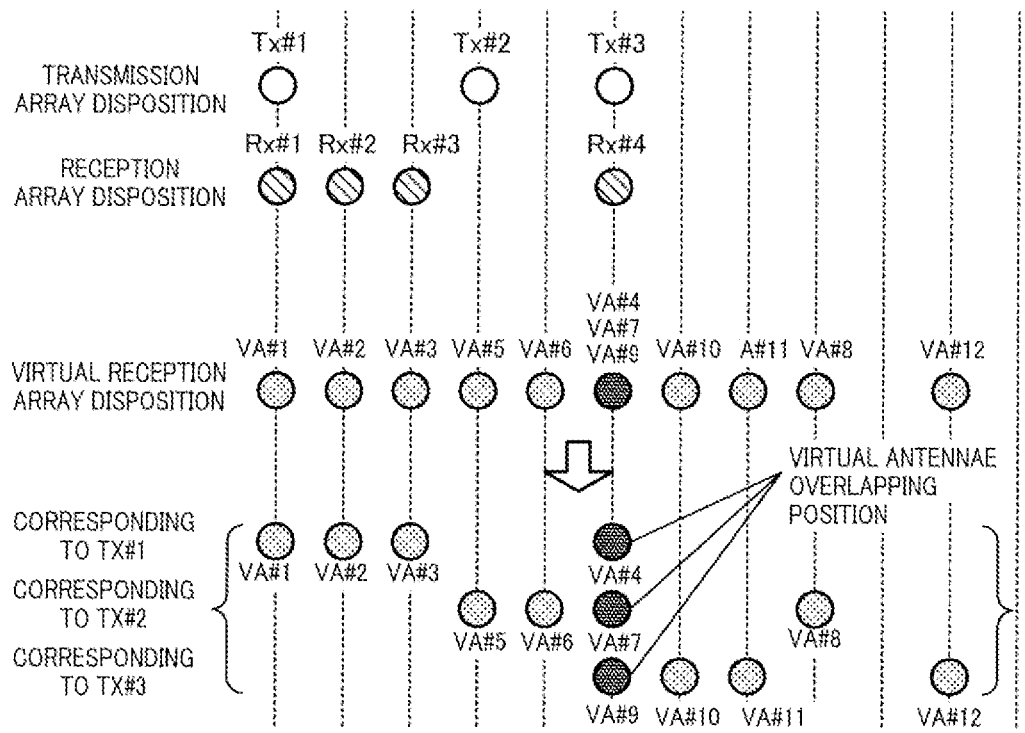
FIG. 27 is a diagram illustrating antenna disposition according to Embodiment 8.
Figure 28:
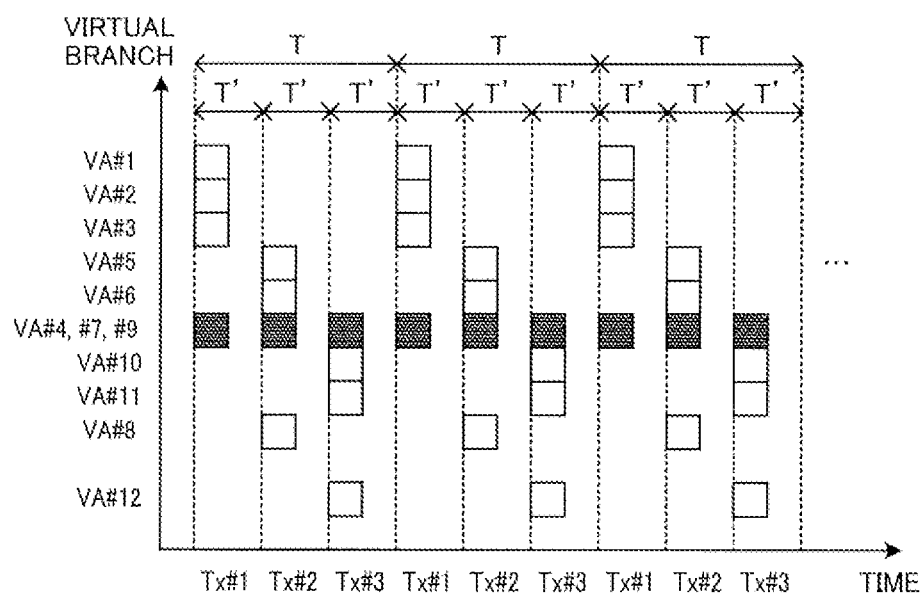
FIG. 28 is a diagram illustrating an example of a reception timing of each virtual antenna according to Embodiment 8.

As an example, a description will be made of a case (details thereof will be described later) of using antenna disposition and a transmission interval illustrated in FIGS. 27 and 28. In FIGS. 27 and 28, a set (VA #4, VA #7, and VA #9) of overlapping virtual reception arrays are sampled in cycle T'. Thus, in a case where ND is 1, 2, and 3, and z is 4, 3, and 1, expression (55) is represented by the following expression. In expression (56), $N_{va}$ is 3, and N is 3.

$$\text{FT\_CI}_z^{(ND)}(k, f_s, w) = \sum_{q=0}^{3N_c-1} \text{bit}_{N_D}(q+1)$$

$$AC_z(k, N_tN_c(w-1) + q + 1)\exp\left[-j\frac{2\pi q f_s}{3N_c}\right]$$

(Expression 56)

As another example, a description will be made (details thereof will be described later) of using antenna disposition and a transmission interval illustrated in FIGS. 29, 30, 31, and 32. In FIGS. 29, 30, 31, and 32, a set (VA #11 and VA #18) of overlapping virtual reception arrays are sampled in the cycle of T'=3Tr. Thus, in a case where ND is 2 and z is 3, and ND is 3 and z is 2, expression (55) is represented by the following expression. In expression (57), $N_{va}$ is 2, and N is 6.

$$\text{FT\_CT}_z^{(ND)}(k, f_s, w) = \sum_{q=0}^{2N_c-1} \text{bit}_{N_D}(q+1)$$

$$AC_z(k, N_tN_c(w-1) + q + 1)\exp\left[-j\frac{2\pi\left\lfloor\frac{q}{3}\right\rfloor f_s}{2N_c}\right]$$

(Expression 57)

On the other hand, for example, among w-th outputs from ND-th Doppler analyzers 1212 of z-th signal processor 1207, an output in non-overlapping virtual reception arrays except the overlapping virtual reception arrays indicates Doppler frequency response FT_CI$_z$(D)(k,f$_u$,w) of Doppler frequency index $f_u$ at discrete time k as indicated by the following expression. ND is 1 to Nt, k is 1, . . . , and (Nr+Nu)Ns/No, and w is an integer of 1 or greater. In addition, j is an imaginary number unit, and z is 1 to Na.

$$\text{FT\_CI}_z^{(ND)}(k, f_u, w) = \sum_{q=0}^{N_c-1} \text{bit}_{N_D}N1(q+1)$$

$$AC_z(k, N, N_c(w-1) + q + 1)\exp\left[-j\frac{2\pi\left\lfloor\frac{q}{N_t}\right\rfloor f_u}{N_c}\right]$$

(Expression 58)

During the FFT process, Doppler analyzer 1212 may multiply a window function coefficient such as a Hann window or a Hamming window. The window function coefficient is used, and thus it is possible to suppress side lobes generated around a frequency peak.

As mentioned above, the process in each constituent element of signal processor 1207 has been described.

In FIG. 21, CFAR section 1213 performs a constant false alarm rate (CFAR) process (that is, adaptive threshold value determination) by using an output from Doppler analyzer 1212, and extracts discrete time index k$_{\_cfar}$ and Doppler frequency index f$_{s\_cfar}$ providing a peak signal.

For example, CFAR section 1213 performs the CFAR process by using outputs FT_CI$_z^{(ND)}$(k,f$_s$,w) corresponding to overlapping virtual reception arrays (details thereof will be described later) from Doppler analyzers 1213 of respective antenna system processors 1201-1 to 1201-Na.

CFAR section 1213 performs index conversion such that Doppler frequency index f$_{s\_cfar}$ corresponding to the overlapping virtual reception arrays is made to correspond to Doppler frequency index f$_u$ of outputs FT_CI$_z^{(ND)}$(k,f$_s$,w) from Doppler analyzers 1213 other than the overlapping virtual reception arrays. The index conversion may be performed according to expressions (59) and (60). CFAR section 1213 outputs Doppler frequency index f$_{s\_cfar}$ subjected to the index conversion to direction estimator 1214.

Here, $f_{s\_car}$=−(Nt−1)Nc/2+1, . . . , 0, . . . , and (Nt−1)Nc/2, and $f_{u\_cfar}$=−Nc/2+1, . . . , 0, . . . , and Nc/2.

In case of $f_{s\_cfar}$≥0:

$$f_{u\_cfar} = f_{s\_cfar} - \left\lfloor\frac{f_{s\_cfar} + N_c/2 - 1}{N_c}\right\rfloor \times N_c$$

(Expression 59)

In case of $f_{s\_cfar}$<0:

$$f_{u\_cfar} = f_{s\_cfar} + \left\lfloor\frac{-f_{s\_cfar} + N_c/2}{N_c}\right\rfloor \times N_c$$

(Expression 60)

Hereinafter, Doppler frequency index f$_{s\_cfar}$ having a wide Doppler frequency range will be referred to as wide-range Doppler frequency index f$_{s\_cfar}$. Doppler frequency index f$_u$ having a narrow Doppler frequency range will be referred to as narrow-range Doppler frequency index f$_u$. When wide-range Doppler frequency index f$_{s\_cfar}$ is made to correspond to narrow-range Doppler frequency index f$_a$, overlapping may occur.

For example, in a case where Doppler frequency index α in the range of 0≤α≤Nc/2 is included in wide-range Doppler frequency index f$_{s\_cfar}$, conversion into a occurs through index conversion for correspondence to narrow-range Doppler frequency index f$_u$. Here, in a case where β=+−Nc is also included in wide-range Doppler frequency index f$_{s\_cfar}$, β is included in the range of −Nc≤β≤−Nc/2, and thus conversion into 3+N$_c$=a occurs through index conversion for correspondence to narrow-range Doppler frequency index f$_u$. Therefore, in index conversion for making wide-range Doppler frequency index f$_{s\_cfar}$ correspond to narrow-range Doppler frequency index f$_u$, overlapping occurs.

Similarly, in a case where β=α+N$_c$ is also included in wide-range Doppler frequency index f$_{s\_cfar}$, β is included in the range of Nc≤β≤3Nc/2, and thus conversion into β+Nc=α occurs through index conversion for correspondence to narrow-range Doppler frequency index f$_u$. Therefore, in index conversion for making wide-range Doppler frequency index f$_{s\_cfar}$ correspond to narrow-range Doppler frequency index f$_u$, overlapping occurs.

As mentioned above, α and β having a relationship of |α−β| being an integer multiple of Nc are included in wide-range Doppler frequency index $f_{s\_cfar}$, overlapping occurs when being made to correspond to narrow-range Doppler frequency index $f_u$.

In a case where overlapping occurs in narrow-range Doppler frequency index $f_u$, a signal component of narrow-range Doppler frequency index $f_u$ is in a state of being mixed with signals with other Doppler frequency components. As power levels of the mixed signals become closer to each other, an amplitude phase component varies, and thus angle measurement accuracy in direction estimator 1214 in the subsequent stage may deteriorate. Therefore, in the present embodiment, overlapping determination process is introduced. Consequently, the influence to cause deterioration in angle measurement accuracy in direction estimator 1214 is suppressed. Next, the overlapping determination process will be described.

<Overlapping Determination Process>

Among wide-range Doppler frequency indexes $f_{s\_cfar}$ extracted through the CFAR process, Doppler frequency index α and Doppler frequency index β are subjected to index conversion for correspondence to Doppler frequency indexes $f_u$ of w-th outputs $FT\_CI_z^{(ND)}(k,f_u,w)$ from Doppler analyzers 1212 corresponding to non-overlapping virtual reception arrays. In a case where overlapping occurs in converted Doppler frequency index $f_{s\_cfar}$, processes in the following (B1) to (B3) are performed.

(B1) CFAR section 1213 compares a power sum of $FT\_CI_1^{(ND)}(k,\alpha,w), \ldots,$ and $FT\_CI_{Na}^{(ND)}(k,\alpha,w)$ with a power sum of $FT\_CI_1^{(ND)}(k,\beta,w), \ldots,$ and $FT\_CI_{Na}^{(ND)}(k,\alpha,w)$, which are the w-th outputs from Doppler analyzers 1212 corresponding to overlapping virtual reception arrays.

(B2) In a case where there is a power difference of a predetermined value (for example, about 6 dB to 10 dB) or greater as a result of the power sum comparison in (B1), CFAR section 1213 makes a Doppler frequency index with higher power of Doppler frequency indexes α and β valid, and excludes a Doppler frequency index with lower power from an output target to direction estimator 1214.

(B3) In a case where there is no power difference of the predetermined value or greater as a result of the power sum comparison in (B1), CFAR section 1213 excludes both of Doppler frequency indexes α and β from an output target to direction estimator 1214.

As mentioned above, a description has been made of the process in CFAR section 1213. Radar apparatus 110 may perform a direction estimation process in direction estimator 1214 without perform a CFAR process.

In FIG. 21, direction estimator 1214 performs a target direction estimation process by using an output from each Doppler analyzer 1212 on the basis of information (for example, discrete time index $k_{cfar}$, and Doppler frequency indexes $f_{s\_cfar}$ and $f_{u\_cfar}$) that is input from CFAR section 1213.

For example, direction estimator 1214 generates virtual reception array correlation vector $h(k,f_s,w)$ as represented in expression (61), and performs a direction estimation process.

Hereinafter, a sum of the w-th outputs from Doppler analyzers 1212-1 to 1212-$N_t$ obtained through identical processes in respective signal processors 1207 of antenna system processors 1201-1 to 1201-$N_a$ is represented by virtual reception array correlation vector $h(k_{cfar}, f_{cfar}, w)$ including Nt×Na elements corresponding to a product of the number Nt of transmission antennae and the number Na of reception antennae, as represented in expression (61). Virtual reception array correlation vector $h(k_{cfar}, f_{cfar}, w)$ is used for a process of performing direction estimation based on a phase difference between respective reception antennae 1202 on received signals from a target. Here, z is 1, . . . , and Na, and ND is 1, . . . , and Nt.

$$h(k_{cfar}, f_{cfar}, w) = \begin{bmatrix} h_{cal[1]}FT\_CI_1^{(1)}(k_{cfar}, f_{cfar}, w)TxCAL^{(1)}(f_{cfar}) \\ h_{cal[2]}FT\_CI_2^{(1)}(k_{cfar}, f_{cfar}, w)TxCAL^{(1)}(f_{cfar}) \\ \vdots \\ h_{cal[Na]}FT\_CI_{Na}^{(1)}(k_{cfar}, f_{cfar}, w)TxCAL^{(1)}(f_{cfar}) \\ h_{cal[Na+1]}FT\_CI_1^{(2)}(k_{cfar}, f_{cfar}, w)TxCAL^{(2)}(f_{cfar}) \\ h_{cal[Na+2]}FT\_CI_2^{(2)}(k_{cfar}, f_{cfar}, w)TxCAL^{(2)}(f_{cfar}) \\ \vdots \\ h_{cal[2Na]}FT\_CI_{Na}^{(2)}(k_{cfar}, f_{cfar}, w)TxCAL^{(2)}(f_{cfar}) \\ \vdots \\ h_{cal[Na(Nt-1)+1]}FT\_CI_1^{(Nt)}(k_{cfar}, f_{cfar}, w)TxCAL^{(Nt)}(f_{cfar}) \\ h_{cal[Na(Nt-1)+2]}FT\_CI_2^{(Nt)}(k_{cfar}, f_{cfar}, w)TxCAL^{(Nt)}(f_{cfar}) \\ \vdots \\ h_{cal[NaNt]}FT\_CI_{Na}^{(Nt)}(k_{cfar}, f_{cfar}, w)TxCAL^{(Nt)}(f_{cfar}) \end{bmatrix}$$

(Expression 61)

In expression (61), $h_{cal[b]}$ is an array correction value for correcting a phase deviation and an amplitude deviation between the transmission antennae and between the reception antennae. In addition, b is 1, . . . , and Nt×Na. In expression (61), $f_{cfar}$ is $f_{s\_cfar}$ in a set (ND,z) of overlapping virtual reception arrays, and $f_{cfar}$ is $f_{u\_cfar}$ in a set (ND,z) of non-overlapping virtual reception arrays.

Switching among transmission antennae 1108 is performed in a time division manner, and thus different phase rotations occur at different Doppler frequencies f. $TxCAL^{(1)}(f), \ldots,$ and $TxCAL^{(Nt)}(f)$ are transmission phase correction coefficients for correcting the phase rotations to match a phase of a reference transmission antenna.

For example, in a case where first transmission antenna 1108 (ND=1) is used as a reference transmission antenna in correspondence with a switching operation of transmission radio sections 1107 (or transmission antennae 1108) in FIG. 23, the transmission phase correction coefficients are represented by the following expression.

$$TxCAL^{(1)}(f_s) = 1, \; TxCAL^{(2)}(f_s) = \exp\left(-j\frac{2\pi f}{Nc}\frac{1}{Nt}\right),$$

(Expression 62)

-continued $$TxCAL^{(N_t)}(f_s) = \exp\left(-j\frac{2\pi f}{Nc}\frac{Nt-1}{Nt}\right)$$

In a case where different transmission delays $\Delta_1$, $\Delta_2$, ..., and $\Delta_{Nt}$ are respectively provided for transmission start time points for transmission signals of respective transmission radio sections 1107, a result of multiplying transmission phase correction coefficient $TxCAL^{(ND)}(f)$ represented in expression (62) by correction coefficient $\Delta T_{xCAL}^{(ND)}(f)$ represented in expression (63) may be used as new transmission phase correction coefficient $TxCAL^{(ND)}(f)$. Consequently, it is possible to eliminate the influence of different phase rotations due to Doppler frequencies. Here, ND of $\Delta T_{xCAL}^{(ND)}(f)$ is a reference transmission antenna number used as a phase reference.

$$\Delta_{TxCAL}^{(ND)}(f)\exp\left(-j\frac{2\pi f}{Nc}\frac{\Delta_{ND}-\Delta_{ref}}{N_p}\right) \quad \text{(Expression 63)}$$

Virtual reception array correlation vector $h(k_{\_cfar}, f_{s\_cfar}, w)$ is a column formed of Na×Nt elements.

Direction estimator 1214 calculates a space profile by making azimuthal direction θ in direction estimation evaluation function value $P_H(\theta_{BEAM\_cfar}, k_{\_cfar}, f_{s\_cfar}, w)$ variable within a predetermined angle range, extracts a predetermined number of maximum peaks of the calculated space profile in a descending order, and outputs azimuthal directions of the maximum peaks as arrival direction estimation values.

Direction estimation evaluation function value $P_H(\theta_{BEAM\_cfar}, k_{\_cfar}, f_{s\_cfar}, w)$ is obtained in various methods according to an arrival direction estimation algorithm. For example, an estimation method using array antennae disclosed in NPL 3 may be used.

For example, in a case where Nt×Na virtual reception array antennae are linearly disposed at equal interval $d_H$, a beam former method may be represented by the following expression. Methods such as Capon or MUSIC may also be applied.

$$a(\theta_u) = \begin{bmatrix} 1 \\ \exp\{-j2\pi d_H \sin\theta_u/\lambda\} \\ \vdots \\ \exp\{-j2\pi(N_tN_a-1)d_H\sin\theta_u/\lambda\} \end{bmatrix} \quad \text{(Expression 65)}$$

Here, the superscript H in Expression (64) is an Hermitian transpose operator. In addition, $a(\theta_u)$ indicates a direction vector of a virtual reception array for an arrival wave in azimuthal direction $\theta_u$.

Azimuthal direction $\theta_u$ is a vector obtained by changing an azimuth range subjected to arrival direction estimation at predetermined azimuth interval $\beta_1$. For example, $\theta_u$ is set as follows.

$\theta_u = \theta \min + u\beta_1$, and $u=0, \ldots$, and NU

NU=floor[(θ max−θ min)/$\beta_1$]+1

Here, floor(x) is a function that returns the maximum integer value not exceeding real number x.

Time information k may be converted into distance information that is then output. The following expression may be used to convert time information k into distance information R(k). Here, Tw indicates code transmission duration, L indicates a pulse code length, and $C_0$ indicates a light speed.

$$R(k)=kT_wC_0/2L \quad \text{(Expression 66)}$$

The Doppler frequency information may be converted into a relative speed component that is then output. The following expression may be used to convert Doppler frequency index $f_s$ into relative speed component $v_d(f_s)$. Here, λ is a wavelength of a carrier frequency of an RF signal output from transmission radio section 1107. $\Delta_f$ is a Doppler frequency interval in an FFT process performed by Doppler analyzer 1212. For example, in the present embodiment, $\Delta_f$ is 1/(NtNcTr).

$$v_d(f_s) = \frac{\lambda}{2}f_s\Delta_f \quad \text{(Expression 67)}$$

As mentioned above, a description has been made of the operation of direction estimator 1214.

[Operation of Radar Apparatus 110]

A description will be made of an operation of radar apparatus 110 having the configuration.

Nt transmission antennae 1108 (transmission arrays) and Na reception antennae 1202 (reception arrays) are disposed to satisfy the following (condition 1), and are subjected to switching among transmission timings in order to satisfy the following (condition 2).

(Condition 1) Among Nt×Na antenna elements (referred to as virtual antennae or virtual branches) forming virtual reception arrays, transmission antennae 1108 and reception antennae 1202 are disposed such that disposition positions of at least two virtual antennae are the same as each other (or overlap each other).

(Condition 2) A transmission interval between radar transmission signals that are sequentially transmitted from transmission antennae 1108 respectively corresponding to virtual antennae of which disposition positions overlap each other is an equal interval.

First, regarding (condition 2), a transmission timing of a radar transmission signal will be described.

Figure 26A:
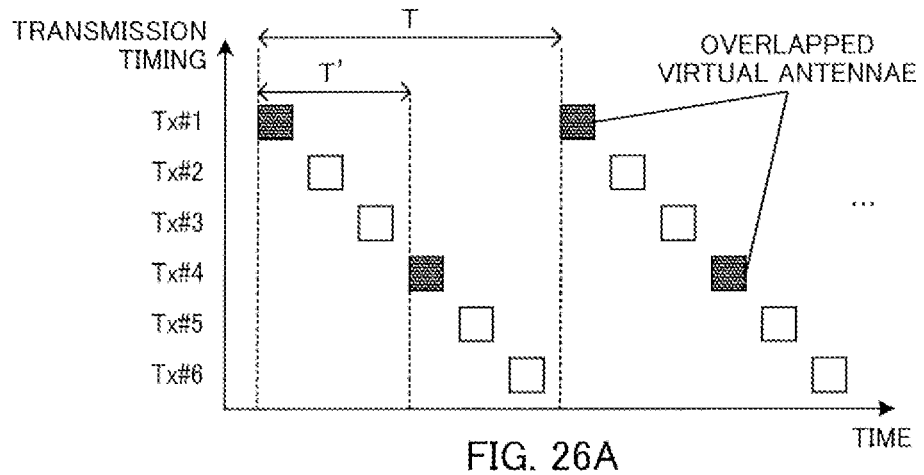
FIG. 26A is a diagram illustrating an example of a transmission timing according to Embodiment 8.
Figure 26B:
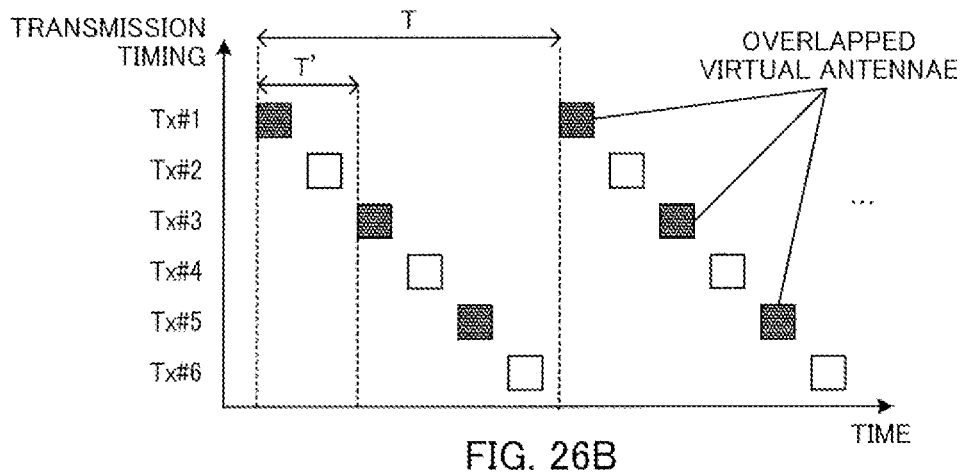
FIG. 26B is a diagram illustrating an example of a transmission timing according to Embodiment 8.
Figure 26C:
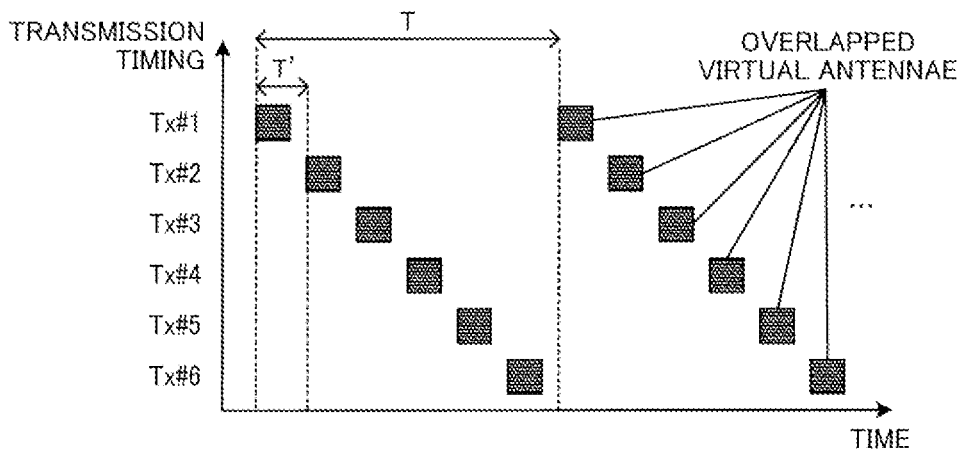
FIG. 26C is a diagram illustrating an example of a transmission timing according to Embodiment 8.

FIGS. 26A, 26B, and 26C illustrate examples of transmission timings of radar transmission signals from a plurality of transmission antennae 1108. In FIGS. 26A, 26B, and 26C, as an example, the number Nt of transmission antennae 1108 is six (for example, Tx #1 to Tx #6).

In a case where N transmission timings (that is, the number of times of transmission) are present in transmission cycle T (for example, T=Tr×Nt) of each transmission antenna 1108, transmission interval (in other words, transmission cycle) T' of each of transmission antennae corresponding to virtual antennae of which disposition positions overlap each other is (1) one cycle for the number of times of transmission corresponding to a divisor of N within one transmission cycle T or (2) N cycles (that is, the whole number of times of transmission) for N times in order to satisfy (condition 2).

For example, as in FIGS. 26A, 26B, and 26C, at N=6 (divisors: 2 and 3), and one transmission cycle T=6T$_r$, transmission cycle T' of transmission antenna corresponding to virtual antennae of which disposition positions overlap each other is any one of one cycle (that is, T'=T/2) for three times of transmission as illustrated in FIG. 26A, one cycle (that is, T'=T/3) for two times of transmission as illustrated in FIG. 26B, and N cycles (that is, T'=T/6) for N times as illustrated in FIG. 26C.

For example, in radar apparatus 110, transmission cycle T' is set according to the number of transmission antennae (for example, the number of divisors of N, or N) corresponding to virtual antennae of which disposition positions overlap each other.

For example, as illustrated in FIG. 26A, in a case where transmission antennae 1108 corresponding to virtual antennae of which disposition positions overlap each other are two antennae (a divisor of N=6) such as Tx #1 and Tx #4, transmission interval T' of Tx #1 and Tx #4 is T/2. Therefore, radar apparatus 110 may set a sampling interval in the virtual antennae of which disposition positions overlap each other to transmission interval T'=T/2 of Tx #1 and Tx #4 in a reception process.

For example, as illustrated in FIG. 26B, in a case where transmission antennae 1108 corresponding to virtual antennae of which disposition positions overlap each other are three antennae (a divisor of N=6) such as Tx #1, Tx #3, and Tx #5, transmission interval T' of Tx #1, Tx #3, and Tx #5 is T/3. Therefore, radar apparatus 110 may set a sampling interval in the virtual antennae of which disposition positions overlap each other to transmission interval T'=T/3 of Tx #1, Tx #3, and Tx #5 in a reception process.

For example, as illustrated in FIG. 26C, in a case where transmission antennae 1108 corresponding to virtual antennae of which disposition positions overlap each other are all antennae (a divisor of N=6) such as Tx #1 to Tx #6, transmission interval T' of Tx #1 to Tx #6 is T/6. Therefore, radar apparatus 110 may set a sampling interval in the virtual antennae of which disposition positions overlap each other to transmission interval T'=T/6 of Tx #1 to Tx #6 in a reception process.

For example, in a case where a sampling interval is set to transmission interval T of each transmission antennae 1108, the relative speed maximum value is represented by $v_{max}=\lambda/4T$. Here, $\lambda$ indicates a wavelength of a carrier frequency, and T indicates a sampling interval.

In contrast, for example, in FIG. 26A, in a case where a sampling interval in virtual antennae of which disposition positions overlap each other is set to transmission interval T'=T/2, the relative speed maximum value is represented by $v'_{max}=\lambda/4T'=2v_{max}$. Similarly, for example, in FIG. 26B, in a case where a sampling interval in virtual antennae of which disposition positions overlap each other is set to transmission interval T'=T/3, the relative speed maximum value is represented by $v'_{max}=\lambda/4T'=3v_{max}$. Similarly, for example, in FIG. 26C, in a case where a sampling interval in virtual antennae of which disposition positions overlap each other is set to transmission interval T'=T/6, the relative speed maximum value is represented by $v'_{max}=\lambda/4T'=6v_{max}$.

As mentioned above, in FIGS. 26A, 26B, and 26C, transmission intervals of radar transmission signals that are sequentially transmitted from a plurality of transmission antennae 1108 corresponding to virtual antennae of which disposition positions overlap each other are an equal interval, and thus relative speed maximum value $v'_{max}$ (or a Doppler frequency range) becomes a multiple of a divisor of N or N times as great as the relative speed maximum value $v_{max}$ (or a Doppler frequency range) based on transmission interval T of each transmission antenna 1108. Therefore, radar apparatus 110 can increase a Doppler frequency at which a Doppler frequency without aliasing can be detected and thus to prevent the occurrence of ambiguity of a Doppler frequency.

Radar apparatus 110 transmits radar transmission signals in a predetermined transmission pattern by using a plurality of transmission antennae 1108. For example, a transmission pattern (in other words, a switching pattern indicated by a switching control signal) of transmission antennae 1108 transmitting radar transmission signals at a plurality of transmission timings (for example, N times) within transmission cycle T is repeated in each transmission cycle T. In radar apparatus 110, a transmission pattern (in other words, a switching pattern indicated by a switching control signal) of transmission antennae 1108 transmitting radar transmission signals at a plurality of transmission timings (for example, N times) within transmission cycle T is repeated in each transmission cycle T.

Next, regarding (condition 1), a description will be made of a specific example of antenna disposition according to the present embodiment. Hereinafter, as an example, a description will be made of disposition example 1 and disposition example 2 that are specific examples of antenna disposition.

Disposition Example 1

In disposition example 1, a description will be made of a case where transmission antennae 1108 and reception antennae 1202 are disposed in a one-dimensional manner.

FIG. 27 illustrates an example of antenna disposition related to disposition example 1.

In FIG. 27, the number $N_t$ of transmission antennae 1108 is three (for example, Tx #1, Tx #2, and Tx #3), and the number $N_a$ of reception antennae 1202 is four (for example, Rx #1, Rx #2, Rx #3, and Rx #4).

In FIG. 27, for example, an interval between Tx #1 and Tx #3 is the same as an interval between Rx #1 and Rx #4. In FIG. 27, for example, an interval between Tx #3 and Tx #2 is the same as an interval between Rx #1 and Rx #3.

In this case, as illustrated in FIG. 27, in virtual reception array disposition (VA #1 to VA #12 of Nt×Na=12), virtual antenna VA #4 formed of Tx #1 and Rx #4, virtual antenna VA #7 formed of Tx #2 and Rx #3, and virtual antenna VA #9 formed of Tx #3 and Rx #1 are disposed to overlap each other at an identical position.

For example, radar apparatus 110 performs switching among transmission timings of respective transmission antennae 1108 such that transmission intervals of transmission antennae Tx #2 and Tx #3 respectively corresponding to virtual antennae VA #7 and VA #9 disposed to overlap each other at an identical position are an equal interval. For example, FIG. 28 illustrates reception timings (in other words, transmission timings of respective transmission antennae 1108) of reflected wave signals in respective virtual antennae (VA #1 to VA #12) in a case where transmission timings of radar transmission signals are subjected to successive switching in the same manner as in FIG. 23 in Tx #1, Tx #2, and Tx #3 illustrated in FIG. 27.

As illustrated in FIG. 28, radar transmission signals are transmitted in transmission interval T' in an order of Tx #1, Tx #2, and Tx #3. Transmission interval T of a radar transmission signal transmitted from each transmission antenna 1108 is 3T' (that is, T'=T/3).

Therefore, in FIG. 28, in the same manner as in FIG. 26C, radar transmission signals are transmitted from transmission antennae 1108 (for example, Tx #1, Tx #2, and Tx #3) corresponding to virtual antennae (VA #4, VA #7, and VA #9) of which disposition positions overlap each other for all of transmission timings N=3 of radar transmission signals within transmission cycle T (for example, T=Tr×Nt) of each transmission antenna 1108.

As illustrated in FIG. 28, radar apparatus 110 receives reflected wave signals corresponding to radar transmission signals transmitted from Tx #1, Tx #2, and Tx #3 in respective transmission intervals T'.

Here, in FIG. 28, virtual antennae VA #4, VA #7, and VA #9 of which disposition positions overlap each other will be focused. As illustrated in FIG. 28, a received signal is received by any one of virtual antennae VA #4, VA #7, and VA #9 in each transmission cycle T'. Specifically, radar apparatus 110 receives a reflected wave signal in VA #4 at the transmission timing of Tx #1, receives a reflected wave signal in VA #7 at the transmission timing of Tx #2, and receives a reflected wave signal in VA #9 at the transmission timing of Tx #3. In other words, radar apparatus 110 can receive a reflected wave signal in a virtual antenna at an identical position at each transmission timing without waiting for reception of a reflected wave signal in transmission cycle T of each transmission antenna 1108. Radar apparatus 110 performs Doppler analysis by using signals received in virtual antennae VA #4, VA #7, and VA #9.

As mentioned above, radar apparatus 110 can receive a reflected wave signal in a virtual antenna disposed at an identical position in each transmission interval T'. Therefore, for example, in FIG. 28, radar apparatus 110 may set sampling interval T' to T''=T/3 at disposition positions of virtual antennae VA #4, VA #7, and VA #9.

For example, in a case where a sampling interval is set to transmission interval T of each transmission antenna 1108, the relative speed maximum value is represented by $v_{max}=\lambda/4T$. Here, λ indicates a wavelength of a carrier frequency. In contrast, as illustrated in FIG. 28, in a case where a sampling interval in virtual antennae VA #4, VA #7, and VA #9 is set to transmission interval T'=T/3, the relative speed maximum value is represented by $v'_{max}=\lambda/4T'=3v_{max}$.

Consequently, in disposition example 1, relative speed maximum value $v'_{max}$ (or a Doppler frequency range) becomes three times as great as relative speed maximum value $v_{max}$ based on transmission interval T of each transmission antenna 1108.

Disposition Example 2

In disposition example 2, a description will be made of a case where transmission antennae 1108 and reception antennae 1202 are disposed in a two-dimensional manner, and an arrival direction is estimated in a three-dimensional manner.

Figure 29:
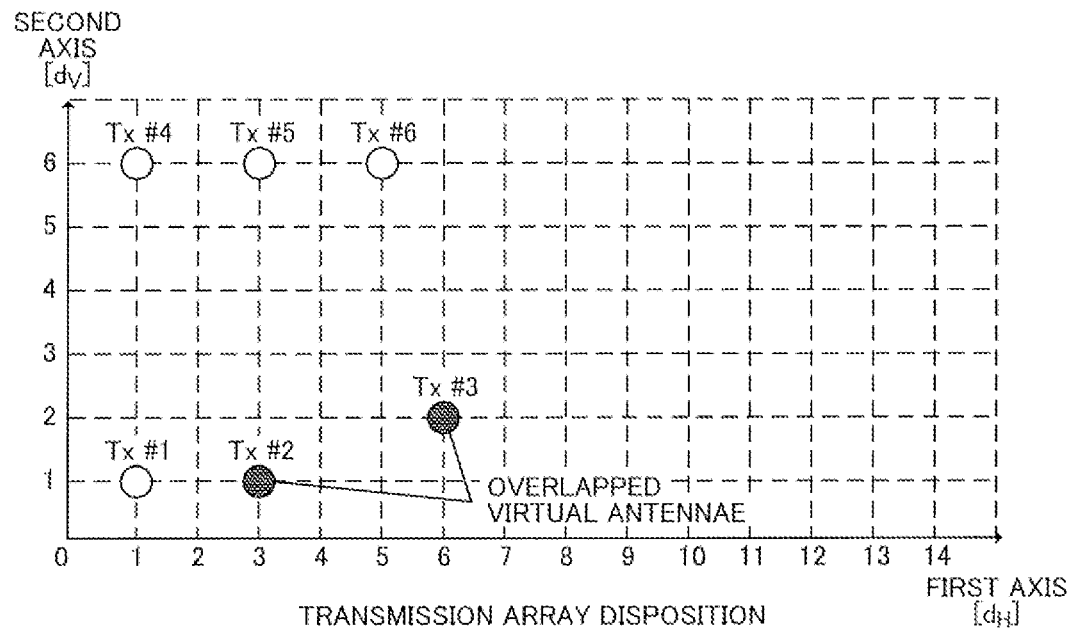
FIG. 29 is a diagram illustrating an example of transmission antenna disposition according to Embodiment 8.
Figure 30:
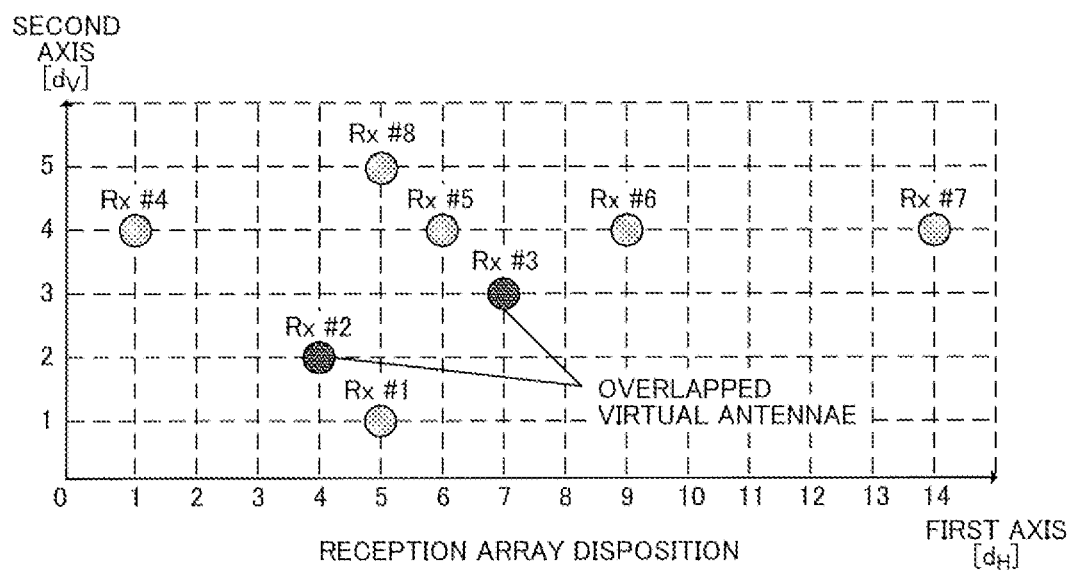
FIG. 30 is a diagram illustrating reception antenna disposition according to Embodiment 8.
Figure 31:
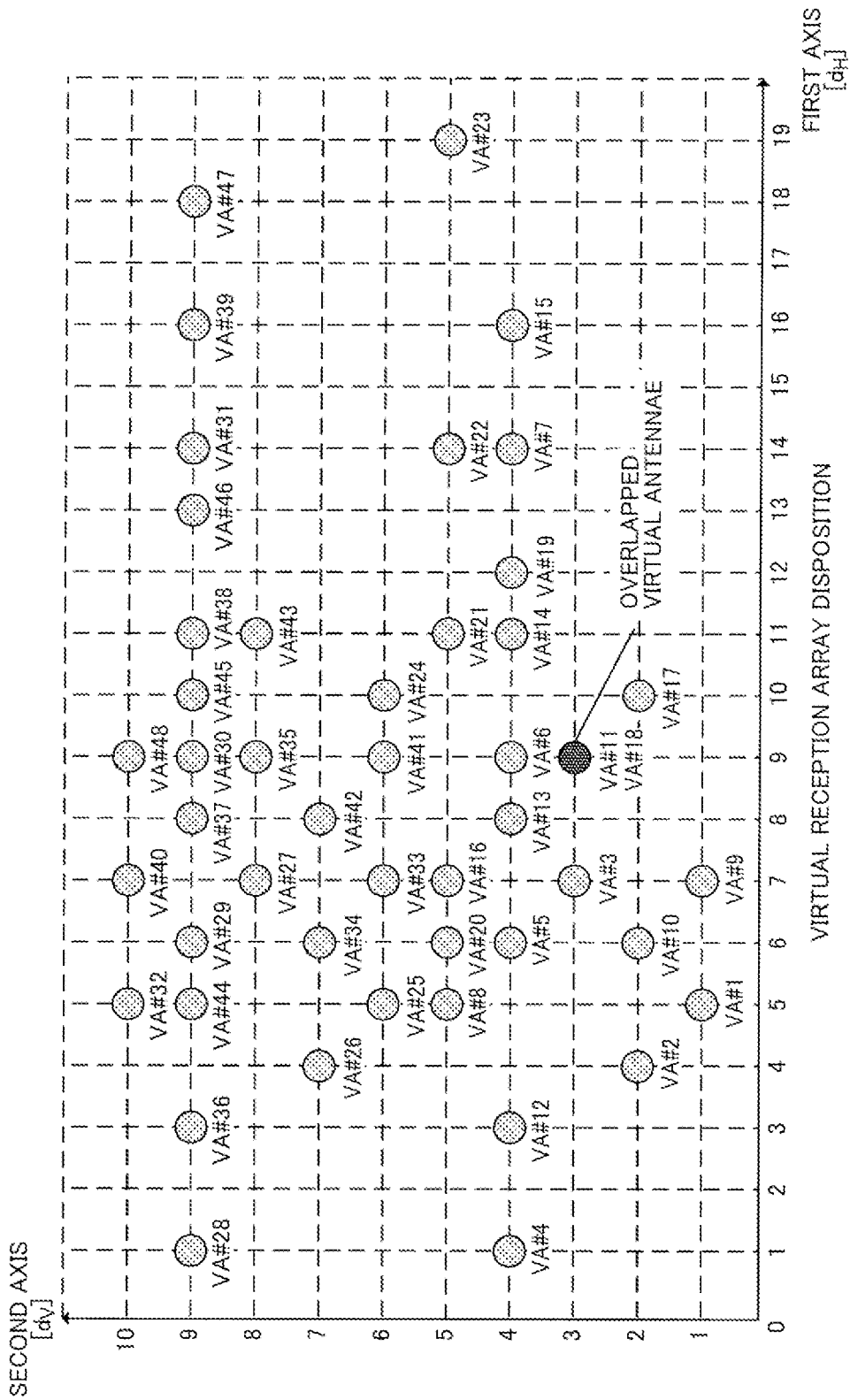
FIG. 31 is a diagram illustrating virtual reception array disposition according to Embodiment 8.

FIG. 29 illustrates a disposition example of transmission antennae 1108 related to disposition example 2, and FIG. 30 illustrates a disposition example of reception antennae 1202 related to disposition example 2. FIG. 31 illustrates a disposition example of virtual reception arrays formed of transmission antennae 1108 illustrated in FIG. 29 and reception antennae 1202 illustrated in FIG. 30.

In FIG. 29, the number $N_t$ of transmission antennae 1108 is six (for example, Tx #1 to Tx #6), and, in FIG. 30, the number $N_a$ of reception antennae 1202 is eight (Rx #1 to Rx #8).

As illustrated in FIGS. 29 and 30, transmission antennae 1108 and reception antennae 1202 are disposed in a two-dimensional manner in a direction of a first axis and a direction of a second axis orthogonal to the first axis. For example, a two-dimensional disposition relationship of Tx #2 and Tx #3 illustrated in FIG. 29 is the same as a two-dimensional disposition relationship of Rx #8 and Rx #6 illustrated in FIG. 30.

In this case, as illustrated in FIG. 31, in virtual reception array disposition (VA #1 to VA #48 of Nt×Na=48), virtual antenna VA #11 formed of Tx #2 and Rx #3 and virtual antenna VA #18 formed of Tx #3 and Rx #2 are disposed to overlap each other at an identical position.

Figure 32:
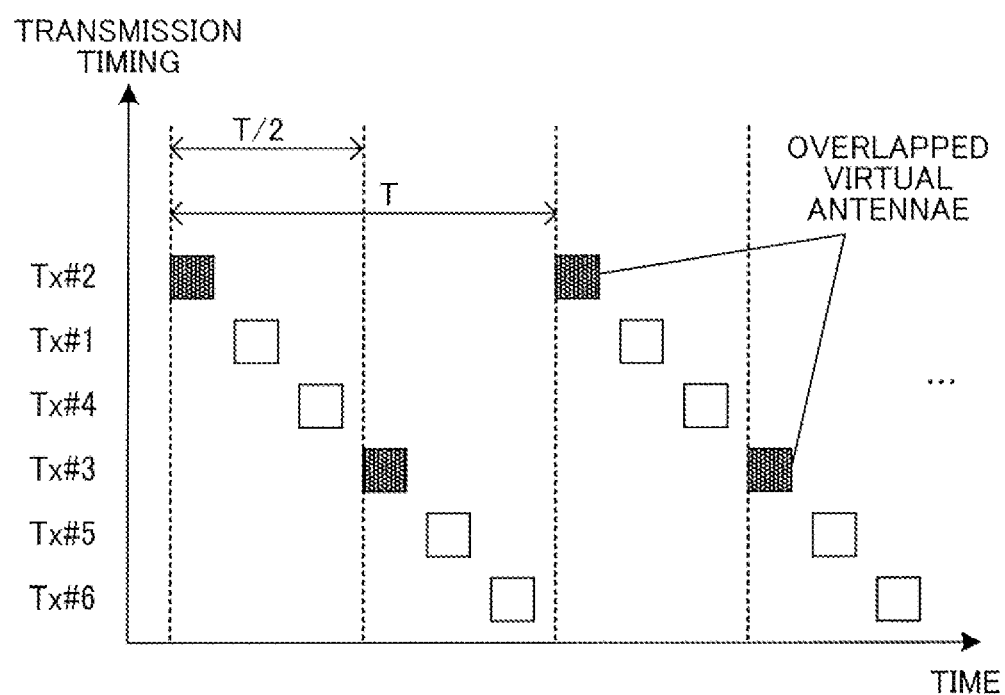
FIG. 32 is a diagram illustrating an example of a reception timing of each virtual antenna according to Embodiment 8.

For example, radar apparatus 110 performs switching among transmission timings of respective transmission antennae 1108 such that transmission intervals of transmission antenna Tx #2 and Tx #3 respectively corresponding to virtual antennae VA #11 and VA #18 disposed to overlap each other at an identical position are an equal interval. FIG. 32 illustrates an example of a transmission timing of each transmission antenna 1108 for each virtual antennae (VA #1 to VA #12) illustrated in FIG. 31.

In FIG. 32, radar transmission signals are transmitted in an order of Tx #2, Tx #1, Tx #4, Tx #3, Tx #5, and Tx #6 in transmission cycle T (for example, $T=6T_r$) of each transmission antenna 1108. Therefore, as illustrated in FIG. 32, transmission intervals T' of Tx #2 and Tx #3 are T/2, and are thus an equal interval. In FIG. 32, transmission intervals of Tx #2 and Tx #3 may be T/2, and a transmission order of respective transmission antennae 1108 is not limited to the order illustrated in FIG. 32.

Therefore, in FIG. 32, in the same manner as in FIG. 26A, radar transmission signals are transmitted from transmission antennae 1108 (for example, Tx #2 and Tx #3) corresponding to virtual antennae (VA #11 and VA #18) of which disposition positions overlap each other for two times that is a divisor of N of transmission timings N=6 of radar transmission signals within transmission cycle T (for example, T=Tr×Nt) of each transmission antenna 1108.

Radar apparatus 110 receives reflected wave signals respectively corresponding to radar transmission signals transmitted from Tx #2 and Tx #3 corresponding to VA #11 and VA #18 in transmission interval T/2 in virtual antennae VA #11 and VA #18 of which disposition positions overlap each other. In other words, radar apparatus 110 can receive a reflected wave signal in a virtual antenna at an identical position at each transmission interval T'=T/2 without waiting for reception of a reflected wave signal in transmission cycle T of each transmission antenna 1108. Radar apparatus 110 performs Doppler analysis by using signals received in virtual antennae VA #11 and VA #18.

As mentioned above, radar apparatus 110 can receive a reflected wave signal in a virtual antenna disposed at an identical position in each transmission interval T'. Therefore, for example, in FIG. 32, radar apparatus 110 may set sampling interval T' to T''=T/2 at disposition positions of virtual antennae VA #11 and VA #18.

For example, in a case where a sampling interval is set to transmission interval T of each transmission antenna 1108, the relative speed maximum value is represented by $v_{max}=\lambda/4T$. Here, λ indicates a wavelength of a carrier frequency. In contrast, as illustrated in FIGS. 31 and 32, in a case where a sampling interval in virtual antennae VA #11 and VA #18 is set to transmission interval T'=T/2, the relative speed maximum value is represented by $v'_{max}=\lambda/4T'=2v_{max}$.

Consequently, in disposition example 2, relative speed maximum value $v'_{max}$ (or a Doppler frequency range) becomes twice as great as relative speed maximum value $v_{max}$ based on transmission interval T of each transmission antenna 1108.

As mentioned above, a description has been made of disposition example 1 and disposition example 2 of antenna disposition.

Antenna disposition (for example, the number $N_t$ or $N_a$ of antennae or disposition positions) is not limited to the examples illustrated in FIGS. 27, 29, and 30, and may be antenna disposition satisfying the above (condition 1).

Here, for example, the virtual reception arrays illustrated in FIG. 27 is a partially vacant state in which a gap between VA #8 and VA #12 is wider than a gap between other virtual antennae. In the present embodiment, for example, transmission antennae 1108 and reception antennae 1202 may be disposed such that the number of locations in a partially vacant state is one or less in virtual reception arrays. Consequently, it is possible to prevent an increase in a level (that is, an unallowable level) of a side lobe or a grating lobe due to the partially vacant state.

Other disposition examples of antenna disposition will be described later in Variation 4.

As mentioned above, in the present embodiment, in radar apparatus 110, among virtual reception arrays including a plurality of virtual antennae formed by using a plurality of transmission antennae 1108 and a plurality of reception antennae 1202, disposition positions of at least two virtual antennae are the same as each other. In radar apparatus 110, among the plurality of transmission antennae 1108, transmission intervals of radar transmission signals of transmission antennae 1108 corresponding to at least two virtual antennae of which disposition positions are the same as each other are set to an identical interval.

Consequently, radar apparatus 110 can receive reflected wave signals in the virtual antennae at transmission timings of the plurality of transmission antennae 1108 corresponding to the virtual antennae of which disposition positions are the same as each other. Therefore, radar apparatus 110 can reduce a reception interval in a single virtual antenna more than a transmission interval in single transmission antenna 1108. Therefore, radar apparatus 110 can reduce a sampling interval in the virtual antenna, and can thus increase a Doppler frequency range (or the relative speed maximum value).

In radar apparatus 110, transmission antennae 1108 and reception antennae 1202 are disposed such that disposition positions of virtual antennae respectively corresponding to transmission antennae 1108 overlap each other by using the plurality of transmission antennae 1108. As an example, in FIG. 27, in a case where a single transmission antenna (one branch) such as Tx #1 and four reception antennae (Rx #1 to Rx #4) are used, as described above, a transmission interval (that is, a sampling interval) can be reduced, but $a_n$ antenna aperture length is a four-antenna length. In contrast, in the present embodiment, three transmission antennae (three branches) such as Tx #1 to Tx #3 and four reception antennae (Rx #1 to Rx #4) are used, and thus a sampling interval can be reduced, and also an antenna aperture length is a ten-antenna length.

Consequently, in the present embodiment, in radar apparatus 110, it is possible to realize an increase of the Doppler frequency range while increasing an antenna aperture area (or an antenna aperture length) compared with a case of using a single transmission antenna.

In the present embodiment, disposition positions of virtual antennae corresponding to a plurality of transmission antennae 1108 overlap each other, and thus a reception interval in the virtual antennae is reduced such that a Doppler frequency range is increased. Therefore, in the present embodiment, for example, since an element interval of reception antennae 1202 is not increased in order to secure an antenna aperture area, it is possible to suppress the occurrence of a grating lobe and thus to suppress an increase in wrong detection (for example, the occurrence of a ghost).

As mentioned above, according to the present embodiment, it is possible to increase a Doppler frequency range (or the relative speed maximum value) in which aliasing does not occur (in other words, ambiguity does not occur) while reducing an antenna aperture area or suppressing an increase in a grating lobe. Consequently, radar apparatus 110 can detect a target (for example, an arrival direction) with high accuracy in a wider Doppler frequency range.

Variation 1 of Embodiment 8

In a case where N transmission timings (that is, the number of times of transmission) are present in transmission cycle T of each transmission antenna 1108, transmission interval (or transmission cycle) T' of each of transmission antennae corresponding to virtual antennae of which disposition positions overlap each other is (1) one cycle for the number of times of transmission corresponding to divisors of N or (2) the cycle of the whole N times of transmission.

In Variation 1, a description will be made of a case where the number $N_t$ (for example, N times of transmission) of transmission antennae 1108 is a prime number, and a divisor of N is not present.

In Variation 1, in a case where Nt is a prime number, for example, a number that is not a prime number and is greater than Nt is set as N. For example, in a case where Nt is 5, "6" that is a value (Nt+1) greater than Nt by 1 is set as N. Transmission intervals between transmission antennae 1108 corresponding to virtual antennae of which disposition positions overlap each other can be made an equal interval.

In a case where radar transmission signals are transmitted transmission antennae 1108 corresponding to virtual antennae of which disposition positions overlap each other at all of N transmission timings within transmission cycle T of each transmission antenna 1108 (for example, refer to FIG. 26C), N may be set to Nt even when Nt is a prime number (for example, Nt=5). This is because, even when N is Nt, transmission intervals between transmission antennae 1108 corresponding to virtual antennae of which disposition positions overlap each other can be made an equal interval.

Therefore, for example, in a case where Nt is 5, transmission cycle T' of each of a plurality of transmission antennae corresponding to virtual antennae of which disposition positions overlap each other is either one cycle for the number of times of transmission corresponding to a divisor (that is, 2 or 3) of N=6 within one transmission cycle T or Nt cycles for N=Nt=5.

Figure 33:
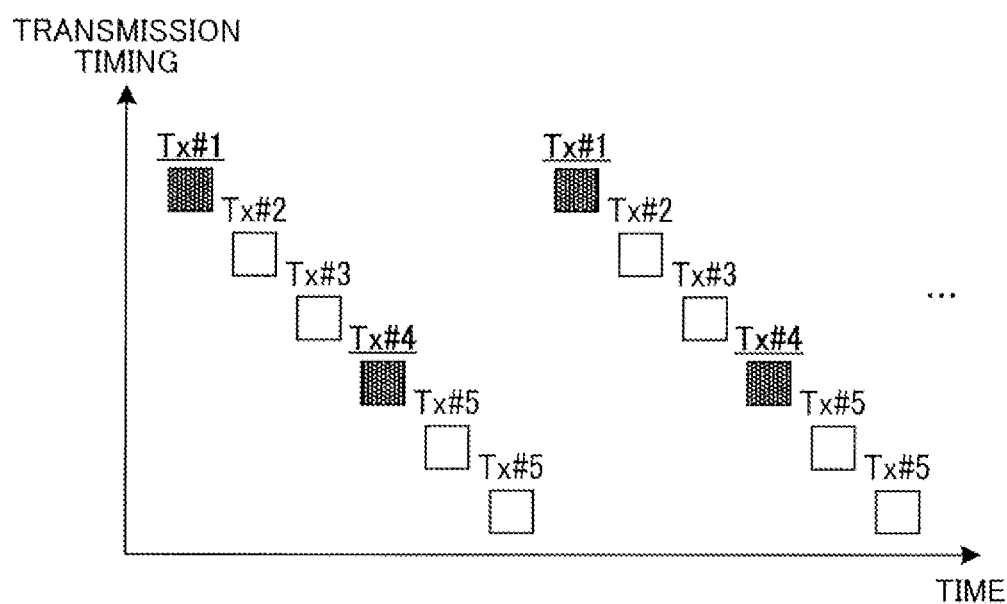
FIG. 33 is a diagram illustrating an example of a transmission timing according to Variation 1 of Embodiment 8.

FIG. 33 illustrates an example of a transmission timing in a case where the number of times of transmission of transmission antennae corresponding to virtual antennae of which disposition positions overlap each other within one transmission cycle T is two (transmission cycle T'=T/2) at Nt=5. In FIG. 33, transmission antennae Tx #1 and Tx #4 are transmission antennae corresponding to virtual antennae of which disposition positions overlap each other.

In the example illustrated in FIG. 33, the number of times of transmission N within transmission cycle T is six (=Nt+1) with respect to Nt=5 (prime number). Therefore, in FIG. 33, transmission intervals T' of two transmission antennae 1108 such as Tx #1 and Tx #4 are an equal interval as T/2. In FIG. 33, as an example, Tx #5 transmits a radar transmission signal twice within one transmission cycle T. However, in a case where transmission timings of transmission antennae Tx #1 and Tx #4 are provided at an equal interval, in a transmission pattern within transmission cycle T, transmission antenna 1108 that transmits a radar transmission signal a plurality of times may be transmission antenna 1108 (for example, Tx #2 or Tx #3) other than Tx #5.

According to Variation 1, even in a case where the number $N_t$ of transmission antennae 1108 is a prime number, transmission intervals of transmission antennae corresponding to virtual antennae of which disposition positions overlap each other can be made an equal interval. Therefore, in the same manner as in the present embodiment, a Doppler frequency range (relative speed maximum value) can be increased, and radar apparatus 110 can suppress a reduction in a Doppler frequency range in which a Doppler frequency without aliasing can be detected and can thus estimate an arrival direction with high accuracy.

In FIG. 33, a description has been made of a case where Nt is 5, but the same applies to cases where values of Nt are other prime numbers. In FIG. 33, a description has been made of a case where N=Nt+1 is set at Nt=5, but N is not limited to a value obtained by adding 1 to Nt.

In FIG. 33, as an example, a description has been made of a case where the number of times of transmission is set to two that is a divisor of N at N=Nt+1=6, but the number of times of transmission may be three that is another divisor, and may be Nt.

For example, at N>Nt, in a case where the number of times of transmission of transmission antennae corresponding to virtual antennae of which disposition positions overlap each other is three or more within transmission cycle T, in a transmission pattern of transmission antenna 1108 within transmission cycle T, transmission antennae corresponding to virtual antennae of which disposition positions overlap each other may be set to transmission antennae 1108 transmitting a radar transmission signal a plurality of times (two or more times).

Figure 34A:
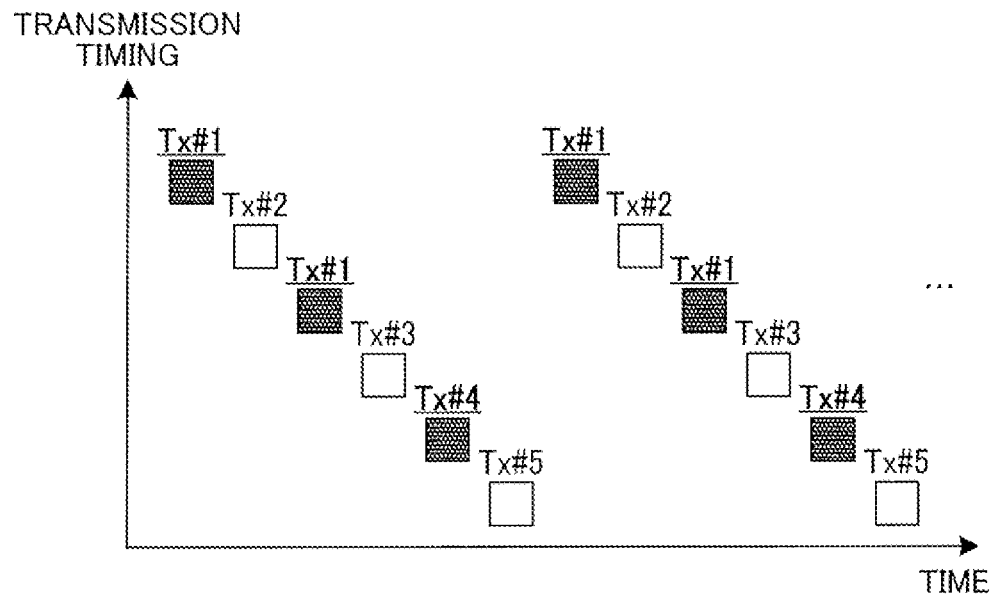
FIG. 34A is a diagram illustrating another example of a transmission timing according to Variation 1 of Embodiment 8.

FIG. 34A illustrates an example of a transmission timing in a case where the number of times of transmission of transmission antennae (for example, Tx #1 and Tx #4) corresponding to virtual antennae of which disposition positions overlap each other is three within transmission cycle T, at Nt=5, and N=6 as an example of N>Nt. In FIG. 34A, in a transmission pattern (or a switching pattern) within transmission cycle T, the number of transmission timings of Tx #1 is set to two, and the number of transmission timings of Tx #4 is set to one.

For example, at N>Nt, in a case where the number of times of transmission of transmission antennae corresponding to virtual antennae of which disposition positions overlap each other within transmission cycle T is three or more, in a transmission pattern of transmission antennae 1108 within transmission cycle T, transmission antenna 1108 that transmits a radar transmission signal a plurality of times may be a transmission antenna other than a transmission antenna farthest from the centroid in disposition of a plurality of transmission antennae 1108. For example, transmission antenna 1108 that transmits a radar transmission signal a plurality of times may be a transmission antenna around the center in disposition of a plurality of transmission antennae 1108.

Figure 34B:
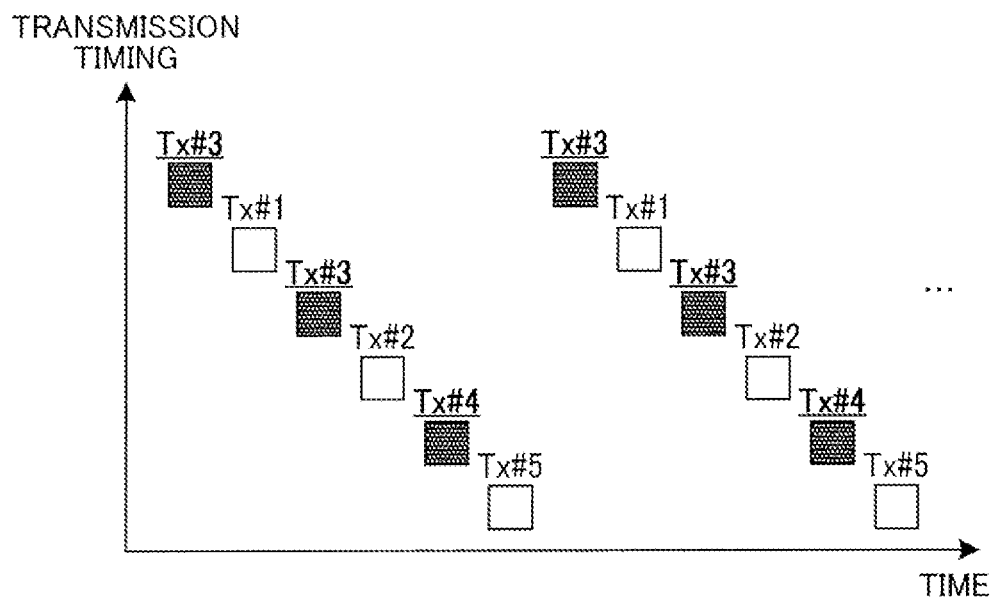
FIG. 34B is a diagram illustrating still another example of a transmission timing according to Variation 1 of Embodiment 8.

FIG. 34B illustrates an example of a transmission timing in a case where the number of times of transmission of transmission antennae (for example, Tx #3 and Tx #4) corresponding to virtual antennae of which disposition positions overlap each other is three within transmission cycle T, at Nt=5, and N=6 as an example of N>Nt. In FIG. 34B, transmission antenna Tx #3 is a transmission antenna disposed at the center of transmission antennae Tx #1 to Tx #5 (or a transmission antenna other than a transmission antenna farthest from the centroid). In other words, transmission antenna Tx #3 is a transmission antenna forming virtual antennae around the center on virtual antenna disposition. In a case of FIG. 34B, the number of transmission timings of Tx #3 is two, and the number of transmission timings of transmission antenna Tx #4 is one. Consequently, radar apparatus 110 can reduce a side lobe on an angle profile during direction estimation due to a window function effect.

Variation 2 of Embodiment 8

In Variation 2, a description will be made of a case where a signal obtained through beam formation using a plurality of antennae (a plurality of transmission antennae 1108 or a plurality of reception antennae 1202) is handled as a real signal of which a phase center is different from that of a signal of each antenna.

Figure 35:
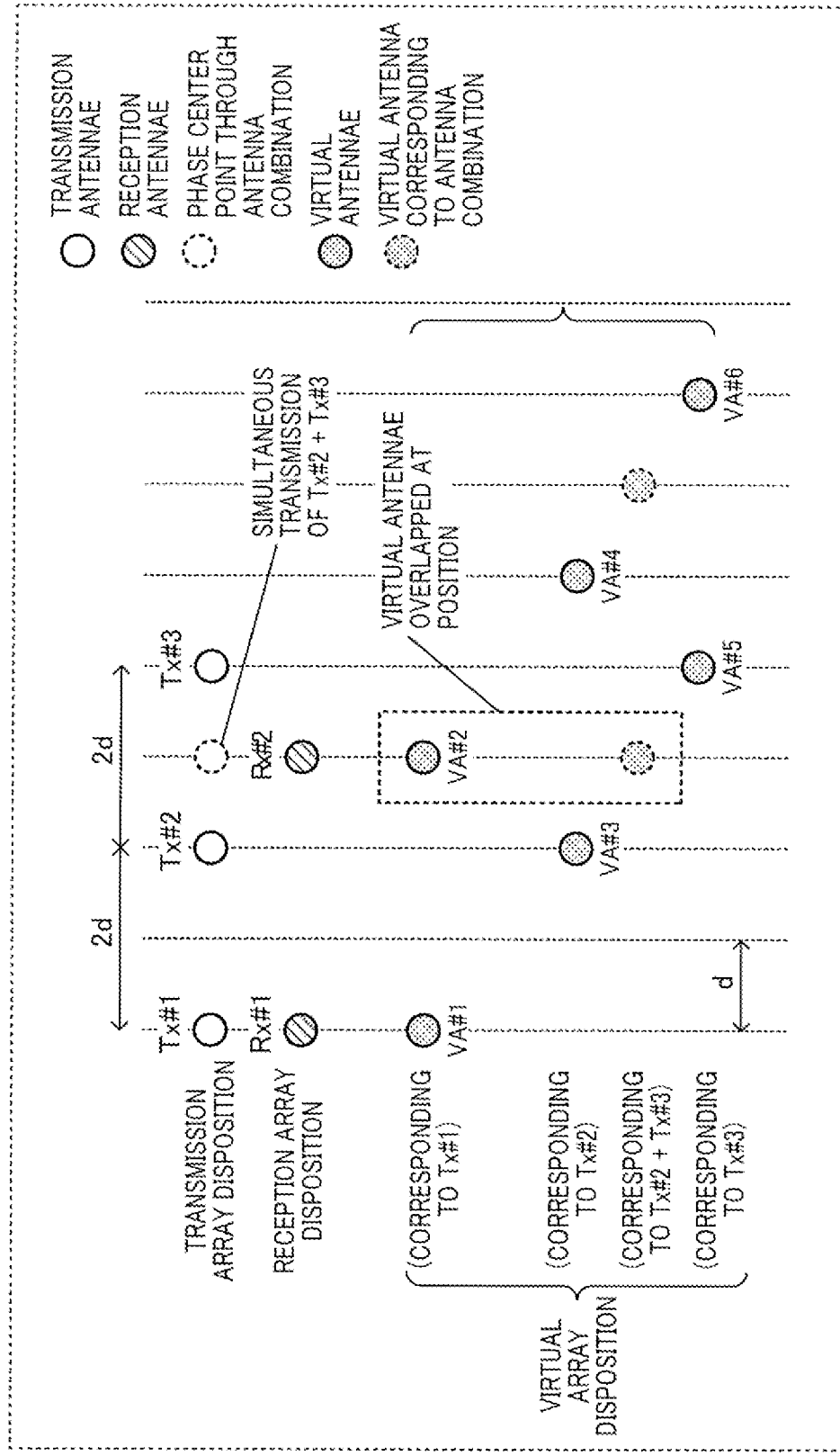
FIG. 35 is a diagram illustrating an example of antenna disposition according to Variation 2 of Embodiment 8.

FIG. 35 illustrates examples of antenna disposition of transmission antennae 1108 and reception antenna 1202, and disposition of virtual reception arrays related to Variation 2.

In FIG. 35, the number Nt of transmission antennae 1108 is three (for example, Tx #1, Tx #2, and Tx #3), and the number Na of reception antennae 1202 is two (for example, Rx #1 and Rx #2). However, values of Nt and Na are not limited to the examples illustrated in FIG. 35.

For example, antenna elements of transmission antennae 1108 and reception antennae 1202 are disposed in an integer multiple of interval d. In FIG. 35, Tx #1, Tx #2, and Tx #3 are disposed to be separated from each other by interval 2d, and Rx #1 and Rx #2 are disposed to be separated from each other by interval 3d. Interval d is about a half wavelength, and, for example, d is 0.5λ.

In Variation 2, radar apparatus 110 controls phases of Tx #2 and Tx #3 in transmission antennae 1108 illustrated in FIG. 35, supplies power thereto, and thus forms a beam (that is, performs antenna combination) by using two elements such as Tx #2 and Tx #3. In FIG. 35, a phase center of the two elements is present between Tx #2 and Tx #3. For example, in a case where identical power is supplied to Tx #2 and Tx #3, a phase center of the two elements is a central point between Tx #2 and Tx #3 as illustrated in FIG. 35.

In FIG. 35, interval 3d between the phase center point (for example, a phase center of combined antennae) of the two elements such as Tx #2 and Tx #3 and Tx #1 is the same as interval 3d between Rx #1 and Rx #2.

in this case, as illustrated in FIG. 35, in virtual reception arrays, a virtual antenna (in other words, a virtual antenna corresponding to antenna combination) formed of combined antennae of Tx #2 and Tx #3 and Rx #1, and virtual antenna VA #2 formed of Tx #1 and Rx #2 are disposed to overlap each other at an identical position. Two received signals are present at the position where the two virtual antennae are disposed to overlap each other.

In Variation 2, radar transmitter 1100 performs switching among transmission timings of respective transmission antennae 1108 such that transmission intervals of Tx #1 and combined antennae of Tx #2 and Tx #3, corresponding to virtual antennae of which disposition positions overlap each other are an equal interval.

Figure 36:
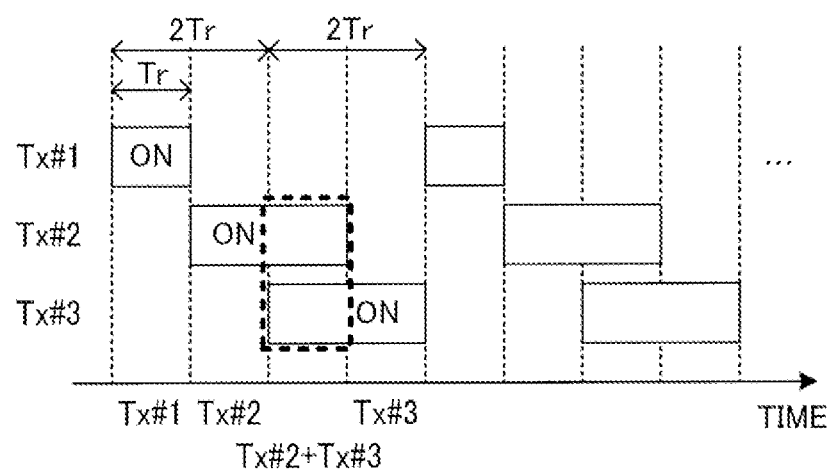
FIG. 36 is a diagram illustrating an example of a transmission timing according to Variation 2 of Embodiment 8.

FIG. 36 illustrates an example of a transmission timing in antenna disposition illustrated in FIG. 35. Transmission timing is not limited to the example illustrated in FIG. 36, and transmission timings of transmission antennae 1108 corresponding to virtual antennae of which disposition positions overlap each other may be set to have constant intervals.

In FIG. 36, a transmission interval (transmission cycle) of each of transmission antennae 1108 such as Tx #1, Tx #2, and Tx #3 is T=4Tr. As illustrated in FIG. 36, an interval between a transmission timing of Tx #1 and a transmission timing (that is, a timing at which Tx #2 and Tx #3 perform simultaneous transmission) of combined antennae (Tx #2+Tx #3) of Tx #2 and Tx #3 is T'=2Tr. Therefore, as illustrated in FIG. 36, transmission intervals T' of Tx #1 and the combined antennae of Tx #2 and Tx #3 are an equal interval as 2Tr=T/2.

In a case of FIG. 36, radar apparatus 110 receives reflected wave signals in each transmission cycle of T'=2T$_r$ in virtual antennae of which disposition positions overlap each other in FIG. 35. Radar receiver 1200 performs Doppler analysis by using received signals that are respectively received by two virtual antennae of which disposition positions overlap each other in FIG. 35 in Doppler analyzer 1212.

As mentioned above, radar apparatus 110 can receive a reflected wave signal in a virtual antenna disposed at an identical position in each transmission interval T'. Therefore, for example, in FIG. 36, radar apparatus 110 may set sampling interval T' to T''=T/2 in virtual antennae disposed at an identical position.

For example, as illustrated in FIG. 36, in a case where a sampling interval is set to transmission interval T=4Tr of each transmission antennae 1108, the relative speed maximum value is represented by $v_{max}=\lambda/4T$. Here, k indicates a wavelength of a carrier frequency. In contrast, as illustrated in FIG. 36, in a case where a sampling interval in virtual antennae, corresponding to a transmission interval (2Tr) of Tx #1 and combined antennae of Tx #2 and Tx #3, is set to transmission interval T'=2T$_r$=T/2, the relative speed maximum value is represented by $v'_{max}=\lambda/4T'=2v_{max}$.

Consequently, in FIG. 35, relative speed maximum value $v'_{max}$ (or a Doppler frequency range) becomes twice as great as relative speed maximum value $v_{max}$ based on transmission interval T of each transmission antenna 1108. In other words, a Doppler frequency range (relative speed) in which aliasing does not occur becomes twice compared with a case where virtual reception arrays do not overlap each other.

Therefore, in Variation 2, radar apparatus 110 can increase a Doppler frequency range (relative speed maximum value) in which aliasing does not occur (in other words, ambiguity does not occur) and can thus estimate an arrival direction with high accuracy compared with a case where virtual antennae do not overlap each other in virtual reception arrays.

In Variation 2, among a plurality of (for example, three or more) transmission antennae 1108, at least two transmission antennae 1108 simultaneously transmit radar transmission signals. Consequently, a disposition position of a virtual antenna is defined on the basis of a phase center point of at least two transmission antennae 1108. Therefore, for example, compared with the embodiment, virtual antennae each formed of single transmission antenna 1108 may not overlap each other. For example, in FIG. 35, virtual antennae VA #1 to VA #6 formed of combinations of Tx #1 to Tx #3, and Rx #1 and Rx #2 do not overlap each other. In the above-described way, in Variation 2, it is possible to increase a Doppler frequency range (or the relative speed maximum value) without reducing an aperture length of a virtual antenna.

For example, since antenna combination of Tx #2 and Tx #3 illustrated in FIG. 35 is a combination of antenna elements from which a phase center is separated by one or more wavelengths, a combined beam formed through antenna combination of Tx #2 and Tx #3 provides a reduced main lobe beam, and is adaptable to a narrow range. For example, Variation 2 is adapted to a case where an object having a high relative speed is desired to be detected in a narrow range, such as a fast object on an expressway.

In FIG. 35, a description has been made of antenna combination (simultaneous transmission) of a plurality of transmission antennae 1108, but this is only an example, and received signals of a plurality of (for example, three or more) reception antennae 1202 may be combined with each other.

Figure 37:
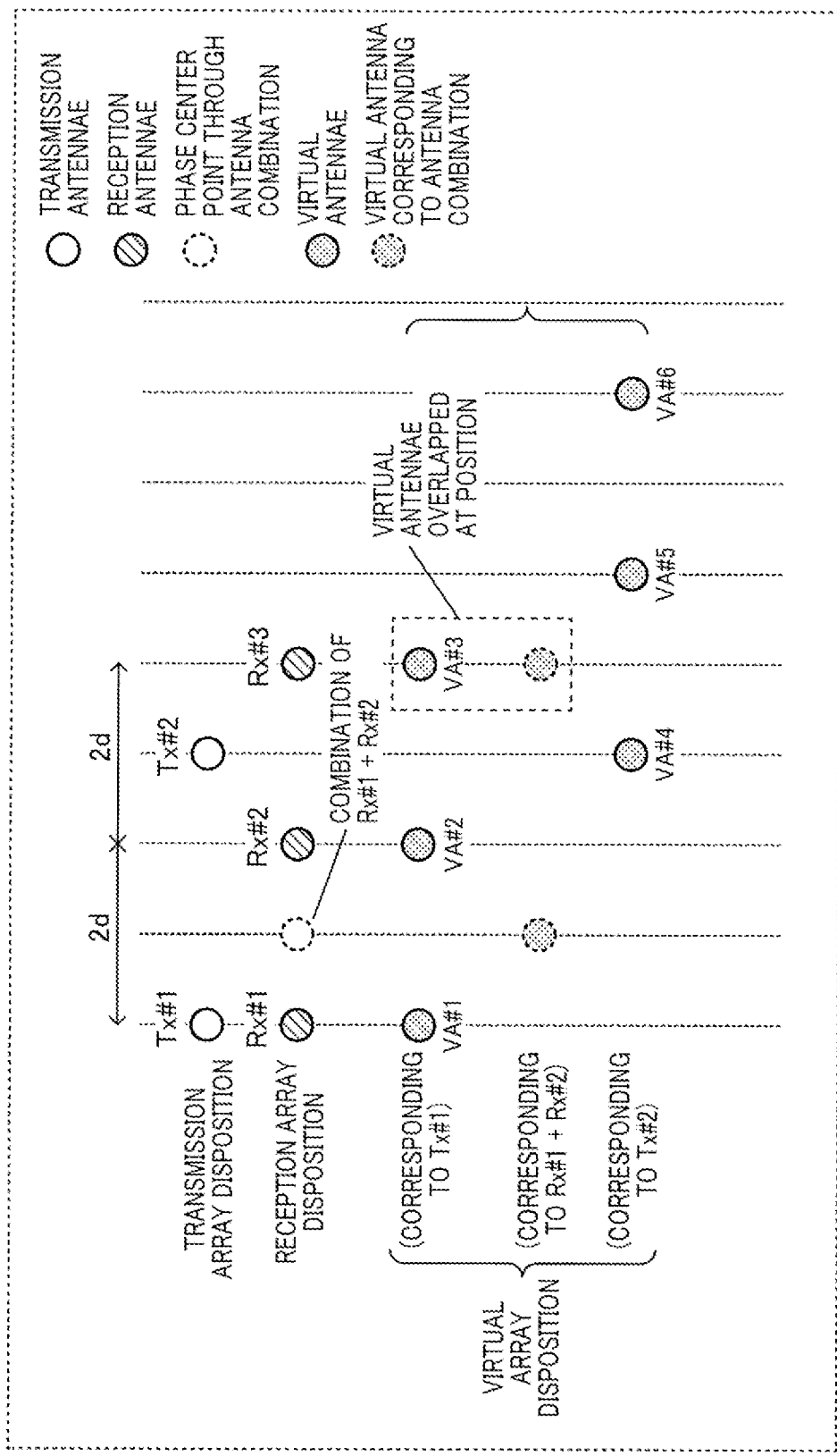
FIG. 37 is a diagram illustrating another example of antenna disposition according to Variation 2 of Embodiment 8.

FIG. 37 illustrates an example in which received signals of a plurality of reception antennae 1202 are combined with each other.

In FIG. 37, the number Nt of transmission antennae 1108 is two (for example, Tx #1 and Tx #2), and the number Na of reception antennae 1202 is three (for example, Rx #1, Rx #2, and Rx #3). However, values of Nt and Na are not limited to the examples illustrated in FIG. 37.

For example, antenna elements of transmission antennae 1108 and reception antennae 1202 are disposed in an integer multiple of interval d. In FIG. 37, Tx #1 and Tx #2 are disposed to be separated from each other by interval 3d, and Rx #1, Rx #2, and Rx #3 are disposed to be separated from each other by interval 2d. Interval d is about a half wavelength, and, for example, d is 0.5λ.

In FIG. 37, radar apparatus 110 combines received signals of Rx #1 and Rx #2 with each other. For example, as illustrated in FIG. 37, in a case where a phase center of the two elements of Rx #1 and Rx #2 is a central point between Rx #1 and Rx #2.

In FIG. 37, interval 3d between the phase center point (for example, a phase center of combined antennae) of the two elements such as Rx #1 and Rx #2, and Rx #3 is the same as interval 3d between Tx #1 and Tx #2.

in this case, as illustrated in FIG. 37, in virtual reception arrays, a virtual antenna (in other words, a virtual antenna corresponding to antenna combination) formed of combined antennae of Rx #1 and Rx #2 and Tx #2, and virtual antenna VA #3 formed of Tx #1 and Rx #3 are disposed to overlap each other at an identical position. Two received signals are present at the position where the two virtual antennae are disposed to overlap each other.

In Variation 2, radar transmitter 1100 performs switching among transmission timings of respective transmission antennae 1108 such that transmission intervals of Tx #1 and Tx #2 corresponding to virtual antennae of which disposition positions overlap each other are an equal interval. Radar receiver 1200 combines reflected wave signals received in Rx #1 and Rx #2 with each other. Consequently, a disposition position of a virtual antenna is defined on the basis of a phase center point between Rx #1 and Rx #2.

In the same manner as in FIG. 35, in FIG. 37, it is also possible to increase a Doppler frequency range (or the relative speed maximum value) without reducing an aperture length of a virtual antenna.

Herein, a description has been made of a process of simultaneously transmitting radar transmission signals from two transmission antennae 1108 and a process of combining received signals in two reception antennae 1202 with each other as an antenna combination process, but, in the antenna combination process, three or more transmission antennae 1108 or three or more reception antennae 1202 may be used.

Variation 3 of Embodiment 8

Each of transmission antennae 1108 and each of reception antennae 1202 may be formed of a sub-array antenna.

Figure 38:
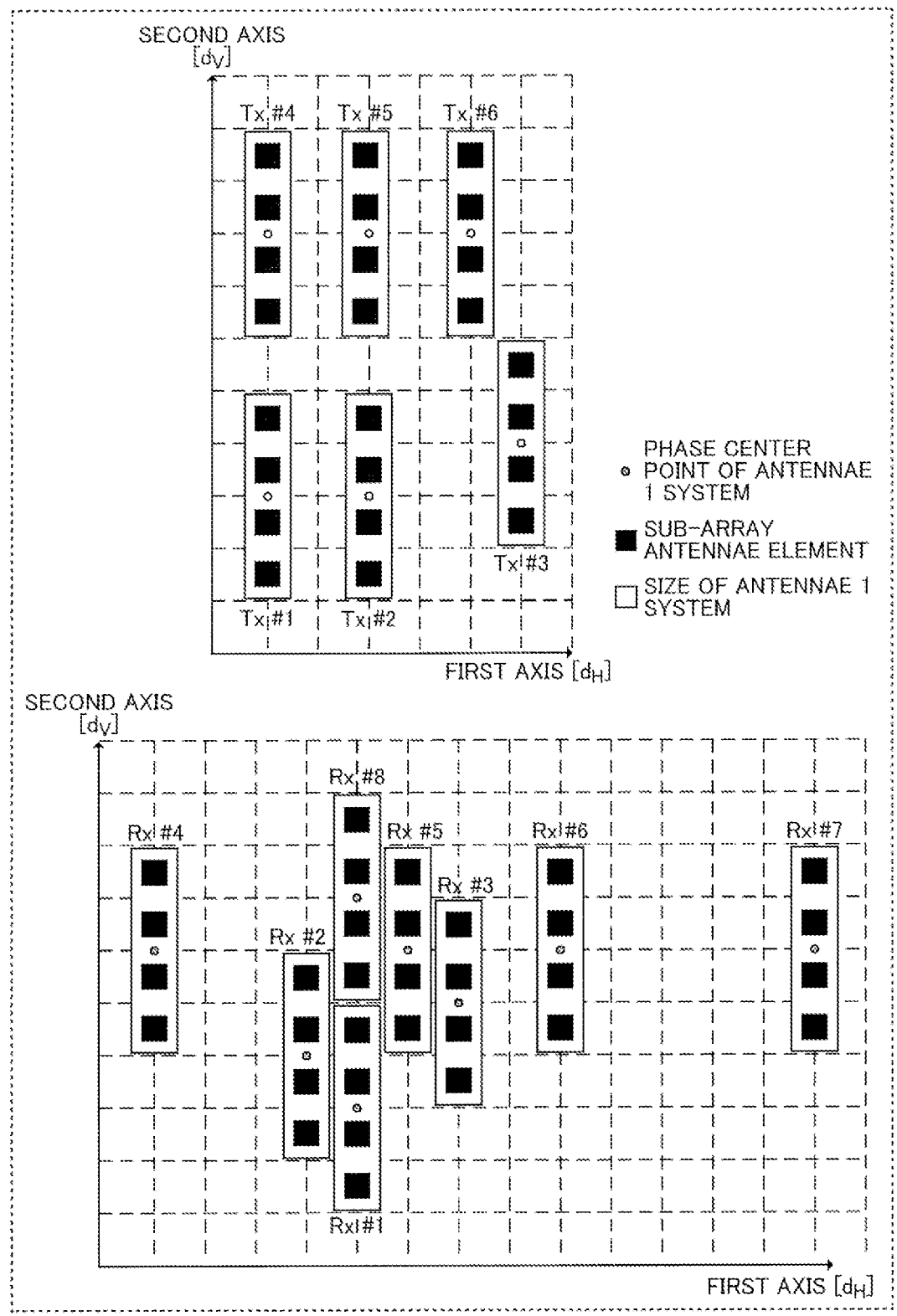
FIG. 38 is a diagram illustrating an example of antenna disposition according to Variation 3 of Embodiment 8.
Figure 39:
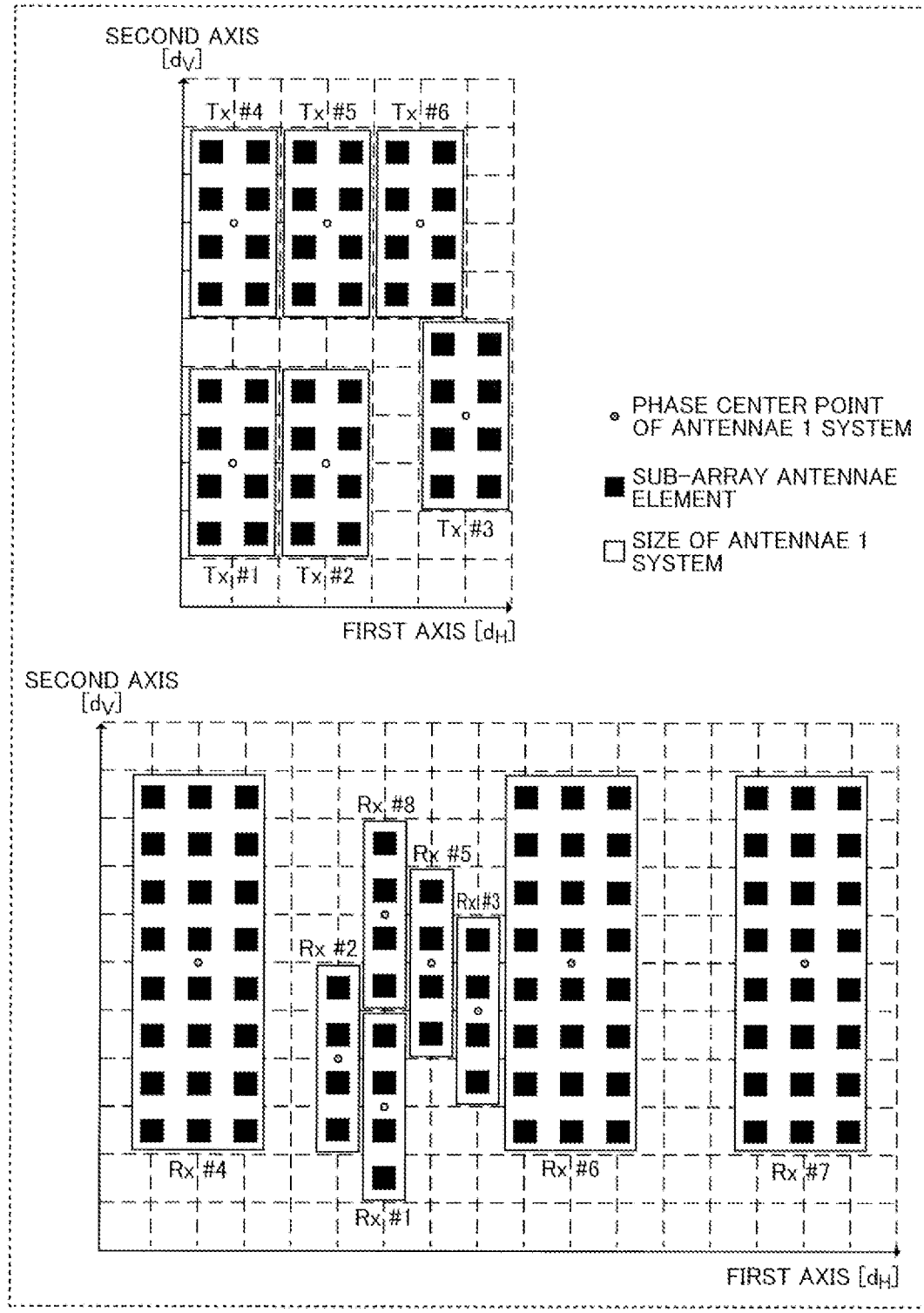
FIG. 39 is a diagram illustrating another example of antenna disposition according to Variation 3 of Embodiment 8.

FIGS. 38 and 39 illustrate examples of a case where the same antenna disposition as the disposition of transmission antennae 1108 illustrated in FIG. 29 and the disposition of reception antennae 1202 illustrated in FIG. 30 is realized by sub-array antennae.

For example, one system (one antenna element) of transmission antenna 1108 and reception antenna 1202 may be formed by using sub-array antennae by increasing an aperture length to the extent to which adjacent antennae does not physically interfere with each other with a point in a plane having a first axis and a second axis illustrated in FIGS. 29 and 30 as a phase center. Consequently, a beam width is reduced, and thus a high antenna gain can be obtained. A side lobe may be suppressed by applying an array weight to a sub-array antenna.

For example, as illustrated in FIG. 38, one antenna system may be formed of sub-array antennae corresponding to four elements in the second axis direction. In a case where a field of view (FOV) of radar apparatus 110 is wide in a horizontal direction and is narrow in a vertical direction, it is preferable that a beam pattern of one system of transmission antenna 1108 and reception antenna 1202 also has a wide angle in the horizontal direction and a narrow angle in the vertical direction in the same manner. Therefore, as illustrated in FIG. 38, there may be a configuration in which sub-array antennae are arranged in the vertical direction (for example, the second axis direction). There may be a configuration in which elements are arranged in the horizontal direction (for example, the first axis direction) instead of the antenna disposition illustrated in FIG. 38. As mentioned above, one system of the transmission antenna and the reception antenna is preferably formed of sub-array antennae causing a beam pattern suitable for a field of view of radar apparatus 110 to be formed.

In FIG. 38, a description has been made of a case where all antenna elements are formed of similar sub-array antennae, but this is only an example. For example, a configuration of each antenna element may be changed within the scope in which adjacent antennae do not interfere with each other.

For example, as illustrated in FIG. 39, each element of transmission antennae 1108 is formed of a sub-array of eight elements including two elements in the first axis direction and four elements in the second axis direction. As illustrated in FIG. 39, among reception antennae 1202, each of Rx #4, Rx #6, and Rx #7 is formed of a sub-array of 24 element including three elements in the first axis direction and eight elements in the second axis direction, and each of Rx #1, Rx #2, Rx #3, Rx #5, and Rx #8 is formed of a sub-array of four element including one element in the first axis direction and four elements in the second axis direction. In the antenna configuration illustrated in FIG. 39, for example, compared with the antenna configuration illustrated in FIG. 38, a beam pattern of one antenna system has a narrow angle, and thus a field of view (FOV) is narrowed. Consequently, in radar apparatus 110 having the antenna configuration illustrated in FIG. 39, an antenna gain in a front direction is improved, and thus a signal to noise ratio (SNR or S/N ratio) can be improved.

As illustrated in FIG. 29, 30, 38, or 39, a dummy antenna element may be provided for transmission antennae 1108 (antenna elements) and reception antennae 1202 (antenna elements) disposed at an inequal interval. For example, in FIG. 38, a dummy antenna element may be provided in a right region of Rx #1 or a left region of Rx #8. The dummy antenna element is provided, and thus it is possible to achieve an effect of uniformizing the influence of electrical characteristics such as radiation of an antenna, impedance matching, or isolation.

Variation 4 of Embodiment 8

In Variation 4, with respect to antenna disposition of transmission antennae 1108 and reception antennae 1202, in addition to disposition example 1 and disposition example 2, other disposition examples will be described. Antenna disposition examples (for example, the number or antennae or an antenna disposition position) described below are only examples, and there is no limitation thereto.

An interval of one mass illustrated in FIGS. 40 to 43, 45, and 47 to 50 is indicated by "d". However, d may have different values in a first axis and a second axis.

Disposition Example 3: Example of Nt=6 and Na=8

In disposition example 3, a description will be made of an antenna disposition example in a case where the number $N_t$ of transmission antennae 1108 is six (for example, Tx #1 to Tx #6), and the number Na=8 of reception antennae 1202 is eight (for example, Rx #1 to Rx #8). In disposition example 3, one of transmission antenna 1108 and reception antenna 1202 is a one-dimensional linear array, and the other thereof is a two-dimensional planar array.

Disposition Example 3-1

Figure 40:
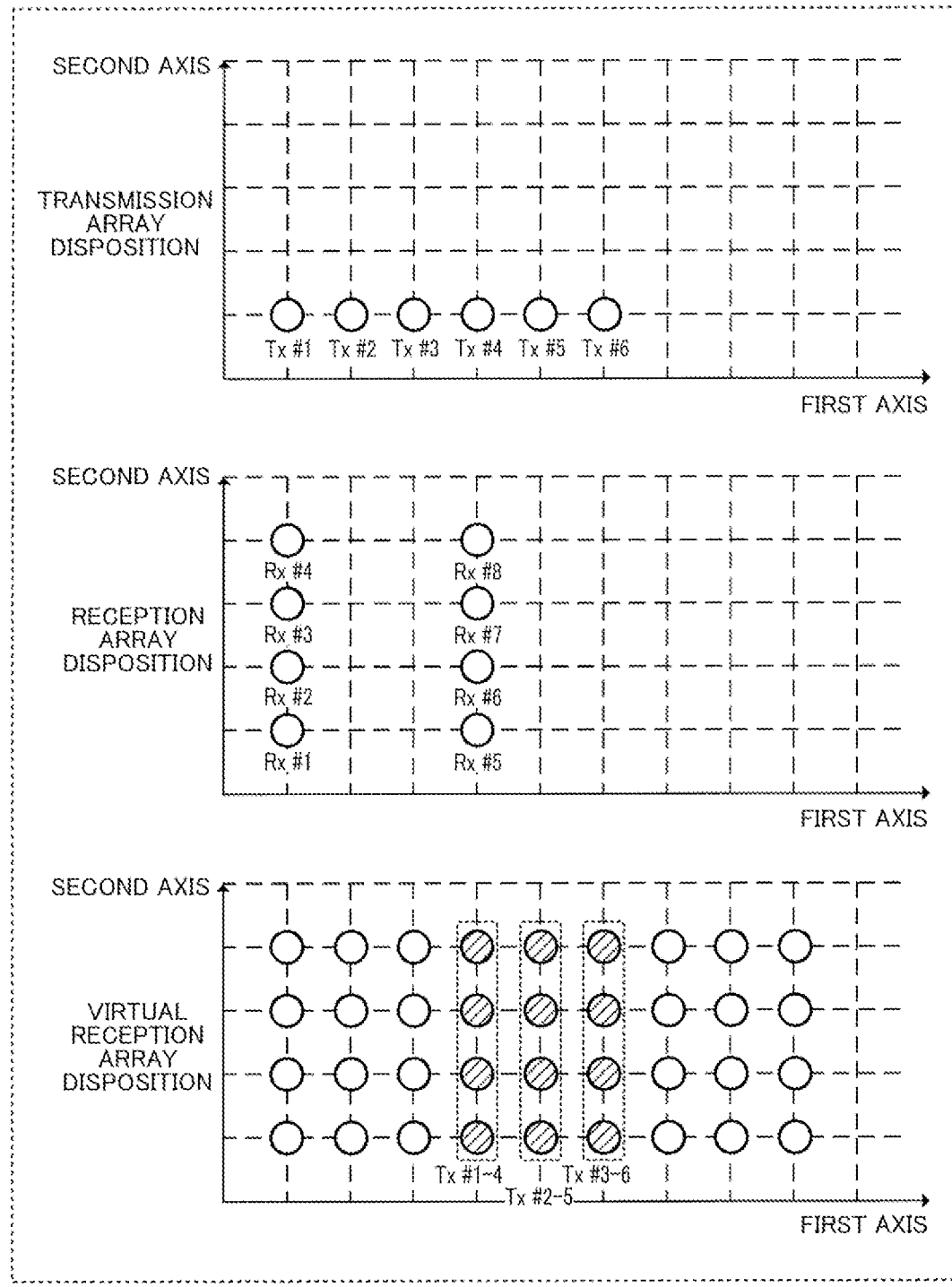
FIG. 40 is a diagram illustrating an example of antenna disposition according to Variation 4 of Embodiment 8.

FIG. 40 illustrates examples of antenna disposition of transmission antennae 1108 and reception antenna 1202, and disposition of virtual reception arrays related to disposition example 3-1.

In FIG. 40, for example, Tx #1 to Tx #6 are disposed, for example, linearly at interval d in the first axis direction. In FIG. 40, Rx #1 to Rx #4, and Rx #5 to Rx #8 are respectively disposed at interval d in the second axis direction, and a set of Rx #1 to Rx #4 and a set of Rx #5 to Rx #8 are disposed at interval 3d in the first axis direction.

In this case, as illustrated in FIG. 40, in virtual reception array disposition (virtual antennae of Nt×Na=48), virtual antennae corresponding to Tx #1 and Tx #4, virtual antennae corresponding to Tx #2 and Tx #5, and virtual antennae corresponding to Tx #3 and Tx #6 respectively overlap each other at four locations in the second axis direction. In FIG. 40, the number of overlapping virtual antennae at each disposition position is two (also referred to as "one overlap").

As mentioned above, a plurality of virtual antennae corresponding to at least one transmission antenna 1108 (in FIG. 40, for example, Tx #1 to Tx #6) is disposed to overlap virtual antennae corresponding to other transmission antennae 1108 at a plurality of positions. Consequently, radar apparatus 110 can improve the quality (for example, an SNR) of a received signal by using received signals received by the virtual antennae at the plurality of disposition positions.

Disposition Example 3-2

Figure 41:
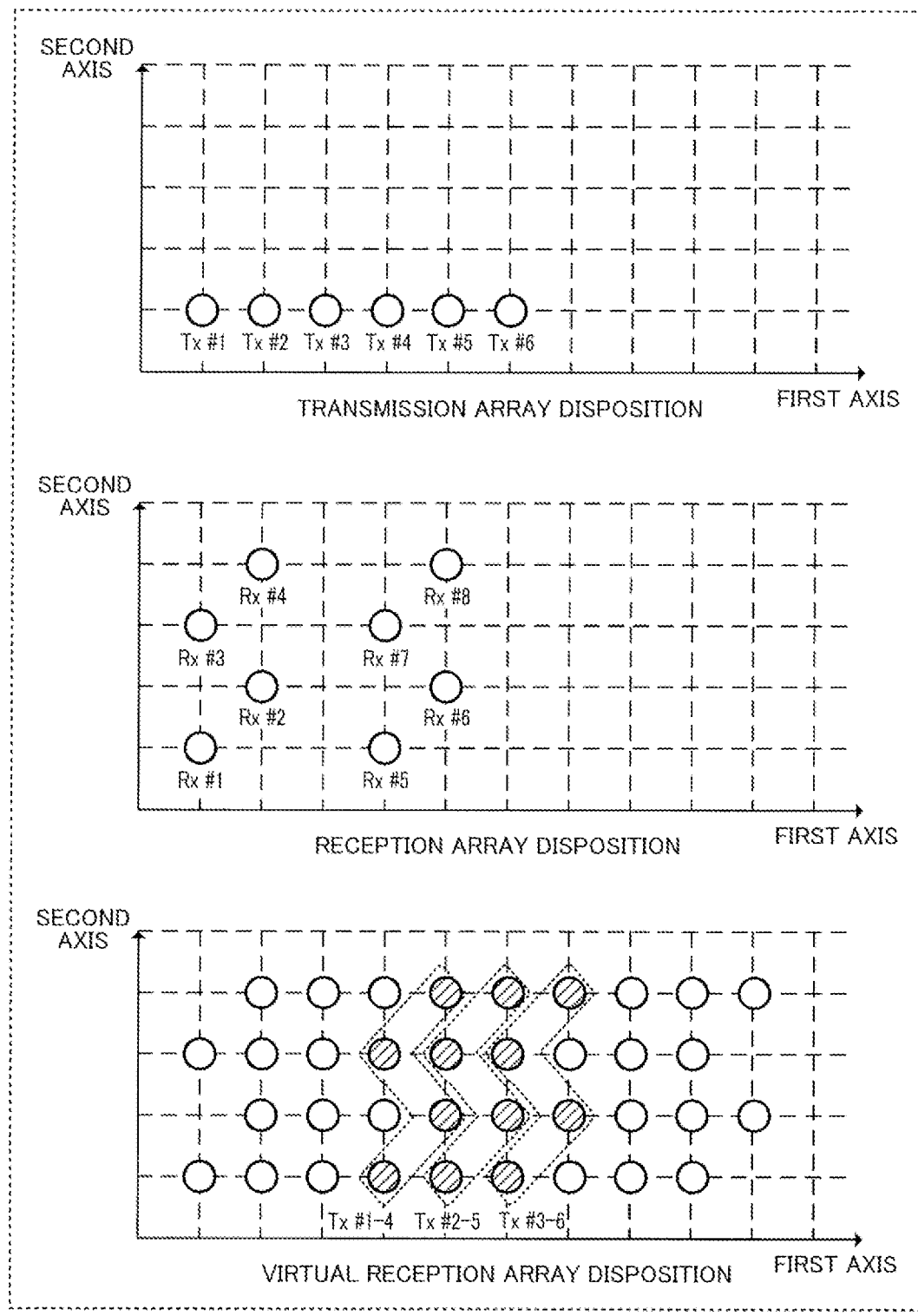
FIG. 41 is a diagram illustrating an example of antenna disposition according to Variation 4 of Embodiment 8.

FIG. 41 illustrates examples of antenna disposition of transmission antennae 1108 and reception antenna 1202, and disposition of virtual reception arrays related to disposition example 3-2.

Compared with the antenna disposition of disposition example 3-1 (FIG. 40), FIG. 41 illustrates antenna disposition in which, in reception antennae 1202, an antenna interval in the first axis direction is the same, and disposition positions of Rx #2, Rx #4, Rx #6, and Rx #8 are deviated to the right by interval d in the first axis direction. In the antenna disposition illustrated in FIG. 41, in the same manner as in FIG. 40, a virtual antenna corresponding to each transmission antenna 1108 is disposed to overlap virtual antennae corresponding to other transmission antennae at a plurality of disposition position, and thus radar apparatus 110 can improve the quality (for example, an SNR) of a received signal.

Disposition Example 3-3

Figure 42:
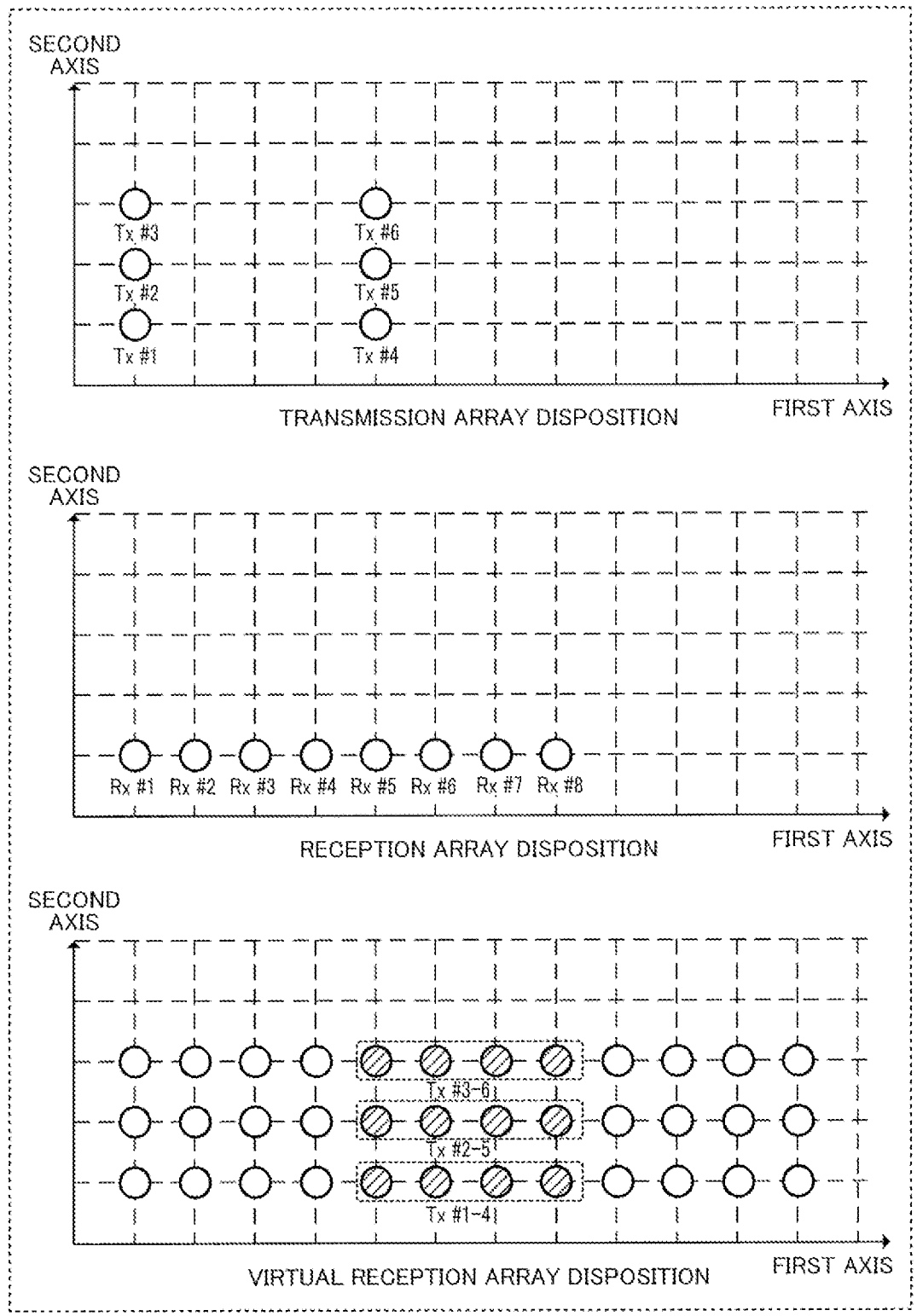
FIG. 42 is a diagram illustrating an example of antenna disposition according to Variation 4 of Embodiment 8.

FIG. 42 illustrates examples of antenna disposition of transmission antennae 1108 and reception antenna 1202, and disposition of virtual reception arrays related to disposition example 3-3.

In FIG. 42, in transmission antennae 1108, Tx #1 to Tx #3, and Tx #4 to Tx #6 are respectively disposed at interval d in the second axis direction, and a set of Tx #1 to Tx #3 and a set of Tx #4 to Tx #6 are disposed at interval 4d in the first axis direction. In FIG. 42, Rx #1 to Rx #8 are disposed, for example, linearly at interval d in the first axis direction.

In this case, as illustrated in FIG. 42, in virtual reception array disposition (virtual antennae of Nt×Na=48), virtual antennae corresponding to Tx #1 and Tx #4, virtual antennae corresponding to Tx #2 and Tx #5, and virtual antennae corresponding to Tx #3 and Tx #6 respectively overlap each other at four locations in the first axis direction. In FIG. 42, the number of overlapping virtual antennae at each disposition position is two (one overlap).

As mentioned above, a plurality of virtual antennae corresponding to at least one transmission antenna 1108 (in FIG. 42, for example, Tx #1 to Tx #6) is disposed to overlap virtual antennae corresponding to other transmission antennae 1108 at a plurality of positions. Consequently, radar apparatus 110 can improve the quality (for example, an SNR) of a received signal by using received signals received by the virtual antennae at the plurality of disposition positions.

Disposition Example 3-4

Figure 43:
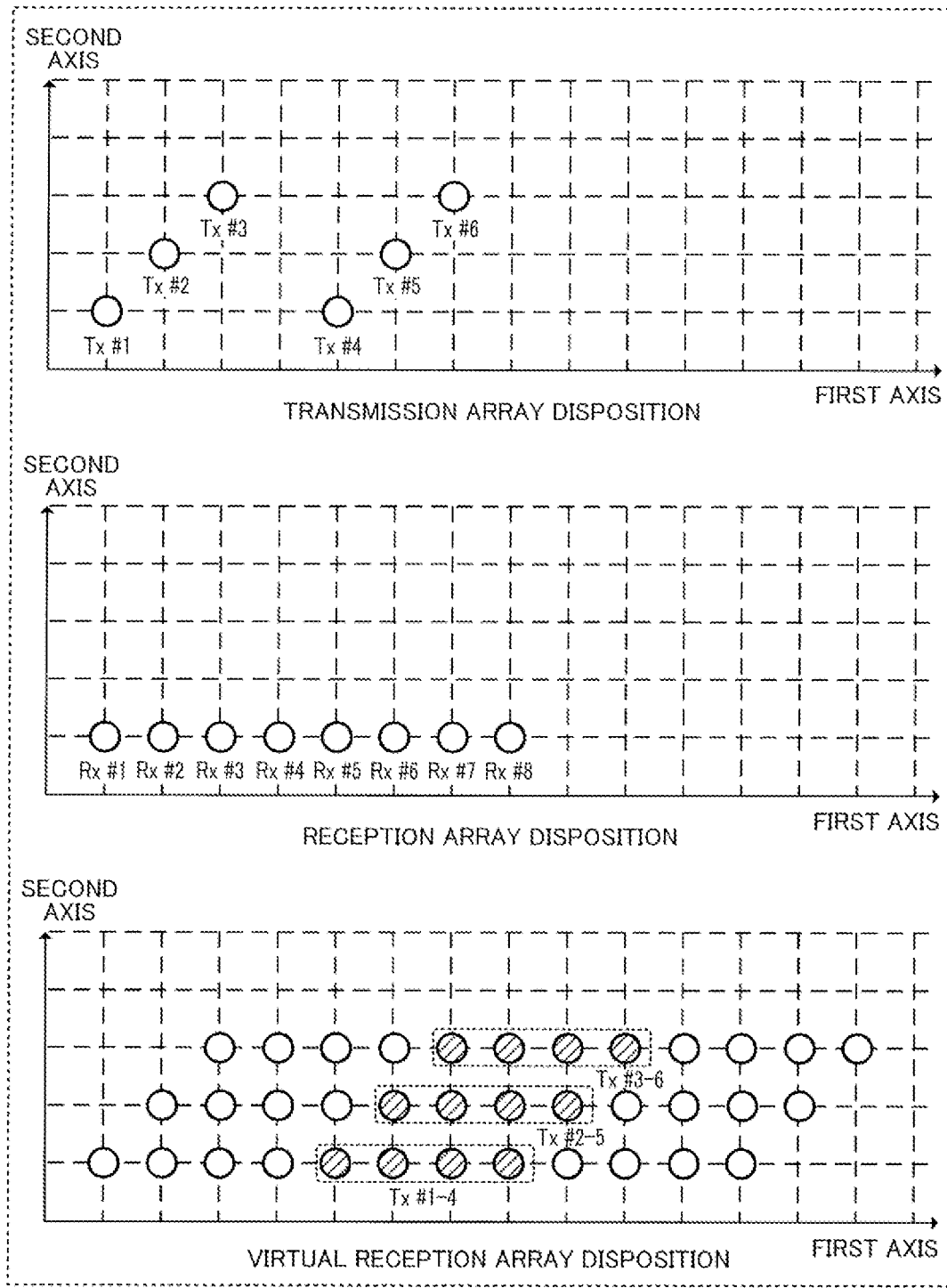
FIG. 43 is a diagram illustrating an example of antenna disposition according to Variation 4 of Embodiment 8.

FIG. 43 illustrates examples of antenna disposition of transmission antennae 1108 and reception antenna 1202, and disposition of virtual reception arrays related to disposition example 3-4.

Compared with the antenna disposition of disposition example 3-3 (FIG. 42), FIG. 43 illustrates antenna disposition in which, in transmission antennae 1108, an antenna interval in the first axis direction is the same, disposition positions of Tx #2 and Tx #5 are deviated to the right by interval d in the first axis direction, and disposition positions of Tx #3 and Tx #6 are deviated to the right by interval 2d in the first axis direction. In the antenna disposition illustrated in FIG. 43, in the same manner as in FIG. 42, a virtual antenna corresponding to each transmission antenna 1108 is disposed to overlap virtual antennae corresponding to other transmission antenna at a plurality of disposition position, and thus radar apparatus 110 can improve the quality (for example, an SNR) of a received signal.

As mentioned above, disposition example 3-1 to disposition example 3-4 have been described.

Figure 44:
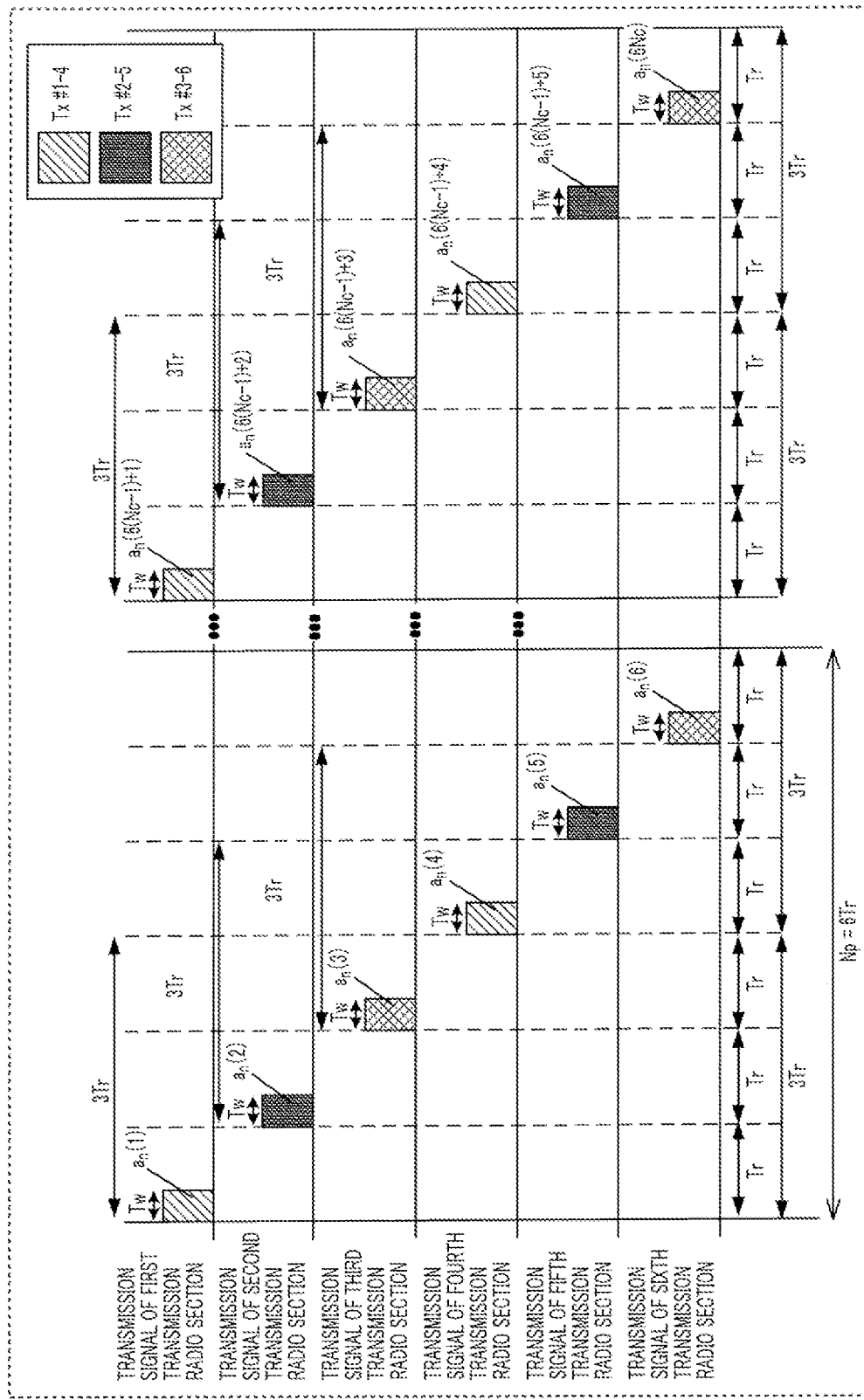
FIG. 44 is a diagram illustrating an example of a transmission switching operation according to Variation 4 of Embodiment 8.

FIG. 44 illustrates an example of a transmission timing of each of transmission antennae 1108 (Tx #1 to Tx #6) in disposition example 3 (for example, refer to FIGS. 40 to 43).

As illustrated in FIG. 44, transmission cycle T of each transmission antenna 1108 such as Tx #1 to Tx #6 is $6T_r$. As illustrated in FIG. 44, transmission cycle T' of each set (for example, Tx #1 and Tx #4, Tx #2 and Tx #5, and Tx #3 and Tx #6) of transmission antennae 1108 corresponding to virtual antennae disposed at an identical position is 3Tr. In other words, transmission cycle T' of a set of transmission antennae 1108 forming virtual antennae disposed at an identical position is T/2.

Therefore, according to the antenna disposition of disposition example 3, relative speed maximum value $v'_{max}$ (or a Doppler frequency range) becomes twice as great as relative speed maximum value $v_{max}$ based on transmission interval T of each transmission antenna 1108.

Disposition Example 4: Example of Nt=6 and Na=8

In disposition example 4, a description will be made of an antenna disposition example in a case where the number $N_t$ of transmission antennae 1108 is six (for example, Tx #1 to Tx #6), and the number $N_a$ of reception antennae 1202 is eight. In disposition example 4, both of transmission antenna 1108 and reception antenna 1202 are two-dimensional planar arrays.

Figure 45:
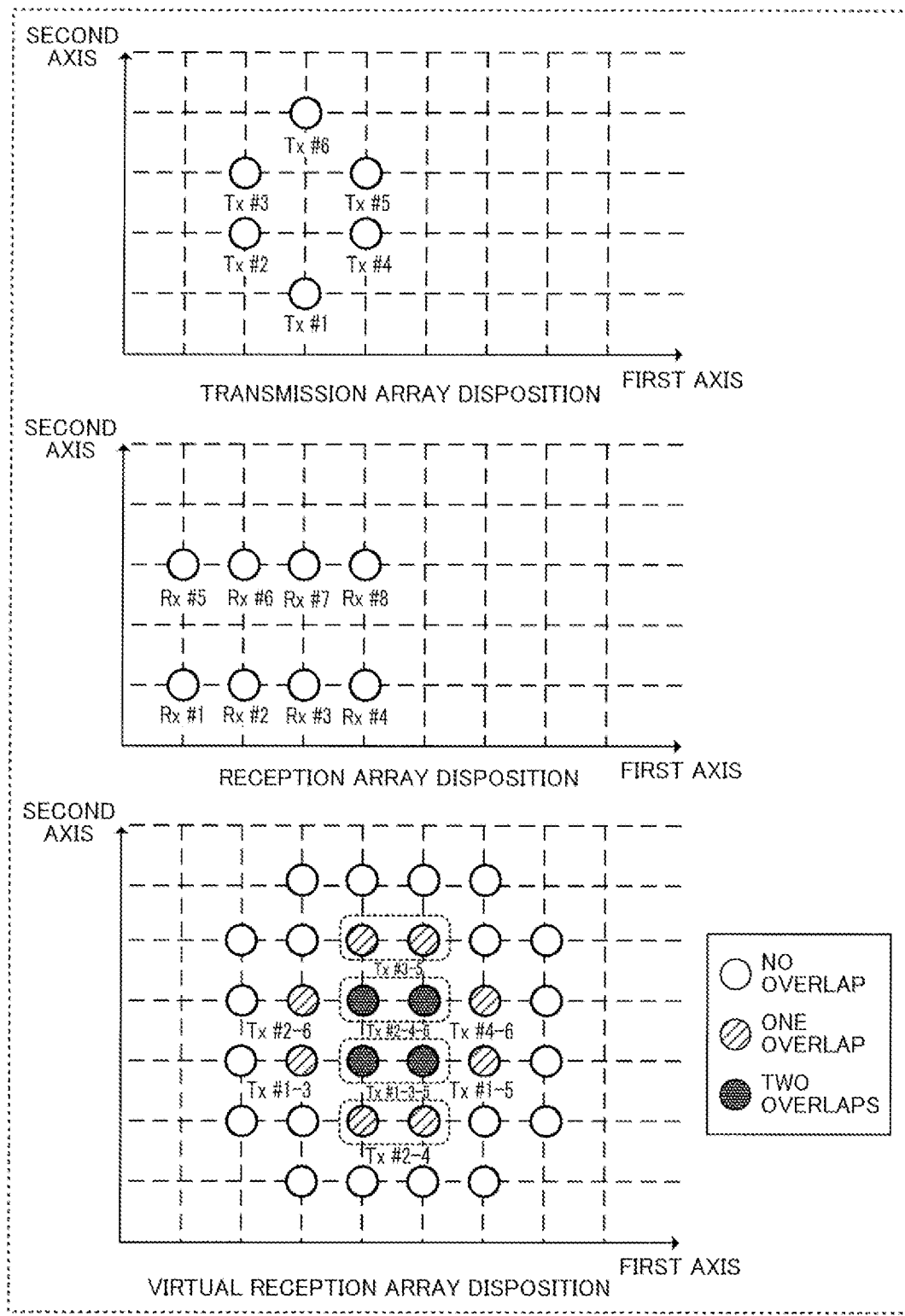
FIG. 45 is a diagram illustrating an example of antenna disposition according to Variation 4 of Embodiment 8.

FIG. 45 illustrates examples of antenna disposition of transmission antennae 1108 and reception antenna 1202, and disposition of virtual reception arrays related to disposition example 4.

In FIG. 45, a set of Tx #2 and Tx #3 and a set of Tx #4 and Tx #5 are disposed to be separated from each other by interval 2d in the first axis direction. Tx #3 and Tx #5 are disposed to be separated by interval d in the first axis direction and to be separated by interval 2d in the second axis direction, with respect to Tx #1. Similarly, Tx #2 and Tx #4 are disposed to be separated by interval d in the first axis direction and to be separated by interval 2d in the second axis direction, with respect to Tx #6. In FIG. 45, two sets of four antenna elements (a set of Rx #1 to Rx #4 and a set of Rx #5 to Rx #8) that are disposed to be separated from each other by interval d in the first axis direction are disposed to be separated from each other by interval 2d in the second axis direction.

In this case, as illustrated in FIG. 45, in virtual reception array disposition (virtual antennae of Nt×Na=48), virtual antennae corresponding to each of Tx #1 and Tx #3, Tx #2 and Tx #4, Tx #3 and Tx #5, Tx #4 and Tx #6, Tx #1 and Tx #5, and Tx #2 and Tx #6 are disposed at an identical position in one overlap. Virtual antennae corresponding to each of a set of Tx #1, Tx #3, and Tx #5, and a set of Tx #2, Tx #4, and Tx #6 are disposed at an identical position at two locations in two overlaps.

In FIG. 45, virtual reception arrays in two overlaps are disposed at the center, and virtual antennae in one overlap and virtual antennae in no overlap are radially disposed. Therefore, the virtual reception array disposition illustrated in FIG. 45 is disposition in which reception power becomes higher in proportion to reception power of the center of the virtual reception arrays. As mentioned above, a spatial distribution such as a window function is obtained, and thus a side lobe level in a beam pattern formed by the arrays is reduced such that a wrong detection risk is reduced, compared with a case where the same type of reception arrays are disposed in no overlap. Signals of overlapping virtual reception arrays may be subjected to addition, averaging, or a process of applying a window function to a spatial power distribution, and may be used for arrival direction estimation.

Figure 46:
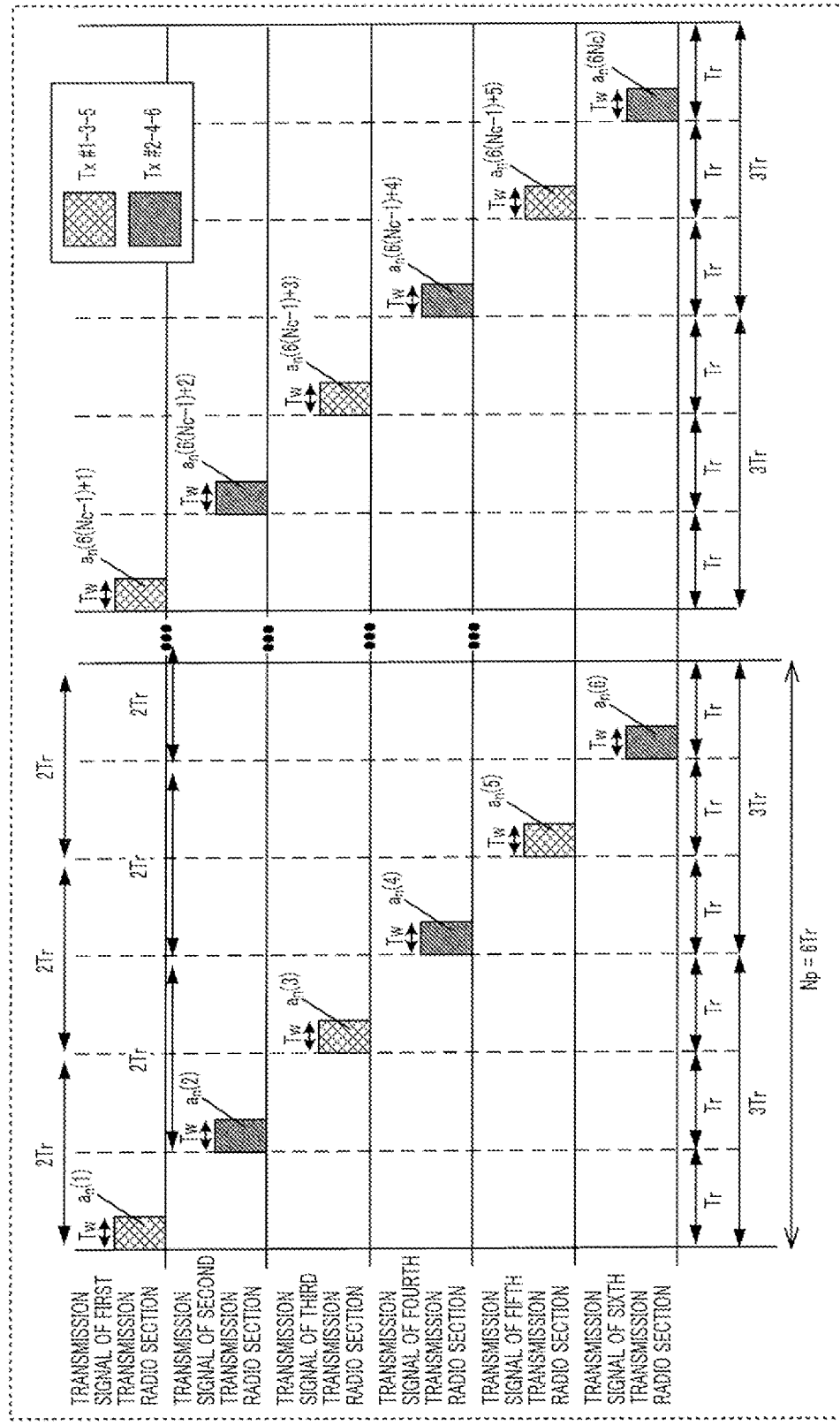
FIG. 46 is a diagram illustrating an example of a transmission switching operation according to Variation 4 of Embodiment 8.

FIG. 46 illustrates an example of a transmission timing of each of transmission antennae 1108 (Tx #1 to Tx #6) in disposition example 4 (for example, refer to FIG. 45).

As illustrated in FIG. 46, transmission cycle T of each transmission antenna 1108 such as Tx #1 to Tx #6 is $6T_r$. As illustrated in FIG. 46, transmission cycle T' of each set (for example, a set of Tx #1, Tx #3, and Tx #5, and a set of Tx #2, Tx #4, and Tx #6) of transmission antennae 1108 corresponding to virtual antennae disposed at an identical position in two overlaps is $2T_r$. In other words, transmission cycle T' of a set of transmission antennae 1108 forming virtual antennae disposed at an identical position is T/3.

Therefore, according to the antenna disposition in FIG. 45, relative speed maximum value $v'_{max}$ (or a Doppler frequency range) becomes three times as great as relative speed maximum value $v_{max}$ based on transmission interval T of each transmission antenna 1108.

In FIG. 45, a virtual antenna corresponding to each transmission antenna 1108 is disposed to overlap virtual antennae corresponding to other transmission antennae at a plurality of disposition position, and thus radar apparatus 110 can improve the quality (for example, an SNR) of a received signal.

Figure 47:
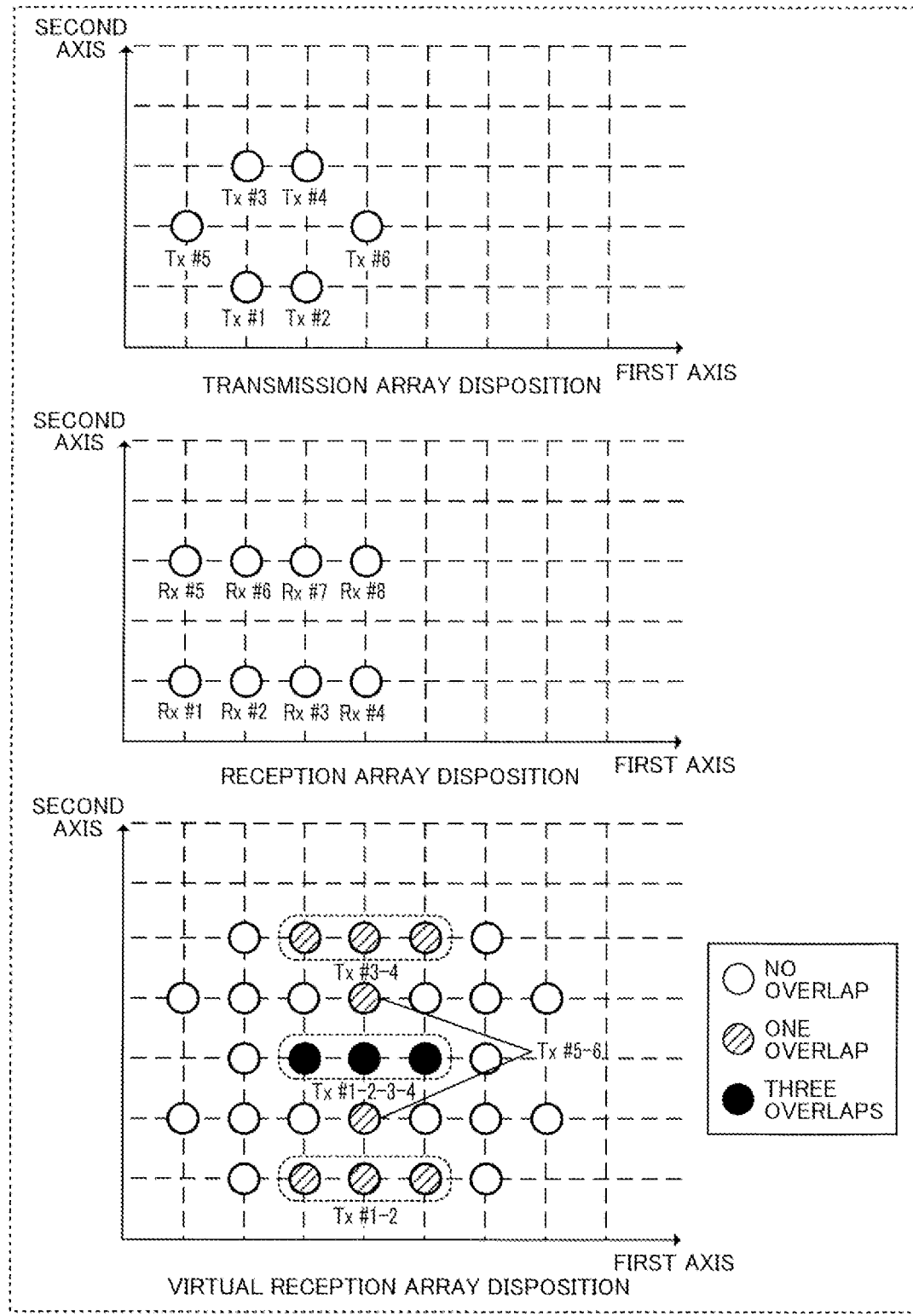
FIG. 47 is a diagram illustrating an example of antenna disposition according to Variation 4 of Embodiment 8.

Antenna disposition illustrated in FIG. 47 may be applied instead of the antenna disposition illustrated in FIG. 45. FIG. 47 illustrates antenna disposition in which the disposition of the transmission antennae 1108 illustrated in FIG. 45 is rotated by 90 degrees. In this case, as illustrated in FIG. 47, virtual antennae corresponding to a set of Tx #1, Tx #2, Tx #3, and Tx #4 are disposed at an identical position at three locations in three overlaps. Consequently, in the same manner as in FIG. 45, it is possible to increase the relative speed maximum value and thus to improve the quality (for example, an SNR) of a received signal in radar apparatus 110.

Figure 48:
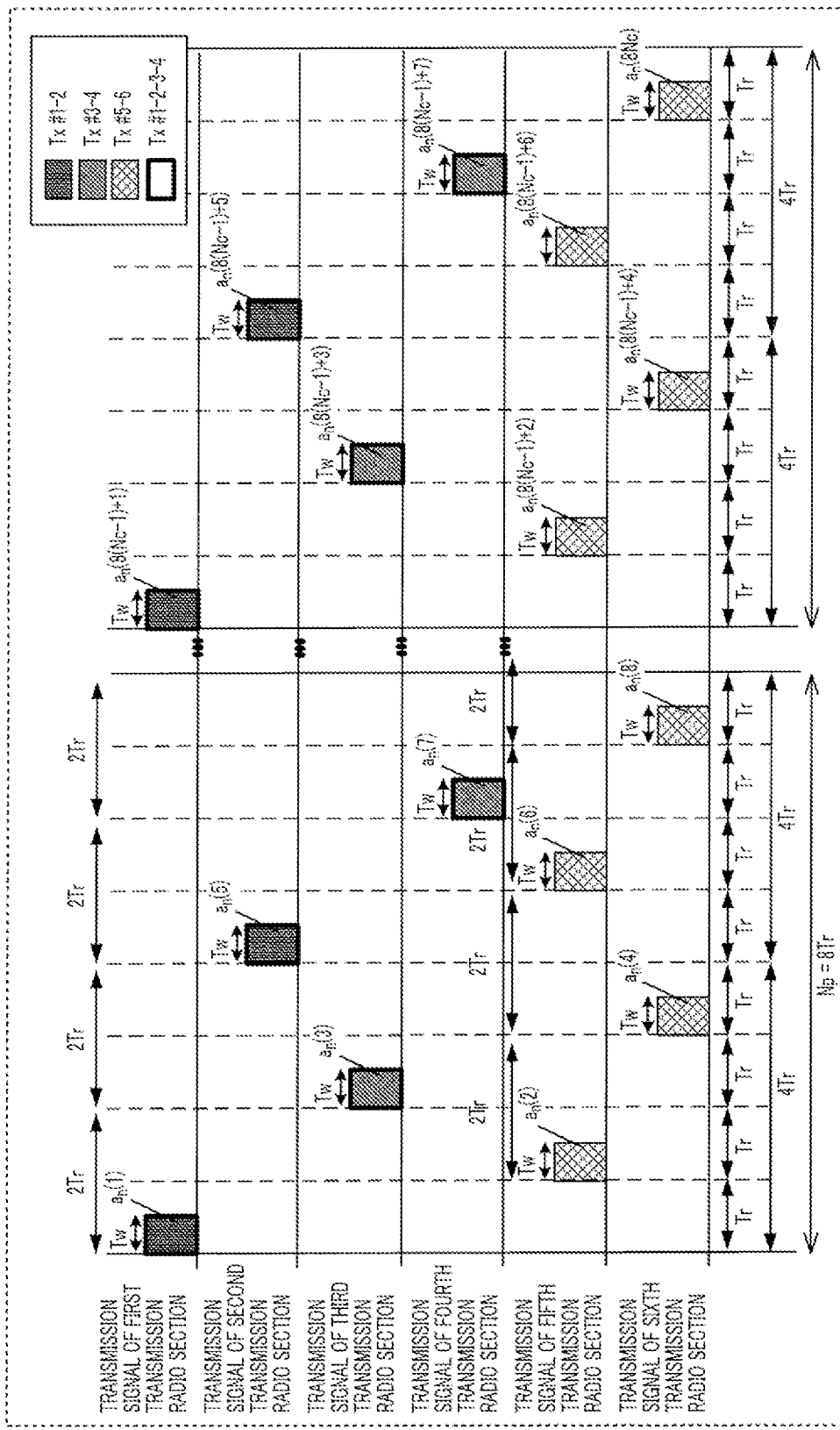
FIG. 48 is a diagram illustrating an example of a transmission switching operation according to Variation 4 of Embodiment 8.

FIG. 48 illustrates an example of a transmission timing of each of transmission antennae 1108 (Tx #1 to Tx #6) in FIG. 47.

As illustrated in FIG. 48, transmission cycle T of each transmission antenna 1108 such as Tx #1 to Tx #6 is $8T_r$. As illustrated in FIG. 48, transmission cycle T' of each set (Tx #1, Tx #2, Tx #3, and Tx #4) of transmission antennae 1108 corresponding to virtual antennae disposed at an identical position in three overlaps is $2T_r$. Transmission cycle T' of each of Tx #5 and Tx #6 that are transmission antennae 1108 corresponding to virtual antennae in two overlaps is $2T_r$.

In a case where radar apparatus 110 performs speed estimation by using the virtual reception arrays with the transmission cycle ($T'=2T_r$), when transmission cycle Torg of the related art is assumed to be 6Tr, transmission cycle T' is Torg/3. Consequently, relative speed maximum value $v'_{max}$ (or a Doppler frequency range) becomes three times as great as relative speed maximum value $v_{max}$ based on transmission interval Torg of each transmission antenna 1108.

There may be a configuration in which radar apparatus 110 performs speed estimation by using a signal of a virtual reception array at transmission cycle $T'=4T_r$. Consequently, radar apparatus 110 may perform a speed estimation process and a CFAR process by adding signals of sets (a set of Tx #1 and Tx #2 and a set of Tx #3 and Tx #4) of transmission antennae corresponding to virtual reception arrays in one overlap, signals of virtual reception arrays corresponding to Tx #5 and Tx #6, and signals of virtual reception arrays in three overlaps in FIG. 47 together.

In a case where radar apparatus 110 performs speed estimation by using the virtual reception arrays with the transmission cycle ($T'=4T_r$), when transmission cycle Torg of the related art is assumed to be 6Tr, transmission cycle T' is 2T/3. Consequently, relative speed maximum value $v'_{max}$ (or a Doppler frequency range) becomes 1.5 times as great as relative speed maximum value $v_{max}$ based on transmission interval Torg of each transmission antenna 1108. A lower maximum speed is obtained than in a case of transmission cycle T'=4Tr, but the number of signals of virtual reception arrays used for speed estimation is larger, and thus it is possible to improve the quality (for example, an SNR) of a received signal used for a CFAR process.

In the configurations illustrated in FIGS. 47 and 48, radar apparatus 110 can select the reception process. for example, radar apparatus 110 performs a process using a received signal with transmission cycle T'=2Tr in a case where a reflection object with high reflection intensity and a high relative speed is desired to be detected, and may perform a process using a received signal with transmission cycle T'=4Tr in a case where reflection intensity is lower than in the above case.

All antennae of transmission antennae 1108 may not be multiplexed. For example, radar apparatus 110 consecutively transmits radar transmission signals by using only Tx #1, Tx #2, Tx #3, and Tx #4 corresponding to overlapping virtual reception antennae among the transmission antennae illustrated in FIG. 47. Consequently, radar apparatus 110 can perform speed estimation by using signals of virtual reception arrays at transmission cycle T'=Tr. Assuming that transmission cycle Torg of the related art is 6Tr, transmission cycle T' is Torg/6. Consequently, relative speed maximum value $v'_{max}$ (or a Doppler frequency range) becomes six times as great as relative speed maximum value $v_{max}$ based on transmission interval Torg of each transmission antenna 1108. As mentioned above, radar apparatus 110 may employ the configuration capable of coping with higher speed. For example, radar apparatus 110 may employ a configuration capable of coping with higher speed and a configuration capable of improving the accuracy of arrival direction estimation by performing switching among transmission timing patterns of transmission antennae depending on a detection target. The present disposition example of the present embodiment in which a plurality of virtual reception antennae overlap each other has been described as an example, but there is no limitation thereto, and adaptation may occur.

Disposition Example 5: Example of Nt=3 and Na=4

In disposition example 5, a description will be made of an antenna disposition example in a case where the number $N_t$ of transmission antennae 1108 is three (for example, Tx #1 to Tx #3), and the number $N_a$ of reception antennae 1202 is four. In disposition example 5, transmission antenna 1108 is a one-dimensional linear array, and reception antenna 1202 is a two-dimensional planar array.

Disposition Example 5-1

Figure 49:
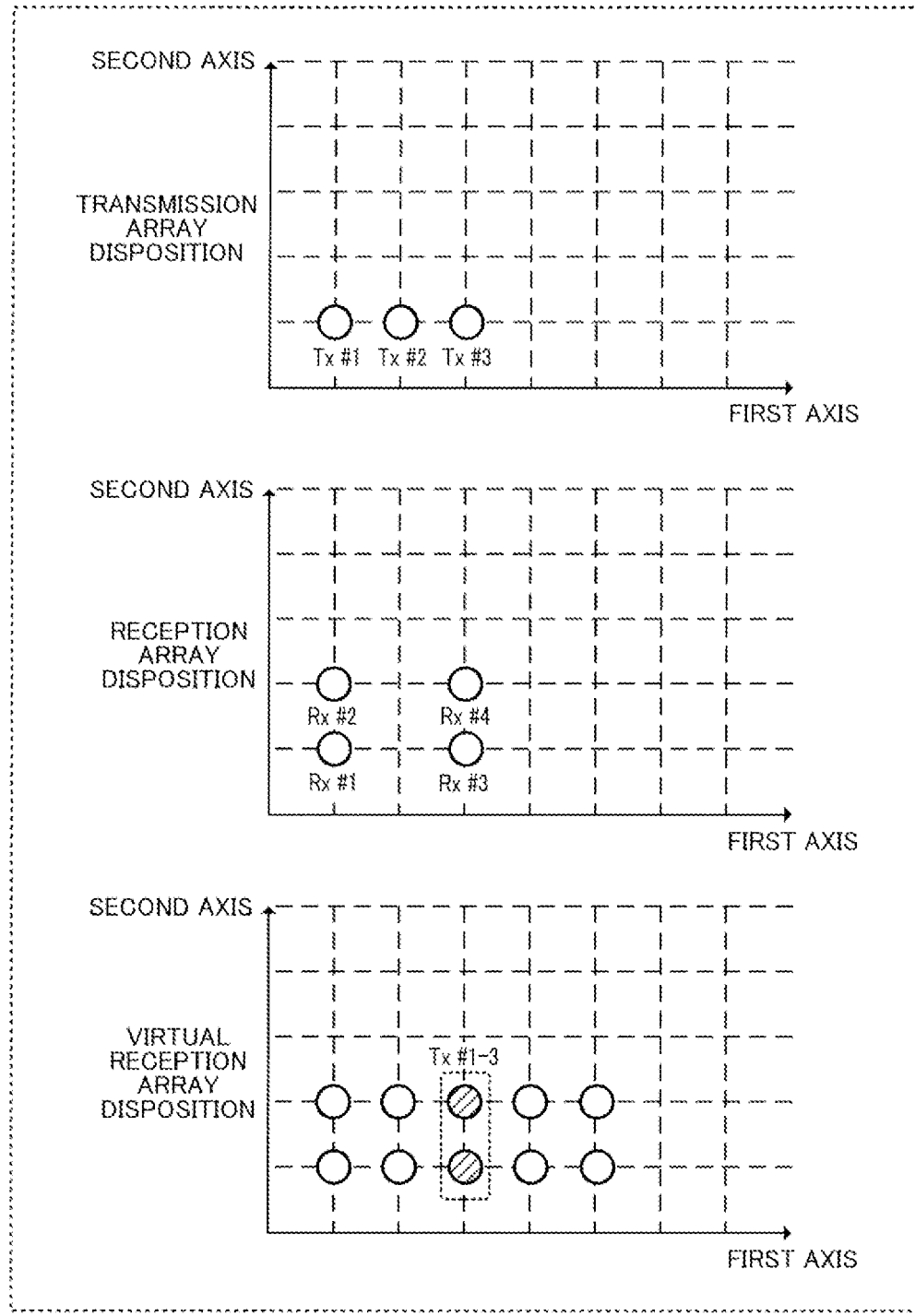
FIG. 49 is a diagram illustrating an example of antenna disposition according to Variation 4 of Embodiment 8.

FIG. 49 illustrates examples of antenna disposition of transmission antennae 1108 and reception antenna 1202, and disposition of virtual reception arrays related to disposition example 5-1.

In FIG. 49, for example, Tx #1 to Tx #3 are disposed, for example, linearly at interval d in the first axis direction. In reception antennae 1202, for example, two elements are disposed in two sets (a set of Rx #1 and Rx #2 and a set of Rx #3 and Rx #4) at interval d in the second axis direction, and the two sets are disposed to be separated from each other by interval 2d in the first axis direction.

In this case, as illustrated in FIG. 49, in virtual reception array disposition (virtual antennae of Nt×Na=12), virtual antennae corresponding to Tx #1 and Tx #3 are disposed to overlap each other at two locations in the second axis direction (one overlap).

Consequently, in FIG. 49, radar apparatus 110 can improve the quality (for example, an SNR) of a received signal by using received signals received by the virtual antennae at the plurality of disposition positions.

Disposition Example 5-2

Figure 50:
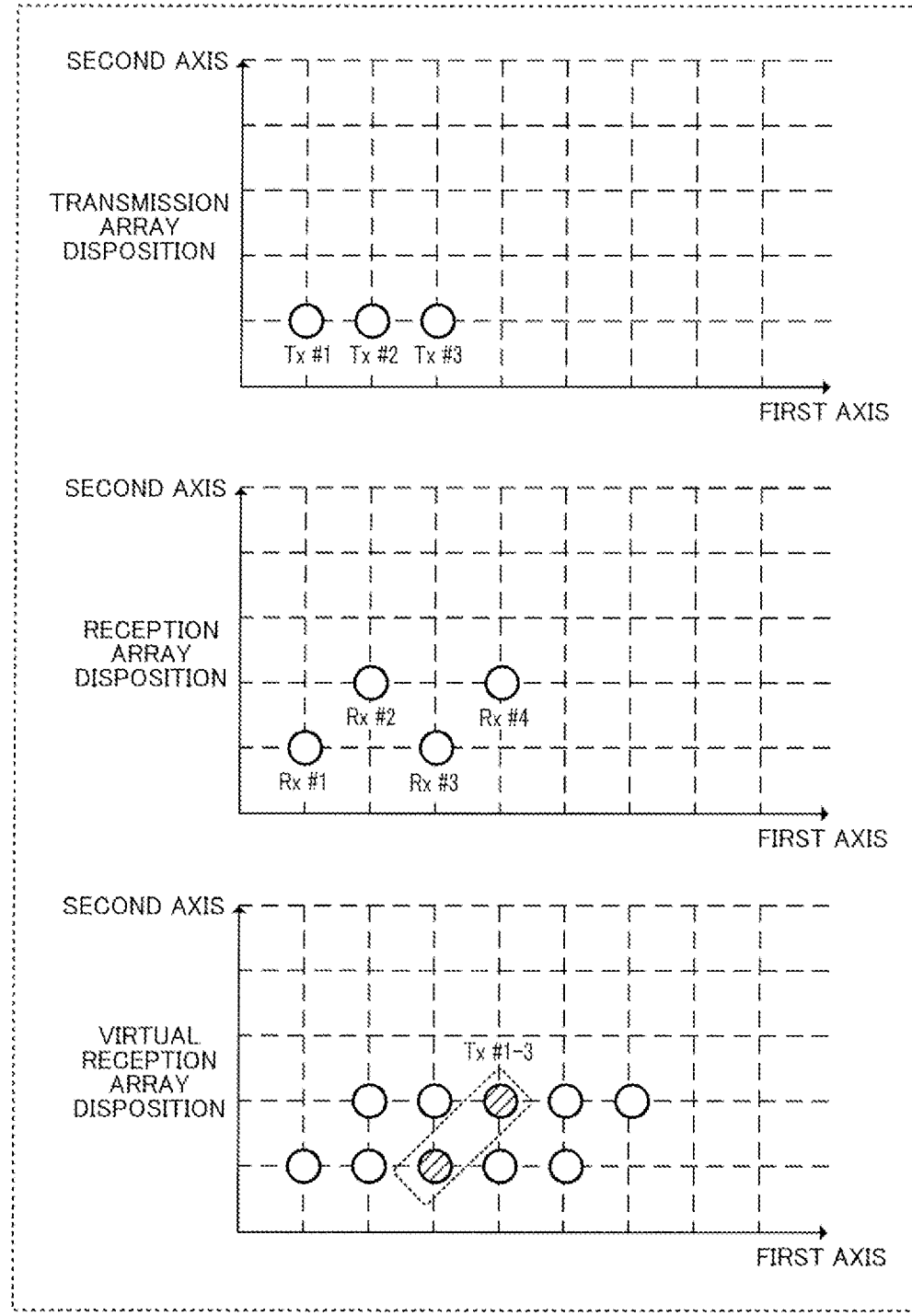
FIG. 50 is a diagram illustrating an example of antenna disposition according to Variation 4 of Embodiment 8.

FIG. 50 illustrates examples of antenna disposition of transmission antennae 1108 and reception antenna 1202, and disposition of virtual reception arrays related to disposition example 5-2.

Compared with the antenna disposition of disposition example 5-1 (FIG. 49), FIG. 50 illustrates antenna disposition in which, in reception antennae 1202, an antenna interval (2d) in the first axis direction is the same, and disposition positions of Rx #2 and Rx #4 are deviated to the right by interval d in the first axis direction. In the antenna disposition illustrated in FIG. 50, in the same manner as in FIG. 49, a virtual antenna corresponding to each transmission antenna 1108 is disposed to overlap virtual antennae corresponding to other transmission antennae at a plurality of disposition position, and thus radar apparatus 110 can improve the quality (for example, an SNR) of a received signal.

Disposition Example 5-3

Figure 51:
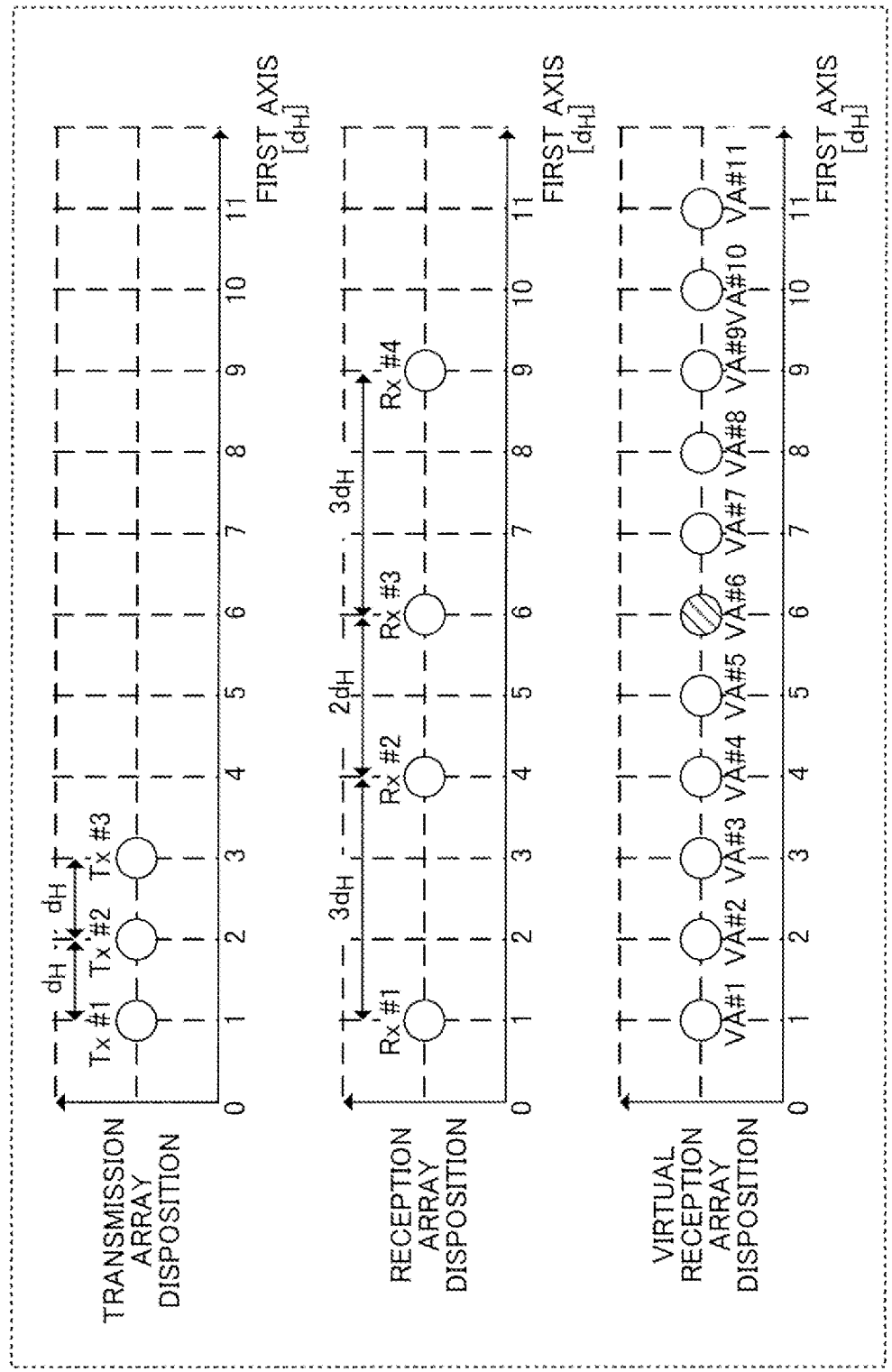
FIG. 51 is a diagram illustrating an example of antenna disposition according to Variation 4 of Embodiment 8.

FIG. 51 illustrates examples of antenna disposition of transmission antennae 1108 and reception antenna 1202, and disposition of virtual reception arrays related to disposition example 5-3.

In FIG. 51, a total number $N_t$ of transmission antennae 1108 is three, and three antennae are respectively indicated by Tx #1 to Tx #3. Transmission antennae Tx #1 to Tx #3 are disposed at an equal interval of $d_H$ in the first axis direction. Here, basic interval $d_H$ in the first axis direction is, for example, $d_H=0.5\lambda$. A total number $N_a$ of reception antennae 1202 is four, and four antennae are respectively indicated by Rx #1 to Rx #4. Reception antennae Rx #1 to Rx #4 are respectively disposed at intervals of $3 \times d_H$, $2 \times d_H$, and $3 \times d_H$ in the first axis direction.

As illustrated in FIG. 51, virtual antennae formed of transmission antenna Tx #3 and reception antenna Rx #2 and virtual antennae formed of transmission antenna Tx #1 and reception antenna Rx #3 are disposed to overlap each other at a position of virtual antenna VA #6.

Figure 52:
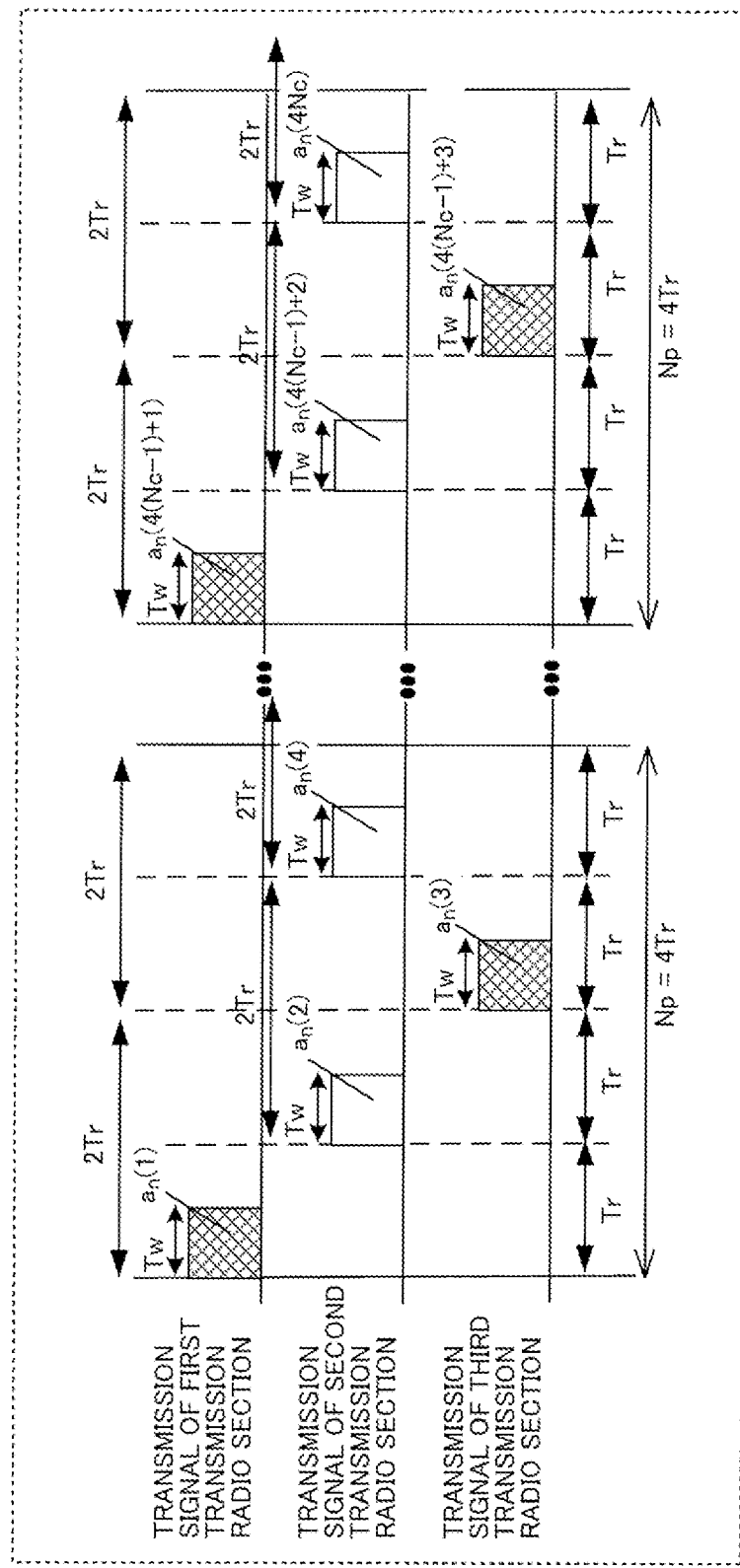
FIG. 52 is a diagram illustrating an example of a transmission switching operation according to Variation 4 of Embodiment 8.

FIG. 52 illustrates an example of a transmission timing of each of transmission antennae 1108 (Tx #1 to Tx #3) in FIG. 51. Transmission cycle T of each transmission antenna 1108 such as Tx #1 to Tx #3 is $4T_r$. As illustrated in FIG. 52, transmission cycle T' of a set (Tx #1 and Tx #3) of transmission antennae 1108 corresponding to virtual antennae disposed at an identical position in on overlap is $2T_r$. As illustrated in FIG. 52, transmission cycle T' of transmission antenna Tx #2 is also $2T_r$. Therefore, radar apparatus 110 may perform a speed estimation process and a CFAR process by adding a signal of a virtual reception array formed of Tx #2 to signals of virtual reception arrays in one overlap.

In a case where speed estimation is performed by using the virtual reception arrays with the transmission cycle (T'=2Tr), when transmission cycle Torg of the related art is assumed to be 3Tr, transmission cycle T' is 2T/3. Consequently, relative speed maximum value $v'_{max}$ (or a Doppler frequency range) becomes 1.5 times as great as relative speed maximum value $v_{max}$ based on transmission interval Torg of each transmission antenna 1108.

There is an advantage in an SNR regarding the transmission method. Typically, as in FIG. 52, a radar transmission signal is transmitted only once for N times of transmission from Tx #2 (at Nt=3 and N=3) in which there is no overlapping in a virtual antenna, and thus a total number of times of transmission is Nc. However, a radar transmission signal is transmitted twice for N times of transmission from Tx #2 in which there is no overlapping in a virtual antenna, and thus a total number of times of transmission is 2Nc. The entire transmission is performed at interval 2Tr, and thus received signals are subjected to in-phase addition through FFT such that an SNR can be expected to be improved.

Variation 5 of Embodiment 8

Figure 53:
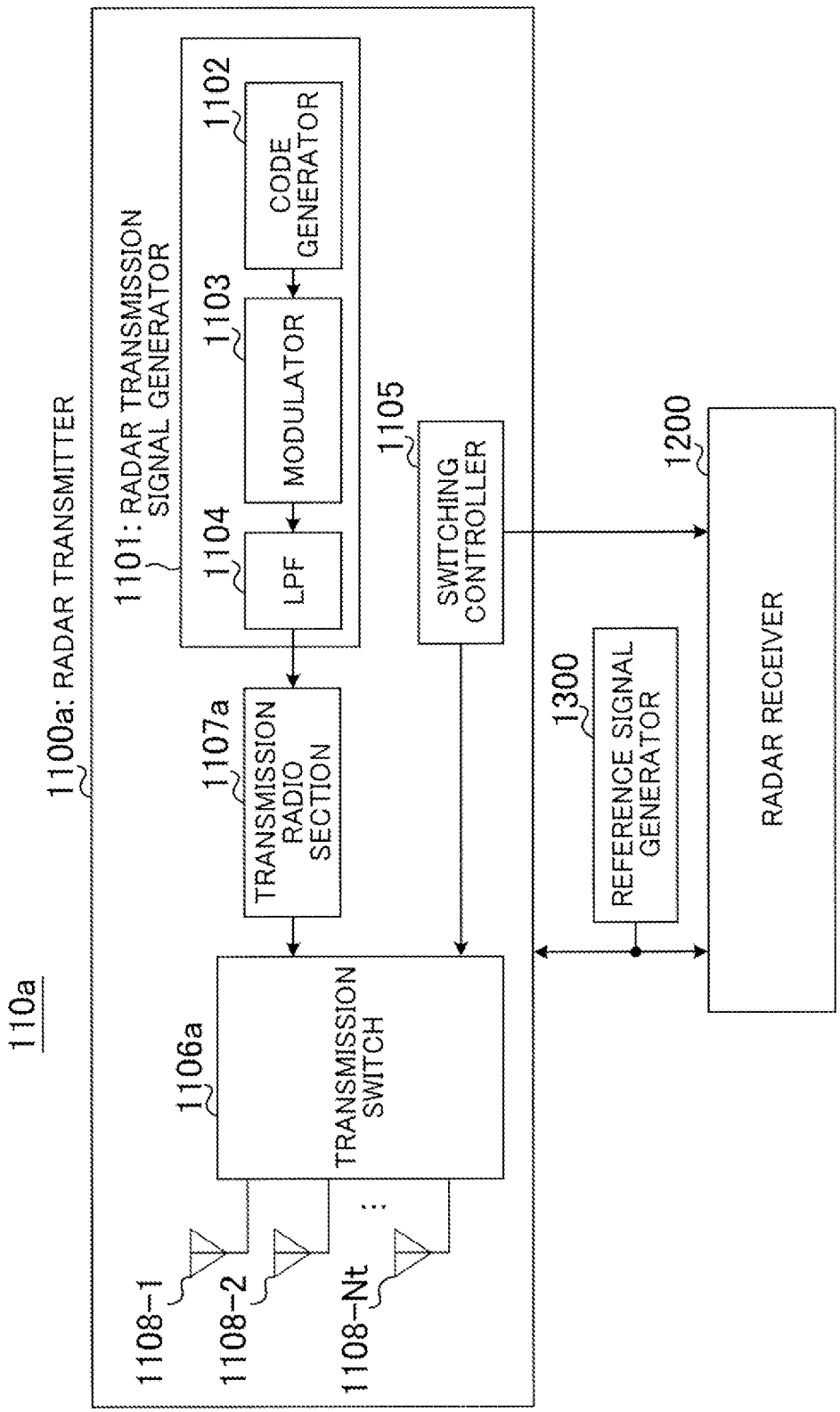
FIG. 53 is a block diagram illustrating a configuration example of a radar apparatus according to Variation 5 of Embodiment 8.

A configuration of a radar apparatus according to an aspect of the present disclosure is not limited to the configuration illustrated in FIG. 21. For example, a configuration of radar apparatus 110a illustrated in FIG. 53 may be used. In FIG. 53, a configuration of radar receiver 1200 is the same as the configuration illustrated in FIG. 21, and thus a detailed configuration thereof is not illustrated.

In radar apparatus 110 illustrated in FIG. 21, in radar transmitter 1100, transmission witching section 1106 selectively switches an output from radar transmission signal generator 1101 to any one of a plurality of transmission radio sections 1107. In contrast, in radar apparatus 110a illustrated in FIG. 53, in radar transmitter 1100a, transmission radio section 1107a performs a transmission radio process on an output (radar transmission signal) from radar transmission signal generator 1101, and transmission witching section 1106a selectively switches an output from transmission witching section 1107a to any one of a plurality of transmission antennae 1108.

The configuration of radar apparatus 110a illustrated in FIG. 53 can also achieve the same effect as that of the embodiment.

Variation 6 of Embodiment 8

In the embodiment, in radar transmitter 1100, a description has been made of a case using a pulse compression radar that performs phase modulation or amplitude modulation on a pulse train and then transmits the pulse train, but a modulation method is not limited thereto. For example, the present disclosure is also applicable to a radar method using a pulse wave such as a chirp pulse subjected to frequency modulation.

Figure 54:
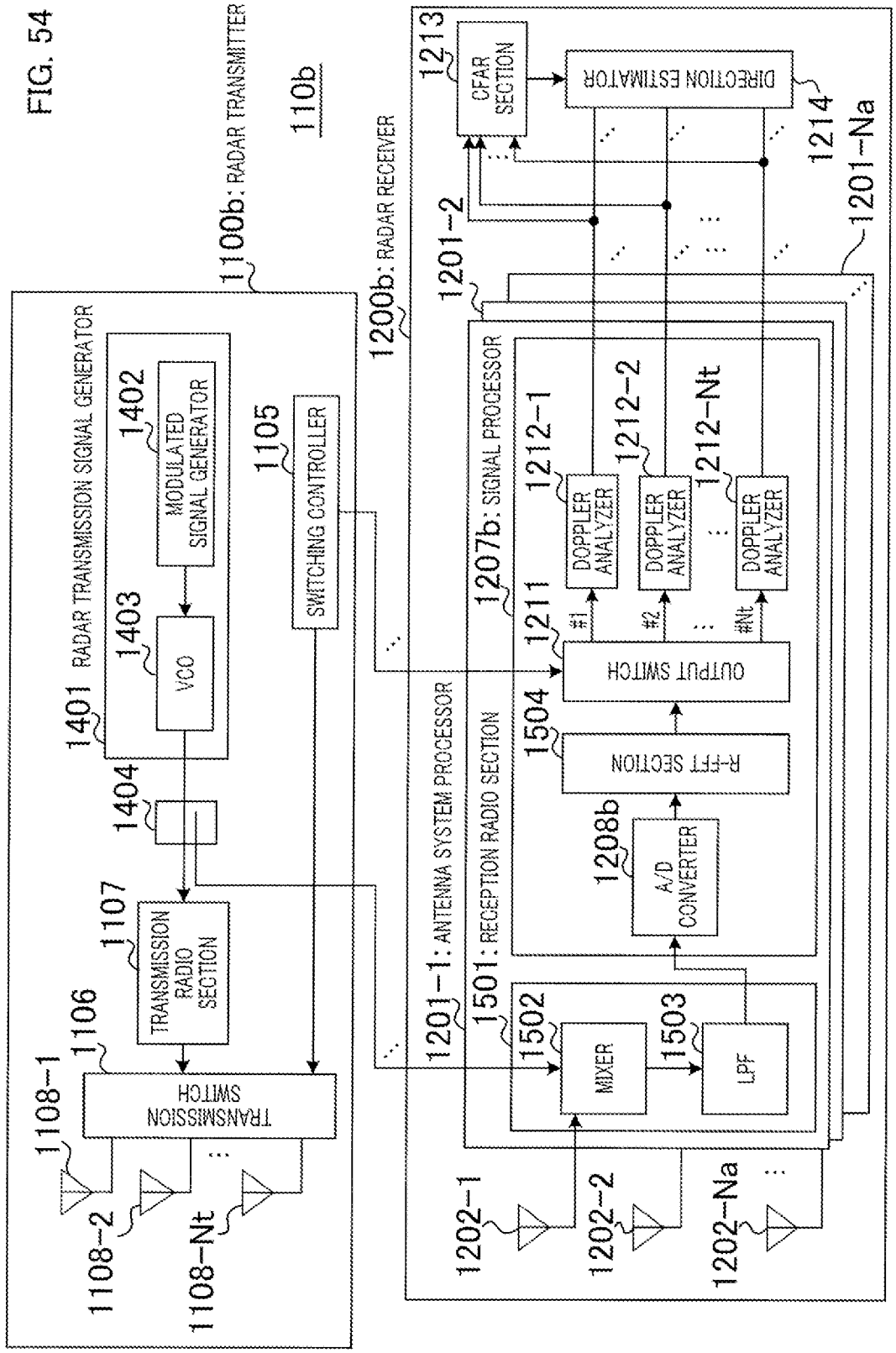
FIG. 54 is a block diagram illustrating a configuration example of a radar apparatus according to Variation 6 of Embodiment 8.

FIG. 54 is a diagram illustrating an example of a configuration of radar apparatus 110b in a case where a radar method using chirp pulse (for example, fast chirp modulation) is applied. In FIG. 54, the same constituent element as in FIG. 21 will be given an identical reference numeral, and a description thereof will be omitted.

First, a description will be made of a transmission process in radar transmitter 1100b.

In radar transmitter 1100b, radar transmission signal generator 1401 includes modulated signal generator 1402 and voltage controlled oscillator (VCO) 403.

Figure 55:
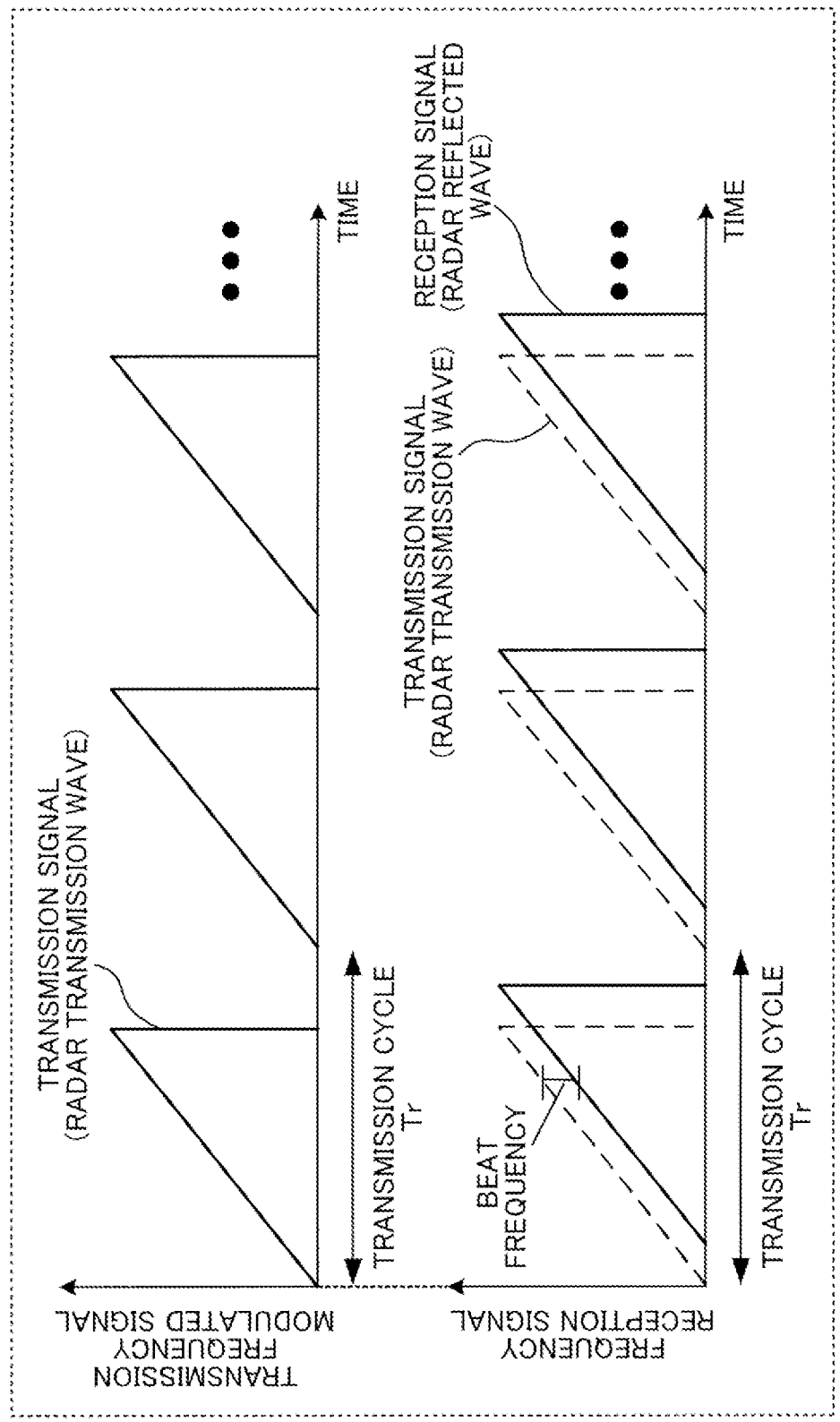
FIG. 55 is a diagram illustrating examples of a transmission signal and a reflected wave signal in a case where a chirp pulse is used.

Modulated signal generator 1402 periodically generates, for example, a modulated signal having a saw tooth shape as illustrated in FIG. 55. Here, a radar transmission cycle is indicated by Tr.

VCO 403 outputs a frequency modulated signal (that is, a frequency chirp signal) to transmission radio section 1107 on the basis of a radar transmission signal output from modulated signal generator 1402. The frequency modulated signal is amplified in transmission radio section 1107, and is radiated to the space from transmission antenna 1108 to which switching is performed by transmission switch 1106. For example, radar transmission signals are respectively transmitted from transmission antennae including first transmission antenna 1108 to Nt-th transmission antenna 1108 at a transmission interval of the cycle of Np (=Nt×Tr).

Directional coupler 1404 extracts some of the frequency modulated signals, and outputs the extracted frequency modulated signals to respective reception radio sections 1501 (mixers 1502) of radar receiver 1200b.

Next, a description will be made of a reception process in radar receiver 1200b.

In reception radio section 1501 of radar receiver 1200b, mixer 1502 mixes a received reflected wave signal with the frequency modulated signal (a signal that is input from directional coupler 1404) that is a transmission signal, and causes a resultant signal to pass through LPF 1503. Consequently, a bit signal having a frequency corresponding to a delay time of the reflected wave signal is extracted. For example, as illustrated in FIG. 55, a difference frequency between a frequency of the transmission signal (transmission frequency modulated wave) and a frequency of the received signal (reception frequency modulated wave) may be obtained as a beat frequency.

A signal output from LPF 1503 is converted into discrete sample data by A/D converter 1208b in signal processor 1207b.

R-FFT section 1504 performs an FFT process on $N_{data}$ pieces of discrete sample data obtained in a predetermined time range (range gate) in each transmission cycle $T_r$. Consequently, signal processor 1207b outputs a frequency spectrum in which a peak appears in the beat frequency corresponding to the delay time of the reflected wave signal (radar reflected wave). During the FFT process, R-FFT section 1504 may multiply a window function coefficient such as a Hann window or a Hamming window. The window function coefficient is used, and thus it is possible to suppress side lobes generated around a beat frequency peak.

Here, a beat frequency spectrum response output from R-FFT section 1504 of z-th signal processor 1207b, obtained due to M-th chirp pulse transmission, is indicated by AC_RFT$_z$(fb,M). Here, fb is an index number (bin number) of FFT, and is fb=0, . . . , and $N_{data}$/2. Smaller frequency index $f_b$ indicates a beat frequency at which a delay time of a reflected wave signal becomes shorter (that is, a distance from a target becomes shorter).

Output switch 1211 of z-th signal processor 1207b selectively switches an output from R-FFT section 1504 in each radar transmission cycle Tr to one of Nt Doppler analyzers 1212, and outputs the output to the selected Doppler analyzer, on the basis of a switching control signal that is input from switching controller 1105, in the same manner as in the embodiment.

Hereinafter, as an example, a switching control signal in M-th radar transmission cycle Tr[M] is represented by Nt-bit information [bit$_1$(M), bit$_2$(M), . . . , and bit$_{Nt}$(M)]. For example, in a case where, in the switching control signal in M-th radar transmission cycle Tr[M], ND-th bit bit$_{ND}$(M) (where ND is any one of 1 to Nt) is "1", output switch 1211 selects ND-th Doppler analyzer 1212 (that is, turns on Doppler analyzer 1212). On the other hand, in a case where, in the switching control signal in M-th radar transmission cycle Tr[M], the ND-th bit bit$_{ND}$(M) is "0", output switch 1211 non-selects ND-th Doppler analyzer 1212 (that is, turns off Doppler analyzer 1212). Output switch 1211 outputs a signal that is input from R-FFT section 1504, to selected Doppler analyzer 1212.

As described above, respective Doppler analyzers 1212 are sequentially turned on in the cycle of Np (=Nt×Tr). The switching control signal repeats the content $N_c$ times. In the same manner as in the present embodiment, selection (that is, a transmission timing of transmission antennae 1108) of Doppler analyzers 1212 corresponding to transmission antennae 1108 corresponding to virtual antennae disposed to overlap each other at an identical position is set at an equal interval in a transmission cycle of each transmission antenna 1108.

A transmission start time for a transmission signal of each transmission radio section 1107 may not be synchronized with cycle Tr. For example, different transmission delays $\Delta_1$, $\Delta_2$, . . . , and $\Delta_{Nt}$ may be respectively provided for transmission start time points of respective transmission radio sections 1107, and radar transmission signals may be transmitted.

z-th (where z=1, . . . , and Na) signal processor 1207b includes Nt Doppler analyzers 1212.

Doppler analyzer 1212 performs Doppler analysis on an output from output switch 1211 for each beat frequency index fb.

For example, in a case where Nc is a power of 2, a fast Fourier transform (FFT) process may be applied in the Doppler analysis.

For example, among w-th outputs from ND Doppler analyzers 1212 of z-th signal processor 1207b, outputs in overlapping virtual reception arrays indicate Doppler frequency response FT_CI$_z^{(ND)}$(fb,f$_s$,w) of Doppler frequency index f$_s$ at beat frequency index fb as indicated by the following expression. ND is 1 to Nt, and w is an integer of 1 or greater. $N_{va}$ indicates the number of antennae corresponding to overlapping virtual reception arrays, and N indicates the number of times of transmission within one cycle. In addition, j is an imaginary number unit, and z is 1 to $N_a$.

(Expression 68)
$$FT\_CI_z^{(ND)}(f_b, f_s, w) = \sum_{q=0}^{N_{va}N_c-1} bit_{ND}(q+1)AC\_RFT_z$$
$$(f_b, NN_c(w-1)+q+1)\exp\left[-j\frac{2\pi\left\lfloor\frac{N_{va}q}{N}\right\rfloor f_s}{N_{va}N_c}\right]$$

On the other hand, for example, among the w-th outputs from ND Doppler analyzers 1212 of z-th signal processor 1207b, outputs in non-overlapping virtual reception arrays other than the overlapping virtual reception arrays indicate Doppler frequency response FT_CI$_z^{ND}$(fb,f$_u$,w) of Doppler frequency index f$_u$ at beat frequency index fb as indicated by the following expression. ND is 1 to Nt, and w is an integer of 1 or greater. In addition, j is an imaginary number unit, and z is 1 to Na.

(Expression 69)
$$FT\_CI_z^{(ND)}(f_b, f_u, w) = \sum_{q=0}^{N_c-1} bit_{ND}(q+1)$$

$$\text{AC\_RFT}_z(f_b, N_t N_c(w-1) + q + 1) \exp\left[-j \frac{2\pi \left\lfloor \frac{q}{N_t} \right\rfloor f_u}{N_c}\right]$$

Processes in signal corrector 1213, CFAR section 1214, and direction estimator 1215 in the stages subsequent to signal processor 1207b correspond to operations in which discrete time k described in the embodiment is replaced with beat frequency index $f_b$, and thus detailed description thereof will be omitted.

Through the configurations and the operations, the present variation can also achieve the same effect as that of the embodiment. A frequency chirp signal may be similarly applied as a radar transmission signal in a variation of one embodiment which will be described later, and thus the same effect as in a case of using a coded pulse signal can be achieved.

Beat frequency index $f_b$ may be converted into distance information that is then output. The following expression may be used to convert beat frequency index $f_b$ into distance information $R(f_b)$. Here, Bw indicates a frequency modulation bandwidth of a frequency chirp signal generated through frequency modulation, and $C_0$ indicates a light speed.

$$R(fb) = \frac{C_0}{2B_{w15}} f_b \quad \text{(Expression 70)}$$

As mentioned above, a plurality of embodiments according to the present embodiment have been described.

Other Embodiments

In radar apparatuses 1 and 110 illustrated in FIGS. 1, 10, 12, 14, 16, 18, 20, and 21, radar transmitter 100 and 1100 and radar receiver 200 and 1200 may be disposed separately at locations physically separated from each other. In radar receivers 200 and 1200 illustrated in FIGS. 1, 12, 14, 16, 18, 20, and 21, direction estimators 214 and 1214 and other constituent elements may be disposed separately at locations physically separated from each other.

Radar apparatus 1 or 110 has, although not illustrated, for example, a central processing unit (CPU), a storage medium such as a read only memory (ROM) storing a control program, and a work memory such as a random access memory (RAM). In this case, the function of each constituent element is realized by the CPU executing the control program. However, a hardware configuration of radar apparatus 1 or 110 is not limited to such an example. For example, each functional element of radar apparatus 1 or 110 may be realized by an integrated circuit (IC). Each functional element may be separately formed of one chip, and may be formed of one chip to include a part or the whole thereof.

As mentioned above, various embodiments have been described with reference to the drawings, but, needless to say, the present disclosure is not limited to the embodiments. It is clear that a person skilled in the art can conceive of various changes or modifications within the category disclosed in the claims, and it is understood that they are naturally included in the technical scope of the present disclosure. The respective constituent elements in the embodiment may be combined with each other within the scope without departing from the spirit of the disclosure.

In the respective embodiments, the present disclosure has been described to be configured by using hardware as an example, but the present disclosure may be realized by software through cooperation with hardware.

Each functional block used in description of each embodiment is generally realized by an LSI that is an integrated circuit. The integrated circuit may be separately formed of one chip, and may be formed of one chip to include a part or the whole thereof. The term LSI is used here, but may be referred to as an IC, a system LSI, a super LSI, or an ultra LSI depending on a difference in the degree of integration.

A method of forming an integrated circuit is not limited to an LSI, and the integrated circuit may be realized by using a dedicated circuit or a general purpose processor. After the LSI is manufactured, a field programmable gate array (FPGA) that is programmable or a reconfigurable processor in which connection or setting of circuit cells of the inside of the LSI is reconfigurable may be used.

In a case where an integrated circuit technique that replaces an LSI appears as a result of advances in semiconductor techniques or other techniques derived therefrom, a functional block may naturally be integrated using the techniques. A biotechnology may be applied.

<Conclusion of Present Disclosure>

According to one aspect of the present disclosure, there is provided a radar apparatus including a plurality of transmitters; and a controller that selects a transmitter which will a transmission signal from among the plurality of transmitters in each transmission cycle of the transmission signal, and provides a transmission gap period that is a period in which the transmission signal is not transmitted between a first period in which each of the plurality of transmitters is selected by at least one round and a second period in which each of the plurality of transmitters is selected by at least one round, the second period being subsequent to the first period.

The radar apparatus according to the aspect of the present disclosure further includes a receiver that receives a signal of each transmission signal reflected at an object; a Doppler analyzer that analyzes a Doppler frequency component of a received signal corresponding to each transmission signal; a detector that detects a peak Doppler frequency component that is a frequency component of which reception power is more than a threshold value from the Doppler frequency component; a determiner that compares a peak Doppler frequency component of a received signal corresponding to a transmission signal in the first period with a peak Doppler frequency component of a received signal corresponding to a transmission signal in the second period, and determines whether or not the peak Doppler frequency components include an aliasing signal; and a direction estimator that estimates a direction of the object on the basis of the peak Doppler frequency component of each of the received signals.

In the radar apparatus according to the aspect of the present disclosure, the determiner converts the peak Doppler frequency component and outputs the converted peak Doppler frequency component to the direction estimator in a case where it is determined that the aliasing signal is included, and outputs the peak Doppler frequency component without being converted to the direction estimator in a case where it is determined the aliasing signal is not included.

In the radar apparatus according to the aspect of the present disclosure, the controller sequentially selects the plurality of transmitters, and the transmission gap period is ½ of a cycle in which the controller selects the plurality of transmitters by one round.

In the radar apparatus according to the aspect of the present disclosure, the controller selects a first transmitter in a first cycle from among the plurality of transmitters, and selects each second transmitter except the first transmitter in a second cycle longer than the first cycle, the detector detects the peak Doppler frequency component from a Doppler frequency component of a received signal corresponding to a transmission signal from the first transmitter, and the determiner determines whether or not an aliasing signal is included in the peak Doppler frequency component of the received signal corresponding to the transmission signal from the first transmitter.

In the radar apparatus according to the aspect of the present disclosure, the transmission gap period is ½ of the first cycle.

In the radar apparatus according to the aspect of the present disclosure, the controller provides the transmission gap period $N_{GAP}$ times, and the transmission gap period is $1/(N_{GAP}+1)$ of a cycle in which the controller selects the plurality of transmitters by one round.

According to another aspect of the present disclosure, there is provided a radar apparatus including a plurality of transmitters; and a code multiplexer that generates a code-multiplexed transmission signal by cyclically multiplexing a code element of an orthogonal code into a transmission signal in each transmission cycle, in which the plurality of transmitters transmit each transmission signal into which a code element is code-multiplexed, in each transmission cycle of the transmission signal in a first period in which the code element of a cyclically generated orthogonal code is transmitted by at least one round, do not transmit the transmission signal into which the code element is code-multiplexed during a predetermined transmission gap period after the first period, and transmit each transmission signal into which a code element is code-multiplexed, in each transmission cycle of the transmission signal in a second period in which the code element of a cyclically generated orthogonal code is transmitted by at least one round after the transmission gap period.

The radar apparatus according to the aspect of the present disclosure further includes a receiver that receives a signal of the code-multiplexed transmission signal reflected at an object; a Doppler analyzer that analyzes a Doppler frequency component of each received signal corresponding to the code element of the code-multiplexed transmission signal; a detector that detects a peak Doppler frequency component that is a frequency component of which reception power is more than a threshold value from the Doppler frequency component; and a determiner that compares a peak Doppler frequency component of a received signal corresponding to a code-multiplexed transmission signal in the first period with a peak Doppler frequency component of a received signal corresponding to a code-multiplexed transmission signal in the second period, and determines whether or not the peak Doppler frequency components include an aliasing signal.

The radar apparatus according to the aspect of the present disclosure further includes a code demultiplexer that demultiplexes a received signal into which the orthogonal code is multiplexed from an output from the Doppler analyzer on the basis of a determination result in the determiner and the orthogonal code; and a direction estimator that estimates a direction of the object on the basis of an output from the code demultiplexer.

In the radar apparatus according to the aspect of the present disclosure, the transmission gap period is ½ of a cycle in which the code element of the orthogonal code is transmitted by one round.

In the radar apparatus according to the aspect of the present disclosure, the transmission gap period is provided $N_{GAP}$ times, and the transmission gap period is $1/(N_{GAP}+1)$ of a cycle in which the code element of the orthogonal code is transmitted by one round.

In the radar apparatus according to the aspect of the present disclosure, the transmission signal is a chirp pulse signal.

According to still another aspect of the present disclosure, there is provided a radar method including causing each of a plurality of transmitters to transmit a transmission signal in each transmission cycle of the transmission signal in a first period in which each of the plurality of transmitters is selected by at least one round; and causing each transmitter not to transmit the transmission signal during a predetermined transmission gap period after the first period, and to transmit the transmission signal in each transmission cycle in a second period in which each of the plurality of transmitters is selected by at least one round after the transmission gap period.

According to still another aspect of the present disclosure, there is provided a radar method including causing each of plurality of transmitters to transmit each transmission signal into which a code element is code-multiplexed, in each transmission cycle of the transmission signal in a first period in which a code element of a cyclically generated orthogonal code is transmitted by at least one round, not to transmit the transmission signal into which the code element is code-multiplexed during a predetermined transmission gap period after the first period, and to transmit each transmission signal into which a code element is code-multiplexed, in each transmission cycle of the transmission signal in a second period in which the code element of a cyclically generated orthogonal code is transmitted by at least one round after the transmission gap period.

According to still another aspect of the present disclosure, there is provided a radar apparatus including a plurality of transmitters; and a controller that selects a first transmitter in a first cycle from among the plurality of transmitters, and selects each second transmitter except the first transmitter in a second cycle longer than the first cycle, in each transmission cycle of a transmission signal.

The radar apparatus according to the aspect of the present disclosure further includes a receiver that receives a signal of each transmission signal reflected at an object; a Doppler analyzer that analyzes a Doppler frequency component of a received signal corresponding to each transmission signal; a detector that detects a peak Doppler frequency component that is a frequency component of which reception power is more than a threshold value from the Doppler frequency component of a received signal corresponding to a transmission signal from the first transmitter; and a direction estimator that estimates a direction of the object on the basis of the peak Doppler frequency component of each received signal.

In the radar apparatus according to the aspect of the present disclosure, the detector converts the peak Doppler frequency component into a range of a Doppler frequency component of a received signal corresponding to a transmission signal from the second transmitter, and excludes overlapping peak frequency components from among peak frequency components obtained through conversion or excludes a peak frequency component of which reception power is less than a predetermined threshold value from among the overlapping peak frequency components.

In the radar apparatus according to the aspect of the present disclosure, the first period is twice the transmission cycle.

In the radar apparatus according to the aspect of the present disclosure, the direction estimator estimates a direction of the object on the basis of the peak Doppler frequency of a plurality of virtual reception antennae virtually formed according to a positional relationship between the plurality of transmitters and at least one receiver, and the first transmitter is disposed at a position where a virtual reception antenna located around a center of the plurality of virtual reception antennae is formed in the plurality of transmitters.

In the radar apparatus according to the aspect of the present disclosure, a first transmitter among a plurality of transmitters transmits a transmission signal in a first cycle, and a second transmitter that is a transmitter except the first transmitter among the plurality of transmitters transmits the transmission signal in a second cycle longer than the first cycle, in each transmission cycle of the transmission signal.

According to still another aspect of the present disclosure, there is provided a radar apparatus including a plurality of transmission antennae; and a transmission circuit that transmits transmission signals by using the plurality of transmission antennae, in which, in a virtual reception array including a plurality of virtual antennae formed of a plurality of reception antennae and the plurality of transmission antennae, disposition positions of at least two of the virtual antennae are the same as each other, and, in which, transmission intervals of the transmission signals that are sequentially transmitted from transmission antennae corresponding to the at least two virtual antennae among the plurality of transmission antennae are an equal interval.

In the radar apparatus according to the aspect of the present disclosure, the transmission circuit transmits the transmission signals in a predetermined transmission pattern by using the plurality of antennae.

In the radar apparatus according to the aspect of the present disclosure, in the transmission pattern, the plurality of antennae include a transmission antenna that transmits the transmission signals a plurality of times.

In the radar apparatus according to the aspect of the present disclosure, in the transmission pattern, the transmission antenna transmitting the transmission signals a plurality of times is a transmission antenna other than a transmission antenna farthest from the centroid in antenna disposition of the plurality of transmission antennae.

In the radar apparatus according to the aspect of the present disclosure, the plurality of virtual antennae corresponding to at least one transmission antenna among the plurality of transmission antennae are disposed to overlap the virtual antennae corresponding to other transmission antennae at a plurality of disposition positions.

In the radar apparatus according to the aspect of the present disclosure, the transmission circuit consecutively transmits the transmission signals from transmission antennae corresponding to the at least two virtual antennae among the plurality of transmission antennae.

In the radar apparatus according to the aspect of the present disclosure, the transmission signals are simultaneously transmitted from at least two transmission antennae among three or more transmission antennae, and disposition positions of the at least two virtual antennae are defined on the basis of a phase center point between the at least two transmission antennae.

The radar apparatus according to the aspect of the present disclosure further includes a reception circuit that receives reflected wave signals of the transmission signals reflected at a target by using three or more reception antennae, the reception circuit combines the reflected wave signals received in at least two reception antennae among the three or more reception antennae with each other, and disposition positions of the at least two virtual antennae are defined on the basis of a phase center point between the at least two reception antennae.

In the radar apparatus according to the aspect of the present disclosure, the plurality of transmission antennae are disposed in a two-dimensional manner.

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2018-185243, filed on Sep. 28, 2018, Japanese Patent Application No. 2018-185294, filed on Sep. 28, 2018 and Japanese Patent Application No. 2019-061414, filed on Mar. 27, 2019, the disclosure of which including the specification, drawings and abstract is incorporated herein by reference in its entirety.

INDUSTRIAL APPLICABILITY

One aspect of the present disclosure is useful for a radar system.

REFERENCE SIGNS LIST 1, 110, 110a, 110b Radar apparatus
100, 1100, 1100a, 1100b Radar transmitter
101, 1101, 1101a, 1401 Radar transmission signal generator
102, 1102 Code generator
103, 1103 Modulator
104, 226, 1104, 1503 LPF
105, 1105 switching controller
106 Transmission RF switch
107 Transmission RF section
108 Orthogonal code generator
109 Code multiplexer
191 Code multiplier
111, 1111 Code memory
112, 1112 D/A converter
121 Transmission antenna switch
122, 1402 Modulated signal generator
123 Voltage controlled oscillator
124 1404 Directional coupler
200, 1200, 1200b Radar receiver
201, 1201 Antenna system processor
203, 1203, 1501 Reception radio section
204, 1204 Amplifier
205, 1205 Frequency converter
206, 1206 Quadrature detector
207, 1207, 1207b Signal processor
208, 209, 228, 1208, 1208b, 1209 A/D converter
210, 1210 Correlation calculator
211, 1211 Output switch
213, 1212 Doppler analyzer
214, 1214 Direction estimator
215, 1213 CFAR section
216 Aliasing determiner
217 Code demultiplexer
220, 1504 R-FFT section 224, 1502 Mixer
1106, 1106a Transmission switch
1107, 1107a Transmission radio section
1108 Transmission antenna
1300 Reference signal generator
1403 VCO

What is claimed is:

1. A radar device, comprising:
a radar transmission circuit that transmits one or more transmission signals, each of the one or more transmission signals having a transmission period Tr, and
a radar receiving circuit that receives one or more reflected signals in which the one or more transmission signals are reflected by an object and estimates a direction of the object based on the one or more reflected signals,
wherein the radar transmission circuit includes:
Nt transmission antennas, where Nt is an integer greater than or equal to 2; and
a control circuit that sets a transmission gap period between a first period and a second period,
wherein the transmission gap period is a period during which the one or more transmission signals are not transmitted,
wherein one of the Nt transmission antennas transmits a transmission signal for each transmission period Tr,
wherein each of the Nt transmit antennas transmits a transmission signal at least once in a period Np,
wherein the first period is equal to an integral multiple of the period Np,
wherein the second period is set after the first period and is equal to an integral multiple of the period Np,
wherein the radar receiving circuit includes:
a receiving antenna that receives the one or more reflected signals;
a Doppler analysis circuit that analyzes a Doppler frequency component of each of the one or more reflected signals in the first period and the second period;
a detection circuit that detects a first peak Doppler frequency component in the first period and a second peak Doppler frequency component in the second period, the first peak Doppler frequency component being detected from a first period Doppler frequency component whose received power is greater than a threshold value in the first period, the second peak Doppler frequency component being detected from a second period Doppler frequency component whose received power is greater than the threshold value in the second period;
a determination circuit that compares the first peak Doppler frequency component in the first period with the second peak Doppler frequency component in the second period to determine whether or not the first peak Doppler frequency component in the first period and the second peak Doppler frequency component in the second period includes an aliasing signal; and
a direction estimation circuit that estimates the direction of the object based on the Doppler frequency component of each of the one or more reflected signals in the first period and the second period to which a presence or an absence of the aliasing signal is applied,
when the period Np is larger than Nt times the transmission period Tr:
the control circuit selects, within the period Np, a first transmitting antenna among the Nt transmission antennas multiple times, selects each second transmitting antenna other than the first transmitting antenna once among the Nt transmission antennas, and sets a period in which the first transmitting antenna is selected to be shorter than a period in which each second transmitting antenna part is selected; and
the detection circuit detects one of the first peak Doppler frequency component in the first period or the second peak Doppler frequency component in the second period, the first peak Doppler frequency component and the second peak Doppler frequency component corresponding to a transmission signal from the first transmitting antenna, and
the determination circuit determines whether the aliasing signal is included in the one of the first peak Doppler frequency component or the second peak Doppler frequency component.

2. The radar apparatus according to claim 1, wherein the control circuit selects at least one of the Nt transmission antennas for each transmission period Tr.

3. The radar apparatus according to claim 1, wherein the control circuit selects all of the Nt transmission antennas for each transmission period Tr.

4. The radar apparatus according to claim 1, wherein the control circuit sets the transmission gap period whenever the transmission signals are transmitted $Nc/(N_{GAP}+1)$ times from at least one of the $N_t$ transmit antennas,
Nc is an integer greater than or equal to 2,
the $N_{GAP}$ is an integer greater than or equal to 1, and
the transmission gap period is equal to $1/(N_{GAP}+1)$ of the period Np.

5. The radar apparatus according to claim 4, wherein the $N_{GAP}$ is equal to one, and
the transmission gap period is equal to ½ of the period $N_p$.

6. The radar apparatus according to claim 1, wherein, when the determination circuit determines that the aliasing signal is included in the first peak Doppler frequency component in the first period or the second peak Doppler frequency component in the second period, the determination circuit converts the Doppler frequency component of each of the one or more reflected signals in the first period and the second period, and
when the determination circuit determines that the aliasing signal is not included in the first peak Doppler frequency component in the first period and the second peak Doppler frequency component in the second period, the determination circuit does not convert the Doppler frequency component of each of the one or more reflected signals in the first period and the second period.

* * * * *